US007251218B2

(12) United States Patent
Jorgensen

(10) Patent No.: US 7,251,218 B2
(45) Date of Patent: Jul. 31, 2007

(54) METHOD AND COMPUTER PROGRAM PRODUCT FOR INTERNET PROTOCOL (IP)-FLOW CLASSIFICATION IN A WIRELESS POINT TO MULTI-POINT (PTMP) TRANSMISSION SYSTEM

(75) Inventor: Jacob W. Jorgensen, Folsom, CA (US)

(73) Assignee: Van Drebbel Mariner LLC, Los Altos, CA (US)

( * ) Notice: Subject to any disclaimer, the term of this patent is extended or adjusted under 35 U.S.C. 154(b) by 1093 days.

(21) Appl. No.: 10/241,454

(22) Filed: Oct. 24, 2002

(65) Prior Publication Data
US 2003/0067903 A1    Apr. 10, 2003

Related U.S. Application Data

(63) Continuation of application No. 09/350,156, filed on Jul. 9, 1999, now Pat. No. 6,452,915.

(60) Provisional application No. 60/092,452, filed on Jul. 10, 1998.

(51) Int. Cl.
*H04Q 7/24* (2006.01)
*G06F 15/16* (2006.01)
(52) U.S. Cl. .................. 370/235; 370/231; 709/235
(58) Field of Classification Search ................ 370/235, 370/231; 709/232–235
See application file for complete search history.

(56) References Cited

U.S. PATENT DOCUMENTS 4,472,801 A    9/1984   Huang

| 4,742,512 A | 5/1988 | Akashi et al. |
|---|---|---|
| 4,802,836 A | 2/1989 | Whissell |
| 4,907,224 A | 3/1990 | Scoles et al. |
| 5,231,634 A | 7/1993 | Giles et al. |
| 5,282,222 A | 1/1994 | Fattouche et al. |
| 5,337,313 A | 8/1994 | Buchholz et al. |
| 5,420,851 A | 5/1995 | Seshadri et al. |
| 5,442,625 A | 8/1995 | Gitlin et al. |

(Continued)

FOREIGN PATENT DOCUMENTS

CA    2064975    7/1999

(Continued)

OTHER PUBLICATIONS

Kim et al. "The AT&T Labs Broadband Fixed Wireless Field Experiment", IEEE Communications Magazine, Oct. 1999, pp. 56-62.

(Continued)

*Primary Examiner*—Krisna Lim
(74) *Attorney, Agent, or Firm*—Fulbright & Jaworski LLP

(57) ABSTRACT

A system and method for Internet Protocol (IP) flow classification group IP flows in a packet-centric wireless point to multi-point telecommunications system is disclosed. The method comprises analyzing an IP flow in a packet-centric manner, classifying the IP flow, scheduling the IP flow for transmission over a shared wireless bandwidth between a wireless base station and at least one subscriber customer premises equipment (CPE) station, allocating the shared wireless bandwidth to a communication of the IP flow between the wireless base station and a subscriber CPE station so as to optimize end-user quality of service (QoS) associated with the IP flow.

146 Claims, 41 Drawing Sheets

U.S. PATENT DOCUMENTS

| | | |
|---|---|---|
| 5,444,718 A | 8/1995 | Ejzak et al. |
| 5,493,569 A | 2/1996 | Buchholz et al. |
| 5,497,504 A | 3/1996 | Acampora et al. |
| 5,499,243 A | 3/1996 | Hall |
| 5,515,363 A | 5/1996 | Ben-Nun et al. |
| 5,570,355 A | 10/1996 | Dail et al. |
| 5,572,528 A | 11/1996 | Shuen |
| 5,581,544 A | 12/1996 | Hamada et al. |
| 5,594,720 A | 1/1997 | Papadopoulos et al. |
| 5,602,836 A | 2/1997 | Papadopoulos et al. |
| 5,610,910 A | 3/1997 | Focsaneanu et al. |
| 5,613,198 A | 3/1997 | Ahmadi et al. |
| 5,625,877 A | 4/1997 | Dunn et al. |
| 5,638,371 A | 6/1997 | Raychaudhuri et al. |
| 5,640,395 A | 6/1997 | Hamalainen et al. |
| 5,644,576 A | 7/1997 | Bauchot et al. |
| 5,648,969 A | 7/1997 | Pasternak et al. |
| 5,684,791 A | 11/1997 | Raychaudhuri et al. |
| 5,701,302 A | 12/1997 | Geiger |
| 5,717,689 A | 2/1998 | Ayanoglu |
| 5,724,513 A | 3/1998 | Ben-Nun et al. |
| 5,729,542 A | 3/1998 | Dupont |
| 5,732,077 A | 3/1998 | Whitehead |
| 5,734,833 A | 3/1998 | Chiu et al. |
| 5,742,847 A | 4/1998 | Knoll et al. |
| 5,745,480 A | 4/1998 | Behtash et al. |
| 5,745,551 A | 4/1998 | Strauch et al. |
| 5,751,708 A | 5/1998 | Eng et al. |
| 5,752,193 A | 5/1998 | Scholefield et al. |
| 5,758,281 A | 5/1998 | Emery et al. |
| 5,774,461 A | 6/1998 | Hyden et al. |
| 5,787,077 A | 7/1998 | Kuehnel et al. |
| 5,787,080 A | 7/1998 | Hulyalkar et al. |
| 5,790,551 A | 8/1998 | Chan |
| 5,793,416 A | 8/1998 | Rostoker et al. |
| 5,802,465 A | 9/1998 | Hamalainen et al. |
| 5,826,188 A | 10/1998 | Tayloe et al. |
| 5,828,666 A | 10/1998 | Focsaneanu et al. |
| 5,828,677 A | 10/1998 | Sayeed et al. |
| 5,831,971 A | 11/1998 | Bonomi et al. |
| 5,831,975 A | 11/1998 | Chen et al. |
| 5,838,670 A | 11/1998 | Billström |
| 5,841,777 A | 11/1998 | Cohen |
| 5,864,540 A | 1/1999 | Bonomi et al. |
| 5,872,777 A | 2/1999 | Brailean et al. |
| 5,889,816 A | 3/1999 | Agrawal et al. |
| 5,907,822 A | 5/1999 | Prieto, Jr. |
| 5,909,550 A | 6/1999 | Shankar et al. |
| 5,920,705 A | 7/1999 | Lyon et al. |
| 5,930,472 A | 7/1999 | Smith |
| 5,936,949 A | 8/1999 | Pasternak et al. |
| 5,953,328 A | 9/1999 | Kim et al. |
| 5,953,344 A | 9/1999 | Dail et al. |
| 5,956,330 A | 9/1999 | Kerns |
| 5,959,999 A | 9/1999 | An |
| 5,960,000 A | 9/1999 | Ruszczyk et al. |
| 5,966,378 A | 10/1999 | Hamalainen |
| 5,970,059 A | 10/1999 | Ahopelto et al. |
| 5,970,062 A | 10/1999 | Bauchot |
| 5,974,028 A | 10/1999 | Ramakrishnan |
| 5,974,085 A | 10/1999 | Smith |
| 5,991,292 A | 11/1999 | Focsaneanu et al. |
| 6,002,935 A | 12/1999 | Wang |
| 6,005,868 A | 12/1999 | Ito |
| 6,014,377 A | 1/2000 | Gillespie |
| 6,016,311 A | 1/2000 | Gilbert et al. |
| 6,018,516 A | 1/2000 | Packer |
| 6,021,158 A | 2/2000 | Schurr et al. |
| 6,021,439 A | 2/2000 | Turek et al. |
| 6,028,842 A | 2/2000 | Chapman et al. |
| 6,031,832 A | 2/2000 | Turina |
| 6,031,845 A | 2/2000 | Walding |
| 6,038,216 A | 3/2000 | Packer |
| 6,038,230 A | 3/2000 | Ofek |
| 6,038,451 A | 3/2000 | Syed et al. |
| 6,038,452 A | 3/2000 | Strawczynski |
| 6,041,051 A | 3/2000 | Doshi et al. |
| 6,046,980 A | 4/2000 | Packer |
| 6,052,594 A | 4/2000 | Chuang et al. |
| 6,058,114 A | 5/2000 | Sethuram et al. |
| 6,064,649 A | 5/2000 | Johnston |
| 6,072,790 A | 6/2000 | Neumiller et al. |
| 6,075,787 A | 6/2000 | Bobeck et al. |
| 6,075,792 A | 6/2000 | Ozluturk |
| 6,081,524 A | 6/2000 | Chase et al. |
| 6,081,536 A | 6/2000 | Gorsuch et al. |
| 6,084,855 A | 7/2000 | Soirinsuo et al. |
| 6,084,867 A | 7/2000 | Meier |
| 6,091,959 A | 7/2000 | Souissi et al. |
| 6,092,113 A | 7/2000 | Maeshima et al. |
| 6,097,707 A | 8/2000 | Hodzic et al. |
| 6,097,722 A | 8/2000 | Graham et al. |
| 6,097,733 A | 8/2000 | Basu et al. |
| 6,104,721 A | 8/2000 | Hsu |
| 6,111,863 A | 8/2000 | Rostoker et al. |
| 6,115,357 A | 9/2000 | Packer et al. |
| 6,115,370 A | 9/2000 | Struhsaker et al. |
| 6,115,390 A | 9/2000 | Chuah |
| 6,131,012 A | 10/2000 | Struhsaker et al. |
| 6,131,027 A | 10/2000 | Armbruster et al. |
| 6,131,117 A | 10/2000 | Clark et al. |
| 6,151,300 A | 11/2000 | Hunt et al. |
| 6,151,628 A | 11/2000 | Xu et al. |
| 6,154,643 A | 11/2000 | Cox |
| 6,154,647 A | 11/2000 | Dahlin et al. |
| 6,154,776 A | 11/2000 | Martin |
| 6,160,793 A | 12/2000 | Ghani et al. |
| 6,163,532 A | 12/2000 | Taguchi et al. |
| 6,175,860 B1 | 1/2001 | Gaucher |
| 6,188,671 B1 | 2/2001 | Chase et al. |
| 6,192,029 B1 | 2/2001 | Averbuch et al. |
| 6,195,565 B1 | 2/2001 | Dempsey et al. |
| 6,198,728 B1 | 3/2001 | Hulyalkar et al. |
| 6,201,811 B1 | 3/2001 | Larsson et al. |
| 6,205,120 B1 | 3/2001 | Packer et al. |
| 6,208,620 B1 | 3/2001 | Sen et al. |
| 6,215,769 B1 | 4/2001 | Ghani et al. |
| 6,219,713 B1 | 4/2001 | Ruutu et al. |
| 6,236,656 B1 | 5/2001 | Westerberg et al. |
| 6,247,058 B1 | 6/2001 | Miller et al. |
| 6,252,857 B1 | 6/2001 | Fendick et al. |
| 6,256,300 B1 | 7/2001 | Ahmed et al. |
| 6,262,980 B1 | 7/2001 | Leung et al. |
| 6,263,209 B1 | 7/2001 | Reed |
| 6,272,129 B1 | 8/2001 | Dynarski |
| 6,272,333 B1 | 8/2001 | Smith |
| 6,282,208 B1 | 8/2001 | Bowcutt et al. |
| 6,295,285 B1 | 9/2001 | Whitehead |
| 6,304,564 B1 | 10/2001 | Monin et al. |
| 6,310,886 B1 | 10/2001 | Barton |
| 6,320,846 B1 | 11/2001 | Jamp et al. |
| 6,324,184 B1 | 11/2001 | Hou et al. |
| 6,327,254 B1 | 12/2001 | Chuah |
| 6,330,244 B1 | 12/2001 | Swartz et al. |
| 6,330,451 B1 | 12/2001 | Sen et al. |
| 6,331,986 B1 | 12/2001 | Mitra et al. |
| 6,331,987 B1 | 12/2001 | Beser |
| 6,336,143 B1 | 1/2002 | Diedrich et al. |
| 6,353,616 B1 | 3/2002 | Elwalid et al. |
| 6,363,053 B1 | 3/2002 | Schuster et al. |
| 6,377,548 B1 | 4/2002 | Chuah |
| 6,377,782 B1 | 4/2002 | Bishop et al. |
| 6,400,722 B1 | 6/2002 | Chuah et al. |
| 6,407,992 B1 | 6/2002 | Pasternak et al. |

| | | | |
|---|---|---|---|
| 6,412,006 B2 | 6/2002 | Naudus | |
| 6,438,370 B1 | 8/2002 | Einola et al. | |
| 6,442,158 B1 | 8/2002 | Beser | |
| 6,449,251 B1 | 9/2002 | Awadallah et al. | |
| 6,449,647 B1 | 9/2002 | Colby et al. | |
| 6,452,915 B1 | 9/2002 | Jorgensen | |
| 6,459,682 B1 | 10/2002 | Ellesson | |
| 6,466,651 B1 | 10/2002 | Dailey | |
| 6,512,751 B1 | 1/2003 | Struhsaker et al. | |
| 6,517,614 B1 | 2/2003 | Klotz et al. | |
| 6,546,016 B1 | 4/2003 | Gerszberg et al. | |
| 6,590,885 B1* | 7/2003 | Jorgensen | 370/338 |
| 2002/0099949 A1 | 7/2002 | Fries et al. | |
| 2002/0163933 A1 | 11/2002 | Benveniste | |
| 2003/0067903 A1* | 4/2003 | Jorgensen | 370/338 |

FOREIGN PATENT DOCUMENTS

| | | |
|---|---|---|
| EP | 702 462 A1 | 3/1996 |
| EP | 841 763 A1 | 5/1998 |
| EP | 848 563 A2 | 6/1998 |
| EP | 917 317 A1 | 5/1999 |
| EP | 926 845 A2 | 6/1999 |
| WO | WO 96/10320 | 4/1996 |
| WO | WO 98/37670 | 8/1998 |
| WO | WO 98/37706 | 8/1998 |
| WO | WO 99/26430 | 5/1999 |
| WO | WO 0072626 A1 | 11/2000 |
| WO | WO 00/79722 | 12/2000 |
| WO | WO 01/005098 | 1/2001 |
| WO | WO 01/008372 | 2/2001 |
| WO | WO 02/39710 A1 | 5/2002 |

OTHER PUBLICATIONS

Iera et al. "Wireless Broadband Applications: The Teleservice Model and Adaptive QoS Provisioning", IEEE Communications Magazine, Oct. 1999, pp. 71-75.

Celidonio et al. "A Wideband Two-Layer Radio Access Network Using DECT Technology in the Uplink", IEEE Communications Magazine, Oct. 1999, pp. 76-81.

Yoon et al. "A Wireless Local Loop System Based on Wideband CDMA Technology", IEEE Communications Magazine, Oct. 1999, pp. 128-135.

Balakrishnan et al. "Improving Reliable Transport and Handoff Performance in Cellular Wireless Networks", http://www.cs.berkeley.edu/~ss/papers/wunet/html/winet.html, Computer Science Div., Dept. of Electrical Engineering and Computer Science, Univ. of California at Berkeley, Berkeley, CA 94720-1776, Nov. 1995, pp. 1-18.

Bianchi, et al. "C-PRMA: A Centralized Packet Reservation Multiple Access for Local Wireless Communications" in IEEE Transactions on Vehicular Technology, vol. 46, No. 2 pp. 422-436, May 1997.

"A Cellular Wireless Local Area Network with QoS Guarantees for Heterogeneous Traffic", Author(s): Sunghyun Choi and Kang G. Shin, Technical Report CSE-TR-300-96, Aug. 1996, pp. 1-24.

"The GSM System", Authors: Michel Mouly, Marie-Bernadette Pautet, pp. 272-277, XP-002154762.

"A Comparison of Mechanisms for Improving TCP Performance over Wireless Links" Author(s): Hari Balakrishnan, Venkata N. Padmanabhan, Srinivasan Seshan, and Randy H. Katz; XF000734405 IEEE/ACM Transactions on Networking, vol. 5, No. 6, Dec. 1997, pp. 756-769.

"Improving TCP/IP Performance Over Wireless Networks"; Author(s): Hari Balakrishnan, Srinivasan Seshan, Elan Amire and Randy H. Katz; In Proc. 1st ACM Int'l Conf. Co Mobile Computing and Networking (Mobicom), Nov. 1995, XP-002920962.

International Search Report; Date: Dec. 14, 2000; International Appln. No. PCT/US 00/18531 for (36792-164878).

International Search Report; Date: Feb. 14, 2000; International Appln. No. PCT/US 00/18584 for (36792-164879).

International Search Report; Date: Dec. 14, 2000; International Appln. No. PCT/US 00/18585 for (36792-164880).

International Search Report; Date: Dec. 22, 2000; International Appln. No. PCT/US 00/18666 for (36792-164881).

Cheng et al., "Wireless Intelligent ATM Network and Protocol Design for Future Personal Communication Systems", IEEE 1997.

Zahedi, A. et al. "Voice and Data Integration on TCP/IP Wireless Networks" Personal, Indoor and Mobile Radio Communication Sep. 1-4, 1997, vol. 2, pp. 678-682.

Madhow, U. "Dynamic Congestion Control and Error Recovery over a Heterogeneous Internet" Decision and Control, Dec. 10-12, 1997, vol. 3, pp. 2368-2374.

Kitchin, D. et al. "IEEE P802.11 Wireless LANs—Wireless Multimedia Enahancements (WME)" doc: IEEE 802.11-02/592r0, Sep. 11, 2002.

Jerry D. Gibson, "The Communications Handbook," CRC Press, Inc., first edition, p. 630-31.

IEEE 802 Committee "Draft Supplement to Standard for Telecommunications and Information Exchange Between Systems -LAN/MAN Specific Requirements—Part 11: Wireless Medium Access Control (MAC) and Physical Layer (PHY) specifications: Medium Access Control (MAC Enhancements for Duality of Service (QoS)" IEEE Std. 802.11e/D3.3, Oct. 2002, (Draft Supplement to IEEE Std. 802.11, 1999 Edition).

Cisco White Paper, Policy-Based Routing, 1996 pp. 1-7.

Broadcom Corporation, "BCM3300 Product Brief, BCM3300 QAMLink Single-Chip DOCSIS Cable Modem", www.broadcom.com, Dec. 2, 1999.

Broadcom Corporation, "Broadcom, NetSpeak, and Telogy Networks Demonstrate Voice over IP Cable Modem Reference Design with Call Agent Interface at VON Show", www.broadcom.com, Apr. 14, 1999.

Broadcom Corporation, "Cable Modems Using Broadcom's TurboQAM BCM3348 Integrated Chip Achieve DOCSIS 2.0 Certification from CableLabs", www.broadcom.com, Dec. 19, 2002.

Broadcom Corporation, "Broadcom Announces World's First Single-Chip Cable Modem Solution", www.broadcom.com, Sep. 21, 1998.

Quigley, T. and Harman, D. "Future Proofing, MCNS Data-Over-Cable Protocol", CED, Mar. 1998.

European Examination Report issued for EP 00 947 079.0, dated Jan. 19, 2006.

* cited by examiner

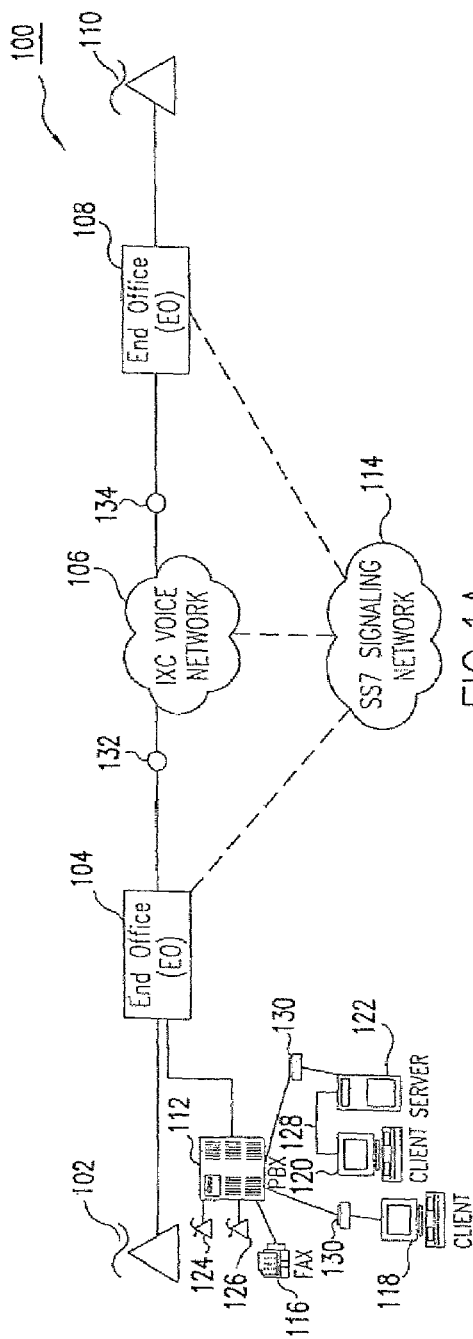
FIG.1A
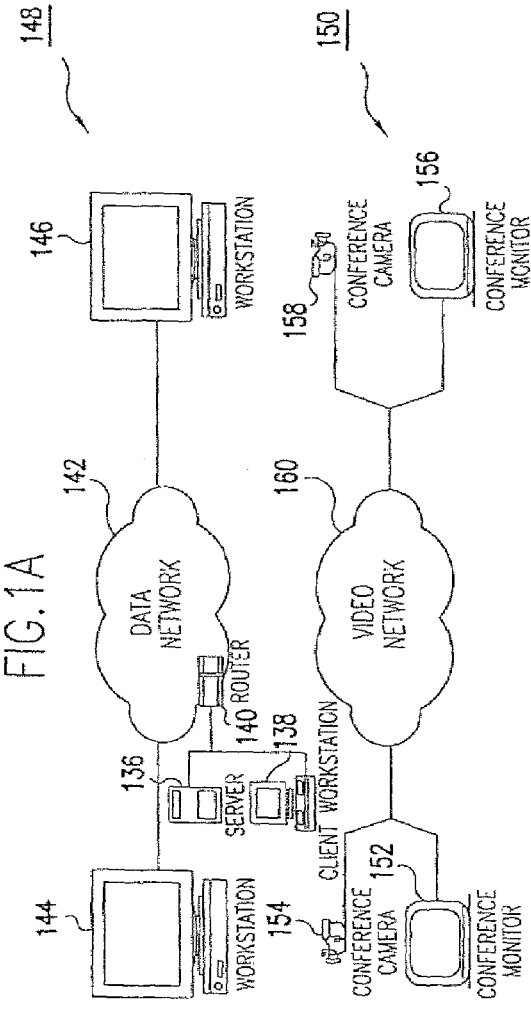
FIG.1B
FIG.1C

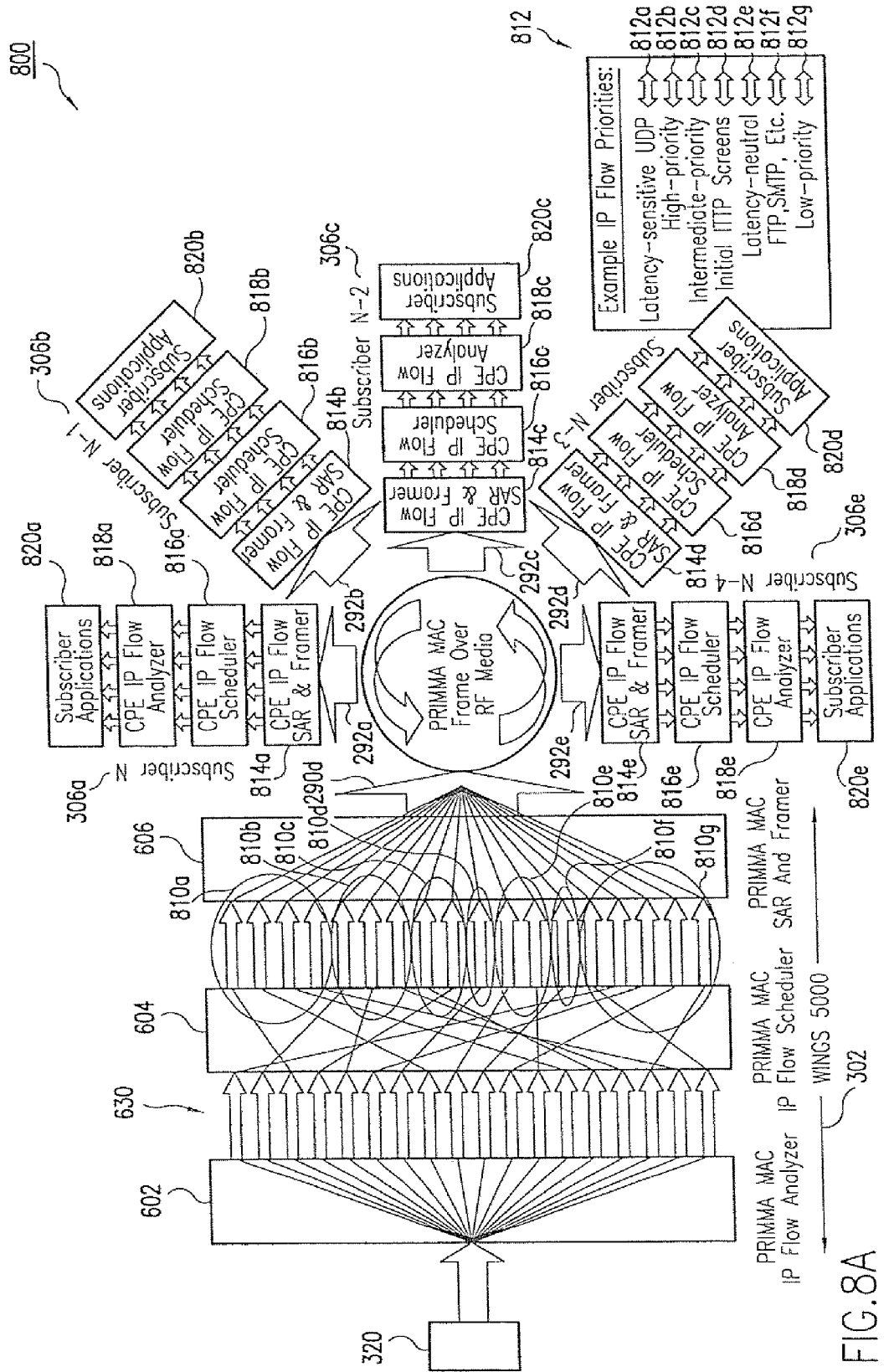

CPE Acknowledging Receipt of Slot Transmitted from Base

METHOD AND COMPUTER PROGRAM PRODUCT FOR INTERNET PROTOCOL (IP)-FLOW CLASSIFICATION IN A WIRELESS POINT TO MULTI-POINT (PTMP) TRANSMISSION SYSTEM

This application is a continuation of U.S. application Ser. No. 09/350,156, filed Jul. 9, 1999, entitled IP-FLOW CLASSIFICATION IN A WIRELESS POINT TO MULTI-POINT (PtMP) TRANSMISSION SYSTEM, which issued as U.S. Pat. No. 6,452,915 on Sep. 17, 2002, and which claims the benefit of priority from U.S. Provisional Patent Application No. 60/092,452, filed Jul. 10, 1998, the disclosures of each are incorporated herein by reference thereto.

CROSS-REFERENCE TO OTHER APPLICATIONS

The following applications of common assignee contain common disclosure:

U.S. Patent Application entitled "Transmission Control Protocol/Internet Protocol (TCP/IP) Packet-Centric Wireless Point to Multi-Point (PtMP) Transmission System Architecture," filed Jul. 9, 1999, assigned U.S. application Ser. No. 09/349,477, issued as U.S. Pat. No. 6,862,622.

U.S. Patent Application entitled "Quality of Service (QoS)—Aware Wireless Point to Multi-Point (PtMP) Transmission System Architecture," filed Jul. 9, 1999, assigned U.S. application Ser. No. 09/349,480, now abandoned.

U.S. Patent Application entitled "Method for Providing Dynamic Bandwidth Allocation Based on IP-Flow Characteristics in a Wireless Point to Multi-Point (PtMP) Transmission System," filed Jul. 9, 1999, assigned U.S. application Ser. No. 09/350,126, now abandoned.

U.S. Patent Application entitled "Method for Providing for Quality of Service (QoS)—Based Handling of IP-Flows in a Wireless Point to Multi-Point Transmission System," filed Jul. 9, 1999, assigned U.S. application Ser. No. 09/350,118, now abandoned.

U.S. Patent Application entitled "IP-Flow Identification in a Wireless Point to Multi-Point Transmission System," filed Jul. 9, 1999, assigned U.S. application Ser. No. 09/347,856, issued as U.S. Pat. No. 6,594,246.

U.S. Patent Application entitled "IP-Flow Characterization in a Wireless Point to Multi-Point (PtMP) Transmission System," filed Jul. 9, 1999, assigned U.S. application Ser. No. 09/350,150, issued as U.S. Pat. No. 6,590,885.

U.S. Patent Application entitled "IP-Flow Prioritization in a Wireless Point to Multi-Point (PtMP) Transmission System," filed Jul. 9, 1999, assigned U.S. application Ser. No. 09/349,476, now abandoned.

U.S. Patent Application entitled "Method of Operation for Providing for Service Level Agreement (SLA) Based Prioritization in a Wireless Point to Multi-Point (PtMP) Transmission System," filed Jul. 9, 1999, assigned U.S. application Ser. No. 09/350,170, now abandoned.

U.S. Patent Application entitled "Method for Transmission Control Protocol (TCP) Rate Control With Link-Layer Acknowledgments in a Wireless Point to Multi-Point (PtMP) Transmission System," filed Jul. 9,1999, assigned U.S. application Ser. No. 09/349,481, now abandoned.

U.S. Patent Application entitled "Transmission Control Protocol/Internet Protocol (TCP/IP)—Centric QoS Aware Media Access Control (MAC) Layer in a Wireless Point to Multi-Point (PtMP) Transmission System," filed Jul. 9, 1999, assigned U.S. application Ser. No. 350,159, now abandoned.

U.S. Patent Application entitled "Use of Priority-Based Scheduling for the Optimization of Latency and Jitter Sensitive IP Flows in a Wireless Point to Multi-Point Transmission System," filed Jul. 9, 1999, assigned U.S. application Ser. No. 09/347,857, now abandoned.

U.S. Patent Application entitled "Time Division Multiple Access/Time Division Duplex (TDMA/TDD) Access Method for a Wireless Point to Multi-Point Transmission System," filed Jul. 9, 1999, assigned U.S. application Ser. No. 09/349,475, now abandoned.

U.S. Patent Application entitled "Reservation Based Prioritization Method for Wireless Transmission of Latency and Jitter Sensitive IP-Flows in a Wireless Point to Multi-Point Transmission System," filed Jul. 9, 1999, assigned U.S. application Ser. No. 09/349,483, issued as U.S. Pat. No. 6,628,629.

U.S. Patent Application entitled "Translation of Internet-Prioritized Internet Protocol (IP)-Flows into Wireless System Resource Allocations in a Wireless Point to Multi-Point (PtMP) Transmission System," filed Jul. 9, 1999, assigned U.S. application Ser. No. 09/349,479, now abandoned.

U.S. Patent Application entitled "Method of Operation for the Integration of Differentiated services (Diff-serv) Marked IP-Flows into a Quality of Service (QoS) Priorities in a Wireless Point to Multi-Point (PtMP) Transmission System," filed Jul. 9, 1999, assigned U.S. application Ser. No. 09/350,162, now abandoned.

U.S. Patent Application entitled "Method for the Recognition and Operation of Virtual Private Networks (VPNs) over a Wireless Point to Multi-Point (PtMP) Transmission System," filed Jul. 9, 1999, assigned U.S. application Ser. No. 09/349,975, issued as U.S. Pat. No. 6,680,922.

U.S. Patent Application entitled "Time Division Multiple Access/Time Division Duplex (TDMA/TDD) Transmission Media Access Control (MAC) Air Frame," filed Jul. 9, 1999, assigned U.S. application Ser. No. 09/350,173, now abandoned.

U.S. Patent Application entitled "Application—Aware, Quality of Service (QoS) Sensitive, Media Access Control (MAC) Layer," filed Jul. 9, 1999, assigned U.S. application Ser. No. 09/349,482, issued as U.S. Pat. No. 6,640,248.

U.S. Patent Application entitled "Transmission Control Protocol/Internet Protocol (TCP/IP) Packet-Centric Wireless Point to Point (PtP) Transmission System Architecture," filed Jul. 9, 1999, assigned U.S. application Ser. No. 09/349,478, now abandoned.

U.S. Patent Application entitled "Transmission Control Protocol/Internet Protocol (TCP/IP) Packet-Centric Cable Point to Multi-Point (PtMP) Transmission System Architecture," filed Jul. 9, 1999, assigned U.S. application Ser. No. 09/349,474, now abandoned.

U.S. Patent Application entitled Transmission Control Protocol/Internet Protocol (TCP/IP) Packet-Centric Wireless Point to Multi-Point (PtMP) Transmission System Architecture," filed Feb. 28, 2005, assigned U.S. application Ser. No. 11/068,719.

U.S. Patent Application entitled "Method for Providing Dynamic Bandwidth Allocation Based on IP-Flow Characteristics in a Wireless Point to Multi-Point (PtMP) Transmission System," filed Aug. 10, 2007, assigned U.S. application Ser. No. 11/502,331.

U.S. Patent Application entitled "Use of Priority-Based Scheduling for the Optimization of Latency and Jitter Sensitive IP Flows in a Wireless Point to Multi-Point Transmission System," filed Aug. 10, 2007, assigned U.S. application Ser. No. 11/502,583.

U.S. Patent Application entitled "Quality of Service (QoS)—Aware Wireless Point to Multi-Point (PtMP) Transmission System Architecture," filed Aug. 10, 2006, assigned U.S. application Ser. No. 11/502,596.

U.S. Patent Application entitled "Method for Providing for Quality of Service (QoS)—Based Handling of IP-Flows in a Wireless Point to Multi-Point Transmission System," filed Aug. 10, 2006, assigned U.S. application Ser. No. 11/502,348.

U.S. Patent Application entitled "Transmission Control Protocol/Internet Protocol (TCP/IP)—Centric QoS Aware Media Access Control (MAC) Layer in a Wireless Point to Multi-Point (PtMP) Transmission System," filed Aug. 10, 2006, assigned U.S. application Ser. No. 11/502,599.

U.S. Patent Application entitled "Method of Operation for the Integration of Differentiated Services (Diff-Serv) Marked IP-Flows into a Quality of Service (QoS) Priorities in a Wireless Point to Multi-Point (PtMP) Transmission System," filed Aug. 10, 2006, assigned U.S. application Ser. No. 11/502,101.

U.S. Patent Application entitled "Time Division Multiple Access/Time Division Duplex (TDMA/TDD) Transmission Media Access Control (MAC) Air Frame," filed Aug. 10, 2006, assigned U.S. application Ser. No. 11/502,601.

BACKGROUND OF THE INVENTION

1. Field of the Invention

The present invention relates generally to telecommunications and, more particularly, to a system and method for implementing a QoS aware wireless point-to-multi-point transmission system.

2. Related Art

Telecommunication networks such as voice, data and video networks have conventionally been customized for the type of traffic each is to transport. For example, voice traffic is very latency sensitive but quality is less important, so voice networks are designed to transport voice traffic with limited latency. Traditional data traffic, such as, e.g., a spreadsheet, on the other hand is not latency sensitive, but error-free delivery is required. Conventional telecommunications networks use circuit switching to achieve acceptable end user quality of service (QoS). With the advent of new packet switching high bandwidth data networks, different types of traffic can be transported over a data network. Specifically, convergence of separate voice, data and video networks into a single broadband telecommunications network is enabled. To ensure end user satisfaction, a system is desired that provides QoS for various types of traffic to be transported.

Wireless networks present particular challenges over their wireline counterparts in delivering QoS. For example, wireless networks traditionally exhibit high bit error rates (BER) due to a number of reasons. Conventional wireless networks also implement circuit switched connections to provide reliable communications channels. However the use of circuit switched connections allocates bandwidth between communicating nodes whether or not traffic is constantly being transferred between the nodes. Therefore, circuit switched connections use communications bandwidth rather inefficiently.

Packet switching makes more efficient use of available bandwidth than does traditional circuit switching. Packet switching breaks up traffic into so-called "packets" which can then be transported from a source node to a destination for reassembly. Thus a particular portion of bandwidth can be shared by many sources and destinations yielding more efficient use of bandwidth.

A wireless broadband access telecommunications system is desired which can provide a QoS capability that is comparable to that delivered by wireline broadband access devices. Conventionally, one of the barriers to the deployment of wireless broadband access systems has been the absence of acceptable QoS characteristics, while at the same time delivering bandwidth sufficient to qualify as broadband. Delivery of raw bandwidth over wireless media without acceptable QoS would not benefit end users. Likewise, the delivery of a high level of QoS at the cost of sufficient bandwidth would also not benefit endusers.

Conventional efforts to provide wireless broadband access systems have not granted sufficient priority to QoS as a guiding principle in architecting the wireless systems, resulting in sub-optimal designs. With the rapid emergence of the Internet, the packet switching paradigm, and transmission control protocol/interact protocol (TCP/IP) as a universal data protocol, it has become clear that a new wireless system design has become necessary.

What is needed then is an IP-centric wireless broadband access system with true QoS capabilities.

SUMMARY OF THE INVENTION

The present invention is directed to an IP flow classification system used in a wireless telecommunications system. More specifically, the IP flow classification system groups IP flows in a packet-centric wireless point to multi-point telecommunications system.

The classification system includes: a wireless base station coupled to a first data network; one or more host workstations coupled to the first data network; one or more subscriber customer premise equipment (CPE) stations in wireless communication with the wireless base station over a shared bandwidth using a packet-centric protocol; and one or more subscriber workstations coupled to each of the subscriber CPE stations over a second network; a resource allocation device optimizes end-user quality of service (QoS) and allocates shared bandwidth among the subscriber CPE stations; an analyzing and scheduling device analyzes and schedules internet protocol (IP) flow over the shared wireless bandwidth. The analyzing device includes the above IP flow classifier that classifies the IP flow.

In one embodiment, the classifier includes a means for associating a packet of an existing IP flow with the IP flow. The classifier can include a QoS grouping device that groups a packet of a new IP flow into a QoS class grouping. The QoS grouping device can include a determining device that determines and takes into account QoS class groupings for the IP flow. The QoS grouping device can include an optional differentiated services (Diff Serv) device that takes into account an optional DiffServs field priority marking for the IP flow. The QoS grouping device can also include an optional type of service (TOS) device that takes into account any optional type of service (TOS) field priority marking for said IP flow.

The cross-referenced applications are incorporated herein by reference in their entireties.

BRIEF DESCRIPTION OF THE FIGURES

The present invention will be described with reference to the accompanying figures, wherein:

FIG. 1A is a block diagram providing an overview of a standard telecommunications network providing local exchange carrier services within one or more local access and transport areas;

FIG. 1B depicts an exemplary network including workstations coupled to a data network;

FIG. 1C illustrates a conventional video network, such as for example a cable television (CATV) network;

FIG. 8A is a block diagram summarizing an exemplary downlink analysis, prioritization and scheduling function;

FIGS. 12M, 12N and 12O illustrate an exemplary operations data block of an upstream transmission subframe;

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

I. An Example Environment

Figure 2A:
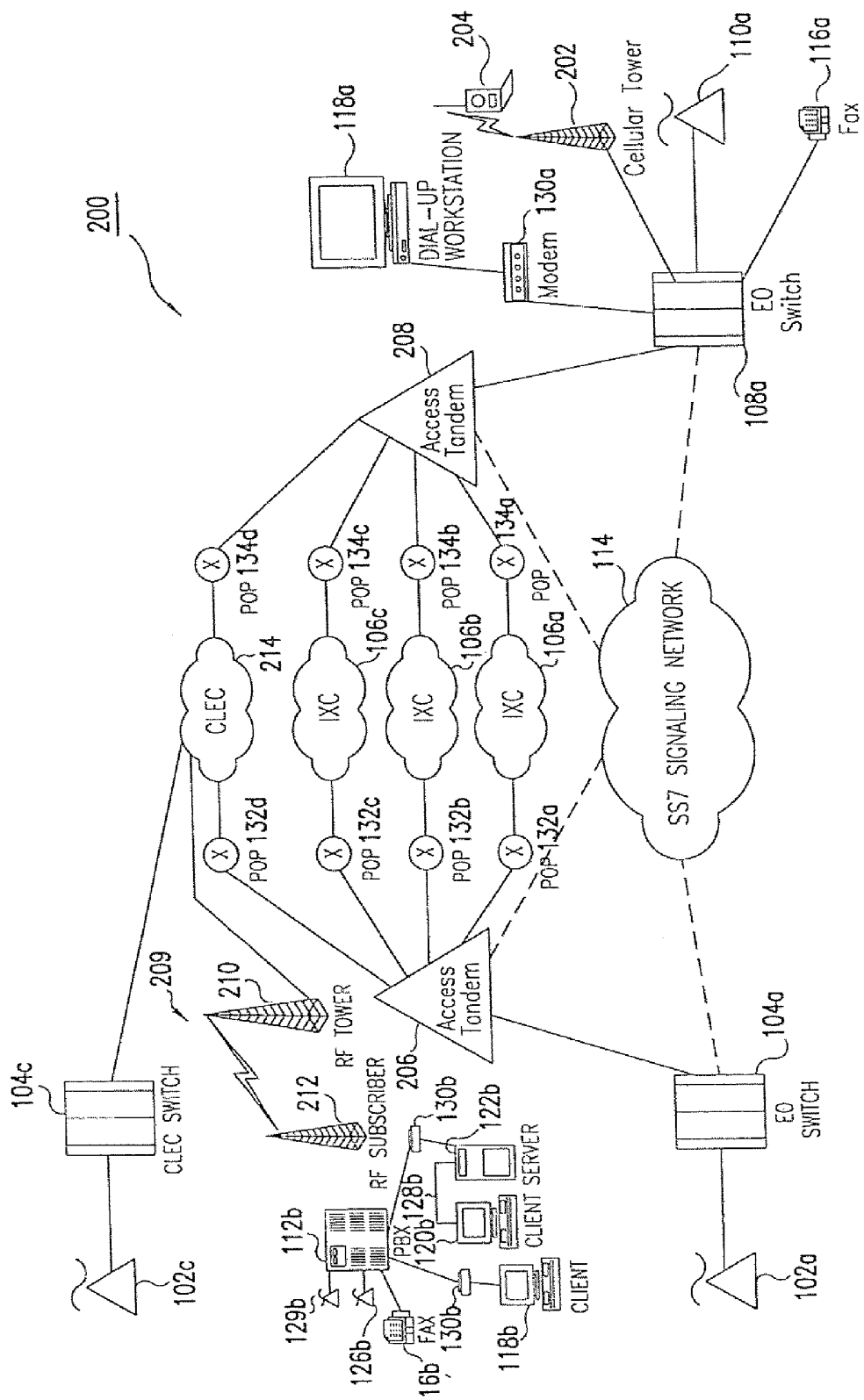
FIG. 2A is a block diagram illustrating an overview of a standard telecommunications network providing both local exchange carrier and interexchange carrier services between subscribers located in different local access and transport areas.

The present invention is described in terms of an example environment. The example environment uses a fixed wireless point-to-multi-point (PtMP) connection to transmit packetized data information including for example, IP telephony, video, data, received from a telecommunications carrier. As used herein, a telecommunications carrier can include US domestic entities (see Definitions below at section II) such as, e.g., ILECs, CLECs, IXCs, NGTs and Enhanced Service Providers (ESPs), as well as global entities such as PTTs and NEs, recognized by those skilled in the art. In addition, as used herein a telecommunications system includes domestic systems used by entities such as, e.g., ILECs, CLECs, IXCs and Enhanced Service Providers (ESPs), as well as global systems recognized by those skilled in the art.

In the preferred embodiment, the traffic arrives from a wide area network (WAN) connection.

Data traffic is received from a data network through a network router and can be demodulated from internet protocol (IP) format to, for example, the point-to-point protocol (PPP). Network routers can include, for example, a general purpose computer, such as the SUN workstation running routing software or a dedicated routing device such as various models from CISCO of San Jose, Calif., ASCEND of Alameda, Calif., NETOPIA of Alameda, Calif., or 3COM of Santa Clara, Calif.

In the alternative, a virtual private networking protocol, such as the point-to-point tunneling protocol (PPTP), can be used to create a "tunnel" between a remote user and a corporate data network. A tunnel permits a network administrator to extend a virtual private network from a server (e.g., a Windows NT server) to a data network (e.g., the Internet).

Although the invention is described in terms of this example environment, it is important to note that description in these terms is provided for purposes of illustration only. It is not intended that the invention be limited to this example environment or to the precise inter-operations between the above-noted devices. In fact, after reading the following description, it will become apparent to a person skilled in the relevant art how to implement the invention in alternative environments.

II. Definitions

Table 1 below defines common telecommunications terminology. These terms are used throughout the remainder of the description of the invention.

TABLE 1

| Term | Definition |
| --- | --- |
| access tandem (AT) | An AT is a class 3/4 switch used to switch calls between EOs in a LATA. An AT provides subscribers access to the IXCs, to provide long distance calling services. An access tandem is a network node. Other network nodes can include, for example, a CLEC, or other enhanced services provider (ESP), an international gateway or global point-of-presence (GPOP), or an intelligent peripheral (IP). |
| bearer (B) channels | Bearer (B) channels are digital channels used to carry both digital voice and digital data information. An ISDN bearer channel is 64,000 bits per second, which can carry PCM-digitized voice or data. |
| called party | The called party is the caller receiving a call sent over a network at the destination or termination end. |
| calling party | The calling party is the caller placing a call over any kind of network from the origination end. |
| central office (CO) | A CO is a facility that houses an EO homed. EOs are often called COs. |
| class 1 switch | A class 1 switching office, the Regional Center (RC), is the highest level of local and long distance switching, or "office of last resort" to complete a call. |
| class 3 switch | A class 3 switching office was a Primary Center (PC); an access tandem (AT) has class 3 functionality. |
| class 4 switch | A class 4 switching office was a Toll Center (TC) if operators were present or else a Toll Point (TP); an access tandem (AT) has class 4 functionality. |
| class 5 switch | A class 5 switching office is an end office (EO) or the lowest level of local and long distance switching, a local central office. The switch closest to the end subscriber. |
| competitive LEC (CLEC) | CLECs are telecommunications services providers of local services that can compete with ILECs. !nterprise and Century 21 are examples. A CLEC may or may not handle IXC services as well. |
| competitive access providers (CAPS) | Teligent and Winstar are examples. |
| customer premises equipment (CPE) | CPE refers to devices residing on the premises of a customer and used to connect to a telephone network, including ordinary telephones, key telephone systems, PBXs, video conferencing devices and modems. |

TABLE 1-continued

| Term | Definition |
| --- | --- |
| digitized data (or digital data) | Digitized data refers to analog data that has been sampled into a binary representation (i.e., comprising sequences of 0's and 1's). Digitized data is less susceptible to noise and attenuation distortions because it is more easily regenerated to reconstruct the original signal. |
| egress end office | The egress EO is the node or destination EO with a direct connection to the called party, the termination point. The called party is "homed" to the egress EO. |
| egress | Egress refers to the connection from a called party or termination at the destination end of a network, to the serving wire center (SWC). |
| end office (EO) | An EO is a class 5 switch used to switch local calls within a LATA. Subscribers of the LEC are connected ("homed") to EOs, meaning that EOs are the last switches to which the subscribers are connected. |
| Enhanced Service Provider (ESP) | A network services provider. |
| equal access | 1+ dialing as used in US domestic calling for access to any long distance carrier as required under the terms of the modified final judgment (MFJ) requiring divestiture of the Regional Bell Operating Companies (RBOCs) from their parent company, AT&T. |
| global point of presence (GPOP) | A GPOP refers to the location where international telecommunications facilities and domestic facilities interface, an international gateway POP. |
| incumbent LEC (ILEC) | ILECs are traditional LECs in the US, which are the Regional Bell Operating Companies (RBOCs). Bell South and US West are examples. ILEC can also stand for an independent LEC such as a GTE. |
| ingress end office | The ingress EO is the node or serving wire center (SVC) with a direct connection to the calling party, the origination point. The calling party is "homed" to the ingress EO. |
| ingress | Ingress refers to the connection from a calling party or origination. |
| integrated service digital network (ISDN) basic rate interface (BRI) line | An ISDN Basic Rate Interface (BRI) line provides 2 bearer B channels and 1 data D line (known as "2B + D" over one or two pairs) to a subscriber. |
| integrated services digital network (ISDN) | ISDN is a network that provides a standard for communications (voice, data and signaling), end-to-end digital transmission circuits, out-of-band signaling, and a features significant amount of bandwidth. |
| inter machine trunk (IMT) | An inter-machine trunk (IMT) is a circuit between two commonly-connected switches. |
| inter-exchange carrier (IXC) | IXCs are U.S. domestic long distance telecommunications services providers. AT&T, MCI, Sprint, are examples. |
| internet protocol (IP) | IP is part of the TCP/IP protocols. It is used to recognize incoming messages, route outgoing messages, and keep track of Internet node addresses (using a number to specify a TCP/IP host on the Internet). IP corresponds to the network layer of OSI. |
| Internet service provider (ISP) | An ISP is a company that provides Internet access to subscribers. |
| ISDN primary rate interface (PRI) | An ISDN Primary Rate Interface (PRI) line provides the ISDN equivalent of a T1 circuit. The PRI delivered to a customer's premises can provide 23B + D (in North America) or 30B + D (in Europe) channels running at 1.544 megabits per second and 2.048 megabits per second, respectively. |
| local exchange carrier (LEC) | LECs are local telecommunications services providers. Bell Atlantic and U.S. West are examples. |
| local access and transport area (LATA) | A LATA is a region in which a LEC offers services. There are over 160 LATAs of these local geographical areas within the United States. |

TABLE 1-continued

| Term | Definition |
|---|---|
| local area network (LAN) | A LAN is a communications network providing connections between computers and peripheral devices (e.g., printers and modems) over a relatively short distance (e.g., within a building) under standardized control. |
| modified final judgment (MFJ) | Modified final judgment (MFJ) was the decision requiring divestiture of the Regional Bell Operating Companies (RBOCs) from their parent company, AT&T. |
| network node | A network node is a generic term for the resources in a telecommunications network, including switches, DACS, regenerators, etc. Network nodes essentially include all non-circuit (transport) devices. Other network nodes can include, for example, equipment of a CLEC, or other enhanced service provider (ESP), a point-of-presence (POP), an international gateway or global point-of-presence (GPOP). |
| new entrant (NE) | A new generation global telecommunications. |
| next generation telephone (NGT) | A new telecommunications services provider, especially IP telephony providers. Examples are Level 3 and Qwest. |
| packetized voice or voice over a backbone | One example of packetized voice is voice over internet protocol (VOIP). Voice over packet refers to the carrying of telephony or voice traffic over a data network, e.g. voice over frame, voice over ATM, voice over Internet Protocol (IP), over virtual private networks (VPNs), voice over a backbone, etc. |
| Pipe or dedicated communications facility | A pipe or dedicated communications facility connects an ISP to the internet. |
| point of presence (POP) | A POP refers to the location within a LATA where the IXC and LEC facilities interface. |
| point-to-point tunneling protocol (PPTP) | A virtual private networking protocol, point-to-point tunneling protocol (PPTP), can be used to create a "tunnel" between a remote user and a data network. A tunnel permits a network administrator to extend a virtual private network (VPN) from a server (e.g., a Windows NT server) to a data network (e.g., the Internet). |
| point-to-point (PPP) protocol | PPP is a protocol permitting a computer to establish a connection with the Internet using a modem. PPP supports high-quality graphical front ends, like Netscape. |
| postal telephone telegraph (PTT) | State regulated telephone companies, many of which are being deregulated. NTT is an example. |
| private branch exchange (PBX) | A PBX is a private switch located on the premises of a user. The user is typically a private company which desires to provide switching locally. |
| private line with a dial tone | A private line is a direct channel specifically dedicated to a customer's use between two specified points. A private line with a dial tone can connect a PBX or an ISP's access concentrator to an end office (e.g. a channelized T1 or PRI). A private line can also be known as a leased line. |
| public switched telephone network (PSTN) | The PSTN is the worldwide switched voice network. |
| regional Bell operating companies (RBOCs) | RBOCs are the Bell operating companies providing LEC services after being divested from AT&T. |
| signaling system 7 (SS7) | SS7 is a type of common channel interoffice signaling (CCIS) used widely throughout the world. The SS7 network provides the signaling functions of indicating the arrival of calls, transmitting routing and destination signals, and monitoring line and circuit status. |
| switching hierarchy or office classification | An office class is a functional ranking of a telephone central office switch depending on transmission requirements and hierarchical relationship to other switching centers. Prior to AT&T's divestiture of the RBOCs, an office classification was the number assigned to offices according to their hierarchical function in the U.S. public switched network (PSTN). The following class numbers are used: class 1 = Regional Center (RC), class 2 = Sectional Center (SC), class 3 = Primary Center (PC), class 4 = Toll Center (TC) if operators are present or else Toll Point (TP), class 5 = End Office (EO) a local central office. Any one center handles traffic from one to two or more centers lower in the hierarchy. Since divestiture and with more intelligent software in switching offices, these designations have become less firm. The class 5 switch was the closest to the end subscriber. Technology has distributed technology closer to the end user, diffusing traditional definitions of network switching hierarchies and the class of switches. |
| telecommunications carrier | A LEC, a CLEC, an IXC, an Enhanced Service Provider (ESP), an intelligent peripheral (IP), an international/global point-of-presence (GPOP), i.e., any provider of telecommunications services. |
| transmission control protocol (TCP) | TCP is an end-to-end protocol that operates at the transport and sessions layers of OSI, providing delivery of data bytes between processes running in host computers via separation and sequencing of IP packets. |
| transmission control protocol/internet protocol (TCP/IP) | TCP/IP is a protocol that provides communications between interconnected networks. The TCP/IP protocol is widely used on the Internet, which is a network comprising several large networks connected by high-speed connections. |
| trunk | A trunk connects an access tandem (AT) to an end office (EO). |
| wide area network (WAN) | A WAN is a data network that extends a LAN over the circuits of a telecommunications carrier. The carrier is typically a common carrier. A bridging switch or a router is used to connect the LAN to the WAN. |

III. Introduction

A. Quality of Service (QOS) in a Wireless Environment

The concept of quality of service (QoS) is one of the most difficult and least understood topics in data networking. Although a common term in data networking, there are many different usages and definitions for QoS, leading to confusion regarding an exact meaning in precise or quantitative terms. Even further confusion is found when attempts are made to measure or specify numeric quantities sufficient to allow comparison of equipment or network performance with respect to QoS.

The confusion about QoS in general data networking is transferred and magnified when applied to wireless data communications. Wireless transmission has a higher inherent bit error rate (BER) than does wireline transmission. The addition of, e.g., a point-to-multipoint (PtMP) topology for multiple users sharing a wireless medium makes it desirable that QoS be defined in a manner that specifically addresses the multiple complicating factors in wireless data communications.

To provide a non-ambiguous definition of QoS that applies to wireless data communications, the nature of the problem that QoS is meant to solve is helpful. Many of the problems of data communications over wireless are unique and distinct from those of wireline data communications, while some are in fact shared. For wireless broadband access systems, the problems of quality delivery are somewhat more complex than for the wireline analog. Like its wireline counterpart, the problems encountered in wireless delivery of data include, e.g., slow peripheral access, data errors, "drop-outs," unnecessary retransmissions, traffic congestion, out-of-sequence data packets, latency, and jitter. In addition to these problems, wireless delivery adds problems including, e.g., high inherent bit error rates(BERs), limited bandwidth, user contention, radio interference, and TCP traffic rate management. A QoS-aware wireless system is desired to address all these problems.

There are a number of ways in which users or subscribers to a data network experience difficulties. One network difficulty is due to a lack of network availability. Depending on the access technology being used, this can include a "modem no-answer" condition, "network busy" condition, or a sudden unexpected "drop" of a network connection. These conditions would not be described as being consistent with high QoS. Once network connectivity is achieved, slow traffic caused by congestion, local access bottlenecks, and network failures can be experienced as slow web page loading, slow file transfers, or poor voice/video quality in streaming multimedia applications. Poor quality in streaming multimedia applications can instead result from high "jitter," or large and rapid variations in latency, leading to interruptions, distortion, or termination of session. Many different conditions can lead to actual data errors, which in some contexts can be catastrophic, such as in the file transfer of a spreadsheet. It is desirable that these problems of a data communications network be minimized or eliminated.

1. Quality

In data networking, quality usually implies the process of delivering data in a reliable and timely manner. What is reliable and timely is dependent on the nature of the traffic being addressed. These terms may include references to limitations in data loss, expectations of data accuracy, limitations of data latency variations (also known as jitter), and limitations of data retransmissions and limitations of data packet order inversions. Therefore, QoS is a complex concept, which can require a correspondingly complex mechanism to implement it.

QoS can be a relative term, finding different meanings for different users. A casual user doing occasional web browsing, but no file transfer protocol (FTP) file downloads or real time multimedia sessions may have different a different definition of QoS than a power user doing many FTP file downloads of large database or financial files, frequent H.323 video conferencing and IP telephony calls. Also, a user can pay a premium rate (i.e. a so-called service level agreement (SLA)) for high network availability, low latency, and low jitter, while another user can pay a low rate for occasional web surfing only, and on weekends only. Therefore, perhaps it is best to understand QoS as a continuum, defined by what network performance characteristic is most important to a particular user and the user's SLA. Maximizing the end-user experience is an essential component of providing wireless QoS.

2. Service

In data networking, a service can be defined as a type of connection from one end of a network to another. Formerly, this could have been further defined to be protocol specific, such as, e.g., IBM's systems network architecture (SNA), Novell's IPX, Digital's DECnet. However, it appears that TCP/IP (i.e. including user datagram protocol(UDP)) has evolved to become the overwhelming protocol of choice, and will continue to be in the foreseeable future. Therefore, service can be defined to be a particular type of TCP/IP connection or transmission. Such service types might include, e.g., FTP file transfers, e-mail traffic, hypertext transfer protocol (HTTP) traffic, H.323 videoconferencing sessions. It is desirable that a QoS mechanism deal with these differing types of service, in addition to dealing with the different types of quality as discussed previously.

3. QOS as a Mechanism

QoS can be thought of as a mechanism to selectively allocate scarce networking, transmission and communications resources to differentiated classes of network traffic with appropriate levels of priority. Ideally, the nature of the data traffic, the demands of the users, the conditions of the network, and the characteristics of the traffic sources and destinations all modify how the QoS mechanism is operating at any given instant. Ultimately, however, it is desirable that the QoS mechanism operate in a manner that provides the user with optimal service, in whatever manner the user defines it.

a. Circuit-Switched QoS

In legacy networks created primarily for voice traffic by telephone companies, data transmission was accomplished with reference to a circuit-centric definition of QoS. In this definition, QoS implied the ability to carry asynchronous (i.e. transmission of data through start and stop sequences without the use of a common clock) as well as isochronous (i.e. consistent timed access of network bandwidth for time-sensitive voice and video) traffic. Circuit-switched QoS was accomplished by dedicating an end-to-end circuit for each connection or service, whether it was voice (see FIG. 1A) or data. The circuit-centric QoS mechanism was simply the provision of this circuit for exclusive use by the user. Of course, this approach dedicates the circuit, all transmission channels associated with the circuit, and the transport media itself to a single user for the entire duration of the session, regardless of whether data is actually being transmitted every instant of the session. It was generally believed that only in this manner could true QoS be achieved. Therefore, traditional designs for wireless broadband access systems (see FIG. 2A) also used this approach, dedicating a wireless radio channel to each particular data connection, regardless of the application or whether indeed any data was being transmitted at any given moment. This circuit-centric approach to QoS is fairly expensive, in terms of the cost of the equipment, and the utilization factors for the transmission media itself.

b. Asynchronous Transfer Mode (ATM) QoS

With ATM networking, telephone companies could continue to provide a circuit-centric QOS mechanism with the establishment of permanent virtual connections (PVCs) (i.e. a virtual path or channel connection (VPC or VCC) provisioned for indefinite use) and switched virtual connections (SVCs) (i.e. a logical connection between endpoints established by an ATM network on demand based upon signaling messages received from the end user or another network) in an analogous manner to the legacy voice circuit mechanism. However, several new concepts were needed, including admission policy, traffic shaping, and mechanisms such as, e.g., leaky-buckets, in order to handle traffic that was now categorized as variable bit rate (VBR), constant bit rate (CBR), and unspecified bit rate (UBR).

Virtual circuits were to be established for data transmission sessions, again regardless of the data application or whether data was being transmitted at any given moment. Although ATM provides QoS for broadband network traffic, the underlying assumptions of ATM design include the low BER characteristic of wireline networks, not the high BER of the wireless medium. Without a recognition of the characteristics of the traffic that is being carried by the ATM mechanism and the high inherent BER of wireless, true QoS can not be provided. ATM QoS mechanisms do not address the unique challenges associated with wireless communication.

c. Packet-Switched QoS

Packet-switching is revolutionizing data communications, so conventional circuit-switch and ATM networking concepts and their legacy QoS mechanisms are in need of update. With packet-switched data communications, one cannot dedicate a circuit to a particular data communications session. Indeed, a strength of packet-switching lies in route flexibility and parallelism of its corresponding physical network. Therefore, the QoS mechanism cannot work in the same manner as the legacy circuit-centric QoS mechanism did.

Simply providing "adequate" bandwidth is not a sufficient QoS mechanism for packet-switched networks, and certainly not for wireless broadband access systems. Although some IP-flows are "bandwidth-sensitive," other flows are latency- and/or jitter-sensitive. Real time or multimedia flows and applications cannot be guaranteed timely behavior by simply providing excessive bandwidth, even if it were not cost-prohibitive to do so. It is desirable that QoS mechanisms for an IP-centric wireless broadband access system recognize the detailed flow-by-flow requirements of the traffic, and allocate system and media resources necessary to deliver these flows in an optimal manner.

d. Summary—QoS Mechanisms

Ultimately, the end-user experience is the final arbiter of QoS. It is desirable that an IP-centric wireless broadband access system assign and regulate system and media resources in a manner that can maximize the end-user experience. For some applications such as an initial screen of a Web page download, data transmission speed is the best measure of QoS. For other applications, such as the download or upload of a spreadsheet, the best measure of QoS can be the minimization of transmission error. For some applications, the best measure of QoS can be the optimization of both speed and error. For some applications, the timely delivery of packets can be the best measure of QoS. It is important to note that fast data transmission may not be the same as timely delivery of packets. For instance, data packets that are already "too old" can be transmitted rapidly, but by being too old can be of no use to the user. The nature of the data application itself and the desired end-user experience then can provide the most reliable criteria for the QoS mechanism. It is desired that an IP-centric wireless broadband access system provide a QoS mechanism that can dynamically optimize system behavior to each particular IP flow, and can also adapt to changes with changing network load, congestion and error rates.

4. Service Guarantees and Service Level Agreements (SLAs)

Service guarantees can be made and service level agreements (SLAs) can be entered into between a telecommunications service provider and a subscriber whereby a specified level of network availability can be described, and access charges can be based upon the specified level. Unfortunately, it is difficult to quantify the degree of network availability at any given time, and therefore this becomes a rather crude measure of service performance. It is desired that data delivery rate, error rate, retransmissions, latency, and jitter be used as measures of network availability, but measuring these quantities on a real-time basis can be beyond the capability of conventional network service providers (NSPs).

Another level of service discrimination desired by network service providers is a service level agreement (SLA) that provides for differing traffic rates, network availability, bandwidth, error rate, latency and jitter guarantees. It is desired that an IP-centric wireless broadband access system be provided that can provide for SLAs, enabling service providers to have more opportunities for service differentiation and profitability.

5. Class of Service and Quality of Service

In order to implement a practical QoS mechanism, it is desired that a system be able to differentiate between types of traffic or service types so that differing levels of system resources can be allocated to these types. It is customary to speak of "classes of service" as a means of grouping traffic types that can receive similar treatment or allocation of system and media resources.

Currently, there are several methods that can be used in wireline network devices to implement differentiated service classes. Example methods include traffic shaping, admission control, IP precedence, and differential congestion management. It is desired that an IP-centric wireless broadband access system use all of these methods to differentiate traffic into classes of service, to map these classes of service against a QoS matrix, and thereby to simplify the operation and administration of the QoS mechanism.

B. QoS and IP-Centric Wireless Environment

In a point-to-multipoint (PtMP) wireless system like the present invention, it is desirable that the QoS mechanism cope not only with wireline networking considerations, but also with considerations particular to the wireless environment. As stated earlier, it is desired that the inherent BER of wireless be handled. The high BER can require that error detection, correction, and re-transmission be done in an efficient manner. It is desired that a BER handling mechanism also work efficiently with the re-transmission algorithms of TCP/IP so as to not cause further unnecessary degradation of bandwidth utilization. An additional challenge of wireless is contention among users for limited wireless bandwidth. It is desirable that the system handle service requests from multiple users in a radio medium subject to interference and noise, which can make efficient allocation of radio bandwidth difficult.

As discussed above, the change from circuit-switched and ATM data networks to packet-switched data networks has impacted the definition of QoS mechanisms. The present invention provides a novel QoS mechanism in a point-to-multi-point IP-centric wireless system for packet-switched network traffic. In order for the system to provide optimal QoS performance, it desirable that it include a novel approach to QoS mechanisms. The use of QoS as the underlying guide to system architecture and design constitutes an important, substantial and advantageous difference of the IP-centric wireless broadband access system of the present invention over existing wireless broadband access systems designed with traditional circuit-centric or ATM cell circuit-centric approaches such as those used by Teligent and Winstar.

C. IP-Centric Wireless Broadband Access QoS and Queuing Disciplines

1. Managing Queues

Queuing is a commonly accepted tool required for manipulating data communications flows. In order for packet headers to be examined or modified, for routing decisions to made, or for data flows to be output on appropriate ports, it is desirable that data packets be queued. However, queuing introduces, by definition, a delay in the traffic streams that can be detrimental, and can even totally defeat the intent of queuing. Excessive queuing can have detrimental effects on traffic by delaying time sensitive packets beyond their useful time frames, or by increasing the RTT (Round Trip Time), producing unacceptable jitter or even causing the time-out of data transport mechanisms.

Therefore, it is desired that queuing be used intelligently and sparingly, without introducing undue delay in delay-sensitive traffic such as real-time sessions.

In a wireless environment where time division multiple access (TDMA), forward error detection (FEC), and other such techniques can be necessary, it is desirable that queuing be used merely to enable packet and radio frame processing. However, in the case of real-time flows, the overall added delay in real-time traffic can preferably be held to below approximately 20 milliseconds.

The use of queue management as the primary QoS mechanism in providing QoS-based differentiated services is a simple and straight forward method for wireless broadband systems. However, wireless systems are usually more bandwidth constrained and therefore more sensitive to delay than their wireline counterparts. For this reason, it is desirable that QoS-based differentiated services be provided with mechanisms that go beyond what simple queuing can do. However, some queuing can still be required, and the different queuing methods are now discussed.

2. First in, First out (FIFO) Queuing

First in, first out (FIFO) queuing can be used in wireless systems, like wireline systems, in buffering data packets when the downstream data channel becomes temporarily congested. If temporary congestion is caused by bursty traffic, a FIFO queue of reasonable depth can be used to smooth the flow of data into the congested communications segment. However, if the congestion becomes severe in extent, or relatively long in duration, FIFO can lead to the discarding of packets as the FIFO queues are filled to capacity and the network is not capable of accepting additional packets causing discarding of packets, i.e. so-called "packet-tossing." Although this can have a detrimental effect on QoS in and of itself, the discarding of packets may cause future problems with traffic flow as the TCP protocol causes the retransmission of lost packets in the proper sequence, further exacerbating the problem. The problem of packet discards can be minimized by increasing the size of the FIFO buffers so that more time can pass before discards occur. Unfortunately, eventually the FIFO can become large enough that packets can become too old and the round-trip time (RTT) can increase to the point that the packets are useless, and the data connection is virtually lost.

In a wireless broadband environment, the requirement for FIFO queuing is partially dependent upon the type of RF access method being used. For time division multiple access/time division duplex (TDMA/TDD), it can be desirable that data be queued even for collecting enough data for the construction of data frames for transmission. Frequency division multiple access (FDMA) and code-division multiple access (CDMA) are not as "sequential" in nature as TDMA, and therefore have less of a requirement for FIFO queuing. However, generally for all wireless access techniques, noise and interference are factors that can lead to retransmissions, and therefore further delays and consequent adverse effect on QoS.

Using FIFO queuing, shared wireless broadband systems can uniformly delay all traffic. This can seem to be the "fairest" method, but it is not necessarily the best method if the goal is to provide high QoS to users. By using different types of queue management, a much better base of overall QoS can be achieved.

3. Priority Queuing

The shared wireless broadband environment can include a constricted bandwidth segment as data is transmitted over the RF medium. Therefore, regardless of access technique, these systems can require some amount of queuing. However, using FIFO queuing can result in a constant delay to all traffic, regardless of the priority or type of traffic. Most data communications environments can consist of a mixture of traffic, with combinations of real time interactive data, file and data downloads, web page access, etc. Some of these types of traffic are more sensitive to delay, and jitter, than others. Priority queuing simply reorders data packets in the queue based on their relative priorities and types, so that data from more latency- and jitter-sensitive traffic can be moved to the front of the queue.

Unfortunately, if there is downlink data channel congestion, or congestion caused by an overabundance of high priority traffic, the condition of "buffer starvation" can occur. Because of the relative volume of high priority packets consuming a majority of buffer space, little room is left for lower priority packets. These lower priority packets can experience significant delays while system resources are devoted to the high priority packets. In addition to low priority packets being held in buffers for long periods of time, or never reaching the buffers, resulting in significantly delayed data flows for these packets, the actual applications corresponding to these low priority packets can also be disrupted, and stop working. Because of the nature of this queuing approach, overall latency and jitter and RTT for lower priority packets can be unpredictable, having an adverse effect on QoS.

If queue sizes are small, reordering data within the queues can have little beneficial effect on the QoS. In fact, processing required to examine packet headers in order to obtain the information necessary to reorder the queues may itself add significant delay to the data stream. Therefore, particularly for wireless broadband data environments, priority queuing can be not much better than FIFO queuing as a QoS mechanism.

4. Classed Based Queuing

By allocating queue space and system resources to packets based on the class of the packets, buffer starvation can be avoided. Each class can be defined to include of data flows with certain similar priorities and types. All classes can be given a certain minimum level of service so that one high priority data flow cannot monopolize all system resources. With the classification approach, because no data flow is ever completely shut off, the source application can receive information about the traffic rate, and can be able to provide TCP-mediated transmission rate adjustment supporting smooth traffic flow.

Although this approach can work better than FIFO queuing in wireless broadband systems, latency and jitter sensitive flows can still be adversely affected by high priority flows of large volume.

5. Weighted Fair Queuing

A weighted fair queuing method can attempt to provide low-volume flows with guaranteed queuing resources, and can then allow remaining flows, regardless of volume or priority, to have equal amounts of resource. Although this can prevent buffer starvation, and can lead to somewhat better latency and jitter performance, it can be difficult to attain stable performance in the face of rapidly changing RF downlink channel bandwidth availability.

Providing a high quality of service can require a QoS mechanism that is more sophisticated than simple queue management.

D. IP-Centric Wireless Broadband Access QoS and TCP/IP

1. TCP/IP

The TCP/IP protocol stack has become the standard method of transmitting data over the Internet, and increasingly it is becoming a standard in virtual private networks (VPNs). The TCP/IP protocol stack includes not only internet protocol (IP), but also transmission control protocol (TCP), user datagram protocol (UDP), and internet control message protocol (ICMP). By assuming that the TCP/IP protocol stack is the standard network protocol for data communications, the creation of a set of optimal QoS mechanisms for the wireless broadband data environment is more manageable. QoS mechanisms can be created that can span the entire extent of the network, including both the wireline and the wireless portions of the network. These mechanisms can integrate in a smooth and transparent manner with TCP rate control mechanisms and provide end-to-end QoS mechanisms that are adaptive to both the wireline and wireless portions of the network. Of course, segments of the wireline network that are congested or are experiencing other transport problems cannot be solved by a wireless QoS mechanism. However, a wireless QoS mechanism can optimize data flows in a manner that can enhance the end user experience when there is no severe wireline network congestion or bottleneck present.

2. Differentiation by Class

Data traffic can be handled based on classes of service, as discussed above. To differentiate traffic by class, data traffic (or a sequence of data packets associated with a particular application, function, or purpose) can be classified into one of several classes of service. Differentiation can be done on the basis of some identifiable information contained in packet headers. One method can include analyzing several items in, e.g., an IP packet header, which can serve to uniquely identify and associate the packet and other packets from that packet flow with a particular application, function or purpose. As a minimum, a source IP address, a source TCP or UDP port, a destination IP address, and a destination IP or UDP port can serve to associate packets into a common flow, i.e. can be used to classify the packets into a class of service.

By creating a finite and manageable number of discrete classes of service, multiple IP flows can be consolidated and handled with a given set of QoS parameters by the QoS mechanisms. These classes can be defined to provide common and useful characteristics for optimal management in the combined wireline and wireless network segments.

3. Per-Flow Differentiation

A finite and discrete set of classes of service, can enable QoS mechanisms to be less compute-intensive, to use less memory, fewer state machines, and therefore have better scaleability than having individual QoS mechanisms (or sets of parameters) for each individual IP flow. However, in a network access device such as, e.g., a point to multi-point (PtMP) wireless broadband access system, the total number of simultaneous IP flows typically will not exceed the range of 1000, and therefore the amount of processing overhead that could be required could permit a per-flow QoS differentiation without resorting to classes of service. However, class of service consolidation of IP flows provides advantages related to marketing, billing and administration.

Prior to the present invention, per-flow differentiation has not been used in a wireless environment (including radio frequencies transmitted over coaxial cables and satellite communications).

4. Using IP Precedence for Class of Service

IP precedence bits in a type of service (IP TOS) field, as described in Internet Engineering Task Force (IETF)1992b, can theoretically be used as a means to sort IP flows into classes of service. IETF RFC1349 proposed a set of 4-bit definitions with 5 different meanings: minimize delay; maximize throughput; maximize reliability; minimize monetary cost; and normal service.

These definitions could add significantly to networks, routers and access devices in differentiating different types of flow so that resources could be appropriately allocated, resulting in improved QoS. However, the proposal has not been widely used. Several proposals in the IETF could make use of this field, along with resource reservation protocol (RSVP), to improve network handling of packets.

Although the type of service (TOS) field has been an integral component of the TCP/IP specification for many years, the field is not commonly used. Absent appropriate bits in the field being set by a source processor, the access devices, the network and network routers cannot implement QoS mechanisms.

5. TCP-Mediated Transmission Rate Mechanisms

The manner in which TCP governs transmission rate can be incorporated and managed by an IP-centric wireless QoS mechanism. If a TCP mechanism is not managed, any wireless QoS mechanism can be overwhelmed or countered by wireless bandwidth factors. Before addressing the specific wireless factors that can impact TCP transmission speed, a review of TCP transmission rate mechanism is needed.

TCP can control transmission rate by "sensing" when packet loss occurs. Because TCP/IP was created primarily for wireline environment with its extremely low inherent BER, such as those found over fiber optic lines, any packet loss is assumed by TCP to be due to network congestion, not loss through bit error. Therefore, TCP assumes that the transmission rate exceeded the capacity of the network, and responds by slowing the rate of transmission. However, packet loss in the wireless link segment is due primarily to inherently high BER, not congestion. The difference turns out to be not insubstantial.

TCP can initially cause the transmission rate to ramp-up at the beginning of a packet flow, and is called slow-start mode. The rate can be continuously increased until there is a loss or time-out of the packet-receipt acknowledgment message. TCP can then "back-off", can decrease the transmission window size, and then can retransmit lost packets in the proper order at a significantly slower rate. TCP can then slowly increase the transmission rate in a linear fashion, which can be called congestion-avoidance mode.

If multiple users share a wireless radio link as with the present invention, the inherently high BER of the medium could potentially cause frequent packet loss leading to unproductive TCP retransmission in congestion avoidance mode. Because wireless bandwidth can be a precious commodity, a IP-centric wireless QoS mechanism preferably provides for packet retransmission without invoking TCP retransmission and consequent and unnecessary "whipsawing" of the transmission rate. This, along with several other factors, makes desirable creation of an IP-centric wireless media access control (MAC) layer. One function of an IP-centric MAC layer can be to mediate local retransmission of lost packets without signaling TCP and unnecessarily altering the TCP transmission speed. A primary task of the IP-centric wireless MAC layer is to provide for shared access to the wireless medium in an orderly and efficient manner. The MAC layer according to the present invention, Proactive Reservation-based Intelligent Multimedia-aware Media Access (PRIMMA) layer, available from Malibu Networks Inc., of Calabasas, Calif., can also schedule all packet transmissions across the wireless medium on the basis of, e.g., IP flow type, service level agreements (SLAs), and QoS considerations.

6. TCP Congestion Avoidance in an IP-Centric Wireless System a. Network Congestion Collapse, Global Synchronization and IP-Centric Wireless TCP Congestion Avoidance The inherently high bit error rate (BER) of wireless transmission can make an occurrence of problems known as congestion collapse or global synchronization collapse more likely than in a wireline environment. When multiple TCP senders simultaneously detect congestion because of packet loss, the TCP senders can all go into TCP slow start mode by shrinking their transmission window sizes and by pausing momentarily. The multiple senders can then all attempt to retransmit the lost packets simultaneously. Because they can all start transmitting again in rough synchrony, a possibility of creating congestion can arise, and the cycle can start all over again.

In the wireless environment, an occurrence of burst noise can cause packet loss from many IP streams simultaneously. The TCP transmission rate mechanisms of the TCP senders can assume that packet loss was due to congestion, and they can all back-off in synchrony. When the TCP senders restart, the senders can restart in rough synchrony, and indeed can now create real congestion in the wireless link segment. This cyclical behavior can continue for some time, and can possibly cause unpredictable system performance. This can be due in part to overflowing system queues which can cause more packets to be dropped and can cause more unproductive retransmissions. This can degenerate into a "race" state that could take many minutes before re-establishing stability; this can have an obvious negative impact on QoS.

In the wireline world, random early detection (RED) can be used to circumvent global synchronization. By randomly selecting packets from randomly selected packet flows before congestion collapse occurs, global synchronization can be avoided. Queues can be monitored, and when queue depth exceeds a preset limit, RED can be activated, activating asynchronously the TCP senders' transmission rate controllers. This can avoid the initial congestion which would otherwise result in collapse and then global synchronization.

Instead of purely random packet discards, the packets to be discarded can be done with consideration to packet priority or type. While still random, the probability of discard for a given flow can be a function of the by packet priority or type. In a wireless system, weighted random early detection (WRED) can be used without the concern of retransmission and TCP rate reset by preferentially selecting UDP packets of real time IP flows such as streaming audio, and H.323 flows with a more critical packet Time-to-Live parameter. These IP flows are more sensitive to latency and jitter, and less sensitive to packet loss.

In the wireless environment, with an appropriately designed MAC layer, packet loss due to BER that might otherwise trigger congestion collapse and global synchronization can best be managed with local retransmission of lost packets according to the present invention and without RED and the unnecessary retransmission of packets by the TCP sender and the resulting reset of TCP transmission rate. The IP-centric wireless system separately manages the TCP transmission window of the TCP sender remotely by transmitting a packet receipt-acknowledgment before the TCP sender detects a lost packet and initiates retransmission along with an unnecessary reset of the transmission rate. This IP-centric wireless system TCP transmission window manager communicates with the MAC layer in order to be aware of the status of all packets transmitted over the wireless medium.

b. The Effect of Fractal Self-Similar Network Traffic Characteristics vs. Poisson Distributions on Network Congestion Conventionally, it has been believed that network traffic can be modeled with a Poisson distribution. Using this distribution leads to the conclusion, through system simulations, that the sum of thousands of individual traffic flows with Poisson distributions results in a uniform overall network traffic distribution. In other words, the overall network can "average-out" the burstiness of individual traffic flows. Using this model, network congestion behavior, burst behavior, and dynamic traffic characteristics have been used to create conventional congestion avoidance strategies, design queue buffer sizes in network devices, and traffic and capacity limitation predictions.

More recent studies have demonstrated that TCP/IP-based traffic causes networks to behave in a fractal, or self-similar fashion. With this model, when the burstiness of individual traffic flows is summed for the entire network, the entire network becomes bursty. The bursty nature of network traffic flow is seen over all time scales and flow scales of the network. This has huge implications both in design of an IP-centric wireless broadband system according to the present invention, and in the design of congestion avoidance strategies in the network as a whole. With this new perspective on network behavior, it has become clear that network routers, switches and transmission facilities in many cases have been "under-engineered." This under-engineering has led to a further exacerbation of the congestion behavior of the network.

The implications for IP-centric wireless system architecture and design range from queue buffer capacity to local congestion avoidance strategies. Because wireless systems have the added burden of a high inherent BER, the effect of network-wide congestion behavior on local (wireless media channel) congestion avoidance strategies must be properly gauged and countered. For this reason, it is desirable that congestion avoidance algorithms of the IP-centric wireless system be crafted to optimize traffic flow with new mathematical and engineering considerations that until very recently were not apparent or available to system designers.

With these considerations in mind, IP-centric wireless system design cannot be done with the conventional wireline system design approaches without resulting in very low system performance characteristics. With traditional design approaches of a circuit-centric wireless system, bandwidth utilization, real time multimedia quality, and overall system QoS provide for a dramatically lower end-user experience.

7. Application-Specific Flow Control in an IP-Centric Wireless System

With a range of data flows, each having different bandwidth, latency and jitter requirements, for the achievement of high QoS as perceived by the end user, it is desirable that the IP-centric wireless system be able to manage QoS mechanism parameters over a wide range, and in real time. The QoS mechanism must be able to alter system behavior to the extent that one or more data flows corresponding to specific applications be switched on and off from appropriate end users in a transparent manner. This approach is in contrast to other QoS mechanisms that seek to achieve high QoS by establishing circuit-centric connections from end to end without regard for an underlying application's actual QoS requirements. By using the present invention, providing a QoS mechanism that is application-specific rather than circuit-specific, scarce wireless bandwidth can be conserved and dynamically allocated where needed by the QoS mechanisms associated with each application type.

B. QoS and IP-Centric Wireless Media Access Control

1. Proactive Reservation-based Intelligent Multimedia-aware Media Access (PRIMMA) MAC Layer The present invention's proactive reservation-based intelligent multimedia-aware media access (PRIMMA) media access control (MAC) layer provides an application switching function of the IP-centric wireless QoS mechanism. Once the nature and QoS requirements of each IP stream are determined by other portions of the system, this information is communicated to the PRIMMA MAC layer so that the IP flows of each application can be switched to appropriate destinations in a proper priority order.

2. PRIMMA IP Protocol Stack Vertical Signaling

For IP streams that originate from a local user's CPE, application-level information about the nature of the application can be used by the system to assign appropriate QoS mechanism parameters to the IP stream. For IP streams that originate from a non-local host, information about the IP streams for use in configuring the appropriate QoS mechanism parameters can be extracted from packet headers. The information about the IP streams is communicated "vertically" in the protocol stack model from the application layer (i.e. OSI level 7) to the PRIMMA MAC layer (i.e. OSI level 2) for bandwidth reservation and application switching purposes. Although this violates the conventional practice of providing isolation and independence to each layer of the protocol stack, thereby somewhat limiting the degree of interchangeability for individual layers of the stack, the advantages far outweigh the negatives in an IP-centric wireless broadband access system.

3. PRIMMA IP Flow Control and Application Switching

Based on a specific set of QOS requirements of each IP application flow in the IP-centric wireless system, applications are switched in a "proactive" manner by appropriate reservations of bandwidth over the wireless medium. The wireless transmission frames in each direction are constructed in a manner dictated by the individual QoS requirements of each IP flow. By using QoS requirements to build the wireless transmission frames, optimal QoS performance can result over the entire range of applications being handled by the system. For example, latency and jitter sensitive IP telephony, other H.323 compliant IP streams, and real-time audio and video streams can be given a higher priority for optimal placement in the wireless transmission frames. On the other hand, hypertext transport protocol (HTTP) traffic, such as, e.g., initial web page transmissions, can be given higher bandwidth reservation priorities for that particular application task. Other traffic without latency, jitter, or bandwidth requirements such as, e.g., file transfer protocol (FTP) file downloads, email transmissions, can be assigned a lower priority for system resources and placement in the wireless transmission frame.

4. PRIMMA TCP Transmission Rate Agent

Wireless end users are separated from a high speed, low BER wireline backbone by a lower speed, high BER wireless segment which can be subject to burst error events. TCP/IP traffic that traverses the wireless segment can experience frequent packet loss that, without intervention, can create congestion collapse and global synchronization as previously discussed. Therefore, it is desirable that the present invention's IP-centric wireless system make use of a TCP transmission rate agent that can monitor packet loss over the wireless segment, and can manage the remote TCP transmission rate function by recreating and transmitting any lost packet acknowledgments. The PRIMMA MAC layer can itself retransmit any lost packets over the wireless medium.

The IP-centric wireless TCP transmission rate agent or "adjunct" can also flow-control the IP streams when necessary, and in accordance with the QoS requirements of the IP flows. All IP-centric wireless TCP transmission rate agent functionality can be transparent to both local and remote hosts and applications.

F. Telecommunications Networks

1. Voice Network a. Simple Voice Network

FIG. 1A is a block diagram providing an overview of a standard telecommunications network 100 providing local exchange carrier (LEC) services within one or more local access and transport areas (LATAs). Telecommunications network 100 can provide a switched voice connection from a calling party 102 to a called party 110. FIG. 1A is shown to also include a private branch exchange 112 which can provide multiple users access to LEC services by, e.g., a private line. Calling party 102 and called party 110 can be ordinary telephone equipment, key telephone systems, a private branch exchange (PBX) 112, or applications running on a host computer. Network 100 can be used for modem access as a data connection from calling party 102 to, for example, an Internet service provider (ISP) (not shown). Network 100 can also be used for access to, e.g., a private data network. For example, calling party 102 can be an employee working on a notebook computer at a remote location who is accessing his employer's private data network through, for example, a dial-up modem connection.

FIG. 1A includes end offices (EOs) 104 and 108. EO 104 is called an ingress EO because it provides a connection from calling party 102 to public switched telephone network (PSTN) facilities. EO 108 is called an egress EO because it provides a connection from the PSTN facilities to a called party 110. In addition to ingress EO 104 and egress EO 108, the PSTN facilities associated with telecommunications network 100 include an access tandem (AT) (not shown) at points of presence (POPs) 132 and 134 that can provide access to, e.g., one or more inter-exchange carriers (IXCs) 106 for long distance traffic, see FIG. 2A. Alternatively, it would be apparent to a person having ordinary skill in the art that IXC 106 could also be, for example, a CLEC, or other enhanced service provider (ESP), an international gateway or global point-of-presence (GPOP), or an intelligent peripheral (IP).

FIG. 1A also includes a private branch exchange (PBX) 112 coupled to EO 104. PBX 112 couples calling parties 124 and 126, fax 116, client computer 118 and associated modem 130, and local area network 128 having client computer 120 and server computer 122 coupled via an associated modem 130. PBX 112 is a specific example of a general class of telecommunications devices located at a subscriber site, commonly referred to as customer premises equipment (CPE).

Network 100 also includes a common channel interactive signaling (CCIS) network for call setup and call tear down. Specifically, FIG. 1 includes a Signaling System 7 (SS7) signaling network 114. Signaling network 114 will be described further below with reference to FIG. 2B.

b. Detailed Voice Network

FIG. 2A is a block diagram illustrating an overview of a standard telecommunications network 200, providing both LEC and IXC carrier services between subscribers located in different LATAs. Telecommunications network 200 is a more detailed version of telecommunications network 100.

Calling party 102a and called party 110a are coupled to EO switches 104a and 108a, respectively. In other words, calling party 102a is homed to ingress EO 104a in a first LATA, whereas called party 110a is homed to an egress EO 108a in a second LATA. Calls between subscribers in different LATAs are long distance calls that are typically routed to IXCs. Sample IXCs in the United States include AT&T, MCI and Sprint.

Telecommunications network 200 includes access tandems (AT) 206 and 208. AT 206 provides connection to points of presence (POPs) 132a, 132b, 132c and 132d. IXCs 106a, 106b and 106c provide connection between POPs 132a, 132b and 132c (in the first LATA) and POPs 134a, 134b and 134c (in the second LATA). Competitive local exchange carrier (CLEC) 214 provides an alternative connection between POP 132d and POP 134d. POPs 134a, 134b, 134c and 134d, in turn, are connected to AT 208, which provides connection to egress EO 108a. Called party 110a can receive calls from EO 108a, which is its homed EO.

Alternatively, it would be apparent to a person having ordinary skill in the art that an AT 206 can also be, for example, a CLEC, or other enhanced service provider (ESP), an international gateway or global point-of-presence (GPOP), or an intelligent peripheral.

Network 200 also includes calling party 102c homed to CLEC switch 104c. Following the 1996 Telecommunications Act in the U.S., CLECs gained permission to compete for access within the local RBOCs territory. RBOCs are now referred to as incumbent local exchange carriers (ILECs).

i. Fixed Wireless CLECs

Network 200 further includes a fixed wireless CLEC 209. Example fixed wireless CLECs are Teligent Inc., of Vienna, Va., WinStar Communications Inc., Advanced Radio Telecom Corp. And the BizTel unit of Teleport Communications Group Inc. Fixed wireless CLEC 209 includes a wireless transceiver/receiver radio frequency (RF) tower 210 in communication over an RF link to a subscriber transciever RF tower 212. Subscriber RF tower 212 is depicted coupled to a CPE box, PBX 112b. PBX 112b couples calling parties 124b and 126b, fax 116b, client computer 118b and associated modem 130b, and local area network 128b having client computer 120b and server computer 122b coupled via an associated modem 130b.

Network 200 also includes called party 110a, a fax 116a, client computer 118a and associated modem 130a, and cellular communications RF tower 202 and associated cellular subscriber called party 204, all coupled to EO 108a, as shown.

EO 104a, 108a and AT 206, 208 are part of a switching hierarchy. EO 104a is known as a class 5 office and AT 208 is a class 3/4 office switch. Prior to the divestiture of the regional Bell Operating Companies (RBOCs) from AT&T following the modified final judgment, an office classification was the number assigned to offices according to their hierarchical function in the U.S. public switched network (PSTN). An office class is a functional ranking of a telephone central office switch depending on transmission requirements and hierarchical relationship to other switching centers. A class 1 office was known as a Regional Center (RC), the highest level office, or the "office of last resort" to complete a call. A class 2 office was known as a Sectional Center (SC). A class 3 office was known as a Primary Center (PC). A class 4 office was known as either a Toll Center (TC) if operators were present, or otherwise as a Toll Point (TP). A class 5 office was an End Office (EO), i.e., a local central office, the lowest level for local and long distance switching, and was the closest to the end subscriber. Any one center handles traffic from one or more centers lower in the hierarchy. Since divestiture and with more intelligent software in switching offices, these designations have become less firm. Technology has distributed functionality closer to the end user, diffusing traditional definitions of network hierarchies and the class of switches.

ii. Connectivity to Internet Service Providers (ISPs)

In addition to providing a voice connection from calling party 102a to called party 110a, the PSTN can provide calling party 102a a data connection to an ISP (i.e. similar to client 118b).

Network 200 can also include an Internet service provider (ISP) (not shown) which could include a server computer 122 coupled to a data network 142 as will be discussed further below with reference to FIG. 1B. The Internet is a well-known, worldwide network comprising several large networks connected together by data links. These links can include, for example, Integrated Digital Services Network (ISDN), T1, T3, FDDI and SONET links. Alternatively, an internet can be a private network interconnecting a plurality of LANs and/or WANs, such as, for example, an intranet. An ISP can provide Internet access services for subscribers such as client 118b.

To establish a connection with an ISP, client 118b can use a host computer connected to a modem (modulator/demodulator) 130b. The modem can modulate data from the host computer into a form (traditionally an analog form) for transmission to the LEC facilities. Typically, the LEC facilities convert the incoming analog signal into a digital form. In one embodiment, the data is converted into the point-to-point protocol (PPP) format. (PPP is a well-known protocol that permits a computer to establish a connection with the Internet using a standard modem. It supports high-quality, graphical user-interfaces.) As those skilled in the art will recognize, other formats are available, including, e.g., a transmission control program, interact protocol (TCP/IP) packet format, a user datagram protocol, internet protocol (UDP/IP) packet format, an asynchronous transfer mode (ATM) cell packet format, a serial line interface protocol (SLIP) protocol format, a point-to-point (PPP) protocol format, a point-to-point tunneling protocol (PPTP) format, a NETBIOS extended user interface (NETBEUI) protocol format, an Appletalk protocol format, a DECnet, BANYAN/VINES, an Internet packet exchange (IPX) protocol format, and an internet control message protocol (ICMP) protocol format.

iii. Communications Links

Note that FIGS. 1A, 2A and other figures described herein include lines which may refer to communications lines or which may refer to logical connections between network nodes, or systems, which are physically implemented by telecommunications carrier devices. These carrier devices include circuits and network nodes between the circuits including, for example, digital access and cross-connect system (DACS), regenerators, tandems, copper wires, and fiber optic cable. It would be apparent to persons having ordinary skill in the art that alternative communications lines can be used to connect one or more telecommunications systems devices. Also, a telecommunications carrier as defined here, can include, for example, a LEC, a CLEC, an IXC, an Enhanced Service Provider (ESP), a global or international services provider such as a global point-of-presence (GPOP), and an intelligent peripheral.

EO 104a and AT 206 are connected by a trunk. A trunk connects an AT to an EO. A trunk can be called an inter machine trunk (IMT). AT 208 and EO 108*a* are connected by a trunk which can be an IMT.

Referring to FIG. 1A, EO 104 and PBX 112 can be connected by a private line with a dial tone. A private line can also connect an ISP (not shown) to EO 104, for example. A private line with a dial tone can be connected to a modem bay or access converter equipment at the ISP. Examples of a private line are a channelized T1 or integrated services digital network (ISDN) primary rate interface (PRI). An ISP can also attach to the Internet by means of a pipe or dedicated communications facility. A pipe can be a dedicated communications facility. A private line can handle data modem traffic to and from an ISP.

Trunks can handle switched voice traffic and data traffic. For example, trunks can include digital signals DS1-DS4 transmitted over T1-T4 carriers. Table 2 provides typical carriers, along with their respective digital signals, number of channels, and bandwidth capacities.

TABLE 2

| Digital signal | Number of channels | Designation of carrier | Bandwidth in Megabits per second (Mbps) |
|---|---|---|---|
| DS0 | 1 | None | 0.064 |
| DS1 | 24 | T1 | 1.544 |
| DS2 | 96 | T2 | 6.312 |
| DS3 | 672 | T3 | 44.736 |
| DS4 | 4032 | T4 | 274.176 |

Alternatively, trunks can include optical carriers (OCs), such as OC-1, OC-3, etc. Table 3 provides typical optical carriers, along with their respective synchronous transport signals (STSs), ITU designations, and bandwidth capacities.

TABLE 3

| Optical carrier (OC) signal | Electrical signal, or synchronous transport signal (STS) | International Telecommunications Union (ITU) terminology | Bandwidth in Megabits per second (Mbps) |
|---|---|---|---|
| OC-1 | STS-1 |  | 51.84 |
| OC-3 | STS-3 | STM-1 | 155.52 |
| OC-9 | STS-9 | STM-3 | 466.56 |
| OC-12 | STS-12 | STM-4 | 622.08 |
| OC-18 | STS-18 | STM-6 | 933.12 |
| OC-24 | STS-24 | STM-8 | 1244.16 |
| OC-36 | STS-36 | STM-12 | 1866.24 |
| OC-48 | STS-48 | STM-16 | 2488.32 |

As noted, a private line is a connection that can carry data modem traffic. A private line can be a direct channel specifically dedicated to a customer's use between two specified points. A private line can also be known as a leased line. In one embodiment, a private line is an ISDN/primary rate interface (ISDN PRI) connection. An ISDN PRI connection can include a single signal channel (called a data or D channel) on a T1, with the remaining 23 channels being used as bearer or B channels. (Bearer channels are digital channels that bear voice and data information.) If multiple ISDN PRI lines are used, the signaling for all of the lines can be carried over a single D channel, freeing up the remaining lines to carry only bearer channels.

iv. Telecommunications Traffic

Telecommunications traffic can be sent and received from any network node of a telecommunications carrier. A telecommunications carrier can include, for example, a LEC, a CLEC, an IXC, and an Enhanced Service Provider (ESP). In an embodiment, this traffic can be received from a network node which is, for example, a class 5 switch, such as EO 104*a*, or from a class 3/4 switch, such as AT 206. Alternatively, the network system can also be, for example, a CLEC, or other enhanced service provider (ESP), an international gateway or global point-of-presence (GPOP), or an intelligent peripheral.

Voice traffic refers, for example, to a switched voice connection between calling party 102*a* and called party 110*a*. It is important to note that this is on a point-to-point dedicated path, i.e., that bandwidth is allocated whether it is being used or not. A switched voice connection is established between calling party 102*a* and EO 104*a*, then to AT 206 then over an IXC's network such as that of IXC 106*a* to AT 208 and then to EO 108*a* and over a trunk to called party 110*a*. In another embodiment, AT 206 or IXC 106*a* can also be, for example, a CLEC, or other enhanced service provider (ESP), an international gateway or global point-of-presence (GPOP), or an intelligent peripheral.

It is possible that calling party 102*a* is a computer with a data connection to a server over the voice network. Data traffic refers, for example, to a data connection between a calling party 102*a* (using a modem) and a server 122*b* that could be part of an ISP. A data connection can be established, e.g., between calling party 102*a* and EO 104*a*, then to AT 206, then to CLEC 214, then over a fixed wireless CLEC 209 link to PBX 112*b* to a modem 130*b* associated with server 122*b*.

c. Signaling Network

Figure 2B:
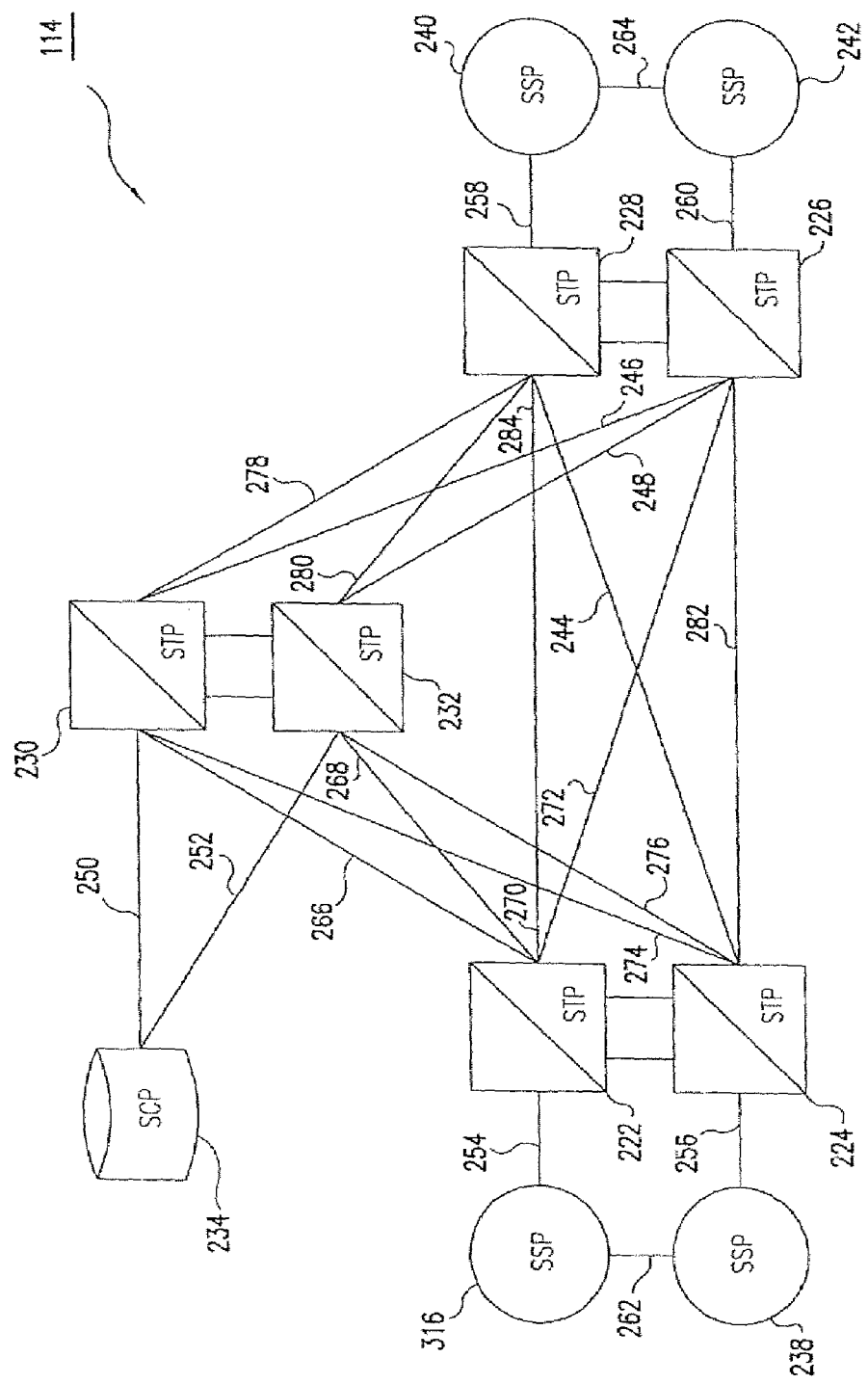
FIG. 2B illustrates a signaling network in detail.

FIG. 2B illustrates signaling network 114 in greater detail. Signaling network 114 is a separate network used to handle the set up, tear down, and supervision of calls between calling party 102 and called party 110. Signaling network 114 in the given example is the Signaling System 7 (SS7) network. Signaling network 114 includes service switching points (SSPs) 236, 238,240 and 242, signal transfer points (STPs) 222, 224, 226, 228, 230 and 232, and service control point (SCP) 234.

In the SS7 network, the SSPs are the portions of the backbone switches providing SS7 functions. The SSPs can be, for example, a combination of a voice switch and an SS7 switch, or a computer connected to a voice switch. The SSPs communicate with the switches using primitives, and create packets for transmission over the SS7 network.

EOs 104*a*, 108*a* and ATs 206, 208 can be respectively represented in SS7 signaling network 114 as SSPs 236, 238, 240 and 242. Accordingly, the connections between EOs 104*a*, 108*a* and ATs 206, 208 (presented as dashed lines) can be represented by connections 254, 256, 258 and 268. The types of these links are described below.

The STPs act as routers in the SS7 network, typically being provided as adjuncts to in-place switches. The STPs route messages from originating SSPs to destination SSPs. Architecturally, STPs can and are typically provided in "mated pairs" to provide redundancy in the event of congestion or failure and to share resources (i.e., load sharing is done automatically). As illustrated in FIG. 2B, STPs can be arranged in hierarchical levels, to provide hierarchical routing of signaling messages. For example, mated STPs 222, 224 and mated STPs 226, 228 are at a first hierarchical level, while mated STPs 230, 232 are at a second hierarchical level.

SCPs provide database functions. SCPs can be used to provide advanced features in an SS7 network, including routing of special service numbers (e.g., 800 and 900 numbers), storing information regarding subscriber services, providing calling card validation and fraud protection, and offering advanced intelligent network (AIN) services. SCP 234 is connected to mated STPs 230 and 232.

In the SS7 network, there are unique links between the different network elements. Table 4 provides definitions for common SS7 links.

Referring to FIG. 2B, mated STP pairs are connected by C links. For example, STPs 222, 224, mated STPs 226, 228, and mated STPs 230, 232 are connected by C links (not labeled). SSPs 236, 238 and SSPs 240, 242 are connected by F links 262 and 264.

Mated STPs 222, 224 and mated STPs 226, 228, which are at the same hierarchical level, are connected by B links 270,272,244 and 282. Mated STPs 222,224 and mated STPs 230,232, which are at different hierarchical levels, are connected by D links 266,268,274 and 276. Similarly, mated STPs 226, 228 and mated STPs 230, 232, which are at different hierarchical levels, are connected by D links 278, 280, 246 and 248.

SSPs 236, 238 and mated STPs 222, 224 are connected by A links 254 and 256. SSPs 240, 242 and mated STPs 226, 228 are connected by A links 258 and 260.

SSPs 236, 238 can also be connected to mated STPs 230, 232 by E links (not shown). Finally, mated STPs 230, 232 are connected to SCP 234 by A links 250 and 252.

For a more elaborate description of SS7 network topology, the reader is referred to Russell, Travis, *Signaling System #7*, McGraw-Hill, New York, N.Y. 10020, ISBN 0-07-054991-5, which is incorporated herein by reference in its entirety.

TABLE 4

| SS7 link terminology | Definitions |
|---|---|
| Access (A) links | A links connect SSPs to STPs, or SCPs to STPs, providing network access and database access through the STPs. |
| Bridge (B) links | B links connect mated STPs to other mated STPs. |
| Cross (C) links | C links connect the STPs in a mated pair to one another. During normal conditions, only network management messages are sent over C links. |
| Diagonal (D) links | D links connect the mated STPs at a primary hierarchical level to mated STPs at a secondary hierarchical level. |
| Extended (E) links | E links connect SSPs to remote mated STPs, and are used in the event that the A links to home mated STPs are congested. |
| Fully associated (F) links | F links provide direct connections between local SSPs (bypassing STPs) in the event there is much traffic between SSPs, or if a direct connection to an STP is not available. F links are used only for call setup and call teardown. | d. SS7 Signaled Call Flow

To initiate a call in an SS7 telecommunications network, a calling party using a telephone connected to an ingress EO switch, dials a telephone number of a called party. The telephone number is passed from the telephone to the SSP at the ingress EO of the calling party's local exchange carrier (LEC). First, the SSP can process triggers and internal route rules based on satisfaction of certain criteria. Second, the SSP can initiate further signaling messages to another EO or access tandem (AT), if necessary. The signaling information can be passed from the SSP to STPs, which route the signals between the ingress EO and the terminating end office, or egress EO. The egress EO has a port designated by the telephone number of the called party. The call is set up as a direct connection between the EOs through tandem switches if no direct trunking exists or if direct trunking is full. If the call is a long distance call, i.e., between a calling party and a called party located in different local access transport areas (LATAs), then the call is connected through an inter exchange carrier (IXC) switch. Such a long distance call is commonly referred to as an inter-LATA call. LECs and IXCs are collectively referred to as the public switched telephone network (PSTN).

Passage of the Telecommunications Act of 1996, authorizing competition in the local phone service market, has permitted CLECs to compete with ILECs in providing local exchange services. This competition, however, has still not provided the bandwidth necessary to handle the large volume of voice and data communications. This is due to the limitations of circuit switching technology which limits the bandwidth of the equipment being used by the LECs, and to the high costs of adding additional equipment.

e. Circuit-Switching

Circuit switching dedicates a channel to a call for the duration of the call. Thus, using circuit switching, a large amount of switching bandwidth is required to handle the high volume of voice calls. This problem is compounded by the use of voice circuits to carry data communications over the same equipment that were designed to handle voice communications.

i. Time Division Multiplexed (TDM) Circuit Switching

TDM circuit switching creates a full-time connection or a dedicated circuit between any two attached devices for the duration of the connection. TDM divides the bandwidth down int fixed time slots in which there can be multiple time slots, each with its own fixed capacity, available. Each attached device on the TDM network is assigned a fixed portion of the bandwidth using one or more time slots depending on the need for speed. When the device is in transmit mode, the data is merely placed in this time slot without any extra overhead such as processing or translations. Therefore, TDM is protocol transparent to the traffic being carried. Unfortunately, however, when the device is not sending data, the time slots remain empty, thereby wasting the use of the bandwidth. A higher-speed device on the network can be slowed down or bottled up waiting to transmit data, but the capacity that sits idle cannot be allocated to this higher priority device for the duration of the transmission. TDM is not well suited for the bursts of data that are becoming the norm for the data needs in today's organization.

2. Data Network

FIG. 1B depicts an example network 148 including workstations 144 and 146 coupled to data network 142. Data network 142 can act as a wide area network (WAN) for coupling a plurality of local area networks (LANs) together. Network 148 includes an example local area network including a plurality of host computers such as, e.g., client workstation 138 and server 136, coupled together by wiring including network interface cards (NICs) and a hub, such as, e.g., an Ethernet hub. The LAN is coupled to data network 142 by a network router 140 which permits data traffic to be routed to workstations 144 and 146 from client 138 and server 136.

a. Packet-Switching

Unlike voice networks 100 and 200 described above with reference to FIGS. 1A and 2A which transport traffic over circuit-switched connections, data network 148 transports traffic using packet switching.

Currently, internets, intranets, and similar public or private data networks that interconnect computers generally use packet switching technology. Packet switching provides for more efficient use of a communication channel than does circuit switching. Packet switched networks transport packets of information which can include various types of data such as, e.g., digitized voice, data, and video. With packet switching, many different calls can share a communication channel rather than the channel being dedicated to a single call. During a voice call, for instance, digitized voice information might be transferred between the callers only 60% of the time, with silence being transferred the other 40% of the time. With a circuit switched connection, the voice call could tie-up a communications channel that could have 50% of its bandwidth, unused because of the silence. For a data call, information might be transferred between two computers only 10% of the time. With the data call, 90% of the channel's bandwidth may go unused. In contrast, a packet-switched connection would permit the voice call, the data call and possibly other call information to all be sent over the same channel.

Packet switching breaks a media stream into pieces known as, for example, packets, cells or frames. Each packet can then be encoded with address information for delivery to the proper destination and can be sent through the network. The packets can be received at the destination and the media stream is reassembled into its original form for delivery to the recipient. This process is made possible using an important family of communications protocols, commonly called the Internet Protocol (IP).

In a packet-switched network, there is no single, unbroken physical connection between sender and receiver. The packets from many different calls share network bandwidth with other transmissions. The packets can be sent over many different routes at the same time toward the destination, and can then be reassembled at the receiving end. The result is much more efficient use of a telecommunications network's bandwidth than could be achieved with circuit-switching.

b. Routers

Data network 142 can include a plurality of network routers 140. Network routers are used to route information between multiple networks. Routers act as an interface between two or more networks. Routers can find the best path between any two networks, even if there are several different networks between the two networks.

Network routers can include tables describing various network domains. A domain can be thought of as a local area network (LAN) or wide area network (WAN). Information can be transferred between a plurality of LANs and/or WANs via network routers. Routers look at a packet and determine from the destination address in the header of the packet, the destination domain of the packet. If the router is not directly connected to the destination domain, then the router can route the packet to the router's default router, i.e. a router higher in a hierarchy of routers. Since each router has a default router to which it is attached, a packet can be transmitted through a series of routers to the destination domain and to the destination host bearing the packet's final destination address.

c. Local Area Networks (LANs) and Wide Area Networks (WANs)

A local area network (LAN) can be thought of as a plurality of host computers interconnected via network interface cards (NICs) in the host computers. The NICs are connected via, for example, copper wires so as to permit communication between the host computers. Examples of LANs include an ethernet bus network, an ethernet switch network, a token ring network, a fiber digital data interconnect (FDDI) network, and an ATM network.

A wide area network (WAN) is a network connecting host computers over a wide area. In order for host computers on a particular LAN to communicate with a host computer on another LAN or on a WAN, network interfaces interconnecting the LANs and WANs must exist. An example of a network interface is a router discussed above.

A network designed to interconnect multiple LANs and/or WANs is known as an internet (with a lower case "i"). An internet can transfer data between any of a plurality of networks including both LANs and WANs. Communication occurs between host computers on one LAN and host computers on another LAN via, for example, an internet protocol (IP) protocol. The IP protocol is used to assign each host computer of a network, a unique IP address enabling packets to be transferred over the internet to other host computers on other LANs and/or WANs that are connected to the internet. An internet can comprise a router interconnecting two or more networks.

The "Internet" (with a capital "I") is a global internet interconnecting networks all over the world. The Internet includes a global network of computers which intercommunicate via the internet protocol (IP) family of protocols.

An "intranet" is an internet which is a private network that uses internet software and internet standards, such as the internet protocol (IP). An intranet can be reserved for use by parties who have been given the authority necessary to use that network.

d. Switching vs. Routing

Routing is done at the middle network architecture levels on such protocols as IPX or TCP/IP. Switching is done at a lower level, at layer 2 of the OSI model, i.e. the media access control (MAC) layer.

e. TCP/IP Packet-Centric vs. ATM Circuit-Centric Data Networks

Asynchronous Transfer Mode (ATM) is a fixed- size cell switched circuit-centric data network. ATM implements virtual circuits (VCs), virtual paths (VPs) and transmission paths (TPs). A circuit-centric network like ATM sets up virtual circuits between source and destination nodes which provide QoS by dedicating the virtual circuit to a specific traffic type.

Some networks are packet-centric networks. Unlike a circuit-centric network, a packet-centric network does not use dedicated circuits through which to transfer packets. TCP/IP performs a packetization of user data to be sent between and among the various systems on the IP network. When a large file is sent down the protocol stack, the IP function is responsible for segmentation and packetization of the data. Then a header is placed on the packet for delivery to the data link. The routing and switching of this data is handled at the IP (i.e. network) layer. IP is in a sense a dumb protocol. When a packet is prepared for transmission across the medium, IP does not specifically route the call across a specific channel. Instead, it places a header on the packet and lets the network deal with it. Therefore, the outward bound packets can take various routes to get from a source to a destination. This means that the packets are in a datagram form and not sequentially numbered as they are in other protocols. IP makes its best attempt to deliver the packets to the destination network interface; but it makes no assurances that data will arrive, that data will be free of errors, and that nodes along the way will concern themselves with the accuracy of the data and sequencing, or come back and alert the originator that something is wrong in the delivery mechanism. It is possible that in IP routing of a packet, the packet can be sent along the network in a loop, so IP has a mechanism in its header information to allow a certain number of "hops" or what is called "time to live" on the network. Rather than permit an undeliverable pack to loop around the network, IP has a counter mechanism that decrements every time the packet passes through a network node. If the counter expires, the node will discard the packet. Working together with IP is TCP which provides controls to ensure that a reliable data stream is sent and delivered. At the sending end, TCP puts a byte count header on information that will be delivered to the IP protocol layer and encapsulates it as part of the packet. The receiving end, when it gets packets is responsible for resequencing the packets and ensuring its accuracy. If all of the IP flow is not received correctly, the byte count acknowledgment or nonacknowledgment message can be sent back to the sending end, prompting the sending end to resend the bytes necessary to fill in the remaining portions of the packet flow. TCP buffers additional packets until after resending the nonacknowledged packet.

3. Video Network

FIG. 1C illustrates a conventional video network 150 such as, e.g., a cable television (CATV) network. Video network 150 can include video network 160 coupled to various video capture, distribution links and video output monitors. Video input devices can include, e.g., conference cameras 154 and 158. Video output devices can include, e.g., televisions 152 and 156. Video network 160 can include a variety of head end (i.e. the serving end of the cable) and distribution link equipment such as, e.g., coaxial cable television (CATV) and national television standard code (NTSC) tuner equipment for multiplexing various video signals. Standard cable systems have an immense amount of bandwidth available to them.

It is important to note that CATV is a wireless communication method. The frequencies of many video signals are distributed along the cable at the same time. A television tuner selects a particular channel by tuning into a specific frequency or a "frequency band."

Although a cable television CATV video network often includes only one physical cable, a number of channels can simultaneously be present on the cable. This accomplished by sharing the frequency spectrum of the cable and assigning different frequency ranges to different channels using frequency division multiplexing (FDM). A broadband cable communications system can operate exactly like a CATV system. A counter to this FDM technique is division of the cable not divided into frequency bands but into time slots using time-division multiplexing (TDM). With TDM, each transmitting video station can grab the entire bandwidth of the cable,but only for a very short period of time. The cable is currently capable of carrying up to 750 MHz. FDM techniques can be used to divide the channels into a number of dedicated logical channels. Innovations have allowed a time division multiple access (TDMA) within an FDM channel.

A cable system can allow multiplexing on two separate dimensions to achieve data channels over a cable. The channels can be separated by FDM, and in a frequency band the channel can then be shared via TDMA among multiple users. The most common of the TDMA access methods on broadband cable is CSMA/CD developed by XEROX for Ethernet.

Using a single cable, a midsplit arrangement can accommodate two-way simultaneous transmission. Another way to accomodate this is to use a dual cable system.

Broadband is inherently an analog signaling method. Because video cameras, e.g., are also analog devices, a signal from a video camera (or video recorder) can be directly transmitted onto a broadband cable channel in red/green/blue (RGB) format.

G. Convergence of Voice/Data/Video Networks

Recognizing the inherent efficiency of packet-switched data networks such as the Internet, attention has recently focused on the digitization and transmission of voice, data, video and other information over converged packet-switched data networks. In order to deliver a high quality of service (QoS) end-user experience, the data networks attempt to provide mechanisms to deliver the different types of information timely and with appropriate bandwidth to provide an acceptable end-user experience.

Figure 2C:
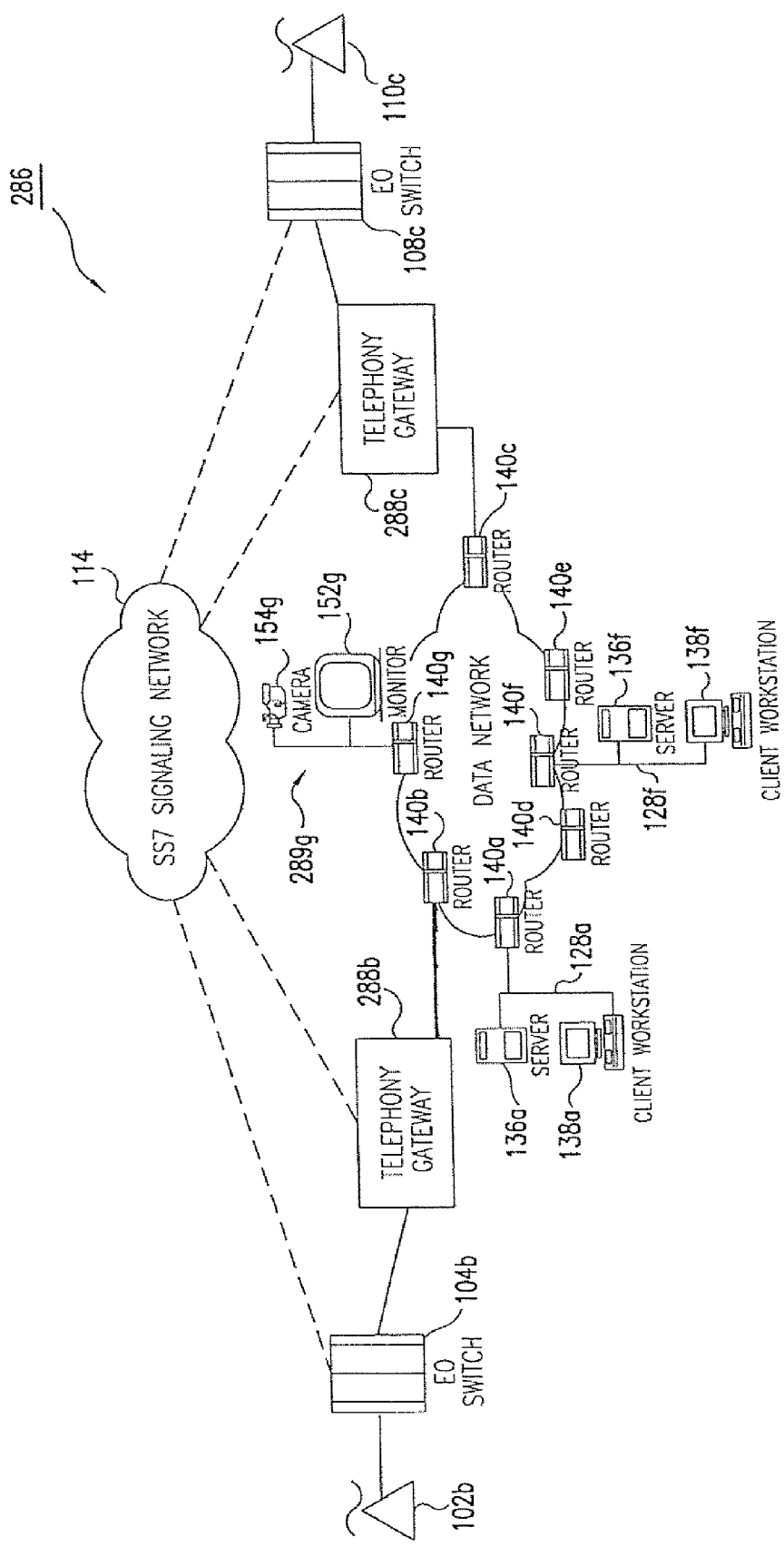
FIG. 2C illustrates an exemplary network carrying voice, data and video traffic over a data network.

FIG. 2C illustrates an example network 286 carrying voice, data and video traffic over a data network. Network 286 includes calling party 102b homed to EO 104b, where EO 104b is linked to a telephony gateway 288b. Network 286 also includes called party 110c homed to EO 108c, where EO 108c is linked to a telephony gateway 288c. EOs 104b and 108c and telephony gateways 288b and 288c can be linked to signaling network 114. Telephony gateways 288b and 288c can also be coupled to data network 142 via routers 140b and 140c, respectively.

Still referring to FIG.2C, telephony gateways 288b and 288c can be used to packetize voice traffic and signaling information into a form appropriate for transport over data network 142. It would be apparent to those skilled in the art that telephony gateways 288b and 288c can include various computer devices designed for controlling, setting up and tearing down calls. Voice calls delivered over the data network can include, e.g., voice over packet (VoP), voice over data (VoD), voice over internet protocol (VoIP), voice over asynchronous transfer mode (VoATM), voice over frame (VoF). An example of a telephony gateway 288b and 288c is a media gateway control protocol (MGCP) compliant gateway available from various vendors such as, e.g., Lucent, of Parsippany, N.J., and CISCO of Palo Alto, Calif. It is important to note that other network devices such as a softswitch available from several member companies of the SoftSwitch Consortium, including Level 3 Communications of Louisville, Colo., could also be necessary to enable transport of, e.g., VoIP.

Network 286 is depicted to include other devices coupled to data network 142. First, an H.323 compliant video-conferencing system 289 is illustrated including a camera 154g and television 152g and router 140g. Second, a local area network (LAN) 128a including a client workstation 138a and a server 136a are coupled to data network 142 via network router 140a. Similarly, LAN 128f having a client workstation 138f and a server 136f are coupled via network router 140f to data network 142.

Data Network 142 can provide for routing of packets of information through network routing devices from source locations to destination locations coupled to data network 142. For example, data network 142 can route internet protocol (IP) packets for transmission of voice and data traffic from telephony gateway 288b to telephony gateway 288c. Data Network 142 represents any art-recognized packet centric data network. One well-known data network is the global Internet. Other examples include a private intranet, a packet-switched network, a frame relay network, and an asynchronous transfer mode (ATM) circuit-centric network.

In an example embodiment, data network 142 can be an IP packet-switched network. A packet-switched network such as, e.g., an IP network, unlike a circuit-switched network, does not require dedicated circuits between originating and terminating locations within the packet switched network. The packet-switched network instead breaks a message into pieces known as packets of information. Such packets can then be encapsulated with a header which designates a destination address to which the packet must be routed. The packet-switched network then takes the packets and routes them to the destination designated by the destination address contained in the header of the packet.

Routers 140a, 140b, 140c, 140d, 140e, 140f and 140g can be connected to one another via physical media such as, for example, optical fiber link connections, and copper wire connections. Routers 140a-g transfer information between one another and intercommunicate according to routing protocols.

Data network 142 could be implemented using any data network such as, e.g., IP networks, ATM virtual circuit-centric networks, frame relay networks, X.25 networks, and other kinds of LANs and WANs. Other data networks could be used interchangeably for data network 142 such as, for example, FDDI, Fast Ethernet, or an SMDS packet switched network. Frame relay and ATM are connection-oriented, circuit-centric services. Switched multi-megabyte data service (SMDS) is a connection-oriented mass packet service that offers speeds up to 45 Mbps.

1. Example Data Networks a. Asynchronous Transfer Mode (ATM)

ATM is a high-bandwidth, low-delay, fixed-sized cell-based multiplexing network technology. Bandwidth capacity is segmented into 53-byte cells, having a header and payload fields. ATM uses fixed-length cells with the belief that the fixed length cells can be switched more easily in hardware than variable size packets and thus should result in faster transmissions in certain environments.

The ATM environment sets up virtual circuits in a circuit-centric manner. Thus, ATM segments variable length IP packet flows into fixed size cells using a segmentation and resequencing algorithm (SAR).

Each ATM cell contains a 48-byte payload field and a 5-byte header that identifies the so-called "virtual circuit" of the cell. ATM is thought suitable for high-speed combinations of voice, data, and video services. Currently, ATM access can perform at speeds as high as 622 Mbps or higher. ATM has recently been doubling its maximum speed every year.

ATM is defined by a protocol standardized by the International Telecommunications Union (ITU-T), American National Standards Institute (ANSI), ETSI, and the ATM Forum. ATM comprises a number of building blocks, including transmission paths, virtual paths, and virtual channels. Asynchronous transfer mode (ATM) is a cell based switching and multiplexing technology designed to be a general purpose connection-oriented transfer mode for a wide range of telecommunications services. ATM can also be applied to LAN and private network technologies as specified by the ATM Forum.

ATM handles both connection-oriented traffic directly or through adaptation layers, or connectionless traffic through the use of adaptation layers. ATM virtual connections may operate at either a constant bit rate (CBR) or a variable bit rate (VBR). Each ATM cell sent into an ATM network contains a small header including information that establishes a virtual circuit-centric connection from origination to destination. All cells are transferred, in sequence, over this virtual connection. ATM provides either permanent or switched virtual connections (PVCs or SVCs). ATM is asynchronous because the transmitted cells need not be periodic as time slots of data are required to be in synchronous transfer mode (STM).

ATM uses an approach by which a header field prefixes each fixed-length payload. The ATM header identifies the virtual channel (VC). Therefore, time slots are available to any host which has data ready for transmission. If no hosts are ready to transmit, then an empty, or idle, cell is sent.

ATM permits standardization on one network architecture defining a multiplexing and a switching method. Synchronous optical network (SONET) provides the basis for physical transmission at very high-speed rates. ATM can also support multiple quality of service (QoS) classes for differing application requirements by providing separate virtual circuits for different types of traffic, depending on delay and loss performance. ATM can also support LAN-like access to available bandwidth.

Cells are mapped into a physical transmission path, such as the North American DS1, DS3, and SONET; European, E1, E3, and E4; ITU-T STM standards; and various local fiber and electrical transmission payloads. All information is multiplexed and switched in an ATM network via these fixed-length cells.

The ATM cell header field identifies cell type, and priority, and includes six portions. An ATM cell header includes a generic flow control (GFC), a virtual path identifier (VPI), a virtual channel identifier (VCI), a payload type (PT), a call loss priority (CLP), and a header error check (HEC). VPI and VCI hold local significance only, and identify the destination. GFC allows a multiplexer to control the rate of an ATM terminal. PT indicates whether the cell contains user data, signaling data, or maintenance information. CLP indicates the relative priority of the cell, i.e., lower priority cells are discarded before higher priority cells during congested intervals. HEC detects and corrects errors in the header.

The ATM cell payload field is passed through the network intact, with no error checking or correction. ATM relies on higher-layer protocols to perform error checking and correction on the payload. For example, a transmission control protocol (TCP) can be used to perform error correction functions. The fixed cell size simplifies the implementation of ATM switches and multiplexers and enables implementations at high speeds.

When using ATM, longer packets cannot delay shorter packets as in other packet-switched networks, because long packets are separated into many fixed length cells. This feature enables ATM to carry CBR traffic, such as voice and video, in conjunction with VBR data traffic, potentially having very long packets, within the same network.

ATM switches take traffic and segment it into the fixed-length cells, and multiplex the cells into a single bit stream for transmission across a physical medium. As an example, different kinds of traffic can be transmitted over an ATM network including voice, video, and data traffic. Video and voice traffic are very time-sensitive, so delay cannot have significant variations. Data, on the other hand, can be sent in either connection-oriented or connectionless mode. In either case, data is not nearly as delay-sensitive as voice or video traffic. Data traffic, as e.g., spread sheet data requires accurate transmission. Therefore, ATM conventionally must discriminate between voice, video, and data traffic. Voice and video traffic requires priority and guaranteed delivery with bounded delay, while data traffic requires, simultaneously, assurance of low loss. In a converged data network, data traffic can also carry voice traffic, making it also time-dependent. Using ATM, in one embodiment, multiple types of traffic can be combined over a single ATM virtual path (VP), with virtual circuits (VCs) being assigned to separate data, voice, and video traffic.

A transmission path can include one or more VPs. Each VP can include one or more VCs. Thus, multiple VCs can be trunked over a single VP. Switching can be performed on a transmission path, VPs, or at the level of VCs.

The capability of ATM to switch to a virtual channel level is similar to the operation of a private or public branch exchange (PBX) or telephone switch in the telephone world. In a PBX switch, each channel within a trunk group can be switched. Devices which perform VC connections are commonly called VC switches because of the analogy to telephone switches. ATM devices which connect VPs are commonly referred to as VP cross-connects, by analogy with the transmission network. The analogies are intended for explanatory reasons, but should not be taken literally. An ATM cell-switching machine need not be restricted to switching only VCs and cross-connection to only VPs.

At the ATM layer, users are provided a choice of either a virtual path connection (VPC) or a virtual channel connection (VCC). Virtual path connections (VPCs) are switched based upon the virtual path identifier (VPI) value only. Users of a VPC can assign VCCs within a VPI transparently, since they follow the same route. Virtual channel connections (VCCs) are switched upon a combined VPI and virtual channel identifier (VCI) value.

Both VPIs and VCIs are used to route calls through a network. Note that VPI and VCI values must be unique on a specific transmission path (TP).

It is important to note that data network 142 can be any of a number of other data-type networks, including various packet-switched data-type networks, in addition to an ATM network.

b. Frame Relay

Alternatively, data network 142 can be a frame relay network. It would be apparent to persons having ordinary skill in the art, that a frame relay network could be used as data network 142. Rather than transporting data in ATM cells, data could be transported in frames.

Frame relay is a packet-switching protocol used in WANs that has become popular for LAN-to-LAN connections between remote locations. Formerly frame relay access would top out at about 1.5 Mbps. Today, so-called "high-speed" frame relay offers around 45 Mbps. This speed is still relatively slow as compared with other technology such as ATM.

Frame relay services employ a form of packet-switching analogous to a streamlined version of X.25 networks. The packets are in the form of frames, which are variable in length. The key advantage to this approach it that a frame relay network can accommodate data packets of various sizes associated with virtually any native data protocol. A frame relay network is completely protocol independent. A frame relay network embodiment of data network 142 does not undertake a lengthy protocol conversion process, and therefore offers faster and less-expensive switching than some alternative networks. Frame relay also is faster than traditional X.25 networks because it was designed for the reliable circuits available today and performs less-rigorous error detection.

c. Internet Protocol (IP)

In an embodiment, data network 142 can be an internet protocol (IP) network over an ATM network. It would be apparent to those skilled in the art, that an internet protocol (IP) network over various other data link layer network such as, e.g., Ethernet, could be used as data network 142. Rather than transporting data in fixed length ATM circuit-centric cells, data could be transported in variable length IP datagram packet-centric packets as segmented by TCP. The IP data network can lie above any of a number of physical networks such as, for example, a SONET optical network.

2. Virtual Private Networks (VPNs)

A virtual private network (VPN) is a wide area communications network operated by a telecommunications carrier that provides what appears to be dedicated lines when used, but that actually includes trunks shared among all customers as in a public network. Just as a VPN can be provided as a service through a wireline network, a VPN can be provided in a wireless network. A VPN can allow a private network to be configured within a public network.

VPNs can be provided by telecommunications carriers to customers to provide secure, guaranteed, long-distance bandwidth for their WANs. These VPNs generally use frame relay or switched multi-megabyte data service (SMDS) as a protocol of choice because those protocols define groups of users logically on the network without regard to physical location. ATM has gained favor as a VPN protocol as companies require higher reliability and greater bandwidth to handle more complex applications. VPNs using ATM offer networks of companies with the same virtual security and QoS as WANs designed with dedicated circuits.

The Internet has created an alternative to VPNs, at a much lower cost, i.e. the virtual private Internet. The virtual private Internet (VPI) lets companies connect disparate LANs via the Internet. A user installs either a software-only or a hardware-software combination that creates a shared, secure intranet with VPN-style network authorizations and encryption capabilities. A VPI normally uses browser-based administration interfaces.

3. H.323 Video Conferencing

The H.323 Recommendation for video conferencing will now be briefly overviewed. The H.323 standard provides a foundation for, for example, audio, video, and data communications across IP-based networks, including the Internet. By complying with the H.323 Recommendation, multimedia products and applications from multiple vendors can interoperate, allowing users to communicate without concern for compatibility. H.323 promises to be the foundation of future LAN-based products multimedia applications.

H.323 is an umbrella recommendation from the International Telecommunications Union (ITU) that sets standards for multimedia communications over Local Area Networks (LANs) that do not provide a guaranteed Quality of Service (QoS). These networks dominate today's corporate desktops and include packet-switched TCP/IP and IPX over Ethernet, Fast Ethernet and Token Ring network technologies. Therefore, the H.323 standards are important building blocks for a broad new range of collaborative, LAN-based applications for multimedia communications.

The H.323 specification was approved in 1996 by the ITU's Study Group 16. Version 2 was approved in January 1998. The standard is broad in scope and includes both stand-alone devices and embedded personal computer technology as well as point-to-point and multipoint conferences. H.323 also addresses call control, multimedia management, and bandwidth management as well as interfaces between LANs and other networks.

H.323 is part of a series of communications standards that enable videoconferencing across a range of networks. Known as H.32X, this series includes H.320 and H.324, which address ISDN and PSTN communications, respectively.

The H.323 architecture defines four major components for network-based communications, including terminals, gateways, gatekeepers, and multipoint control units (MCUs).

Terminals are client endpoints on the LAN that provide real-time, two-way communications. All terminals support voice communications; video and data are optional. H.323 specifies the modes of operation required for different audio, video, and/or data terminals to work together. H.323 is the standard of next generation Internet phones, audio conferencing terminals, and video conferencing technologies.

All H.323 terminals also support H.245, which is used to negotiate channel usage and capabilities. Three other components are required: Q.931 for call signaling and call setup, a component called Registration/Admission/Status (RAS), which is a protocol used to communicate with a gatekeeper; and support for RTP/RTCP for sequencing audio and video packets.

Optional components in an H.323 terminal are video codecs, T.120 data conferencing protocols, and MCU capabilities.

A gateway is an optional element in an H.323 conference. An H.323 gateway can provide many services, the most common being a translation function between H.323 conferencing endpoints and other terminal types. This function includes translation between transmission formats (i.e. H.225.0 to H.221) and between communications procedures (i.e. H.245 to H.242). In addition, a gateway also translates between audio and video codecs and performs call setup and clearing on both the LAN side and the switched-circuit network side.

In general, the purpose of the H.323 gateway is to reflect characteristics of a LAN endpoint to an SCN endpoint and vice versa. The primary applications of gateways are likely to be establishing links with analog PSTN terminals, establishing links with remote H.320 compliant terminals over ISDN-based switched-circuit networks, and establishing links with remote H.324-compliant terminals over PSTN networks.

Gateways are not required if connections to other networks are not needed, since endpoints may directly communicate with other endpoints on the same LAN. Terminals communicate with gateways using the H.245 and Q.931 protocols.

With the appropriate transcoders, H.323 gateways 5806 can support terminals that comply with H.310, H.321, H.322, and V.70.

Many gateway functions are left to the designer. For example, the actual number of H.323 terminals that can communicate through the gateway is not subject to standardization. Similarly, the number of SCN connections, the number of simultaneous independent conferences supported, the audio/video/data conversion functions, and inclusion of multipoint functions are left to the manufacturer. By incorporating H.323 gateway technology into the H.323 specification, the ITU has positioned H.323 as the means to hold standards-based conferencing endpoints together.

The gatekeeper is the most important component of an H.323 enabled network. It can act as the central point for all calls within its zone and provides call control services to registered endpoints. In many ways, an H.323 gatekeeper acts as a virtual switch.

Gatekeepers perform two important call control functions. The first is address translation from LAN aliases for terminals and gateways to IP or IPX addresses, as defined in the RAS specification. The second function is bandwidth management, which is also designated within RAS. For instance, if a network manager has specified a threshold for the number of simultaneous conferences on the LAN, the gatekeeper can refuse to make any more connections once the threshold is reached. The effect is to limit the total conferencing bandwidth to some fraction of the total available; the remaining capacity is left for e-mail, file transfers, and other LAN protocols. A collection of all terminals, gateways, and multipoint control units which can be managed by a single gatekeeper are known as an H.323 Zone.

An optional, but valuable feature of a gatekeeper is its ability to route H.323 calls. By routing a call through a gatekeeper, it can be controlled more effectively. Service providers need this ability in order to bill for calls placed through their network. This service can also be used to re-route a call to another endpoint if a called endpoint is unavailable. In addition, a gatekeeper capable of routing H.323 calls can help make decisions involving balancing among multiple gateways. For instance, if a call is routed through a gatekeeper, that gatekeeper can then re-route the call to one of many gateways based on some proprietary routing logic.

While a gatekeeper is logically separate from H.323 endpoints, vendors can incorporate gatekeeper functionality into the physical implementation of gateways and MCUs.

A gatekeeper is not required in an H.323 system. However, if a gatekeeper is present, terminals must make use of the services offered by gatekeepers. RAS defines these as address translation, admissions control, bandwidth control, and zone management.

Gatekeepers can also play a role in multipoint connections. To support multipoint conferences, users would employ a gatekeeper to receive H.245 control channels from two terminals in a point-to-point conference. When the conference switches to multipoint, the gatekeeper can redirect the H.245 Control Channel to a multipoint controller, the MC. A gatekeeper need not process the H.245 signaling; it only needs to pass it between the terminals or between the terminals and the MC.

LANs which contain gateways could also contain a gatekeeper to translate incoming E.164 addresses into Transport Addresses. Because a Zone is defined by its gatekeeper, H.323 entities that contain an internal gatekeeper can require a mechanism to disable the internal function so that when there are multiple H.323 entities that contain a gatekeeper on a LAN, the entities can be configured into the same Zone.

The Multipoint Control Unit (MCU) supports conferences between three or more endpoints. Under H.323, an MCU consists of a Multipoint Controller (MC), which is required, and zero or more Multipoint Processors (MP). The MC handles H.245 negotiations between all terminals to determine common capabilities for audio and video processing. The MC also controls conference resources by determining which, if any, of the audio and video streams will be multicast.

The MC does not deal directly with any of the media streams. This is left to the MP, which mixes, switches, and processes audio, video, and/or data bits. MC and MP capabilities can exist in a dedicated component or be part of other H.323 components.

The present invention supports multicast for wireless base station 302, including providing: compatibility with RFC 1112, 1584; recognition and support of multicasting applications, including: multimedia, teleconferencing, database, distributed computing, real-time workgroups; support of broadcasting function over wireless link; preserves bandwidth, retains QoS latency performance; support of IPv6 IGMP and IPv4 IGMP multicast; group membership query, group membership report messages.

Approved in January of 1998, version 2 of the H.323 standard addresses deficiencies in version 1 and introduces new functionality within existing protocols, such as Q.931, H.245 and H.225, as well as entirely new protocols. The most significant advances were in security, fast call setup, supplementary services and T.120/H.323 integration.

Figure 2D:
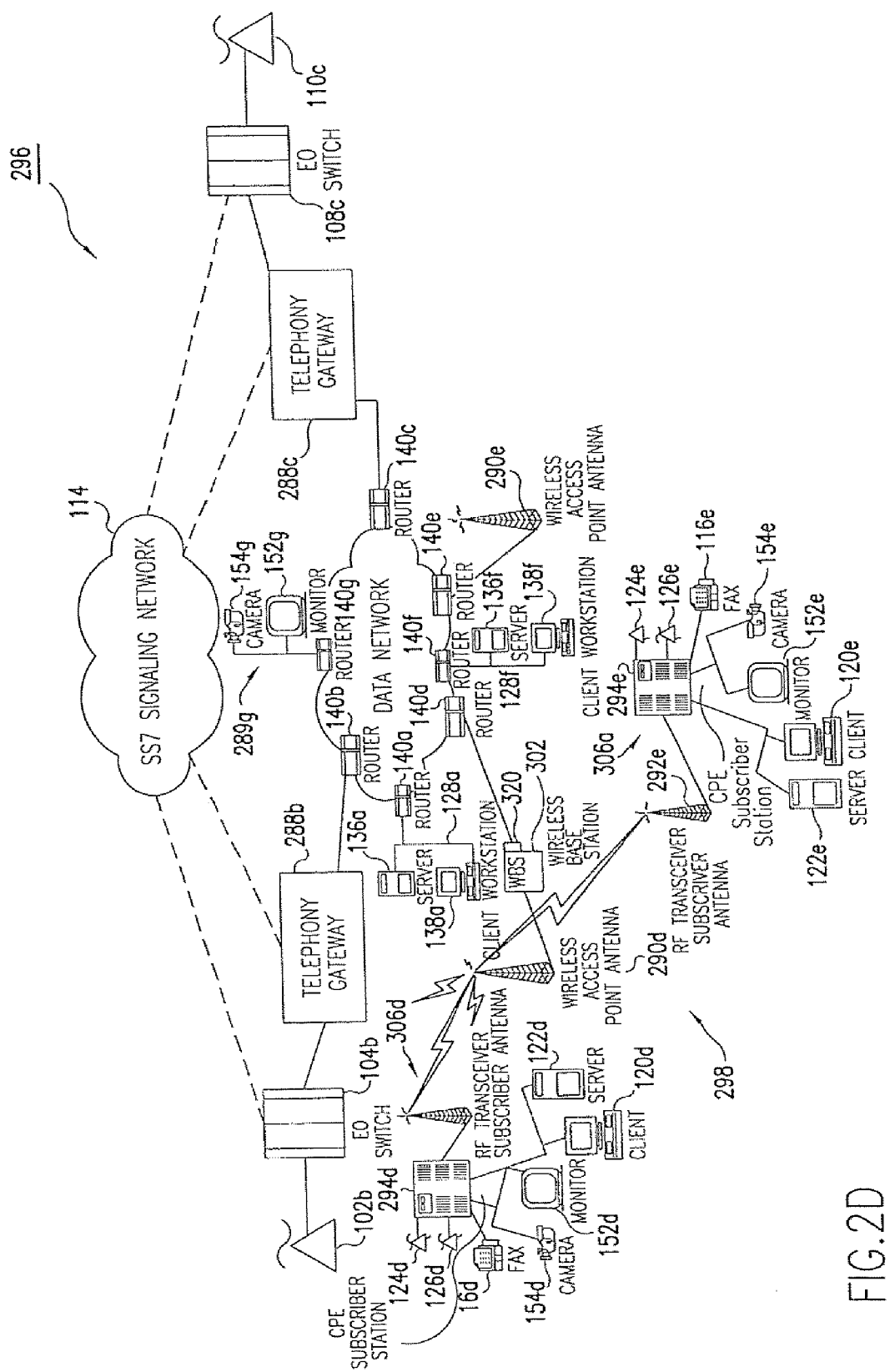
FIG. 2D depicts a network including a point-to-multipoint wireless network coupled via a router to a data network.

G. Packet-Centric QoS-Aware Wireless Point-to-Multi-Point (PtMP) Telecommunications System 1. Wireless Point-to-MultiPoint Telecommunications System FIG. 2D depicts network 296 including a point-to-multipoint (PtMP) wireless network 298 coupled via router 140*d* to data network 142. It is important to note that network 296 includes network 286 from FIG. 2C, plus PtMP wireless network 298. PtMP wireless network 298 enables customer premise equipment (CPE) at a subscriber location to gain access to the various voice, data and video resources coupled to data network 142 by means of wireless connectivity over a shared bandwidth. The wireless PtMP network 298 is a packet switched network which is TCP/IP packet-centric (i.e. no dedicated circuit is created in delivering a communication IP flow) and QoS aware.

Specifically, PtMP wireless network 298 includes a wireless access point (WAP) 290*d* coupled to router 140*d* by, e.g., a wireline connection. A wireless access point 290*e* can be similarly coupled to router 140*e* by a wireline connection. WAP 290*d* is in wireless communication, such as, e.g., radio frequency. (RF) communication, with one or more wireless transciever subscriber antennae 292*d* and 292*e*. It would be apparent to those skilled in the art that various wireless communication methods could be used such as, e.g., microwave, cellular, spread spectrum, personal communications systems (PCS), and satellite.

In an alternative embodiment, RF communication is accomplished over cable television (CATV) coaxial cable. As those skilled in the relevant art will understand, a coaxial cable functions as a waveguide over which RF waves propagate. Accordingly, it is possible for the communications link between RF transceiver subscriber antenna 292*d* and WAP 290*d* to be a coaxial cable. Therefore, a coaxial cable connection is analogous to a wireless connection, and is referred to as an alternative form of wireless connection in the present invention.

In another alternative embodiment, RF communication is accomplished over a satellite connection, such as, e.g., a low earth orbit (LEO) satellite connection or a high earth orbit satellite. Taking the example of an LEO satellite connection, WAP 290*d* and RF transceiver subscriber antenna 292*d* function as satellite gateways, with the additional functionalities described in the present invention.

As would be apparent to those skilled in the art, although the present invention has been described in the context of a point-to-multi-point network, the invention is equally applicable to a point-to-point network environment.

Figure 3A:
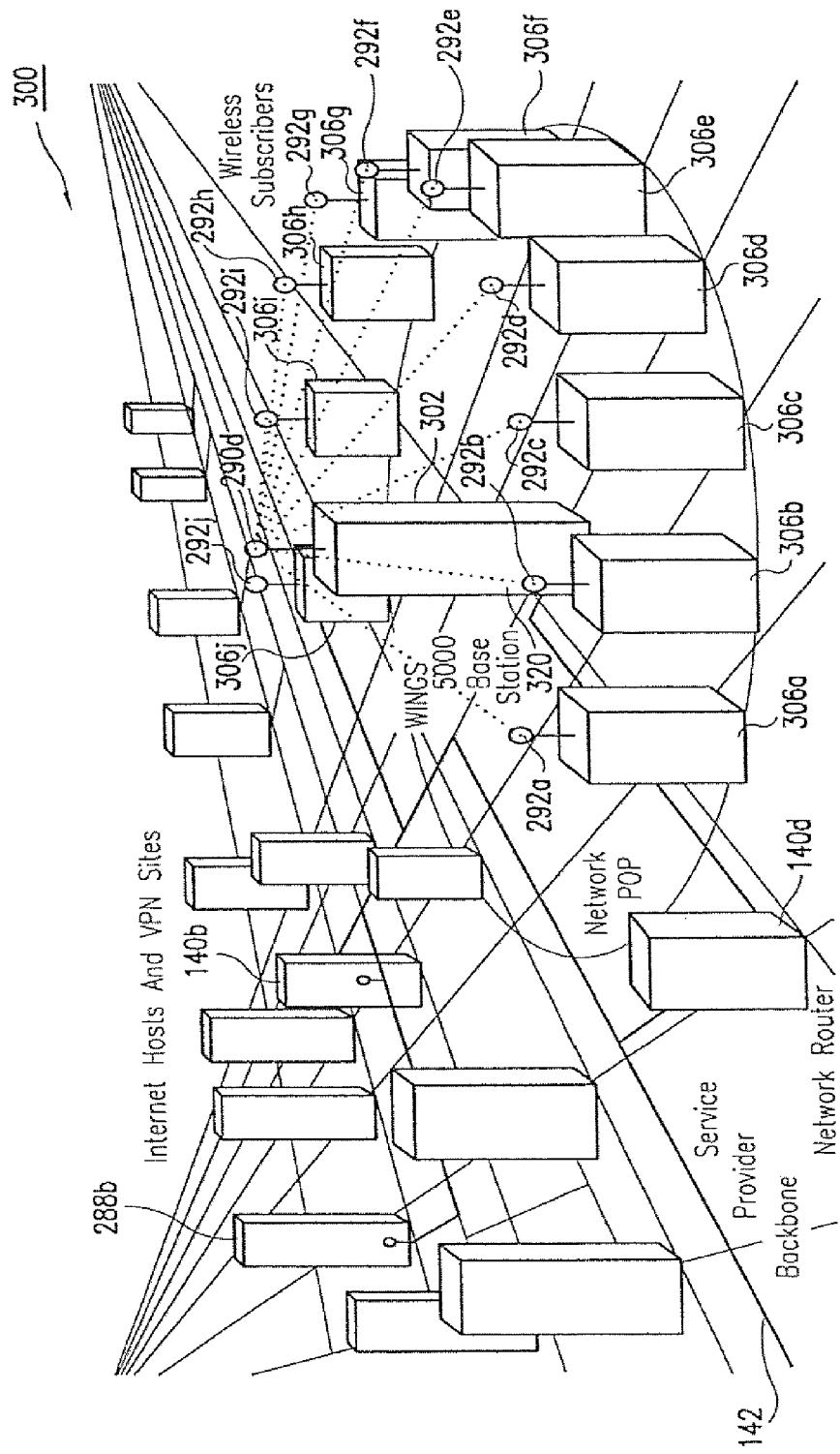
FIG. 3A depicts an exemplary perspective diagram of a point-to-multipoint network.

Referring to FIG. 3A, in an embodiment of the invention, WAPs 290*d* and 290*e* can be coupled to a wireless base station 302 where "IP flow" traffic can be queued, analyzed, characterized, classified, prioritized and scheduled, as described more fully below with reference to the ensuing figures.

Figure 3B:
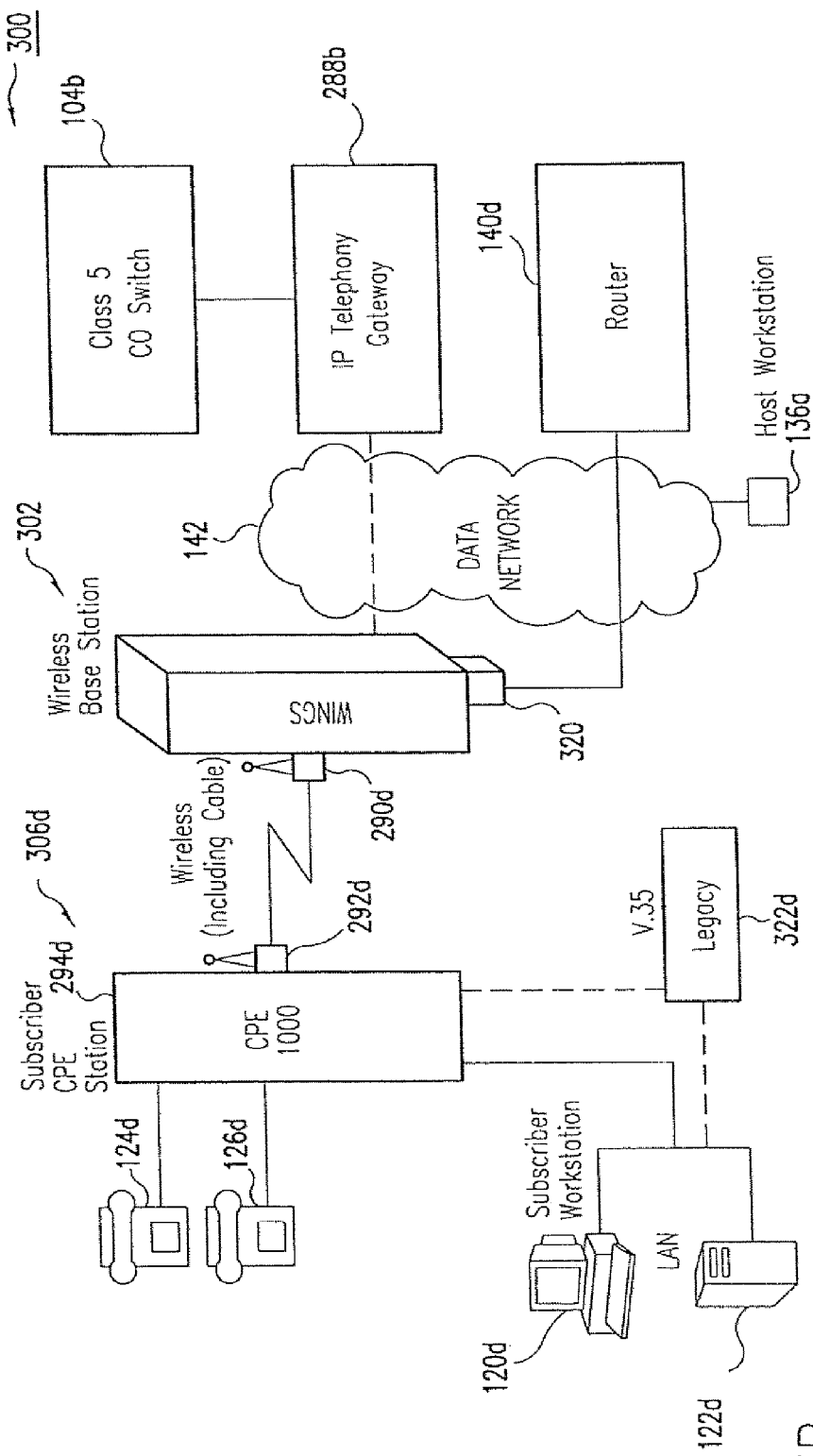
FIG. 3B depicts a block diagram further illustrating a wireless point-to-multipoint network.

Referring to FIG. 3B, one embodiment of the invention, antennae 292*d* and 292*e* are coupled to subscriber customer premise equipment (CPE) stations 294*d* and 294*e*, respectively (also referred to as CPEs 294*d*, 294*e*). Subscriber CPE stations 294*d* and 294*e* are coupled to various other CPE equipment via wireline or wireless connections. For example, CPE stations 290*d* and 290*e* can be coupled to voice calling parties 124*d*, 124*e*, 126*d* and 126*e*, fax machines 116*d* and 116*e*, video conferencing equipment including video monitors 152*d* and 152*e*, and cameras 154*d* and 154*e*, host computers including client computers 120*d* and 120*e* and servers 122*d* and 122*e*. Various legacy devices such as PBXs can be coupled to CPEs 294*d* and 294*e*. In addition, next generation technologies such as Ethernet phones available from Selsius, a subsidiary of CISCO Systems from San Jose, Calif. and other Internet appliances can be coupled via LAN connections to CPEs 294*d* and 294*e*. Other video conferencing equipment as well as H.323 compliant conferencing equipment can also be coupled to CPEs 294*d* and 294*e*.

In an embodiment of the invention, either of antennae 292*d* and 292*e* can communicate with both WAPs 290*d* and 290*e* for alternate or backup wireless communications paths.

Returning to FIG. 3A, it depicts an example perspective diagram 300 of a PtMP network of the present invention. Diagram 300 includes a wireless base station 302 shown in wireless communication with subscriber locations 306*a*, 306*b*, 306*c*, 306*d*, 306*e*, 306*f*, 306*g*, 306*h*, 306*i* and 306*j*. Specifically, wireless base station 302 communicates via wireless access point 290*d* to subscriber antennae 292*a-j* of subscriber locations 306*a-j*.

Wireless base station 302 is coupled at interface 320 to network router 140*d* by, e.g., a wireline connection. Network router 140*d* is coupled to data network 142 which includes various other network routers 140*b* for routing traffic to other nodes on data network 142 such as, e.g., telephony gateway 288*b*.

Returning to FIG. 3B, it depicts block diagram 310 further illustrating the wireless PtMP of the present invention. Diagram 310 includes wireless base station 302 coupled at interface 320 to data network 142. Also coupled to data network 142 are router 140*d* and telephony gateway 288*b* which is in turn coupled to a class 5 central office (CO) switch at EO 104*b*. IP telephony gateway 288*b* can terminate telephony traffic to PSTN facilities by, e.g., translating packets into time domain multiplexed (TDM) standard telephone signals. Wireless base station 302 is in communication with wireless CPE 294*d* at subscriber location 306*d* via antenna WAP 290*d* and 292*d*. It would be apparent to those skilled in the art that other configurations of CPE 294*d* are possible, such as, e.g., one or more host computers with no telephone devices, one or more telephones with no host computers, one or more host computers and one or more telephone devices, and one or more H.323 capable videoconferencing platforms which could include a host computer with monitor and camera.

CPE 294*d* is shown with several telephone devices 124*d* and 126*d*, e.g., analog phones, and host computers, client 120*d* and server 122*d*. Client 120*d* and server 122*d* can be coupled to CPE 294*d* via a LAN connection such as, e.g., an Ethernet LAN, or via a legacy V.35 device 322*d* providing a high speed data connection. Other Internet appliances capable of attachment to a data network can also be coupled to CPE 294*d*.

2. Networking Protocol Stack Architecture—Wireless IP Network Access Architecture (WINAAR)

Figure 4:
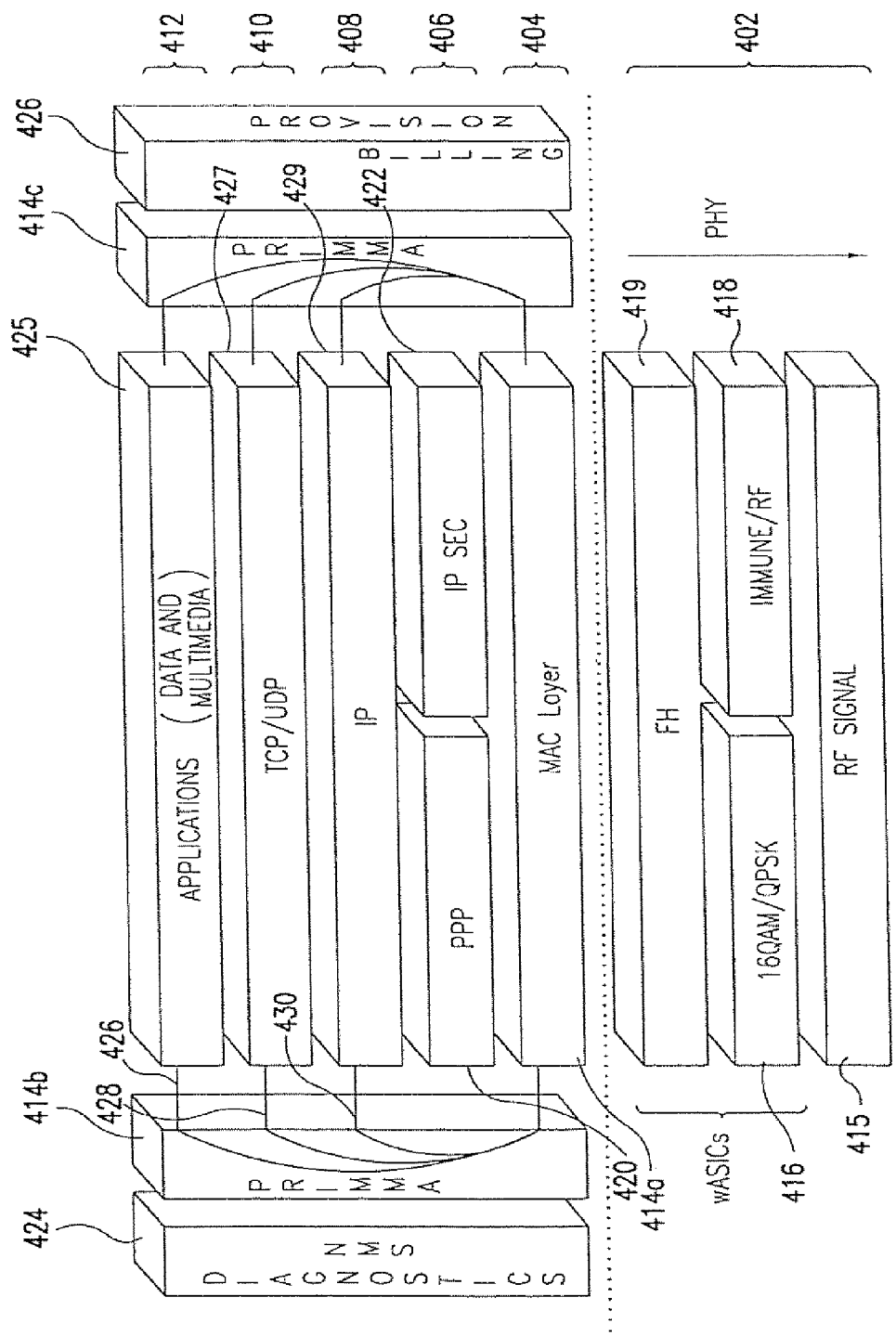
FIG. 4 depicts a wireless Internet protocol network access architecture of the present invention.

FIG. 4 depicts the wireless IP network access architecture (WINAAR) 400 of the present invention. Architecture 400 illustrates the networking protocol stack which is a version of a TCP/IP protocol stack enhanced to support IP-centric, QoS over a packet switched, shared bandwidth, wireless PtMP connection. The networking protocol stack will be described in terms of the Open Systems Interconnect (OSI) 7 layer networking protocol stack standard which includes physical layer (OSI layer 1) 402, data link layer (OSI layer 2) 404, network layer (OSI layer 7) 406 and 408, transport layer (OSI layer 4) 410 and applications layer (OSI layer 7) 412.

a. Physical Layer

In an example embodiment, physical layer 402 can be implemented using several wireless application specific integrated circuits (wASICs), an off-the-shelf 16QAM/QPSK 416 ASIC; an Interference Mitigation and Multipath Negation (IMMUNE)/RF 418 algorithm ASIC for minimizing and/or eliminating harmful interference; and a frequency hopping (FH) 419 ASIC for providing dynamic and adaptive multi-channel transmission that optimizes data link integrity by changing frequency levels depending on the noise level of a given frequency. Physical layer 402 can include the radio frequency (RF) signal 415.

b. Data Link Layer

Data link layer 404 lies on top of physical layer 402. Data link layer 404 can include a media access control (MAC) layer 414 which is depicted graphically in diagram 400 as MAC layer portion 414a and proactive reservation-based intelligent multi-media access (PRIMMA) technology portions 414b and 414c. Arrows 426, 428 and 430, respectively, illustrate that MAC layer 414 can read header information from data and multimedia applications 425, TCP/UDP 427 and IP 429 layers to analyze and schedule an IP packet of an "IP flow." IP packets of the IP flow are identified by analyzing the header information to determine QoS requirements of the IP flow, so that the IP flow can be characterized, classified, presented, prioritized and scheduled.

c. Network Layer

1. Internet Protocol (IP)

Figure 7:
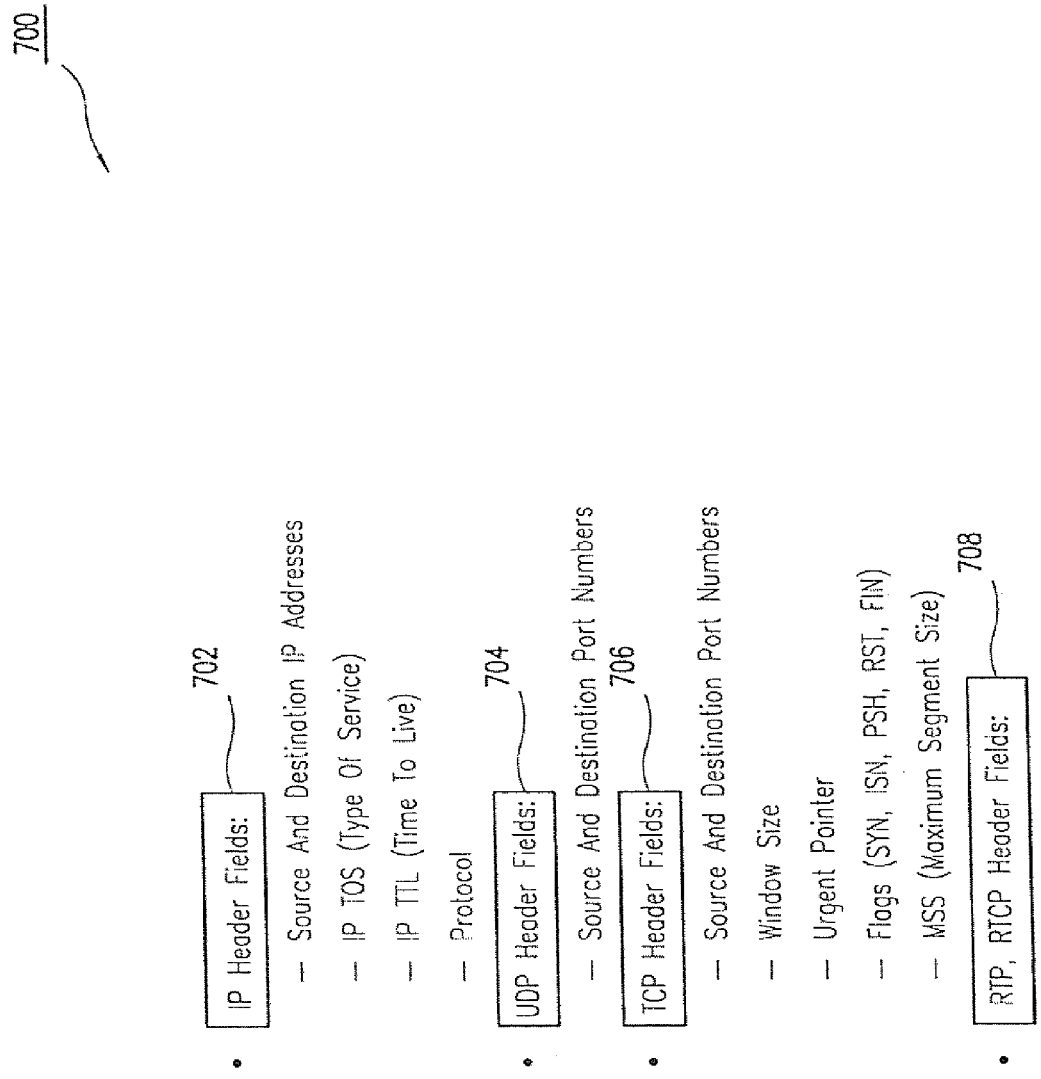
FIG. 7 illustrates packet header field information which can be used to identify Internet protocol flows and the quality of service requirements of the Internet protocol flows.

Network layer 408 is the Internet protocol (IP) 429. As will be discussed further below and as already discussed above with reference to data network 142, IP is a standard protocol for addressing packets of information. Referring now to FIG. 7, IP header fields 702 can include, e.g., source and destination IP addresses, IP type of service (TOS), IP time to live (TTL), and protocol fields. IP is a datagram protocol that is highly resilient to network failures, but does not guarantee sequence delivery. Routers send error and control messages to other routers using the Internet control message protocol (ICMP). ICMP can also provide a function in which a user can send a "ping" (echo packet) to verify reachability and round trip delay of an IP-addresse host. Another OSI layer 3 protocol is address resolution protocol (ARP) which can directly interface to the data link layer. ARP maps a physical address, e.g., an Ethernet MAC address, to an IP address.

2. Internet Protocol (IP)v4 and IPv6

IP 429 of network layer 408 can be, e.g., an IP version 4 (IPv4) or an IP version 6 (IPv6). IPv6 (sometimes called next-generation internet protocol or IPng) is a backward-compatible extension of the current version of the Internet protocol, IPv4. IPv6 is designed to solve problems brought on by the success of the Internet (such as running out of address space and router tables). IPv6 also adds needed features, including circuiting security, auto-configuration, and real-time services similar to QoS. Increased Internet usage and the allocation of many of the available IP addresses has created an urgent need for increased addressing capacity. IPv4 uses a 32-byte number to form an address, which can offer about 4 billion distinct network addresses. In comparison, IPv6 uses 128-bytes per address, which provides for a much larger number of available addresses.

3. Resource Reservation Protocol (RSVP)

IP 429 of network layer 408 can have RSVP enhancement. Developed to enhance IPv4 with QoS features, RSVP is supposed to let network managers allocate bandwidth based on the bandwidth requirements of an application. Basically, RSVP is an emerging communications protocol that is hoped to signal a router to reserve bandwidth for real-time transmission of data, video, and audio traffic.

Resource reservation protocols that operate on a per-connection basis can be used in a network to elevate the priority of a given user temporarily. RSVP runs end to end to communicate application requirements for special handling. RSVP identifies a session between a client and a server and asks the routers handling the session to give its communications a priority in accessing resources. When the session is completed, the resources reserved for the session are freed for the use of others.

RSVP unfortunately offers only two levels of priority in its signaling scheme. Packets are identified at each router hop as either low or high priority. However, in crowded networks, two-level classification may not be sufficient. In addition, packets prioritized at one router hop might be rejected at the next.

Accepted as an IETF standard in 1997, RSVP does not attempt to govern who should receive bandwidth, and questions remain about what will happen when several users all demand a large block of bandwidth at the same time. Currently, the technology outlines a first-come, first-served response to this situation. The IETF has formed a task force to consider the issue.

Because RSVP provides a special level of service, many people equate QoS with the protocol. For example, Cisco currently uses RSVP in its IPv4-based internetwork router operating system to deliver IPv6-type QoS features. However, RSVP is only a small part of the QoS picture because it is effective only as far as it is supported within a given client/server connection. Although RSVP allows an application to request latency and bandwidth, RSVP does not provide for congestion control or network-wide priority with the traffic flow management needed to integrate QoS across an enterprise. Further, RSVP does not address the particular challenges related to delivering packets over a wireless medium.

The present invention supports RSVP by providing: (1) compatibility with RFC 2205; (2) recognition and support of RSVP messages, including: Path messages, Reservation (Resv), Path teardown messages, Resv teardown messages, Path error messages, Resv error messages, and Confirmation messages; (3) recognition and support of RSVP objects, including: Null, Session, RSVP_Hop, Time_Values, Style, Flowspec, Sender_Template, Sender_Tspec, Adspec, Error_Spec, Policy_Data, Integrity, and Scope, Resv Confirm; (4) configurable translation of RSVP Flowspecs for QoS resource allocation in wireless base station 302.

The present invention provides support of DiffServ and RSVP/int-serv by providing: (1) support of RFC 2474 and 2475; (2) DiffServ in the core of Internet; (3) RSVP/int-serv for hosts and edge networks; (4) admission control capability for DiffServ compatibility; (5) differentiated services (DSs) (a field marking supported for use by DiffServ, and translation into a wireless base station 302 resource allocation); and (6) support for binding of multiple end-to-end sessions to one tunnel session.

4. Real-time Transport Protocol (RTP) and Real-time Control Protocol (RTCP)

TCP of transport layer 410 can have a RTP and RTCP enhancement. Real-time transport protocol (RTP) is an emerging protocol for the Internet championed by the audio/video transport workgroup of the IETF. Referring to FIG. 7, RTP and RTCP header fields 708 can include several sub fields of information. RTP supports real-time transmission of interactive voice and video over packet-switched networks. RTP is a thin protocol that provides content identification, packet sequencing, timing reconstruction, loss detection, and security. With RTP, data can be delivered to one or more destinations, with a limit on delay.

RTP and other Internet real-time protocols, such as the Internet stream protocol version 2 (ST2), focus on the efficiency of data transport. RTP and other Internet real-time protocols like RTCP are designed for communications sessions that are persistent and that exchange large amounts of data. RTP does not handle resource reservation or QoS control. Instead, RTP relies on resource reservation protocols such as RSVP, communicating dynamically to allocate appropriate bandwidth.

RTP adds a time stamp and a header that distinguishes whether an IP packet is data or voice, allowing prioritization of voice packets, while RSVP allows networking devices to reserve bandwidth for carrying unbroken multimedia data streams.

Real-time Control Protocol (RTCP) is a companion protocol to RTP that analyzes network conditions. RTCP operates in a multi-cast fashion to provide feedback to RTP data sources as well as all session participants. RTCP can be adopted to circumvent datagram transport of voice-over-IP in private IP networks. With RTCP, software can adjust to changing network loads by notifying applications of spikes, or variations, in network transmissions. Using RTCP network feedback, telephony software can switch compression algorithms in response to degraded connections.

5. IP Multi-Casting Protocols

IP 429 of network layer 408 can also support multi-casting protocols. Digital voice and video comprise of large quantities of data that, when broken up into packets, must be delivered in a timely fashion and in the right order to preserve the qualities of the original content. Protocol developments have been focused on providing efficient ways to send content to multiple recipients, transmission referred to as multi-casting. Multi-casting involves the broadcasting of a message from one host to many hosts in a one-to-many relationship. A network device broadcasts a message to a select group of other devices such as PCS or workstations on a LAN, WAN, or the Internet. For example, a router might send information about a routing table update to other routers in a network.

Several protocols are being implemented for IP multi-casting, including upgrades to the Internet protocol itself. For example, some of the changes in the newest version of IP, IPv6, will support different forms of addressing for uni-cast (point-to-point communications), any cast (communications with the closest member of a device group), and multi-cast. Support for IP multi-casting comes from several protocols, including the Internet group management protocol (IGMP), protocol-independent multi-cast (PIM) and distance vector multi-cast routing protocol (DVMRP). Queuing algorithms can also be used to ensure that video or other multi-cast data types arrive when they are supposed to without visible or audible distortion.

Real-time transport protocol (RTP) is currently an IETF draft, designed for end-to-end, real-time delivery of data such as video and voice. RTP works over the user datagram protocol (UDP), providing no guarantee of in-time delivery, quality of service (QoS), delivery, or order of delivery. RTP works in conjunction with a mixer and translator and supports encryption and security. The real-time control protocol (RTCP) is a part of the RTP definition that analyzes network conditions. RTCP provides mandatory monitoring of services and collects information on participants. RTP communicates with RSVP dynamically to allocate appropriate bandwidth.

Internet packets typically move on a first-come, first-serve basis. When the network becomes congested, Resource Reservation Protocol (RSVP) can enable certain types of traffic, such as video conferences, to be delivered before less time-sensitive traffic such as E-mail for potentially a premium price. RSVP could change the Internet's pricing structure by offering different QoS at different prices. Using SLAs, different QoS levels can be provided to users at CPE location stations depending on SLA subscription level.

The RSVP protocol can be used by a host, on behalf of an application, to request a specific QoS from the network for particular data streams or flows. Routers can use the RSVP protocol to deliver QoS control requests to all necessary network nodes to establish and maintain the state necessary to provide the requested service. RSVP requests can generally, although not necessarily, result in resources being reserved in each node along the data path.

RSVP is not itself a routing protocol. RSVP is designed to operate with current and future uni-cast and multi-cast routing protocols. An RSVP process consults the local routing database to obtain routes. In the multi-cast case for example, the host sends IGMP messages to join a multi-cast group and then sends RSVP messages to reserve resources along the delivery paths of that group. Routing protocols determine where packets are forwarded. RSVP is concerned with only the QoS of those packets as they are forwarded in accordance with that routing. The present invention delivers QoS-aware wireless PtMP access to users over a shared wireless bandwidth, and can take into account priority information provided within packet headers of packets in IP flows received for transmission over the wireless base station's bandwidth.

d. VPN Networks (Example Optional Protocols) at Network Layer

Also at network layer 406 are depicted example optional virtual private network (VPN) protocols point to point protocol (PPP) 420 and IPsec 422, discussed below.

A plurality of protocol standards exist today for VPNs. For example, IP security (IPsec), point-to-point tunneling protocol (PPTP), layer 2 forwarding protocol (L2F) and layer 2 tunneling protocol (L2TP). The IETF has proposed a security architecture for the Internet protocol (IP) that can be used for securing Internet-based VPNs. IPsec facilitates secure private sessions across the Internet between organizational firewalls by encrypting traffic as it enters the Internet and decrypting it at the other end, while allowing vendors to use many encryption algorithms, key lengths and key escrow techniques. The goal of IPsec is to let companies mix-and-match the best firewall, encryption, and TCP/IP protocol products.

IPsec is designed to link two LANs together via an encrypted data stream across the Internet.

1. Point-to-Point Tunneling Protocol (PPTP)

Point-to-point tunneling protocol (PPTP) provides an alternate approach to VPN security than the use of IPsec. Unlike IPsec, which is designed to link two LANs together via an encrypted data stream across the Internet, PPTP allows users to connect to a network of an organization via the Internet by a PPTP server or by an ISP that supports PPTP. PPTP was proposed as a standard to the IETF in early 1996. Firewall vendors are expected to support PPTP.

PPTP was developed by Microsoft along with 3Com, Ascend and US Robotics and is currently implemented in WINDOWS NT SERVER 4.0, WINDOWS NT WORK- STATION 4.0, WINDOWS 95 via an upgrade and WINDOWS 98, available from Microsoft Corporation of Redmond, Wash.

The "tunneling" in PPTP refers to encapsulating a message so that the message can be encrypted and then transmitted over the Internet. PPTP, by creating a tunnel between the server and the client, can tie up processing resources.

2. Layer 2 Forwarding (L2F) Protocol

Developed by Cisco, layer 2 forwarding protocol (L2F) resembles PPTP in that it also encapsulates other protocols inside a TCP/IP packet for transport across the Internet, or any other TCP/IP network, such as data network 112. Unlike PPTP, L2F requires a special L2F-compliant router (which can require changes to a LAN or WAN infrastructure), runs at a lower level of the network protocol stack and does not require TCP/IP routing to function. L2F also provides additional security for user names and passwords beyond that found in PPTP.

3. Layer 2 Tunneling Protocol (L2TP)

The layer 2 tunneling protocol (L2TP) combines specifications from L2F with PPTP. In November 1997, the IETF approved the L2TP standard. Cisco is putting L2TP into its Internet operating system software and Microsoft is incorporating it into WINDOWS NT 5.0. A key advantage of L2TP over IPsec, which covers only TCP/IP communications, is that L2TP can carry multiple protocols. L2TP also offers transmission capability over non-IP networks. L2TP however ignores data encryption, an important security feature for network administrators to employ VPNs with confidence.

4. IPsec

IP flows using the security encryption features of IPsec 422 are supported by the present invention. The integration of IPsec 422 flows of WINAAR architecture 400 are described below in the downlink and uplink directions with reference to FIGS. 17A and 17B, respectively. Wireless base station 302 supports prioritization of IPsec encrypted streams by placing the firewall at the wireless base station and unencrypting the datastream and packet header information prior to identification analysis. Through the wireless transmission medium, the frame stream already includes encryption of the frame data and implements frequency hopping.

IPsec provides for secure data transmission for, e.g., VPNs and eCommerce security. IPsec is compatible with RFC 2401-2407. IPsec is supported with IPv4 and IPv6, and also IPsec tunnel mode. Wireless base station 302 security protocol support includes authentication header (AH) and encapsulating security payload (ESP). Wireless base station 302 supports IPsec authentication (MD5), encryption algorithms, and automatic key management (IKE and ISAKMP/Oakley). Wireless base station 302 provides for a choice of transport mode or tunnel mode and selectable granularity of security service, such as, e.g., providing a single encrypted tunnel for all traffic between two hosts, or providing separate encrypted tunnel for each TCP connection between hosts.

e. Transport Layer

1. Transmission Control Protocol/Internet Protocol (TCP/IP) and User Datagram Protocol/Internet Protocol (UDP/IP)

As already discussed, internet protocol (IP) has become the primary networking protocol used today. This success is largely a part of the Internet, which is based on the transmission control protocol/internet protocol (TCP/IP) family of protocols. TCP/IP is the most common method of connecting PCs, workstations, and servers. TCP/IP is included as part of many software products, including desktop operating systems (e.g., Microsoft's Windows 95 or Windows NT) and LAN operating systems.

The most pervasive LAN protocol to date, has been IPX/SPX from Novell's NetWare network operating system (NOS). However, IPX/SPX is losing ground to TCP/IP. Novell now incorporates native IP support into NetWare, ending NetWare's need to encapsulate IPX packets when carrying them over TCP/IP connections. Both UNIX and Windows NT servers can use TCP/IP. Banyan's VINES, IBM's OS/2 and other LAN server operating systems can also use TCP/IP.

Transport layer four 410 can include transmission control protocol (TCP) or user datagram protocol (UDP) 427 part of the standard TCP/UDP/IP protocol family suite of networking protocols. As will be discussed further below and as already mentioned briely above with reference to data network 142, TCP is a standard protocol for segmenting traffic into packets, transmitting, reassembling and retransmitting packets of information between a source and destination IP address. Referring now to FIG. 7, TCP header fields 706 can include, e.g., source and destination port numbers, window size, urgent pointer, flags (SYN, ISN, PSH, RST, FIN), and maximum segment size (MSS). Both TCP and UDP provide a capability for the TCP/IP host to distinguish among multiple applications through port numbers. TCP can provide for a reliable, sequenced delivery of data to applications. TCP can also provide adaptive flow control, segmentation, and reassembly, and prioritization of data flows. UDP only provides unacknowledged datagram capability. The recently defined real time protocol (RTP), RFC 1889, can provide real time capabilities in support of multimedia applications, for example.

TCP uses a window-based flow control. Each TCP source has a dynamically changing transmit window that determines how many packets it can transmit during each successive round-trip time (RTT). The TCP source can continue increasing its transmit window if no packets were lost within the last RTT. Once congestion is detected, the source TCP throttles back its transmission, i.e. it "backs-off," via a multiplicative decrease. An increasing width of the so-called TCP window versus time corresponds to increasingly longer bursts of packets. TCP's window flow-controlled protocol exhibits this effect of increasing throughput and buffer utilization until terminated by loss, followed by a period of rapid backoff.

TCP works over IP to provide end-to-end reliable transmission of data across data network 142. TCP controls the amount of unacknowledged data in transit by dynamically reducing either window size or segment size. The reverse is also true in that increased window or segment size values achieve higher throughput if all intervening network elements have low error rates, support the larger packets, and have sufficient buffering to support larger window sizes.

f. Application Layer

Applications layer seven 412 can include applications 426 such as, e.g., over TCP, hypertext transport protocol (HTTP), file transfer protocol (FTP), TELNET remote terminal login, and simple simple mail transfer protocol (SMTP); and over UDP, simple network management protocol (SNMP), RPC, NFS, and TFTP. Other applications can also run over the network stack such as, e.g., a world wide web browser such as NETSCAPE NAVIGATOR available from AOL of Reston, Va., a spreadsheet application program such as LOTUS 123 available from IBM of Armonk, N.Y. or a video teleconferencing program such as MS NetMeeting available from MICROSOFT of Redmond, Wash. Packets transmitted from such applications could require special handling and prioritization to achieve an appropriate end-user QoS.

3. PRIMMA-System IP Flow Prioritization a. Scheduling of Mixed IP Flows

Figure 6:
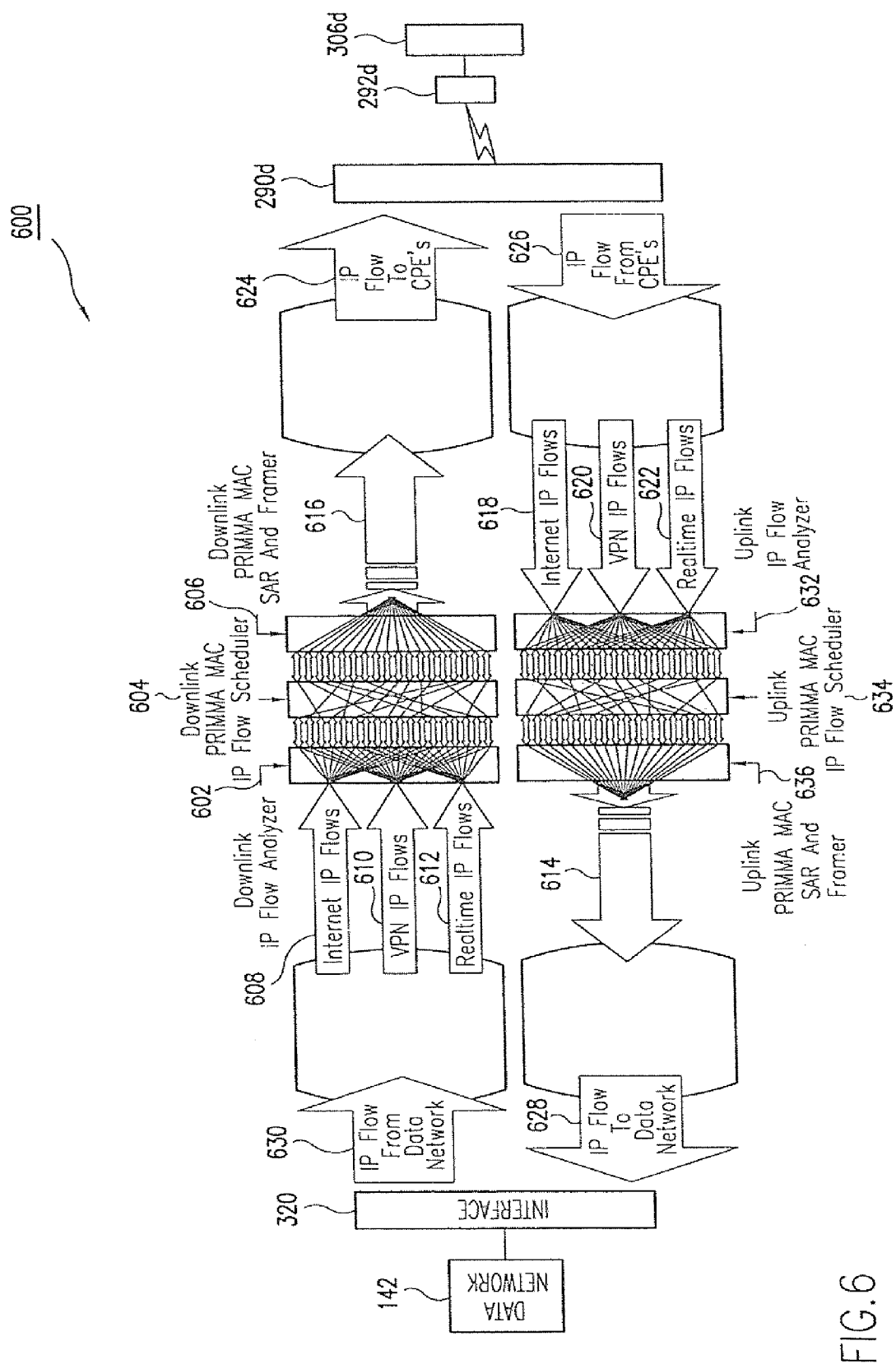
FIG. 6 illustrates a block diagram representing scheduling of mixed Internet protocol flows.

FIG. 6 illustrates block diagram 600 representing scheduling of mixed IP flows. Block diagram 600 shows the scheduling of wireless base station 302. The functionality of block diagram 600 includes PRIMMA management of Internet, VPN, and realtime IP flows. Referring back to FIG. 3A, wireless IP flows are coming from data network 142 via network router 140$d$ to interface 320 of wireless base station 302. IP flows are then scheduled for transmission from wireless base station 302 via antenna 290$d$ through subscriber location 306$d$ via antenna 292$d$.

Referring back to block diagram 600 of FIG. 6, illustrated therein are the downlink and uplink flows between interface 320 and wireless base station antenna 290$d$. An IP flow, as described herein, refers to a series of related packets of data transmitted from a source to a destination post computer. IP flow 630 from data network 142 (over interface 320) comprises Internet IP flows 608, VPN IP flows 610, and realtime IP flows 612. IP flow 630 is in the downlink direction.

Downlink IP flow analyzer 602 (hereinafter downlink flow analyzer 602) analyzes Internet IP flow 608, VPN IP flow 610 and realtime IP flow 612. IP flow analyzer 602 is described further below with reference to FIGS. 8A and 15A. IP flow analyzer 602 receives packets and analyzes packet header fields to identify new or existing IP flows. IP flow analyzer 602 can also characterize QoS requirements for the IP flow depending on packet header field contents. IP flow analyzer 602 can classify the IP flow and associate a given packet with other packets from an existing IP flow and can group together IP flows with similar QoS requirements. IP flow analyzer 602 can also present the IP flows to a flow scheduler.

Downlink PRIMMA MAC IP flow scheduler 604 (hereinafter downlink flow scheduler 604) schedules received IP flows 608, 610, and 612 for transmission in the downlink direction. Downlink flow scheduler 604 can prioritize the different classes of IP flows. For example, scheduler 604 can reserve slots in downlink frames for latency sensitive IP flows; for FTP type IP flows 608, scheduler 604 can allocate large amounts of bandwidth for file transfer; and for e-mail type IP flows 608, a lower priority can be given to packets. In prioritizing allocation of wireless bandwidth frame slots, downlink flow scheduler 604 can take into account the fact that an IP flow 630 is a VPN IP flow 610 from a virtual private network (VPN), such as, e.g., a remote branch office tieing into a corporate network. All traffic from a VPN can be given a higher priority or specific types of VPN traffic can request particular service levels. Downlink flow scheduler 604 can prioritize realtime IP flows 612 such that their arrival at CPEs 294 at CPE subscriber locations 306 will occur as required.

Downlink PRIMMA MAC segmentation and resequencing (SAR) and framer 606 (hereinafter downlink SAR and framer 606) segments and frames the data packets of received IP flows into frames for transmission over the wireless medium to CPEs 294 at CPE subscriber locations 306. For example IP flow 616, 624 can be transmitted to CPE 294$d$ at CPE subscriber location 306$d$, via base station antenna 290$d$ over a wireless medium to subscriber antenna 292$d$ and CPE 294$d$ at CPE subscriber location 306$d$. In the present invention, the term wireless medium is used to broadly encompass not only propagation of RF transmissions over cellular communications, but also RF transmissions over satellite communications and cable (e.g., coaxial cable) communications.

In the uplink direction, IP flow 626 from CPE 294$d$ at CPE subscriber station 306$d$ is received at wireless base station antenna 290$d$. IP flow 626 can include Internet IP flow 618, VPN IP flow 620 and realtime IP flow 622. Uplink IP flow analyzer 632 (hereinafter uplink flow analyzer 632) analyzes Internet IP flow 618, VPN IP flow 620 and realtime IP flow 622. Uplink flow analyzer 632 is described further below with reference to FIGS. 8B and 15B. In one embodiment, the functionality of IP flow analyzer 632 occurs at the CPE 294$d$ at subscriber CPE location 306$d$ and sends a request to transmit data up to wireless base station 302, including information about an IP flow for which CPE 294$d$ would like to schedule an uplink slot.

Uplink PRIMMA MAC IP flow scheduler 634 (hereinafter uplink flow scheduler 634) can schedule the requested IP flow. In one embodiment, the functionality of scheduler 634 can be performed at CPE 294$d$ at subscriber CPE location 306$d$. In another embodiment, the functionality of scheduler 634 can be performed at the wireless base station 302. An advantage of placing uplink flow scheduler 634 at the wireless base station is that this provides efficiencies particularly in a point-to-multi-point architecture. It is more efficient to have one centralized scheduler at the base station 302 rather than to place multiple uplink flow schedulers 634 at CPEs 294 of subscriber CPE locations 306.

Uplink PRIMMA MAC segmentation and resequencing (SAR) and framer 636 (hereinafter SAR and framer 636) can segment and frame the data packets of IP flows into frames for transmission over the wireless medium from CPE 294 at CPE subscriber locations 306 to wireless base station 302 for further transmission over data network 142. IP flow 626 from CPE 294$d$ at CPE subscriber location 306$d$ can be transmitted to base station antenna 290$d$ over a wireless medium such as, e.g., RF communication, cable modem and satellite communication, from subscriber antenna 292$d$ coupled to CPE 294$d$ at CPE subscriber location 306$d$.

b. Summary of Downlink and Uplink SubFrame Prioritization

Figure 8B:
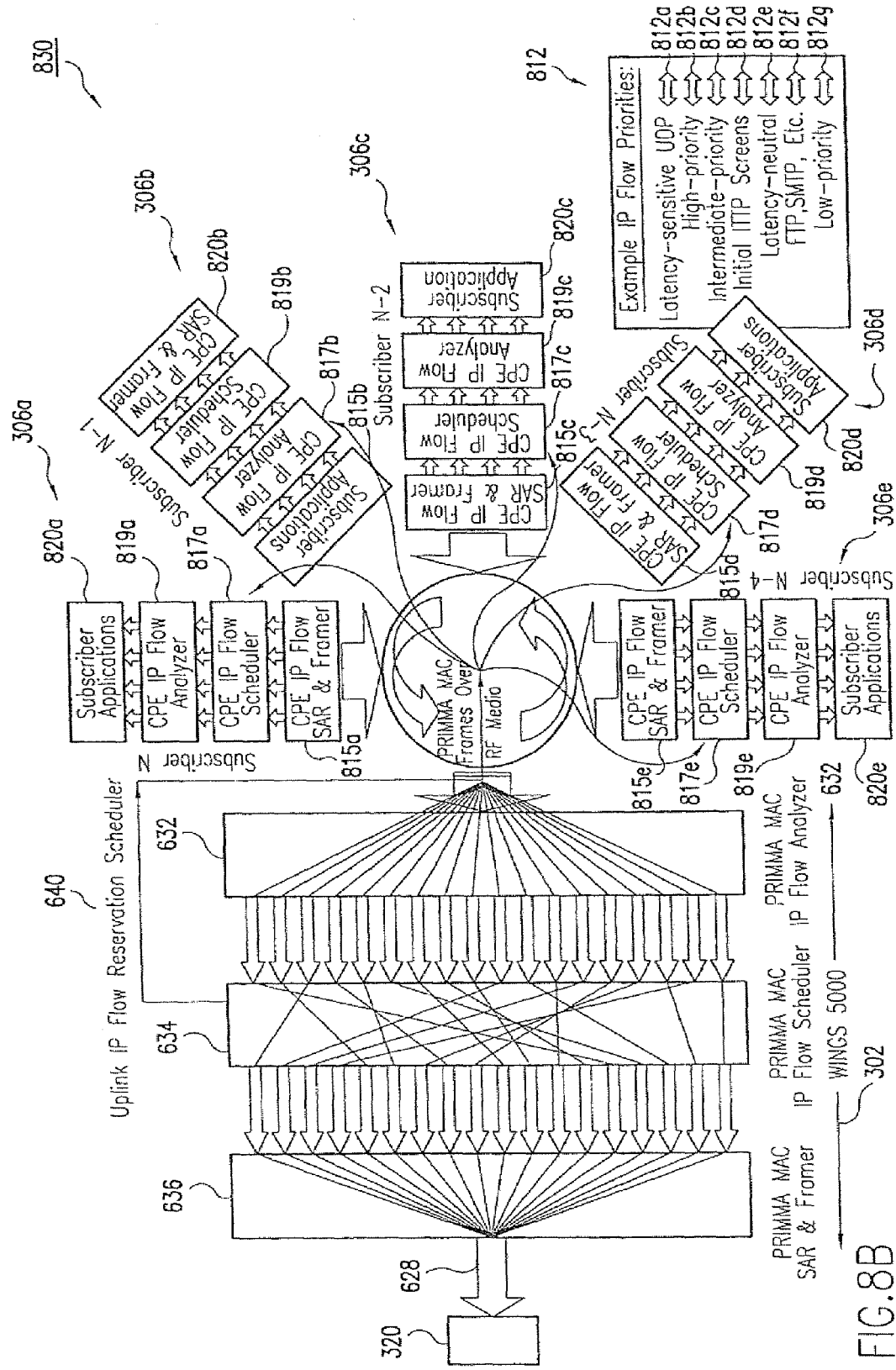
FIG. 8B is a block diagram summarizing an exemplary uplink analysis prioritization and scheduling function.

Block diagram 800 of FIG. 8A summarizes an exemplary downlink analysis, prioritization and scheduling function. Similarly, block diagram 830 of FIG. 8B summarizes an exemplary uplink analysis prioritization and scheduling function. Block diagram 800 and 830 are more detailed views of the function of block diagram 600 of FIG. 6.

Beginning with block diagram 800 (of FIG. 8A), it depicts how IP flow prioritization and scheduling of a shared wireless bandwidth is performed in the downlink path, from data network 142—to router 140$d$—to interface 320—to wireless base station 302—WAP 290$d$—over a wireless medium—to wireless transceiver subscriber antenna 292$d$—to subscriber CPE station 294$d$ at subscriber CPE location 306$d$.

IP flow analyzer 602 performs the function of identifying, characterizing, classifying, and presenting data packets to a downlink frame scheduler. The functions of identifying, characterizing, classifying and presenting the data packets are described with respect to FIG. 15A.

During identification, it is determined whether a data packet of an incoming IP data flow is known to the system, i.e. is an "existing IP flow", or rather is the first data packet of a new IP data flow, based on fields in a packet header section. Identification can also include, e.g., determining the source of the packet in order to extrapolate the type of information in the packet payload.

During characterization, a new data packet (of a new IP data flow) previously unknown to the system is characterized based on the packet header information to determine the QoS requirements for the IP data flow, and to identify the subscriber CPE station that will receive the IP data flow.

During classification, the new IP data flow is classified into a communications priority class. Classification can also include grouping together packets from different IP flows having similar characteristics into a single class. Example class groupings of IP flows 630 are illustrated as IP classes 810a-810g.

During presentation, the new IP data flow is initialized and presented to a downlink flow scheduler 604.

Downlink flow scheduler places the data packets of an IP data flow into a class queue based on class queue priorities, and using a set of rules, schedules the data packets for transmission over a wireless medium to a subscriber CPE station 294 at subscriber CPE location 306 with an advanced reservation algorithm. The rules are determined by inputs to the downlink flow scheduler based on, e.g., a hierarchical class-based prioritization, a virtual private network (VPN) directory enabled data priority (such as, for example, directory enabled networking (DEN)), and a service level agreement priority. The advanced reservation algorithm for use in scheduling, e.g., isochronous traffic, is described with respect to FIG. 14 below.

SAR and framer 606 breaks up, sequences, and frames the data packets for wireless transmission from WAP 290d over the wireless medium to a wireless transceiver subscriber antenna 292. Illustrated in block diagram 800 are a number of subscriber applications 820a-820e running on devices such as, e.g., subscriber workstation 120d (not shown), connected to subscriber CPE stations 294a-e (not shown) located at subscriber CPE locations 306a-306e. Each subscriber CPE location 306 can house one or more subscriber CPE stations 294, and each subscriber CPE station 294 can receive and transmit one or more IP data flows to and from one or more subscriber workstations 120. In fact, each application connected to a single CPE station can receive or transmit multiple IP data flows.

Referring to subscriber CPE location 306a of FIG. 8A, a CPE SAR and framer 814a resequences the received data and transmits it through CPE flow scheduler 816a, and CPE IP flow analyzer 818a, to subscriber application 820a. CPE IP flow schedulers 816a-816e can perform the same function as downlink flow scheduler 604 for uplink traffic. Similarly, CPE IP flow analyzers 818a-818e perform the same function as downlink flow analyzer 602.

In an embodiment of the invention, in downlink mode, CPE IP flow schedulers 816a-816e and CPE IP flow analyzers 818a-818e perform no function.

Block diagram 800 illustrates the logical functions performed on the downlink path, not necessarily the physical locations of these functions.

The functions of subscriber applications 820a-820e, and CPE SAR and framers 814a-814e can be performed in the actual subscriber CPE stations 294 connected over a wireless connection to wireless base station 302.

Block diagram 800 lists an exemplary set of priorities 812 used by downlink flow scheduler 604 to place received data packets into priority class queues. Listed are the following set of example priorities: latency-sensitive UDP prority 812a, high priority 812b, intermediate priority 812c, initial hypertext transfer protocol (HTTP) screens priority 812d, latency-neutral priority 812e, file transfer protocol (FTP), simple mail transfer protocol (SMTP) and other e-mail traffic priority 812f and low priority 812g. Persons skilled in the art will recognize that many different priority classes are possible, depending upon the QoS requirements of the end-users. Latency-sensitive UDP priority data can refer to data that has the highest priority because it is sensitive to jitter (i.e., time synchronization is important) and latency (i.e., the amount of time passage between IP data flows in reverse directions). High priority 812b can refer to, e.g., premium VPN service, and a high priority SLA service. Intermediate priority 812c can refer to, e.g., a value VPN service level and an intermediate level SLA service. HTTP screens priority 812d can refer to the download of HTTP data, for example, an initial HTTP screen, which is important for making an Internet user feel as if he has a great deal of bandwidth available for his Internet session. Latency-neutral priority 812e can refer to data that is neutral to latency, such as, e.g., e-mail traffic. FTP, SMTP priority 812f data includes data that is insensitive to latency and jitter, but requires a large amount of bandwidth to be downloaded accurately because of the size of a transmission. Finally, low priority data 812g can refer to data that can be transmitted over a long period of time, as when one network device transmits its status information to another network device on a 24 hour basis.

Block diagram 830 (of FIG. 8B) depicts how IP flow analysis, prioritization and scheduling of the shared wireless bandwidth is performed in the uplink path, from subscriber CPE station 294d—to wireless transceiver subscriber antenna 292d—over the wireless medium—to WAP 290d—to wireless base station 302—to interface 320—to router 140d—to data network 140.

Block diagram 830 includes uplink flow analyzer 632, uplink flow scheduler 634 and uplink SAR and framer 636. These components are similar in function to downlink flow analyzer 602, downlink flow scheduler 604 and downlink SAR and framer 606, but instead analyze, schedule and sequence and frame data packets being transmitted from subscriber workstations 120 of subscriber CPE stations 294 (at subscriber CPE locations 306a-306e) over the wireless medium, and transmit the data packets to interface 320 for transmission to data network 142.

Illustrated in FIG. 8B are subscriber applications 820a-820e, which are the same applications shown in FIG. 8A. Also shown therein are CPE IP flow analyzers 819a-819e, CPE IP flow schedulers 817a-817e, and CPE SAR and framers 815a-815e. These components function analogously to subscriber applications 820a-820e, CPE IP flow analyzers 818a-818e, CPE IP flow schedulers 816a-816e, and CPE SAR and framers 814a-814e. However, these components function to analyze, schedule and transmit IP flows in the uplink path, from subscriber CPE stations (at subscriber CPE locations 306a-306e) to wireless base station 302 for routing to destination host workstations 136 (not shown).

As noted, multiple applications can be connected to one or more subscriber CPE stations at subscriber CPE locations 306a-306e. To prevent collisions between multiple applications contending for a fixed number of bandwidth allocations for uplink communication, in one embodiment of the present invention a reservation scheduling system is used. The bandwidth allocations for data packets are called frame slots, and are described below with respect to FIGS. 12A-12Q, 14, 16A and 16B.

Block diagram 830 illustrates the logical functions performed on the uplink path, not necessarily the physical locations of these functions.

For example, in one embodiment, the analysis function of IP flow analyzer 632 which identifies a packet for uplink, characterizes and classifies the packet, can occur in a preferred embodiment in CPE IP flow analyzers 819*a*-819*e* at the CPE subscriber stations 294*a*-294*e* (not shown) at subscriber locations 306*a*-306*e*.

Also, one embodiment, the functions of CPE IP flow schedulers 817*a*-817*f* for scheduling uplinks subframe slots can be performed in wireless base station 302 for each of the subscriber CPE stations 294 connected over the wireless connection to wireless base station 302.

In this embodiment, the scheduling function is performed at uplink flow scheduler 634 at wireless base station 302 based on classification information provided to the wireless base station 302 through an uplink IP flow reservation request from the CPE station. By placing all scheduling function at the wireless base station 302, overall system quality of service can be optimized by centralizing the control of scheduling.

In another embodiment, however, their respective functions can be performed in the actual subscriber CPE stations.

In the reservation scheduling function of this embodiment, each subscriber CPE station requests the reservation of frame slots for its uplink transmissions using a reservation request block (RRB) of the TDMA airframe, described further below with reference to FIGS. 12A-12O, before it is permitted to communicate in the uplink path with interface 320. After the reservation request, uplink flow scheduler 634 transmits, as indicated by line 640, to the requesting subscriber CPE station 294 a description of one or more slots which the CPE station 294 can use to transmit its uplink data packets from source subscriber workstations 120, over the wireless medium, which are directed toward destination host workstations 136, over data network 142.

c. Service Level Requests

Figure 9:
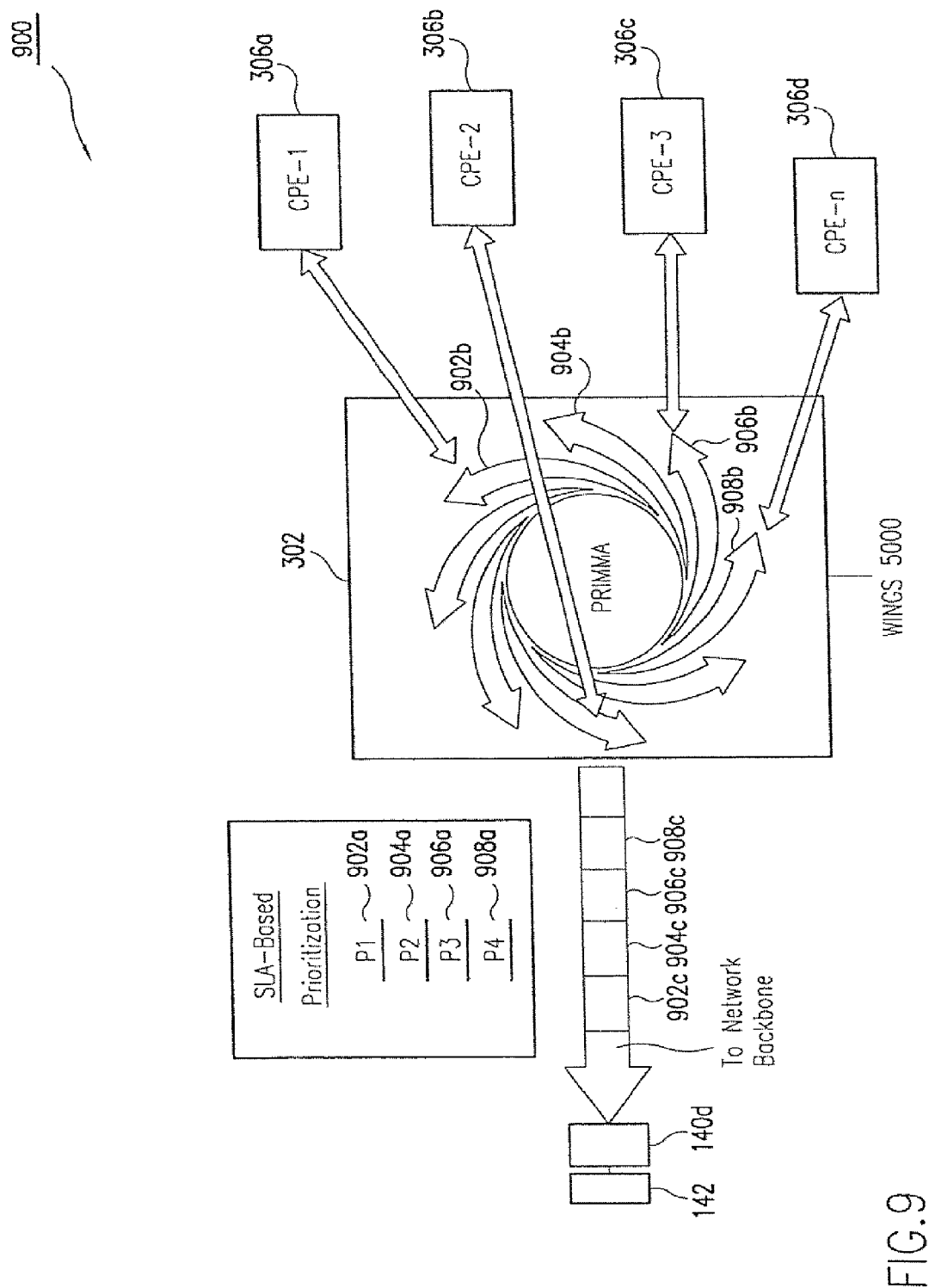
FIG. 9 illustrates how a downlink flow scheduler can take into account a service level agreement in prioritizing a frame slot and scheduling resource allocation.

FIG. 9 illustrates how PRIMMA MAC IP flow scheduler 604 can also take into account a Service Level Agreement in prioritizing frame slot scheduling and resource allocation. FIG. 9 depicts SLA-mediated IP flow management diagram 900 including prioritization of uplink traffic being transmitted to wireless base station 302 from CPE subscriber locations 306*a*, 306*b*, 306*c* and 306*d*. For example, suppose subscribers of telecommunications services have subscribed to one of four SLA levels, P1 902*a*, P2 904*a*, P3 906*a* and P4 908*a*. In the illustrated example, suppose IP flows 902*b* are being sent to a subscriber at CPE location 306*a* and have an SLA priority level of P1 902*a*. Similarly, IP flows 904*b*, 906*b* and 908*b* are being sent to subscribers at CPE locations 306*b*, 306*c* and 306*d* and have SLA priority levels of P2 904*a*, 906*a* and 908*a*, respectively. PRIMMA MAC scheduler 604, 634 of wireless base station 302 can take into account SLA-based priorities in allocating available bandwidth to the subscriber CPE IP flows 902*b*, 904*b*, 906*b* and 908*b*. In the example illustration, IP flow 902*b* can be allocated frame slot 902*c* based on SLA priority 902*a*. Frame slots 904*c*, 906*c* and 908*c* can be similarly scheduled taking into account SLA priorities. Uplinked IP flow traffic can then be transmitted on to data network 142.

SLA-based prioritization can provide a valuable means for a telecommunications provider to provide differentiated services to a variety of customers. For example, it is possible that low priority traffic from a subscriber who has purchased a premium SLA service agreement, can be scheduled at a higher priority than high priority traffic from a subscriber which has only signed up for a value level or low cost SLA service priority.

d. Identification of Headers

FIG. 7 illustrates packet header field information 700 which can be used to identify IP flows and the QoS requirements of the IP flows. Specifically, IP header fields 702 can include, e.g., source and destination IP addresses, helpful in providing application aware preferential resource allocation; IP type of service (TOS), a useful field for assisting PRIMMA MAC in classifying a packet or IP flow; IP time to live (TTL), a useful field for anticipating application packet discards; and protocol fields which can be used in identifying IP flows.

Packet header information 700 also includes UDP header fields 704. Included in UDP packet header fields 704 are source and destination port numbers.

Packet header information 700 also includes TCP header fields 706. Included in TCP packet header fields 706 are source and destination port numbers; TCP sliding window size; urgent pointer; SYN, ISN, PSH, RST and FIN flags; and maximum segment size (MSS).

Packet header information 700 also includes realtime protocol RTP and RTCP header fields 708.

It would be apparent to those skilled in the art that other packet header fields could be useful in identifying an IP flow. The fields have been given by way of example and are not intended to be an exhaustive list of useful packet header fields. Other fields, such as, e.g., fields from IP v6 relating to differentiated services (DIFF SERV) could also be useful to IP flow analyzer 602 and 632 of wireless base station 302.

e. TDMA MAC Air Frame

Figure 12A:
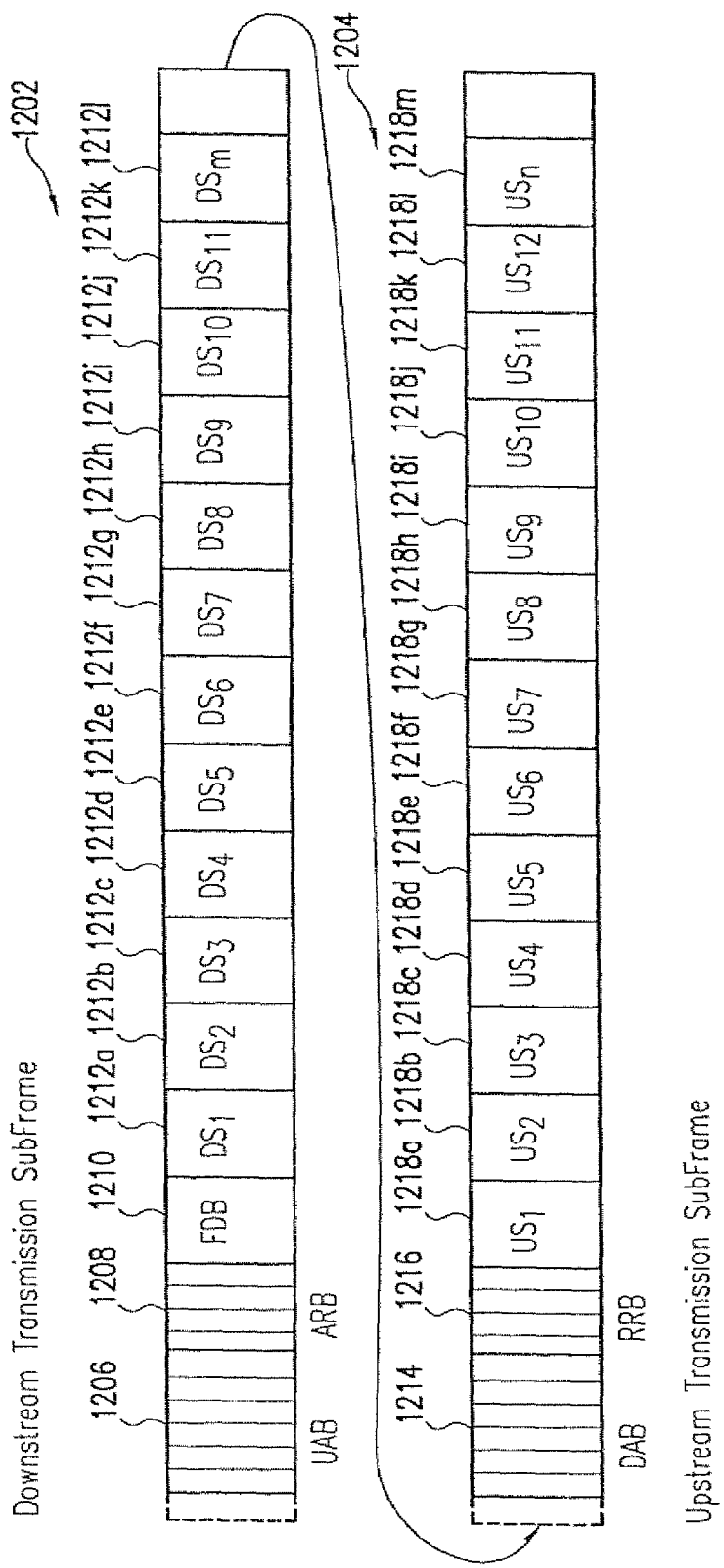
FIG. 12A illustrates an exemplary time division multiple access media access control air frame.

FIGS. 12A-12O illustrate an exemplary time domain multiple access (TDMA) media access control (MAC) transmission air frame. The fields described herein merely refer to one embodiment for the present invention, and are not limiting to the numerous implementations of the present invention.

FIG. 12A illustrates an entire TDMA MAC transmission air frame. Air frame 1202 includes downstream transmission subframe 1202 and upstream transmission subframe 1204.

The TDMA MAC air frame of FIG. 12A includes upstream acknowledgment block (UAB) 1206, acknowledgment request block (ARB) 1208, frame descriptor block (FDB) 1210, data slot (DS)$_1$ 1212*a*, DS$_2$ 1212*b*, DS$_3$ 1212*c*, DS$_4$ 1212*d*, DS$_5$ 1212*e*, DS$_6$ 1212*f*, DS$_7$ 1212*g*, DS$_8$ 1212*h*, DS$_9$ 1212*i*, DS$_{10}$ 1212*j*, DS$_{11}$ 1212*k*, DS$_m$ 1212*l*, downstream acknowledgment block (DAB) 1214, reservation request block (RRB) 1216, UA$_1$ 1218*a*, UA$_2$ 1218*b*, UA$_3$ 1218*c*, UA$_4$ 1218U, UA$_5$ 1218*e*, UA$_6$ 1218*f*, UA$_7$ 1218*g*, UA$_8$ 1218*h*, UA$_9$ 1218*i*, UA$_{10}$ 1218*j*, UA$_{11}$ 1218*k*, UA$_{12}$ 1218*l*, and UA$_n$ 1218*m*.

In the embodiment described herein, the type of TDMA used is TDMA/time division duplex (TDMA/TDD). In TDMA/TDD, for one interval of time, transmission is from a CPE station 294 to a wireless base station 302, and in another instance of time, it is from a wireless base station 302 to a CPE station 194. Any number of slots can be used for the uplink or for the downlink. The number of slots is dynamically assigned for both the uplink and the downlink. However, because the downlink data rate is usually higher than the uplink data rate, more slots are assigned to the downlink. Although distribution of slots between the downlink and uplink is dynamically assigned, the total number of slots for a frame is fixed in this embodiment.

TABLE 5

| MAC Air Frame | Slots | Block/ SubFrame | Name | Description |
|---|---|---|---|---|
| 0 | 1–8 | DAB/ Upstream | Downstream Acknowledgment Request Block | Acknowledgments from subscribers CPE stations to wireless base station of receipt of downstream slots in previous downstream subframe |
| 0 | 1–8 | RRB/ Upstream | Reservation Request Block | Requests from subscriber CPE stations for transmission reservations in later frames with dynamically adjustable number of contention slots |
| 0 | up to 16 | $US_1$–$US_{16}$/ Upstream | Upstream Slot Transmissions | Data slots in the upstream subframe, which is a variable number per frame (up to 16 in one embodiment) |
| 0 | 1–3 | ODB/ Upstream | Operations Data Block | OA&MP data from subscribers sequenced by a subscriber CPE station per frame |
| 0 | 0 | UAB/ Downstream | Upstream Acknowledgment Block | Acknowledgments from wireless base station to subscriber CPE stations of receipt of upstream slots in a previous subframe |
| 0 | 0 | ARB/ Downstream | Acknowledgment Request Block | Acknowledgments of subscriber CPE requests of having received reservation requests in a previous subframe |
| 0 | 0 | FD/ Downstream | Frame Descriptor Block for current frame | Describes the contents of the downstream transmission subframe |
| 0 | up to 16 | $DS_1$–$DS_{16}$/ Downstream | Downstream Slot Transmissions | Data slots in the downstream subframe, which is variable per frame (up to 16 in one embodiment) |
| 0 | 0 | CCB/ Downstream | Command and Control Block | OA&MP commands sequenced by subscribers per frame and frame synchronization |

Figure 12B:
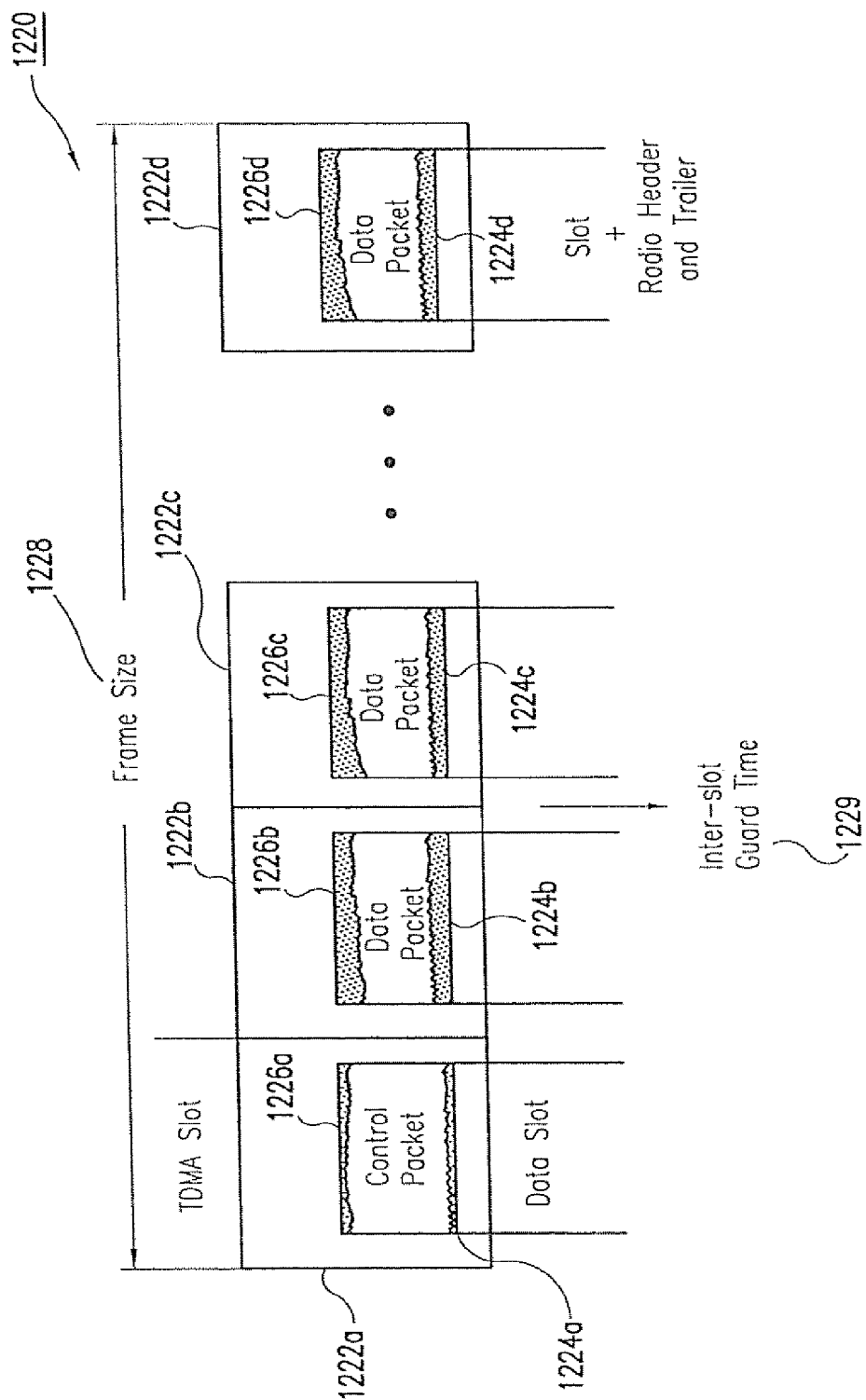
FIG. 12B illustrates an exemplary structure for a time division multiple access/time division duplex air frame.

FIG. 12B is a symbolic illustration of an exemplary TDMA/TDD air frame 1220 of the present invention. TDMA/TDD air frame structure 1220 depicts a frame of frame size 1228, which can be, e.g., 16 slots or 32 slots. It would be apparent to those skilled in the art that frame structures 1220 having other numbers of slots could be used without departing from the spirit and scope of the invention. Frame structure 1220 includes, e.g., various TDMA slots 1222a, 1222b, 1222c and 1222d. Within each TDMA slot 1222a-c, can be included a data slot 1224a, 1224b, 1224c and 1224d which in turn can contain a control packet 1226a, or a data packet 1226b-d, respectively.

In the present embodiment the sum of all TDMA slots 1222 within a frame of frame size 1228 is fixed. However, as noted, using the resource allocation methodologies of the present invention it is possible to dynamically allocate a subset of the entire number of TDMA slots 1222 to an uplink direction, where all the uplink TDMA slots are known collectively as an uplink subframe or an upstream transmission subframe 1204, and to dynamically allocate a subset of the entire number of TDMA slots 1222 to a downlink direction, where all the downlink TDMA slots are known collectively as a downlink subframe or an downlink transmission subframe 1202. Using the resource allocation method of the present invention, it is possible to allocate all TDMA slots 1222 to a given upstream or downstream direction. It is further possible to allocate all data slots 1224 to a single CPE station. The wireless base station 302 has a state machine, and knows the state of each CPE station 294 having a connection therewith (i.e., having an IP flow recognized by the wireless base station 294).

Downstream transmission subframe 1202 and upstream transmission subframe 1204 are described in detail below.

1. Downstream Transmission SubFrames

Figure 12C:
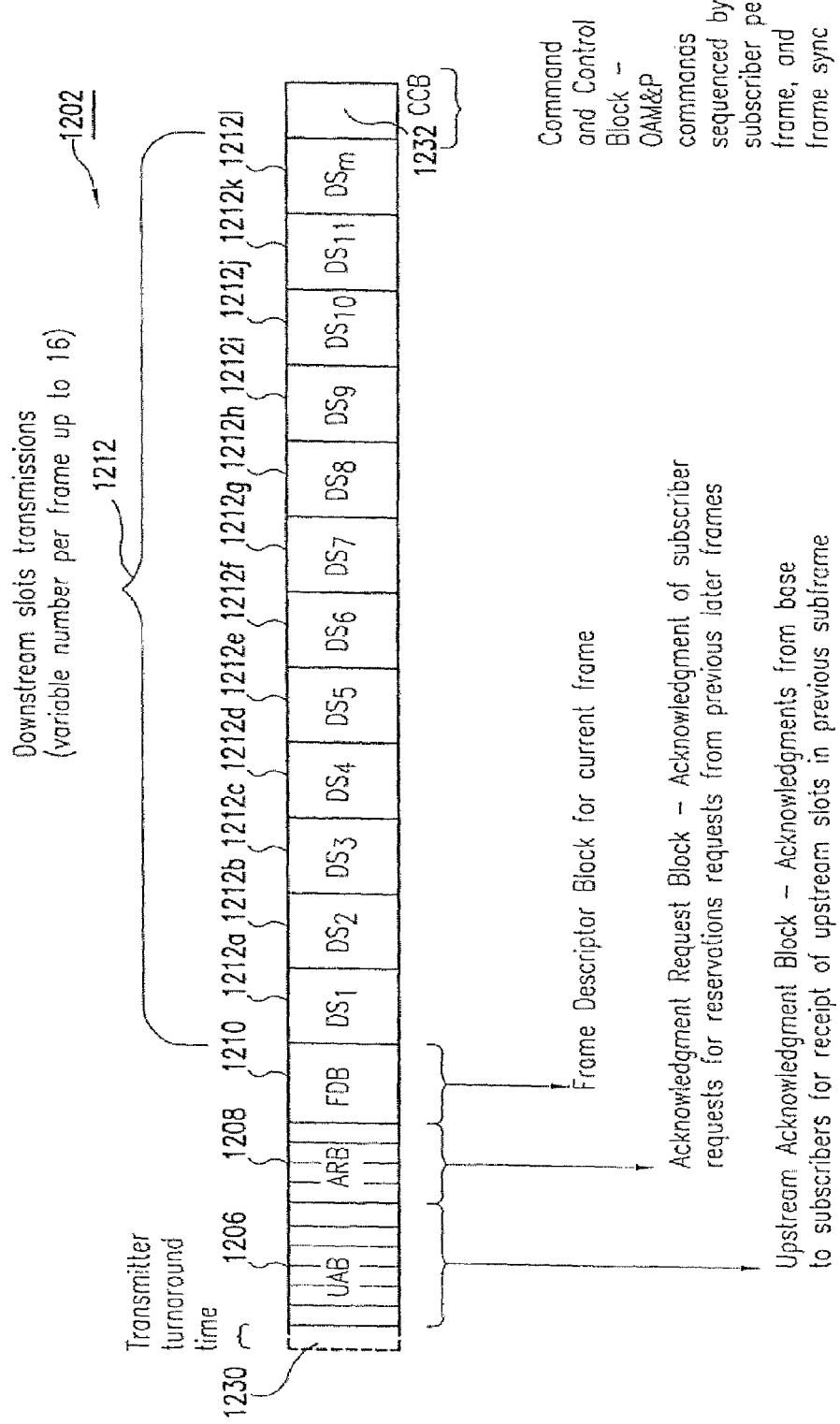
FIG. 12C illustrates an exemplary downstream transmission subframe.

FIG. 12C depicts an exemplary downstream transmission subframe 1202. The downstream transmission subframe of FIG. 12C includes transmitter turnaround time 1230, UAB 1206, ARB 1208, FDB 1210, a variable number of DSs per frame (e.g., 16) 1212, and command and control block (CCB) 1232. The DS transmissions 1212 include $DS_1$ 1212a, $DS_2$ 1212b, $DS_3$ 1212c, $DS_4$ 1212d, $DS_5$ 1212e, $DS_6$ 1212f, $DS_7$ 1212g, $DS_8$ 1212h, $DS_9$ 1212i, $DS_{10}$ 1212j, $DS_{11}$ 1212k, and $DS_m$ 1212l.

Figure 12D:
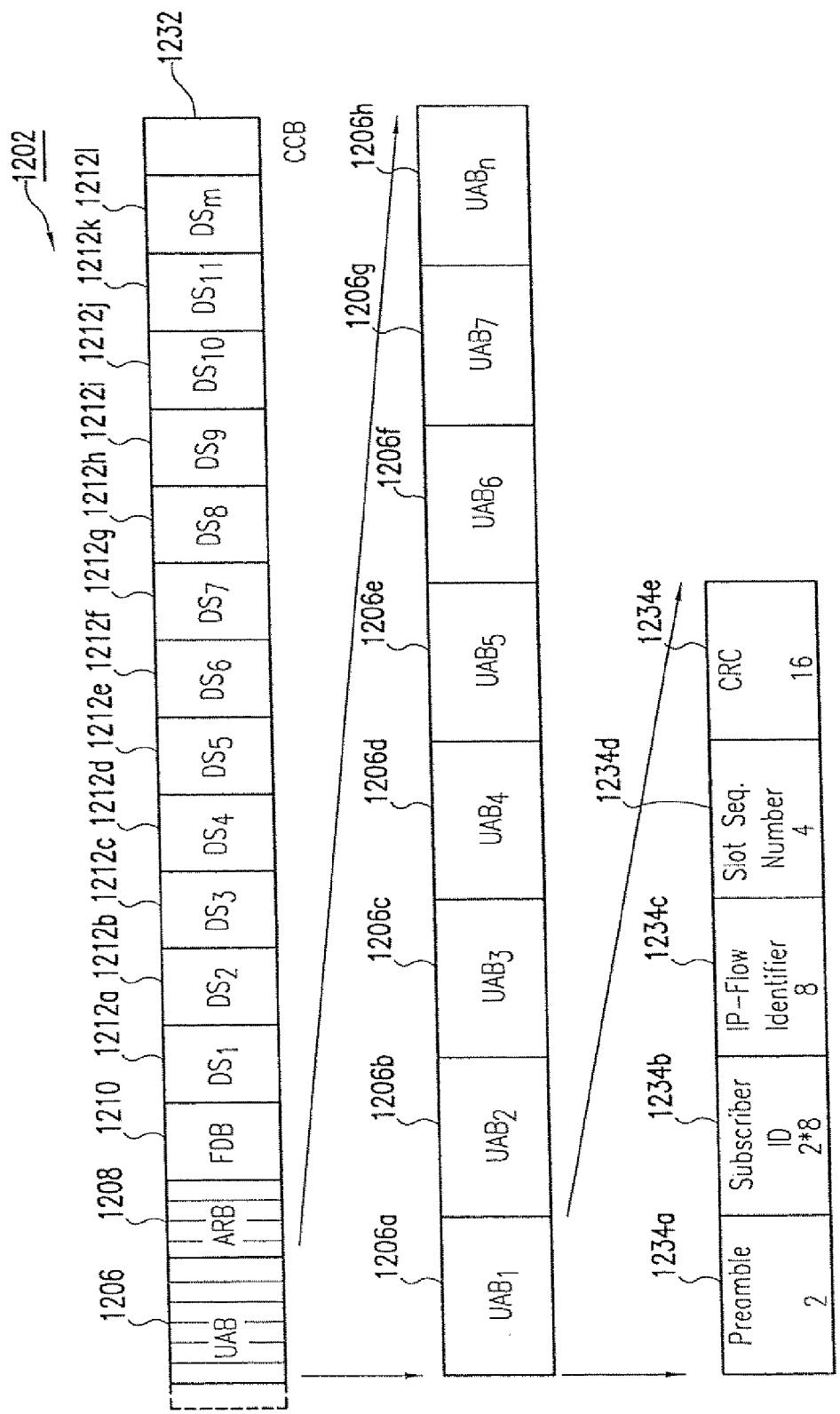
FIG. 12D illustrates an exemplary upstream acknowledgment block field of a downstream transmission subframe.

FIG. 12D depicts an exemplary UAB 1206 of a downstream transmission subframe 1202. The downstream transmission subframe of FIG. 12D includes UAB 1206, ARB 1208, FDB 1210, $DS_1$ 1212a, $DS_2$ 1212b, $DS_3$ 1212c, $DS_4$ 1212d, $DS_5$ 1212e, $DS_6$ 1212f, $DS_7$ 1212g, $DS_n$ 1212h, $DS_9$ 1212i, $DS_{10}$ 1212j, $DS_{11}$ 1212k, $DS_m$ 1212l, and CCB 1232.

UAB 1206 includes subslots $UAB_1$ 1206a, $UAB_2$ 1206b, $UAB_3$ 1206c, $UAB_4$ 1206d, $UAB_5$ 1206e, $UAB_6$ 1206f, $UAB_7$ 1206g, and $UAB_n$ 1206h. $UAB_1$ 1206a includes a preamble 1234a, subscriber ID 1234b, IP-flow identifier 1234c, slot sequence number 1234d, and cyclical redundancy check (CRC) 1234e.

The UAB field is an acknowledgment by a wireless base station 302 to a CPE station 294 that the slots (e.g., $US_1$-$US_{16}$) of an upstream transmission subframe have been received. The reader is referred to the discussion of the upstream transmission subframe below.

In subslot $UAB_1$ 1206a of ARB 1206: preamble 1234a includes data used for link integrity purposes; subscriber ID 1234b identifies which CPE station 294 is making the reservation request; IP-flow identifier 1234c identifies the IP data flow;quality of service data class 1234a identifies the priority class of the IP data flow, if known to the CPE station 294; IP-flow priority and type 1234b is an indicator of a new IP data flow; and CRC 1234e, which stands for cyclic redundancy code, provides error checking bits for subslot RRB, 1216a.

Figure 12E:
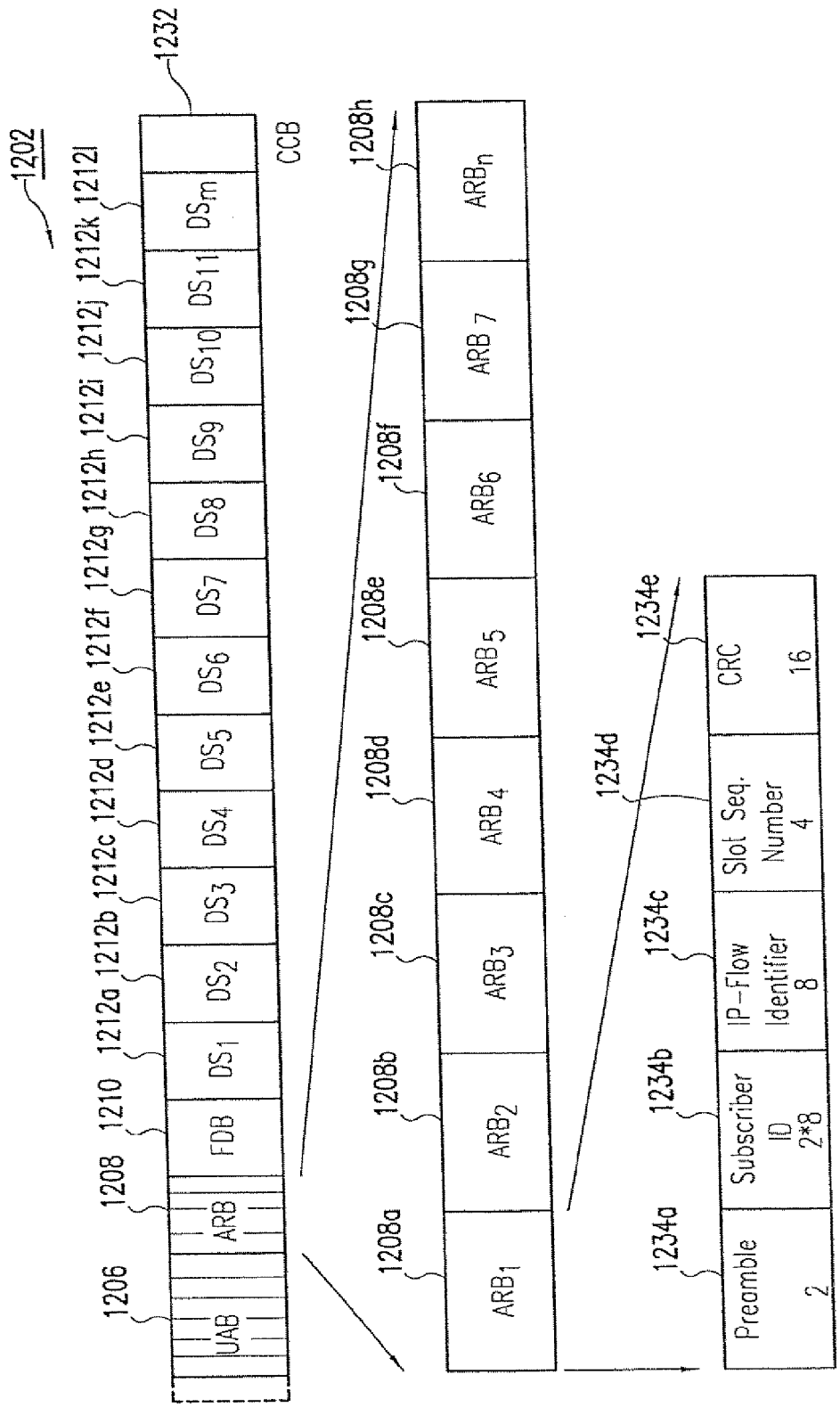
FIG. 12E illustrates an exemplary acknowledgment request block field of a downstream transmission subframe.

FIG. 12E depicts an exemplary ARB 1208 of a downstream transmission subframe 1202. The downstream transmission subframe of FIG. 12E includes UAB 1206, ARB 1208, FDB 1210, $DS_1$ 1212a, $DS_2$ 1212b, $DS_3$ 1212c, $DS_4$ 1212d, $DS_5$ 1212e, $DS_6$ 1212f, $DS_7$ 1212g, $DS_n$ 1212h, $DS_9$ 1212i, $DS_{10}$ 1212j, $DS_{11}$ 1212k, $DS_m$ 1212l, and CCB 1232.

ARB 1208 includes subslots $ARB_1$ 1208a, $ARB_2$ 1208b, $ARB_3$ 1208c, $ARB_4$ 1208d, $ARB_5$ 1208e, $ARB_6$ 1208f, $ARB_7$ 1208g, and $ARB_n$ 1208h. $ARB_1$ 1208a includes a preamble 1234a, subscriber ID 1234b, IP-flow identifier 1234c, slot sequence number 1234d, and CRC 1234e.

The ARB field is an acknowledgment by a wireless base station 302 to a CPE station 294 that the wireless base station 302 has received an upstream reservation request from the CPE station 294. The reader is referred to the discussion of the upstream transmission subframe below.

In subslot ARB, 1208a of ARB 1208: preamble 1234a includes data used for link integrity purposes; subscriber ID 1234b identifies which CPE station 294 is making the reservation request; IP-flow identifier 1234c identifies the IP data flow;quality of service data class 1234a identifies the priority class of the IP data flow, if known to the CPE station 294; IP-flow priority and type 1234b is an indicator of a new IP data flow; and CRC 1234e, which stands for cyclic redundancy code, provides error checking bits for subslot $RRB_1$ 1216a.

Figure 12F:
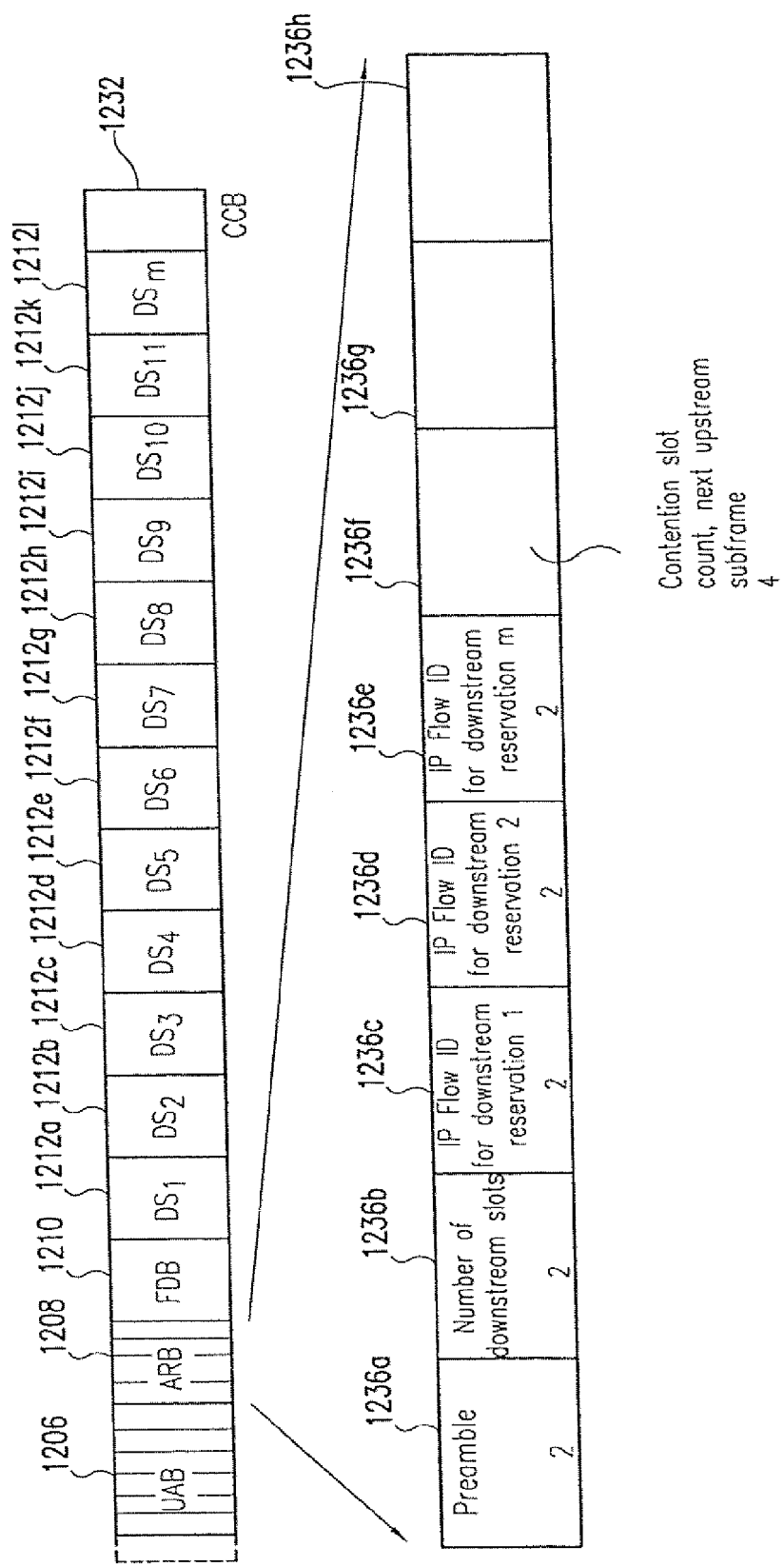
FIG. 12F illustrates an exemplary frame descriptor block field of a downstream transmission subframe.

FIG. 12F depicts an exemplary FDB 1210 of a downstream transmission subframe 1202. The downstream transmission subframe of FIG. 12F includes UAB 1206, ARB 1208, FDB 1210, $DS_1$ 1212a, $DS_2$ 1212b, $DS_3$ 1212c, $DS_4$ 1212d, $DS_5$ 1212e, $DS_6$ 1212f, $DS_7$ 1212g, $DS_n$ 1212h, $DS_9$ 1212i, $DS_{10}$ 1212j, $DS_{11}$ 1212k, $DS_m$ 1212l, and CCB 1232.

The FDB includes detailed information pertaining to the slots (e.g., $DS_2$-$DS_{16}$) of the downstream transmission subframe.

FDB 1210 includes a preamble subslot 1236a, number of downstream slots subslot, 1236b, IP-flow ID for upstream reservation 1 subslot 1236c, IP-flow ID for upstream reservation 2 subslot 1236d, IP-flow ID for upstream reservation n subslot 1236e, and contention slot count for next upstream subframe subslot 1236f.

In FDB 1210, the fields are defined as follows: preamble subslot 1236a includes data used for link integrity purposes; number of downstream slots subslot 1236b includes the number of downstream slots (DSs), IP-flow ID for downstream reservation subslot 1236c includes an IP flow identification for $DS_1$; IP-flow ID for downstream reservation subslot 1236d includes a second IP flow identification for $DS_2$; IP-flow ID for downstream reservation n subslot 1236e includes another IP flow identification for $DS_m$; contention slot count for next upstream subframe subslot 1236f provides a count for the next available upstream subframe.

Figure 12G:
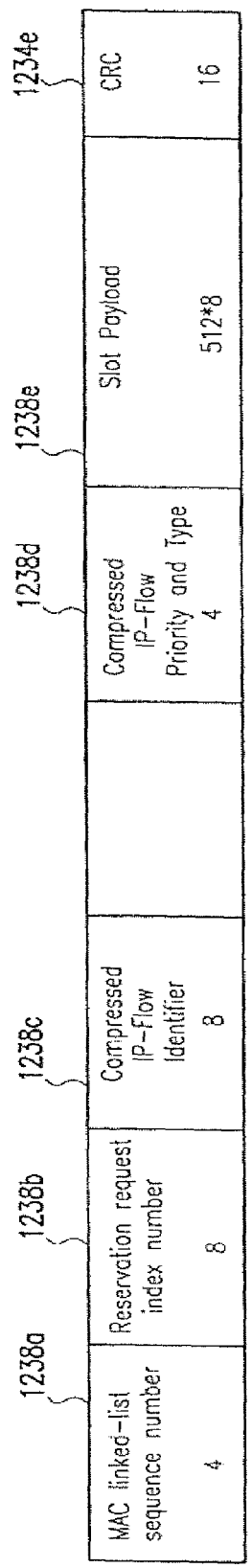
FIG. 12G illustrates an exemplary downstream media access control payload data unit of a downstream transmission subframe.

FIG. 12G depicts an exemplary downstream MAC payload data unit (PDU). The downstream MAC PDU includes information regarding the actual structure of the payload. The downstream MAC PDU of FIG. 12G includes MAC linked list sequence number 1238a (the sequence number of the MAC linked list), reservation request index number 1238b (an index to the downstream IP flow), compressed IP-flow identifier 1238c, compressed IP-flow priority and type 1238d (identifying the priority and type of a compressed IP flow), slot payload 1238e (the amount of data in a downstream data slot), and CRC 1234e (error checking information).

Figure 12H:
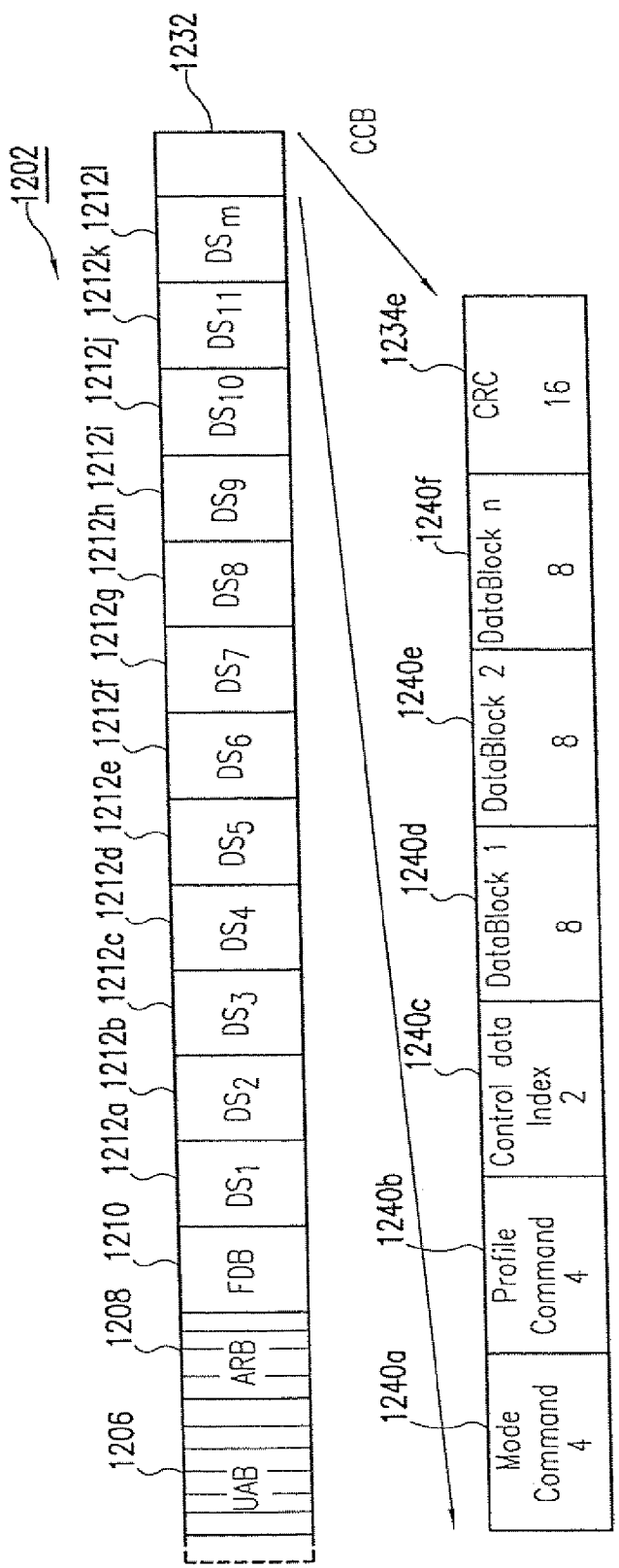
FIG. 12H illustrates an exemplary command and control block of a downstream transmission subframe.

FIG. 12H depicts an exemplary CCB of a downstream transmission subframe 1202. The CCB comprises OAM&P commands sequenced by subscriber CPE station 294 per frame and frame synchronization. CCB 1232 includes a mode command subslot 1240a (includes options of what mode the CPE station is to take), profile command subslot 1240b (includes specific system commands, such as a patch for a module), control data index subslot 1240c (including download locations and memory requirements or other information needed by the CPE stations to download data), datablock 1 subslot 1240d (includes specific system data), datablock 2 subslot 1240e (same), datablock n subslot 1240f (same), and CRC subslot 1234e (error checking information).

2. Upstream Transmission SubFrames

Figure 12I:
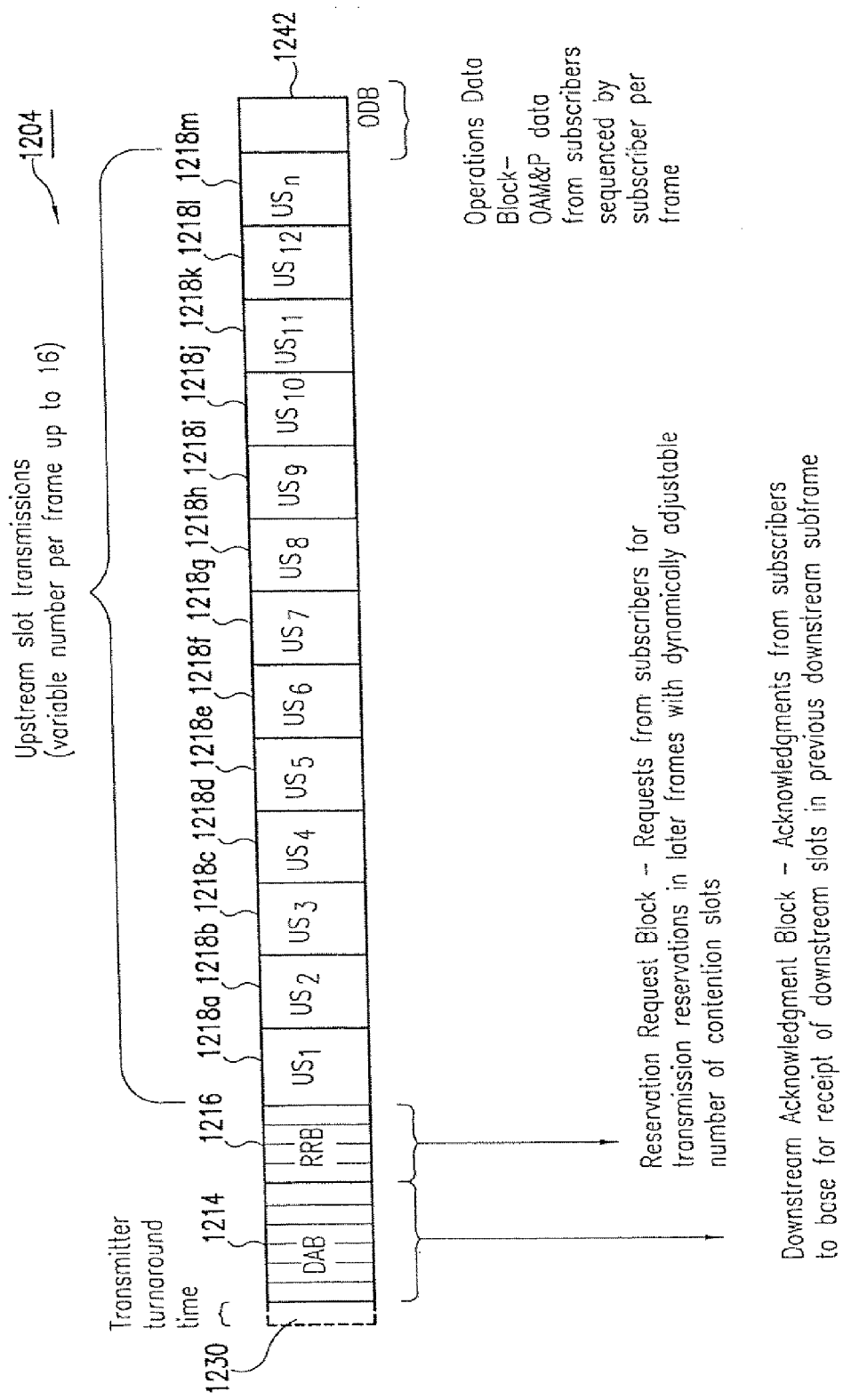
FIG. 12I illustrates an exemplary upstream transmission subframe.

FIG. 12I depicts an exemplary upstream transmission subframe 1204. The upstream transmission subframe of FIG. 12I includes transmitter turnaround time 1230, DAB 1214, RRB 1216, a variable number of USs per frame, e.g., 16, 1218, and operations data block (ODB) 1242, consisting of OAM&P data from subscribers, sequenced by subscriber per frame. The US transmissions 1218 include $US_1$ 1218a, $US_2$ 1218b, $US_3$ 1218c, $US_4$ 1218d, $US_5$ 1218e, $US_6$ 1218f, $US_7$ 1218g, $US_8$ 1218h, $US_9$ 1218i, $US_{10}$ 1218j, $US_{11}$ 1218k, $US_{12}$ 1218l, and $US_n$ 1218m.

Figure 12J:
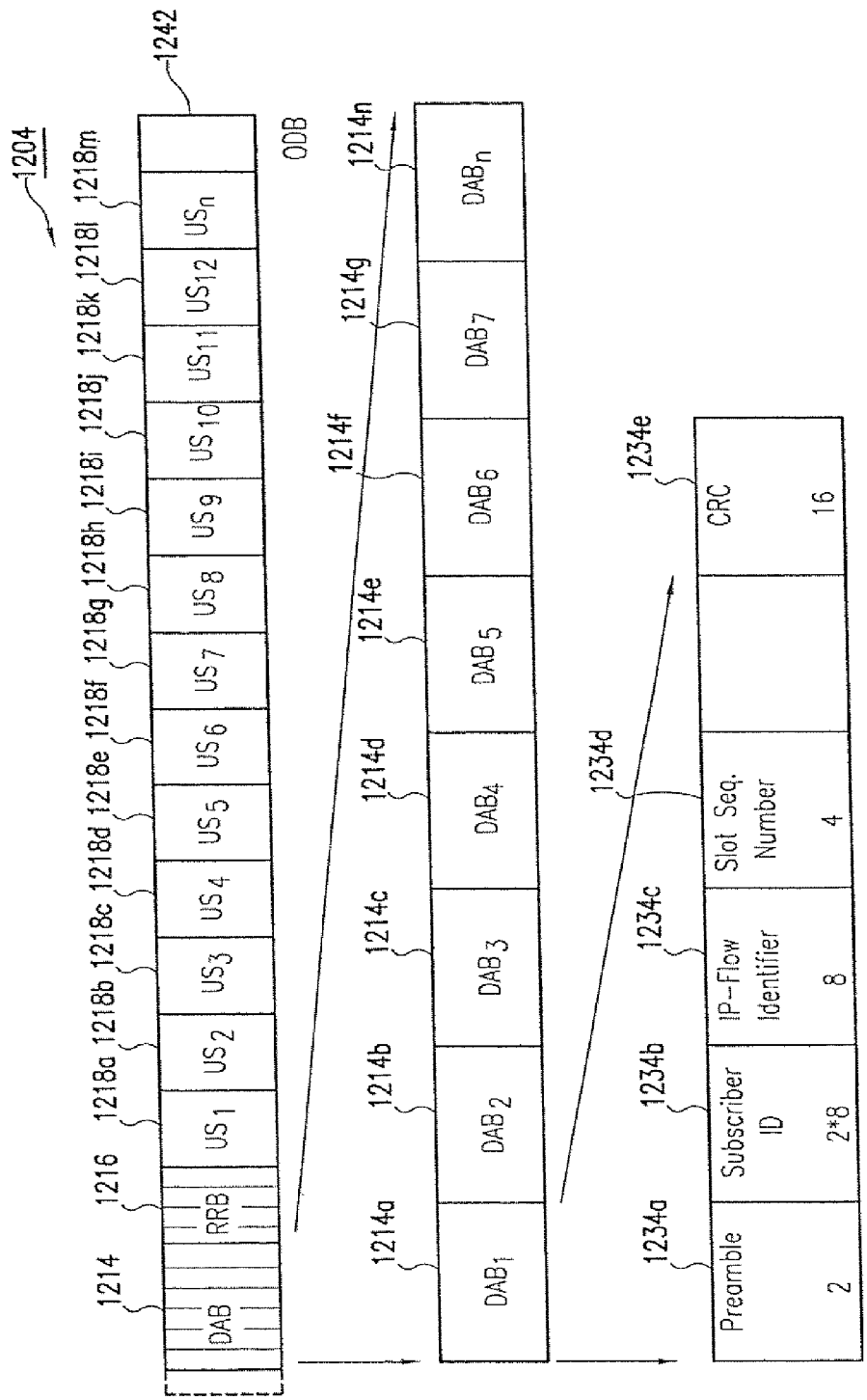
FIG. 12J illustrates an exemplary downstream acknowledgment block of an upstream transmission subframe.
Figure 12K:
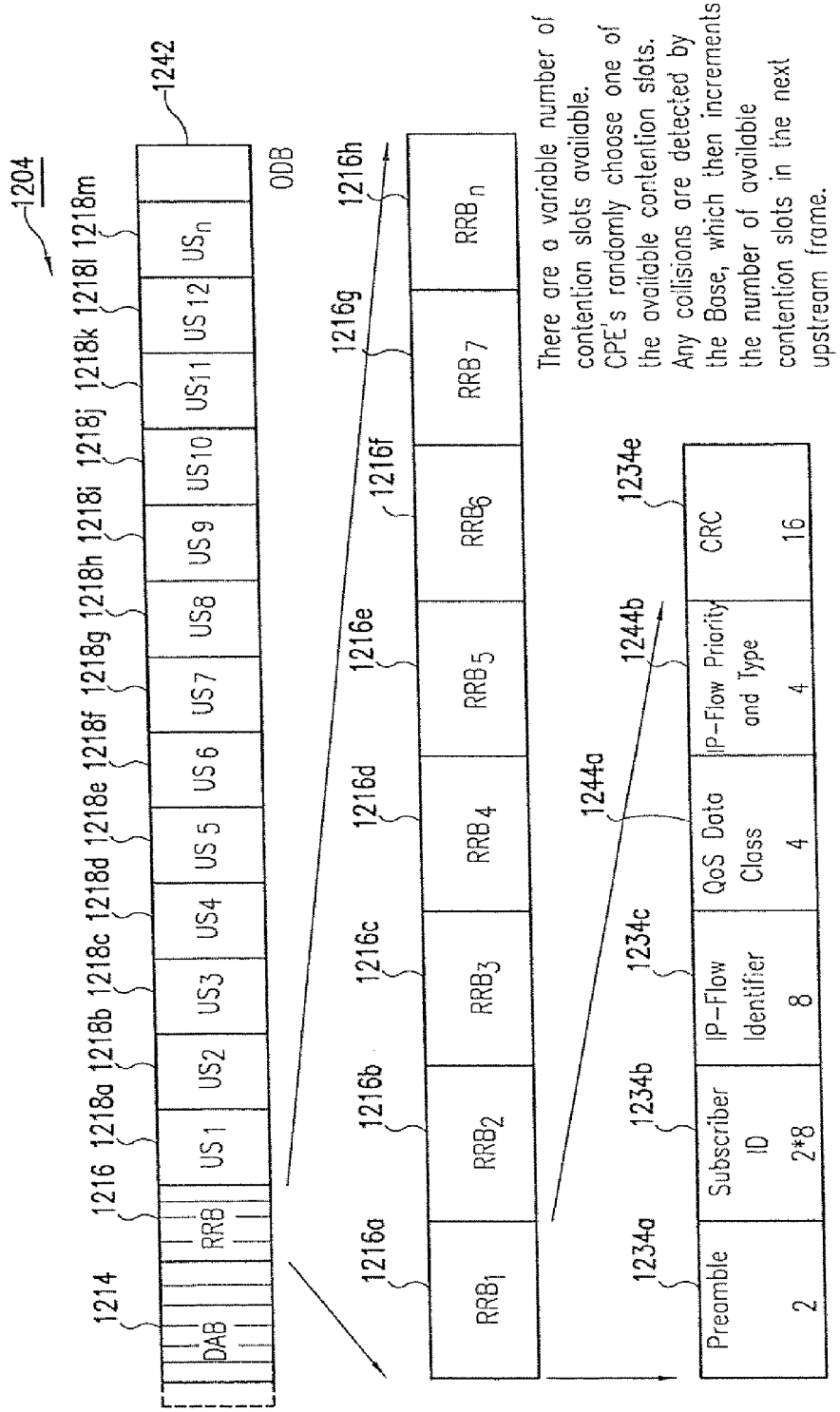
FIG. 12K illustrates an exemplary reservation request block of an upstream transmission subframe 1204.

FIG. 12K depicts an exemplary RRB 1216 of an upstream transmission subframe 1204. The upstream transmission subframe of FIG. 12K also shows DAB 1214, RRB 1216, $US_1$ 1218a, $US_2$ 1218b, $US_3$ 1218c, $US_4$ 1218d, $US_5$ 1218e, $US_6$ 1218f, $US_7$ 1218g, $US_8$ 1218h, $US_9$ 1218i, $US_{10}$ 1218j, $US_{11}$ 1218k, $US_{12}$ 1218l, $US_n$ 1218m, and ODB 1242.

RRB 1216 includes subslots $RRB_1$ 1216a, $RRB_2$ 1216b, $RRB_3$ 1216c, $RRB_4$ 1216d, $RRB_5$ 1216e, $RRB_6$ 1216f, $RRB_7$ 1216g, and $RRB_n$ 1216h. $RRB_1$ 1216a includes a preamble 1234a, subscriber ID 1234b, IP-flow identifier 1234c, quality of service data class 1244a, IP-flow priority and type 1244b, and CRC 1234e.

A CPE station 294 uses one of the subslots ($RRB_1$ 1216a, $RRB_2$ 1216b, $RRB_3$ 1216c, $RRB_4$ 1216d, $RRB_5$ 1216e, $RRB_6$ 1216f, $RRB_7$ 1216g, and $RRB_n$ 1216h) of RRB 1216 to make a reservation request, which is a request by the CPE station 294 for bandwidth in a future uplink transmission subframe. If two CPE stations 294d, 294e attempt to access the same subslot in RRB 1216, which can occur because their pseudorandom number generators select the same subslot, then a "collision" occurs and the data is not readable by wireless base station 302. The two CPE stations 294d, 294e are required to try again.

Reservation request slots can be provided on an IP flow basis. Rather than allocate a reservation request slot to every CPE subscriber station, a default number (e.g., 5) are made available as contention slots. If collisions are detected by a greater number of requesting subscribers than the number of reservation request slots, then the slots allocated can be dynamically varied to provide additional RRB slots. (Collisions are analogous to CSMA/CD collisions in Ethernet, where colliding devices on an Ethernet network attempt to retransmit over the bus architecture by retrying at a random time.)

The radio contention method of the present invention builds upon aspects of the "Slotted Aloha" method developed by L. Roberts in 1972, as a refinement of the "Aloha" method developed by N. Abramson in the early 1970's, and so-called bit-mapped reservation protocols. Like the Slotted Aloha method, the present invention provides for discrete slots for transmission of data, rather than allowing the transmission of data at any point. However, instead of transmitting the actual "payload" of data, the present invention advantageously transmits only a "reservation request" describing the actual data payload contents. Also, the number of slots for reservation requests can advantageously be dynamically altered according to the frequency of detected collisions in the recent past.

Unlike various Carrier Sense Multiple Access (CSMA) techniques previously used in wireless, both persistent and non-persistent, the present method advantageously does not require that subscriber CPE station 294d "sense" the carrier (the radio channel) before transmission. Instead, a subscriber CPE station 294d selects a "subslot" to transmit through a pseudo-random number selection, without a prior carrier sense. If a collision is detected, the subscriber CPE station 294d will try again in the next frame using the pseudo-random number process.

Instead of using a bit-map protocol for the resolution of contention, as is used in some reservation protocols, the wireless base station can explicitly grant reservation requests. The standard bit-map protocol can require that all stations can receive signals from all other stations so that the subsequent order of transmission can be implicitly determined from the resulting bit-map pattern. The present method advantageously does not require the receipt of reservation request signals from other CPE subscriber stations 294d. This is advantageous because, at higher frequencies (such as, e.g., 2 GHz to 30 GHz) where there may be line-of-sight and distance constraints, the requirement for receipt of the transmissions of other CPE subscriber stations 294d could unduly constrain the topology, locations and distances of CPE subscriber stations.

Advantageously, by allowing the wireless base station 302 to explicitly grant the requested reservation, other factors such as relative or dynamic CPE subscriber station 294d (or IP-flow) priority factors can be considered. Therefore, the present invention's reservation protocol with a dynamically adjustable number of contention subslots and explicit wireless base station reservation grants, allows a more optimal means of providing for the allocation of wireless, such as, e.g., radio, bandwidth in response to QoS requirements of IP-flows than any prior method.

As noted, $RRB_1$ 1216a includes the following fields: a preamble 1234a, subscriber ID 1234b, IP-flow identifier 1234c, quality of service data class 1244a, IP-flow priority and type 1244b, and CRC 1234e. In subslot $RRB_1$ 1216a of RRB 1216: preamble 1234a includes data used for link integrity purposes; subscriber ID 1234b identifies which CPE station 294 is making the reservation request; IP-flow identifier 1234c identifies the IP data flow; quality of service data class 1234a identifies the priority class of the IP data flow, if known to the CPE station 294; IP-flow priority and type 1234b is an indicator of a new IP data flow; and CRC 1234e, which stands for cyclic redundancy code, provides error checking bits for subslot $RRB_1$ 1216a. Optionally, an additional field can be provided in subslot $RRB_1$ 1216a which includes the number of data packets CPE station 294 will transmit in its IP data flow.

FIG. 12J depicts an exemplary DAB 1214 of an upstream transmission subframe 1204, where a CPE acknowledges receipt of a slot from base. The DAB is an acknowledgment from a subscriber CPE station 294 to the wireless base station that downstream slots have been received in a previous subframe.

The DAB 1214 includes subslots $DAB_1$ 1214a, $DAB_2$ 1214b, $DAB_3$ 1214c, $DAB_4$ 1214d, $DAB_5$ 1214e, $DAB_6$ 1214f, $DAB_7$ 1214g, and $DAB_n$ 1214h. Subslot $DAB_1$ 1214a includes a preamble 1234a, subscriber ID 1234b, IP-flow identifier 1234c, slot sequence number 1234d, and CRC 1234e. (These fields have the same information as described with respect to the RRB.)

Figure 12L:
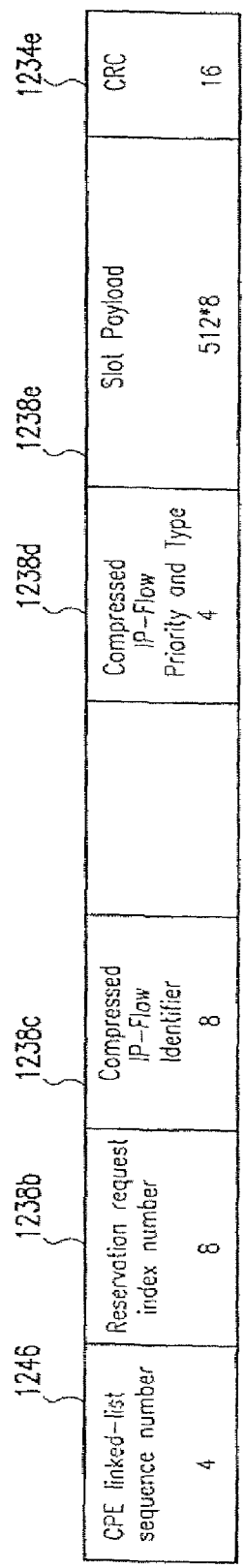
FIG. 12L illustrates an exemplary media access control payload data unit of an upstream transmission subframe.

FIG. 12L depicts an exemplary MAC PDU upstream slot. The MAC PDU upstream slot of FIG. 12L includes a CPE linked-list sequence number 1246, reservation request index number 1236b, compressed IP-flow identifier 1238c, compressed IP-flow priority and type 1238d, slot payload 1238e, and CRC 1234e. The upstream MAC PDU is similar to the downstream MAC PDU, but is used instead for upstream subframe payload information.

Figure 12M:
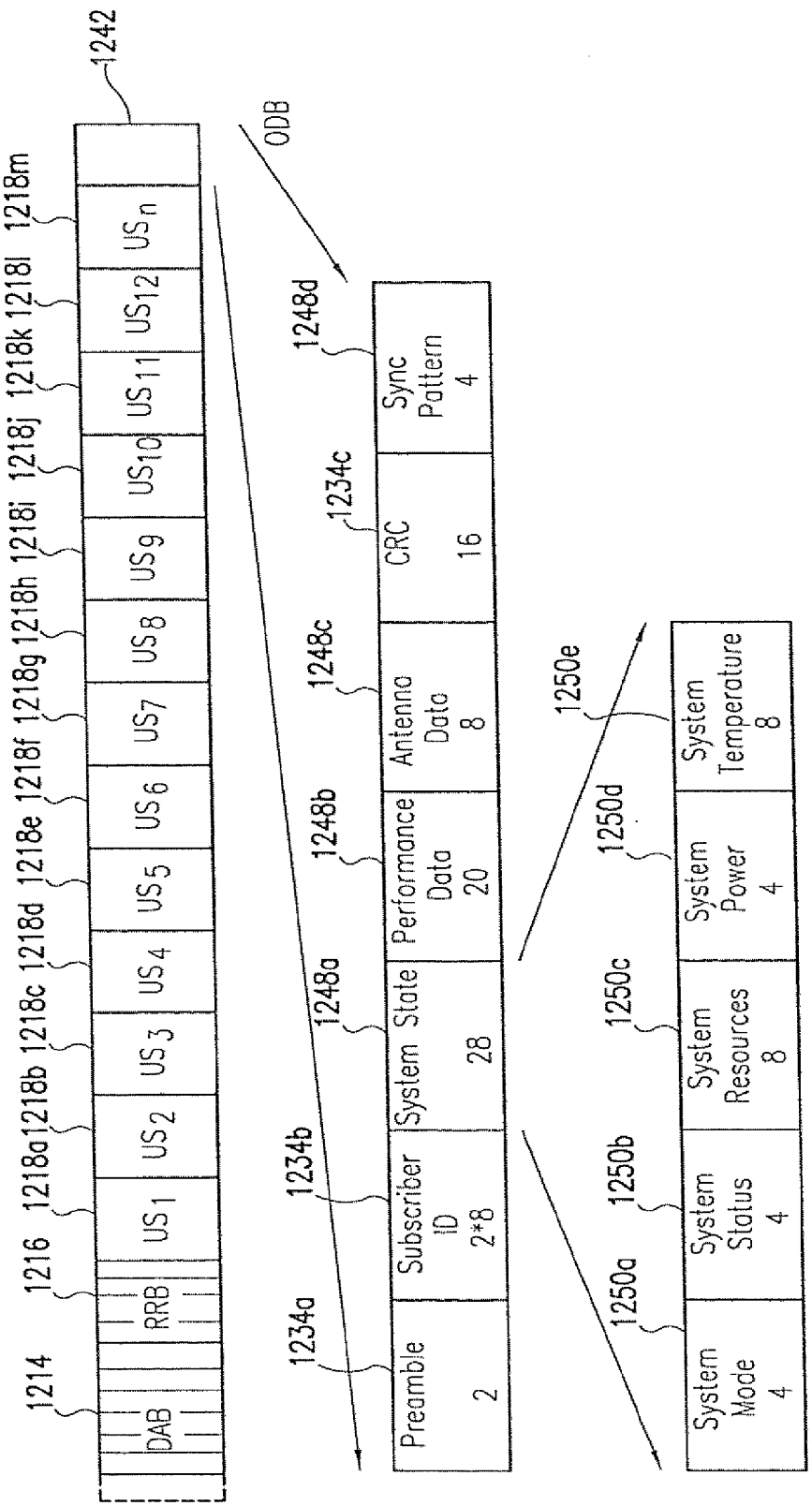
Figure 12N:
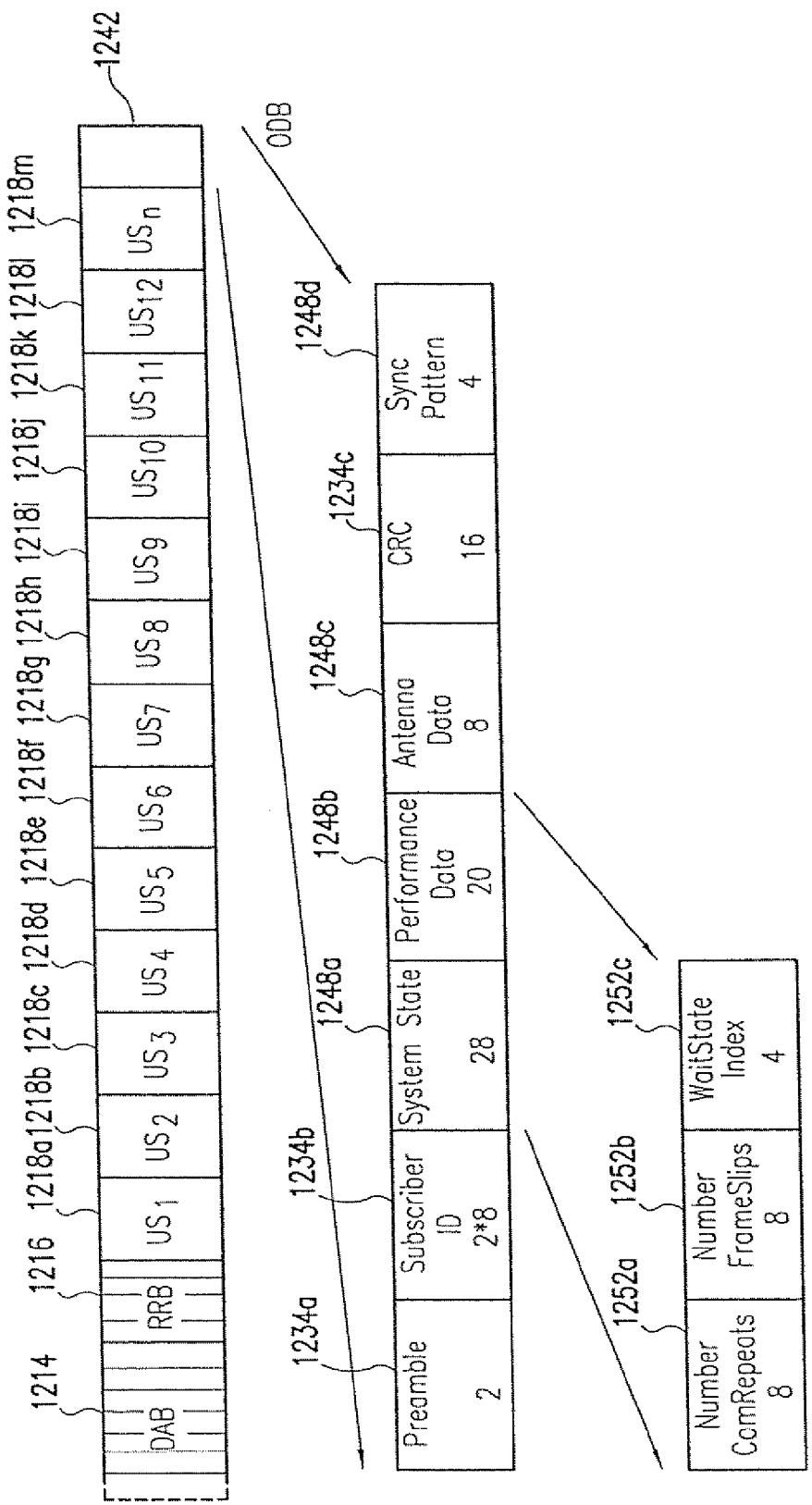
Figure 120:
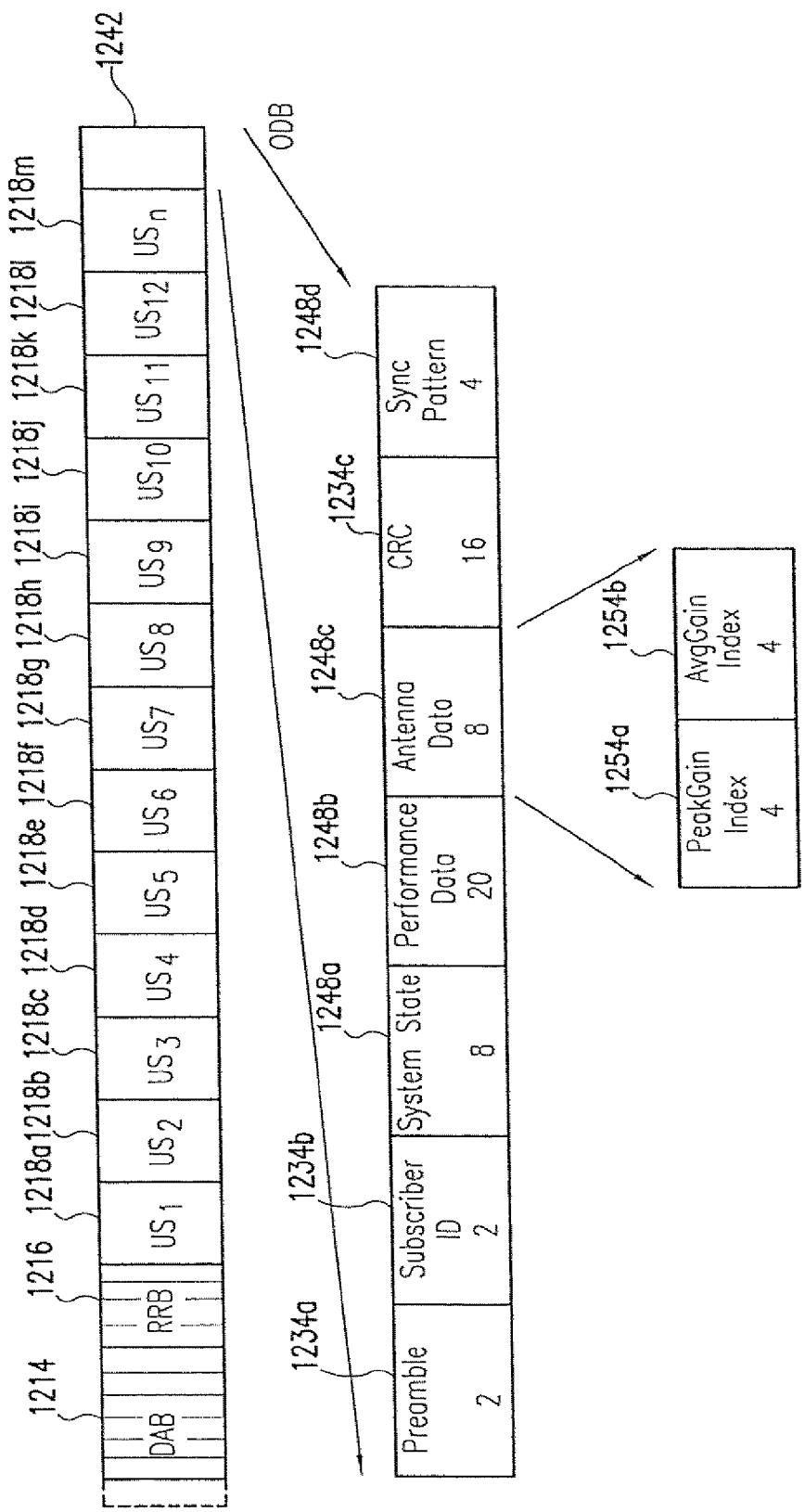

FIGS. 12M, 12N and 12O depict an exemplary ODB 1242 in detail. This field is used to store information regarding the connection between the wireless base station 302 and the CPE station 294. ODB 1242 includes preamble 1234a (including link integrity data), subscriber ID 1234b (identifies which CPE station 294 is making the reservation request), system state 1248a (information about the status of the CPE station 294), performance data 1248b (how full the buffer statistics, cpe processor performance statistics, system state), antenna data 1248c (information pertaining to the antenna), CRC 1234e (error checking information) and synchronization pattern 1248d (error checking information).

Referring to FIG. 12M, system state subslot 1248a comprises system mode 1250a (the mode of the CPE station, e.g., command mode, operations mode, or initialization mode of the system), system status 1250b (the status of the CPE station), system resources 1250a (the mode of the CPE station), system power 1250b (the mode of the CPE station), system temperature 1250a (the temperature of the CPE station). The CPE stations 294 are required to take turns using ODB 1242 to transmit their information.

Referring to FIG. 12N, performance data 1248a comprises the number of comrepeats 1252a (the number of repeats of communication attempts), number of frameslips 1252b (the number of frames that have slipped), waitstate index 1252c (an index to the waiting state).

f. Exemplary Class-based Frame Prioritization

Figure 13:
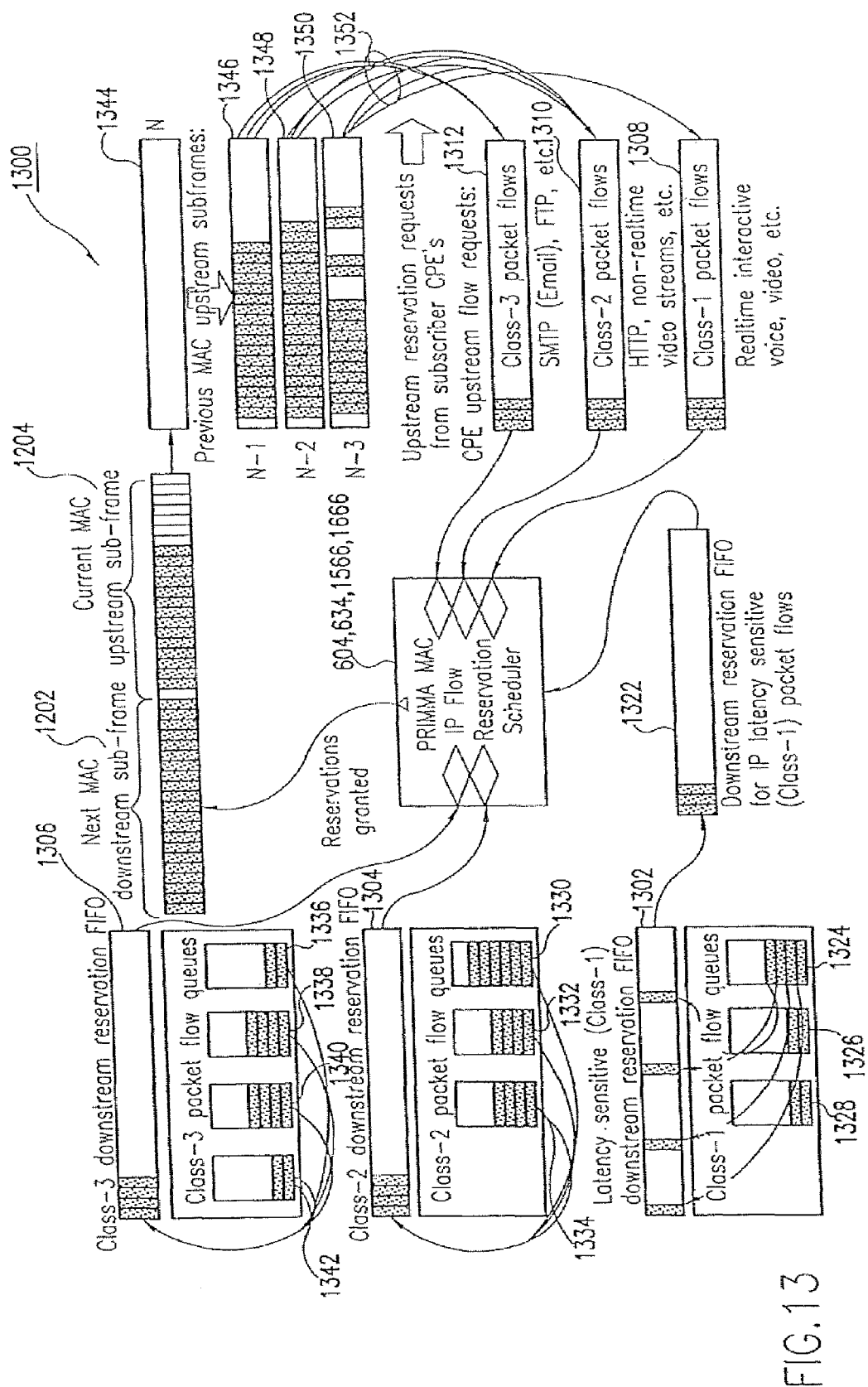
FIG. 13 illustrates how an exemplary flow scheduler for the present invention functions.

FIG. 13 shows block diagram 1300, illustrating how an exemplary flow scheduler for the present invention functions to schedule products. Block diagram 1300 includes: flow scheduler 604, 634 (which is a combination of downlink flow scheduler 604 and uplink flow scheduler 634), downlink transmission subframe 1202 (i.e., the next MAC downstream subframe), uplink transmission subframe 1204 (i.e., the current MAC upstream subframe). Block diagram 1300 also includes the following downstream components: downstream reservation first-in-first-out queue 1322, class 1 downstream queue 1302, class 2 downstream queue 1304, and class 3 downstream queue 1306. Block diagram 1300 also includes the following upstream reservation components: current upstream subframe 1344 (with the current upstream subframe 1204 about to be stored in it), previous upstream subframes 1346, 1348, 1350, class 1 upstream reservation request queue 1308, class 2 upstream reservation request queue 1310, and class 3 upstream reservation request queue 1312.

In the downlink path, an IP flow QoS class queuing processor (described below with respect to FIGS. 15A and 15B) queues the received data packets into class 1 packet flow queues 1324, 1326 and 1328, class 2 packet flow queues 1330, 1332, 1334, and class 3 packet flow queues 1336, 1338, 1340 and 1342.

Based on inputs from a hierarchical class-based priority processor, a virtual private network (VPN) directory enabled (DEN) data table and a service level agreement (SLA) priority data table (described below with respect to FIGS. 15A and 15B), the class 1, class 2, and class 3 packet flow queues are respectively assigned to class 1 downstream queue 1302, class 2 downstream queue 1304, and class 3 downstream queue 1306. Flow scheduler 604, 634 schedules these downlink data packets onto the downlink transmission subframe 1202.

In one embodiment, additional processing is used to minimize latency and jitter. For example, suppose the data packets of class 1 packet flow queue 1324 require jitter-free and latency-free delivery, i.e., delivery of packets must be at constant time intervals and in real-time. Packet flow queue 1324 creates, e.g., 4 equal time spaced slot reservations in future frames, as shown in class 1 downstream queue 1302 and described with respect to FIG. 14 below. The reservations are fed to downstream reservation first-in-first-out queue 1322, and are scheduled onto a future downstream frame 1202 by flow scheduler 604, 634.

In the uplink path, reservation requests for future upstream slots arrive at wireless base station 302 as part of the current upstream subframe 1204 received from CPE subscriber stations 294 over the wireless medium. Current upstream subframe 1344 can temporarily store reservation requests for analysis and scheduling of uplink packets in accord with the description of FIG. 8B above. Previous upstream subframes 1346, 1348, 1350 include upstream reservation requests awaiting upstream frame slot allocations in future upstream subframes 1204. Reservation request blocks (RRBs), described further above with reference to FIG. **12\*\*\*, include a request for a number of slots for a single IP flow with an IP flow identifier # and class of the flow. The upstream reservation requests (by IP flow and class) are queued onto class 1 upstream reservation request queue 1308, class 2 upstream reservation request queue 1310, and class 3 upstream reservation request queue 1312 by an IP flow QoS class queuing processor (described below with respect to FIGS. 16A and 16B). Flow scheduler 604 and 1566, and 634 and 1666, uses these downstream reservations and upstream reservation requests to assign slots to data packets in the next downstream transmission subframe 1202 and upstream transmission subframe 1204**, respectively.

Figure 14:
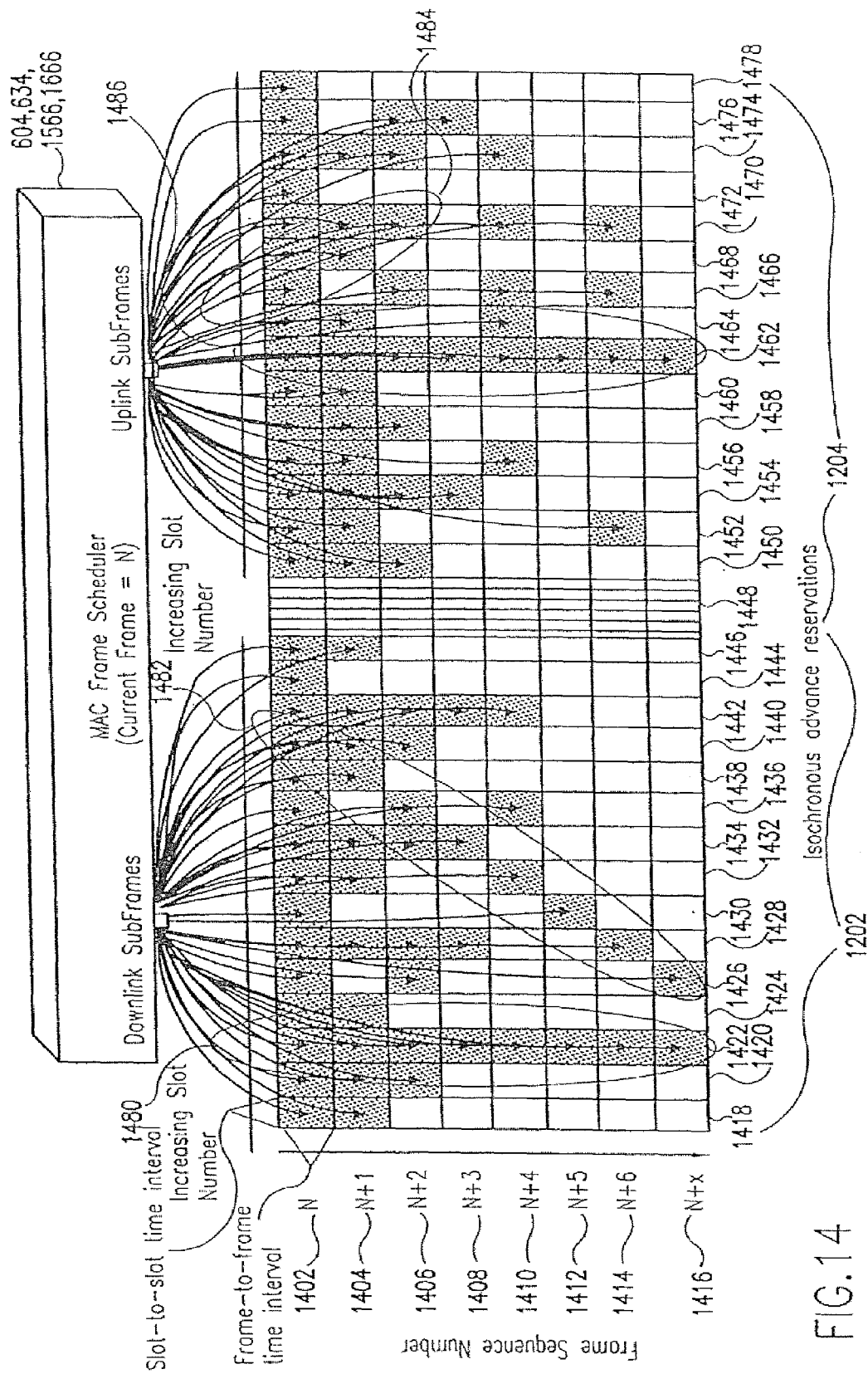
FIG. 14 is an exemplary two-dimensional block diagram of an advanced reservation algorithm.

FIG. 14 is an exemplary two-dimensional block diagram 1400 of the advanced reservation algorithm. FIG. 14 includes MAC subframe scheduler 1566, 1666, frames current frame, n 1402, and future frames, n+1 1404, n+2 1406, n+3 1408, n+4 1410, n+5 1412, n+6 1414 . . . n+x 1416, representing frames of data packets to be transmitted at times n, n+1, n+2 . . . n+x. Each frame is divided into a variable length downlink subframe 1202 and a variable length uplink subframe 1204. The lengths of downlink subframe 1202 and uplink subframe 1204 together comprise the length of an entire frame.

Each frame n 1402 includes a number of slots (1418-1478). Slots 1418-1446 comprise the downlink subframe 1202, and slots 1448-1478 comprise the uplink subframe 1204. In one embodiment, the slots are fixed in length, with each slot capable of storing a single data packet. The total number of frame slots in a frame remains constant. For example, if a given frame includes 64 frame slots, the slots can be allocated dynamically in either the uplink or downlink directions, such as, e.g., 32 up and 32 down, 64 up and 0 down, 0 up and 64 down. Block diagram 1400 can be thought of as a two dimensional matrix with each slot having a time value (i.e., a slot-to-slot time interval), e.g., 0.01 ms, and each frame having a total frame interval time value (i.e., a frame-to-frame time interval), e.g., 0.5 ms.

In the present invention, an advanced reservation algorithm assigns future slots to data packets based on the priority of the IP data flow with which the packet is associated. Exemplary priorities are described above with respect to FIGS. 8A and 8B. For calls that are sensitive to jitter, meaning calls that are time sensitive, it is important to maintain an isochronous (i.e., in phase with respect to time) connection. With such signals, it is important that the data be dispersed in the same slot between frames, or in slots having a periodic variation between frames. For example, vertical reservation 1480 shows a jitter sensitive signal receiving the same slot for downlink communications in each frame. Specifically, the signal is assigned slot 1422 in frames 1402-1416. If the frame-to-frame interval is 0.5 ms, then a slot will be provided to the IP flow every 0.5 ms. As another example, diagonal reservation 1482 shows a jitter sensitive signal receiving a slot varying by a period of one between sequential frames. Specifically, the signal is assigned slot 1440 in frame 1402, slot 1438 in slot 1404, . . . slot 1426 in frame 1416, to create a "diagonal." If the frame-to-frame interval is 0.5 ms and the slot-to-slot interval is 0.01 ms, then a slot can be provided to the IP flow every 0.5 minus 0.01, equals 0.49 mms. Thus, to decrease the frame interval, a diagonal reservation of positive slope can be used. To obtain an increased frame interval, a diagonal of negative slope such as, e.g., negative slope diagonal uplink reservation 1486. The diagonal reservation 1482 can also be more pronounced (i.e., using a greater or lesser slope), depending on the period between sequential frames desired. Reservation patterns 1480, 1482, 1484 and 1486 are useful patterns for jitter sensitive communications. Also illustrated is a vertical reservation 1486, similar to vertical reservation 1480, useful for a jitter sensitive communication in the uplink direction.

For latency sensitivity, one or more slots can be guaranteed in each frame. For example, for a call that is latency sensitive, but not jitter sensitive, each frame can be assigned one (or more) slots for communications. However, the slot(s) need not be periodic between frames, as with jitter sensitive calls. The greater the number of slots allocated per frame to an IP flow, the greater total bandwidth per frame rate for the IP flow.

For calls that are less latency sensitive, fewer slots per frame can be assigned for the communication. For example, a communication that is less latency sensitive can receive a guaranteed bandwidth of one slot every four frames. A call that is even less latency sensitive can receive, e.g., a single slot every ten frames.

Using these principles, the advanced reservation algorithm can assign the slots from highest priority to lowest priority, exhausting the number of available slots in future frames. IP data flows that are both jitter and latency sensitive can be assigned slots with periodic patterns first (e.g., patterns 1480, 1482, 1484 and 1486), followed by flows that are highly latency sensitive (but not jitter sensitive), et cetera, until the flows of lowest latency sensitivity are assigned to slots. Prioritization of different classes of IP flows by scheduler 604, 634, 1566, 1666 is described further below with reference to FIGS. 15A, 15B, 16A and 16B.

g. Downlink SubFrame Prioritization

1. Overview

Figure 15A:
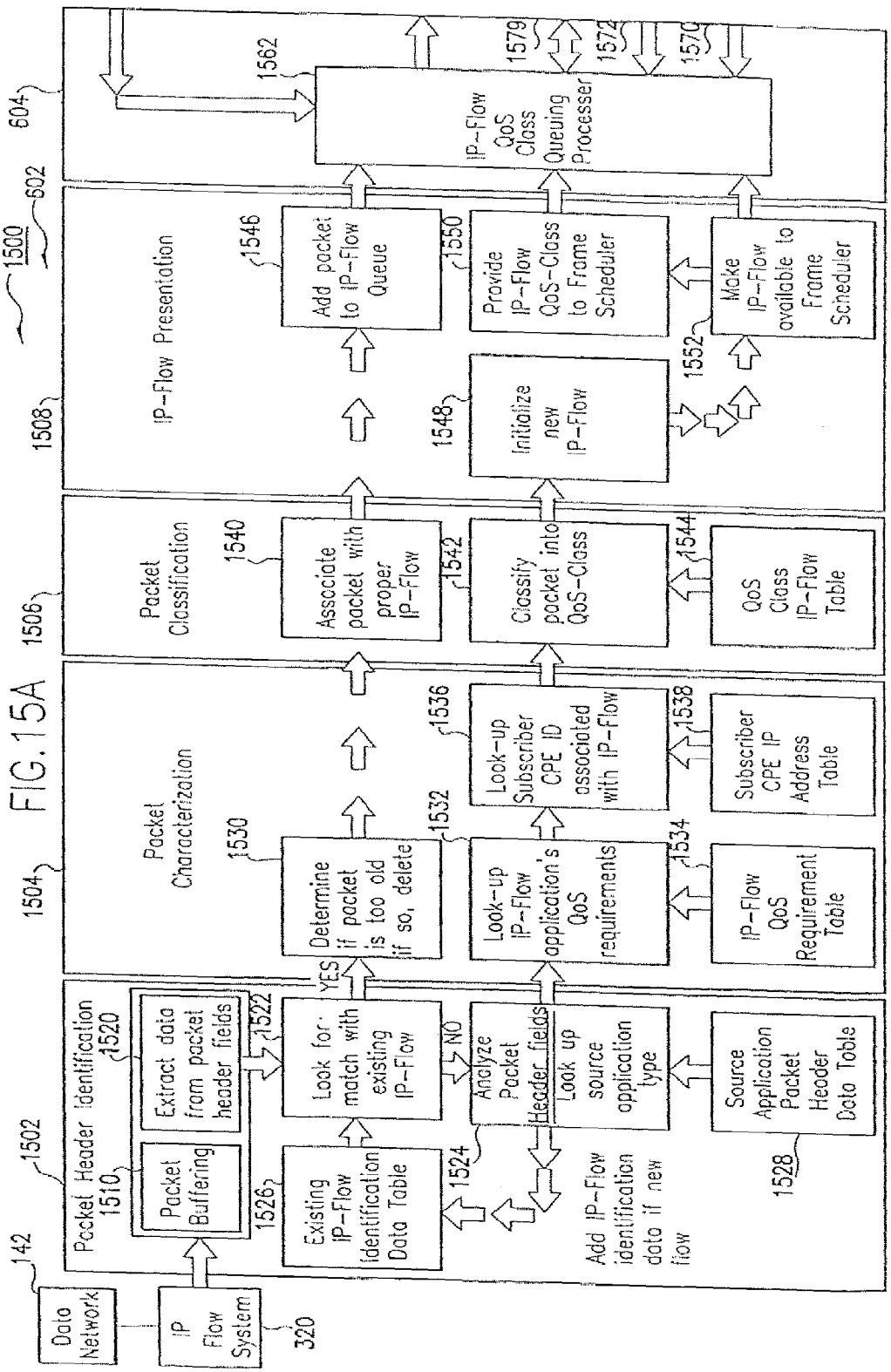
FIG. 15A is an exemplary logical flow diagram for a downlink flow analyzer.
Figure 15B:
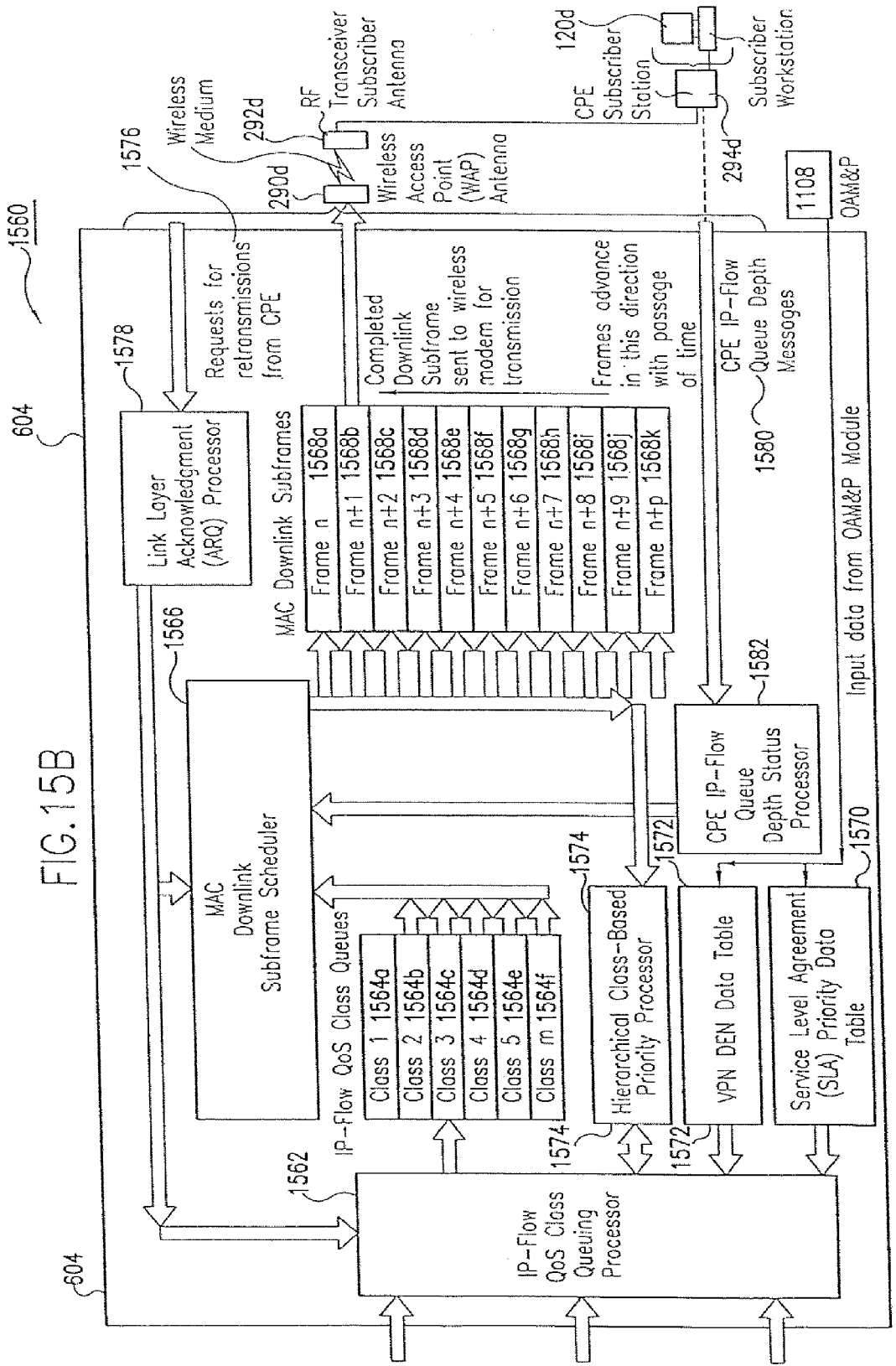
FIG. 15B is an exemplary logical flow diagram for a downlink flow scheduler.

FIGS. 15A and 15B are exemplary logical flow diagrams for analysis and scheduling of the shared wireless bandwidth for the downlink direction. The logical flow pertains to IP packet flows arriving from data network 140, at the wireless base station 302, for transmission down to a subscriber CPE station 294d over the wireless medium. FIG. 15A is an exemplary logical flow diagram 1500 for downlink IP analyzer 602. FIG. 15B is an exemplary logical flow diagram 1560 for the downlink flow scheduler 604.

The functional components for FIGS. 15A and 15B are explained by way of method modules, which can be viewed as physical units (e.g., comprising software, hardware, or a combination thereof) or logical vehicles (e.g., used for explanatory purposes only). Those skilled in the art will recognize that the modules are used only to explain an exemplary embodiment, and are not to be considered limiting.

The exemplary logical flow diagram 1500 for downlink IP flow analyzer of FIG. 15A includes packet header identification component 1502, packet characterization component 1504, packet classification component 1506, and IP flow presentation component 1508. The functions of these components are explained in detail below.

In one embodiment, downlink IP flow analyzer 602 is physically located in wireless base station 302, although those skilled in the art will recognize that the same functionality can be located remotely from wireless base station 302.

FIGS. 2D, 3A and 3B are helpful to the reader for an understanding of the downlink IP flow analyzer.

2. Introduction

IP flow analyzer 602 performs the function of identifying, characterizing, classifying, and presenting data packets to a downlink frame scheduler 604. The functions of identifying, characterizing, classifying and presenting the data packets are respectively performed by packet header identification component 1502, packet characterization component 1504, packet classification component 1506 and IP flow presentation component 1508 of downlink IP flow analyzer 602.

Packet header identification component 1502 determines whether a data packet of an incoming IP data flow is part of an IP flow that is known to the system, or is the first data packet of a new IP data flow, based on the contents of fields of the packet header section. Packet header identification component 1502 also identifies, e.g., the source of the packet using the packet header field contents. Packet characterization component 1504 characterizes a new data packet (of a new IP data flow) to determine the QoS requirements for the IP data flow, and identifies the subscriber CPE station associated with the subscriber workstation that will receive the IP data flow. Packet classification component 1506 classifies the new IP data flow into a communications priority class, grouping the packet together with similar type IP flows. IP data flow presentation 1508 initializes the new IP data flow and presents it to downlink flow scheduler 604.

Downlink flow scheduler 604 places the data packets of an IP data flow into a class queue, and based on a set of rules, schedules the data packets for transmission over the wireless medium to a subscriber CPE station using, e.g., an advanced reservation algorithm. The rules can be determined by inputs to the downlink flow scheduler from a hierarchical class-based priority processor module 1574, a virtual private network (VPN) directory enabled (DEN) data table 1572, and a service level agreement (SLA) priority data table 1570. The advanced reservation algorithm is described further above with respect to FIG. 14.

3. Identification

Packet header identification component 1502 identifies the IP flow received from data network 142 at data interface 320 based on the packet header.

An IP flow packet stream from data network 142, including packets from various IP flows (where each IP flow is associated with a single data "call") is received at packet header identification component 1502. An IP flow can include packetized data including any type of digital information such as, e.g., packetized voice, video, audio, data, IP flows, VPN flows, and real time flows. The IP flow is transmitted over data network 142 from, e.g., a host workstation 136d and arrives at interface 302 of wireless base station 320. Interface 302 transmits the packets of the IP flow to packet header identification component 1502. At module 1510, the received packets are buffered into a storage area. At module 1520, the contents of the packet header fields are extracted and parsed.

For IP flows known to the system, so-called "existing IP flows," there are entries in a table 1526. An IP flow is in the system if there is an existing characterized IP data call. In module 1522, it is determined if there is a match between the incoming packet and an existing IP flow call in an entry in existing IP flow identification table 1526. If so, then the IP flow is known to the system, and control passes to module 1530 of the packet characterization component 1504.

If not, meaning that the IP flow is a new IP data flow, then control passes to module 1524, where the packet header fields are analyzed. Module 1524 analyzes the packet header source field and determines from source application packet header data table 1528 the type of source application making the data call or transmitting the IP packet. The application can be any of the applications described with respect to FIG. 2D or known to those skilled in the art. Examples include a file transfer protocol (FTP) download from another client workstation 138f, an IP voice telephony call (over telephony gateway 288b), a voice telephony call from a caller 124d (connected over a modem), an e-mail from a LAN 128a attached host workstation 136a, a fax machine call, and a conference call from multiple callers 124d and 126d (connected over a modem), to name a few. If the IP flow is not known to the system, then the IP flow is given an IP flow identifier number, and control passes to module 1526 where the IP flow identifier number is added to the existing IP flow identification table 1526.

Once the type source application has been determined by packet header information or by another means, such as direct application identification, then control passes from module 1524 to module 1532 of the packet characterization component 1504. In order to identify the type of source application of the IP flow, any type of service (TOS) or differentiated service (DiffServ) field can also be analyzed.

4. Characterization

Packet characterization component 1504 characterizes new IP flows and passes them to packet classification component 1506 for classification.

For an existing IP flow, control passes to module 1530 from module 1522 of the packet header identification component 1502. If in module 1522 it is determined that the IP data flow is known to the system, in module 1530 it is determined whether the packet is old (i.e., stale). This can include, e.g., determining from a time-to-live field (a field in the IP packet header) the age of the packet, and comparing the field to a threshold age value. If the packet is determined to be stale, it can be discarded. Based on the age of the packet, client application discards can be anticipated. Otherwise, control can pass to module 1540 of the packet classification component 1506.

For a new IP flow, control passes to module 1532 from module 1524 of the packet header identification component 1502. If in module 1524 it is determined that the IP flow is not known to the system, in module 1532 the QoS requirements for the application are determined using the source application information identified in modules 1524 and 1528. Module 1532 performs this operation by looking up the QoS requirements for the identified source application in the QoS requirement table 1534. Different applications have different QoS requirements in order to provide an acceptable end-user experience. For example, bandwidth allocation (i.e., allocating an appropriate amount of bandwidth) is important to an application performing FTP file transfer downloads, and not jitter (i.e., time synchronizing the received data) and latency (i.e., the amount of time passage between responses). On the other hand, jitter and latency are important to voice telephony and conference calls, while bandwidth allocation is not.

After processing by module 1532, in module 1536 a destination CPE subscriber station ID lookup from subscriber CPE IP address table 1538, is performed for the IP flow. Each subscriber CPE station 294d can have one or more applications, running on one or more subscriber workstations 120d, homed to it. Accordingly, the IP flows can be directed to one or more applications on one or more subscriber workstations of one or more CPE stations 294d. A subscriber workstation can be any device coupled to a subscriber CPE station 294d. Module 1536 looks up the IP flow in table 1538, to determine the identity of the subscriber CPE station 294d that will receive the packets of the new IP flow from data network 142. Control then passes from module 1536 to module 1542 of the packet classification component 1506.

5. Classification

Packet classification component 1506 classifies the IP flow and passes it to IP flow presentation component 1508 for presentment.

For an existing IP flow, control passes to module 1540 from module 1530 of the packet characterization component 1504. If in module 1530 it is determined that the packet is not stale, then in module 1540 the packet is associated with its existing IP flow. As illustrated in FIG. 15A, the packet processed herein was determined to be a portion of an IP flow known to the system. Therefore, the QoS processing of modules 1532, 1536 and 1542 are unnecessary, because the QoS requirements of the present packet are assumed to be the same as for its IP flow. In another embodiment, all packets are characterized and classified. From module 1540, control can continue with module 1546 of IP flow presentation 1508.

For the new IP flow, control passes to module 1542 from module 1536 of the packet characterization component 1504. In module 1542 the packet is classified into a QoS class by performing a table lookup into IP flow QoS class table module 1544, where the types of QoS classes are stored depending on the QoS requirements for packets. Similar IP flows, (i.e., IP flows having similar QoS requirements) can be grouped together in module 1542. In classifying packets and IP flows, QoS class groupings, any DiffServ priority markings, and any TOS priority markings can be taken into account. From the module 1542, control passes to module 1548 of IP flow presentation component 1508.

6. IP Flow Presentation

IP flow presentation component 1508 prepares and presents the IP flow packets to downlink flow scheduler 604.

For existing IP flows, control passes to module 1546 from module 1540 of the packet classification component 1540. In module 1546 the packet is added to the associated existing IP flow queue, which is the queue for the current IP flow. From module 1546, control passes to IP flow QoS class queuing processor module 1562 of downlink flow scheduler 604.

For the new IP flow, control passes to module 1548 from module 1542 of the packet classification component 1506. In module 1548, this new IP flow can be initialized for presentation to module 1552. In module 1550, the IP flow QoS class is presented to frame scheduler 604 to be placed in an appropriate class queue. Module 1552 presents the IP flow (in particular, the data packet) and IP flow identifier to IP flow QoS class queuing processor module 1562 of downlink flow scheduler 604.

7. Downlink Flow Scheduler

The exemplary logical flow diagram 1560 for the downlink flow scheduler 604 of FIG. 15B comprises IP flow QoS class queuing processor module 1562, MAC downlink subframe scheduler module 1566, hierarchical class-based priority processor module 1574, VPN DEN data table module 1572, SLA priority data table 1570, CPE IP flow queue depth status processor 1582 and link layer acknowledgment processor module 1578.

Downlink flow scheduler 604 of FIG. 15B also includes QoS class queues as follows: class 1, 1564a; class 2, 1564b; class 3, 1564c; class 4, 1564d; class 5, 1564e; and class 6, 1564f; and MAC downlink subframes: frame n, 1568a; frame n+1, 1568b; frame n+2, 1568c; frame n+3, 1568d; . . . frame n+p, 1568k.

In one embodiment, downlink flow scheduler 604 is physically located in wireless base station 302, although those skilled in the art will recognize that the same functionality can be located remotely from wireless base station 302.

Downlink flow scheduler 604 is used to schedule the downlink subframe. An entire frame can be divided into an uplink portion (called an uplink subframe) for transmitting uplink frames, and a downlink portion (called a downlink subframe) for transmitting downlink frames.

Also illustrated on FIG. 15B are WAP antenna, the wireless medium, 290d, RF transceiver subscriber antenna 292d, subscriber CPE station 294d and subscriber workstation 120d. WAP antenna 290d and RF transceiver subscriber antenna 292d respectively provide a wireless connection between wireless base station 302 (where downlink flow scheduler 604 resides in one embodiment) and subscriber CPE station 294d, which can transmit an IP flow to an application running on subscriber workstation 120d. WAP antenna 290d serves as a wireless gateway for data network 142, and RF transceiver subscriber antenna serves as a wireless gateway for subscriber CPE station 294d. The connection is also illustrated in FIGS. 2D and 3B.

IP flow QoS class queuing processor module 1562 receives the packets from IP flow presentation component 1508. Module 1562 then creates class queues 1564a-1564f, which is a variable number of queues, and places the packets in these class queues. How packets are placed in class queues 1564a-1564f is determined by the inputs to module 1562.

Module 1562 can receive inputs from hierarchical class-based priority processor module 1574, VPN DEN data table 1572 and service level agreement (SLA) priority data table 1570. The queuing function of module 1562 can be based on these inputs.

SLA priority data table 1570 can use predetermined service level agreements for particular customers to affect the queuing function. A customer can be provided a higher quality of telecommunications service by, for example, paying additional money to receive such premium service. An algorithm running on module 1562 can increase the queuing priority for messages transmitted to such customers.

Virtual private network (VPN) directory enabled networking (DEN) data table 1572 can provide prioritization for a predetermined quality of service for a VPN for a company that pays for the VPN function. A VPN is understood by those skilled in the relevant art to be a private network, including a guaranteed allocation of bandwidth on the network, provided by the telecommunications service provider. VPN DEN data table 1572 permits module 1562 to provide higher quality of service for customer-purchased VPNs. As with SLA priority data table 1570, the queuing priority can be increased for such VPNs. For example, a platinum level VPN's lowest priority IP flow classes could also be given a higher priority than a high priority brass level VPN.

Both SLA priority data table 1570 and VPN DEN data table 1572 receive input from operations, administration, maintenance and provisioning (OAM&P) module 1108. This is a module that is kept off-line, and includes storage and revision of administrative information regarding new customers, or updates of information pertaining to existing customers. For example, the SLA priority of the customers and VPN information is updated from OAM&P module 1108.

Hierarchical class-based priority processor module 1574 is a module that operates under the principles of hierarchical class-based queuing. Hierarchical class-based queuing was created by Sally Floyd and Van Jacobson, considered early architects of the Internet.

Hierarchical class-based queuing classifies different types of IP flows using a tree structure at the edge access device routers. Each branch of the tree signifies a different class of IP flows, and each class is dedicated a set limited amount of bandwidth. In this manner, different classes of flows are guaranteed minimum bandwidth, so that no single IP data flow within a class, and no single class of IP flows, can use up all available bandwidth. The present invention adds a prioritization feature enabling class based priority reservations to be made using the hierarchical class queue concept, as discussed above with respect to FIGS. 13 and 14.

MAC downlink subframe scheduler 1566 is a processor module that takes the packets queued in class queues 1564a-1564f, and can make frame slot reservations to fill up subframes 1568a-1568k based on priorities 1570, 1572 and 1574, which is a variable number of frames. In one embodiment, each subframe is scheduled (filled) with up to a predetermined number of packets from each of the classes 1564a-1564f according to priorities 1570, 1572 and 1574. In another embodiment, the subframes are scheduled according to the inventive advanced reservation algorithm method described with respect to FIGS. 13 and 14 for isochronous reservations. In yet another embodiment, the subframes are scheduled according to a combination of known methods and the advanced reservation algorithm method of the present invention.

The subframes can then be sent to WAP antenna 290d for wireless transmission over the wireless medium to RF transceiver subscriber antenna 292d coupled to subscriber CPE station 294d, which in turn can send the packets contained in the subframes to subscriber workstation 120d at CPE subscriber location 306d. The subframes can be scheduled from highest priority to lowest priority.

Hierarchical class-based priority (HCBP) processor module 1574 receives as input the subframes that have been scheduled and transmitted from WAP antenna 290d. By maintaining awareness of the status of the packets (i.e., by knowing which packets have been sent out), HCBP processor module 1574 knows which packets from which class queues 1564a-1564f must yet be scheduled.

Every once in a while, a packet is lost through, e.g., noise. When this situation arises, the subscriber CPE station 294d sends a retransmit request 1576 to WAP 290d, which transmits the request to link layer acknowledgment (ARQ) processor 1578. ARQ processor 1578 informs MAC downlink subframe scheduler 1566 of this condition, which in turn reschedules the requested packets from the appropriate class queues 1564a-1564f for retransmission. Link layer acknowledgment ARQ processor 1578 also awaits positive acknowledgments from subscriber CPE station 294d, to determine that the data packets have been properly received. Only after receiving a positive receipt acknowledgment does MAC downlink subframe scheduler 1566 remove the packet from class queues 1564a-1564f.

Each subscriber CPE station 294d has a limited amount of memory available for received data packets in an IP flow. When, for example, the devices coupled to the subscriber CPE station 294d (e.g., subscriber workstation 120d) stop receiving IP data flows (e.g., subscriber workstation 120d goes down), the CPE data packet queues in CPE subscriber station 294d are quickly filled up. In this scenario, subscriber CPE station 294d transmits a CPE IP flow queue depth message 1580 indicating that the queue is filled up, which can be received by CPE IP flow queue depth status processor 1582. CPE queue depth processor 1582 informs MAC downlink subframe scheduler 1566 of this condition, which stops scheduling downlink subframes directed to subscriber CPE station 294d. Processor 1582 can also send messages to MAC downlink subframe scheduler 1566 to flush particular IP flows from class queues 1564a-1564f.

h. Uplink SubFrame Prioritization

1. Overview

Figure 16A:
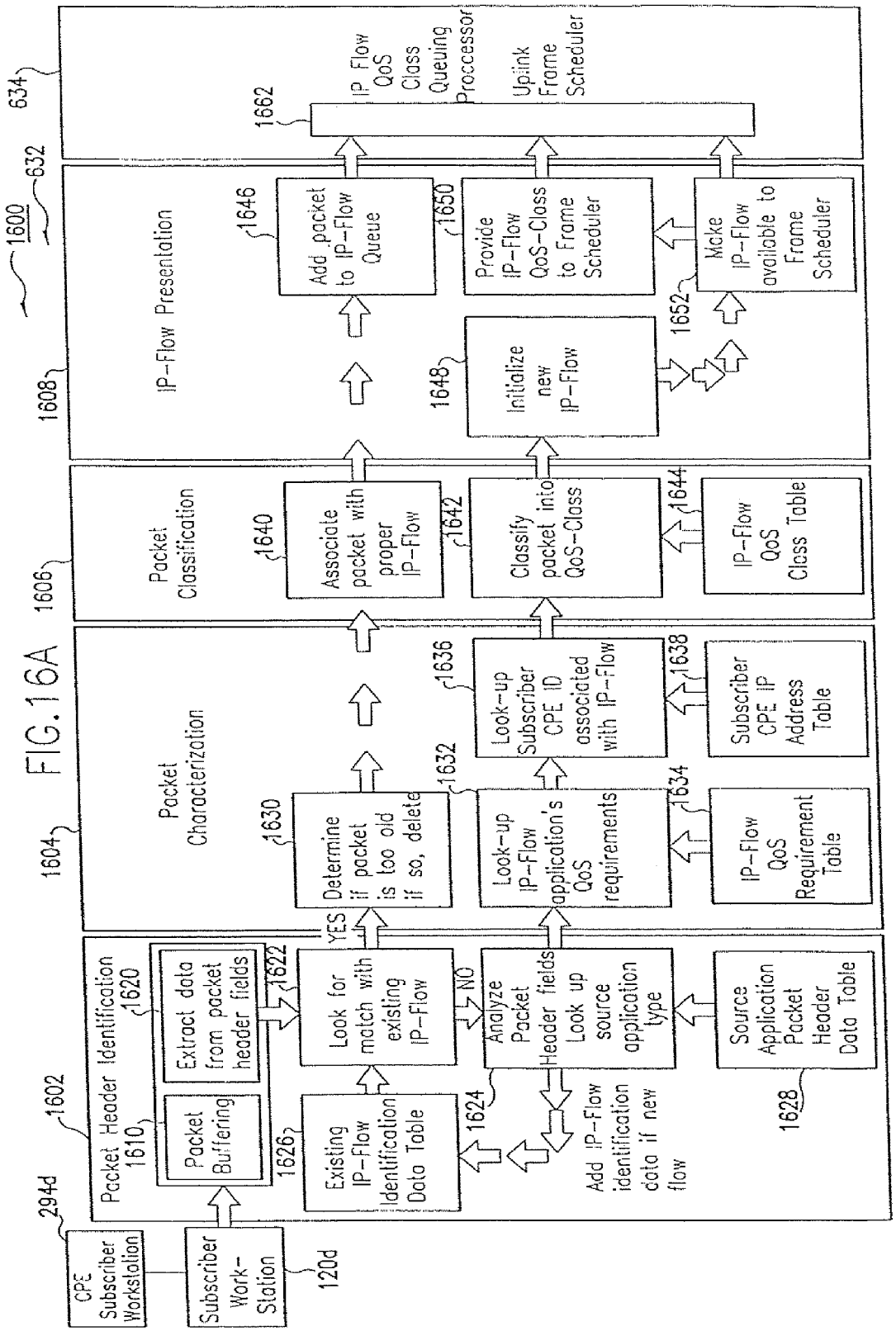
FIG. 16A is an exemplary logical flow diagram for an uplink flow analyzer.
Figure 16B:
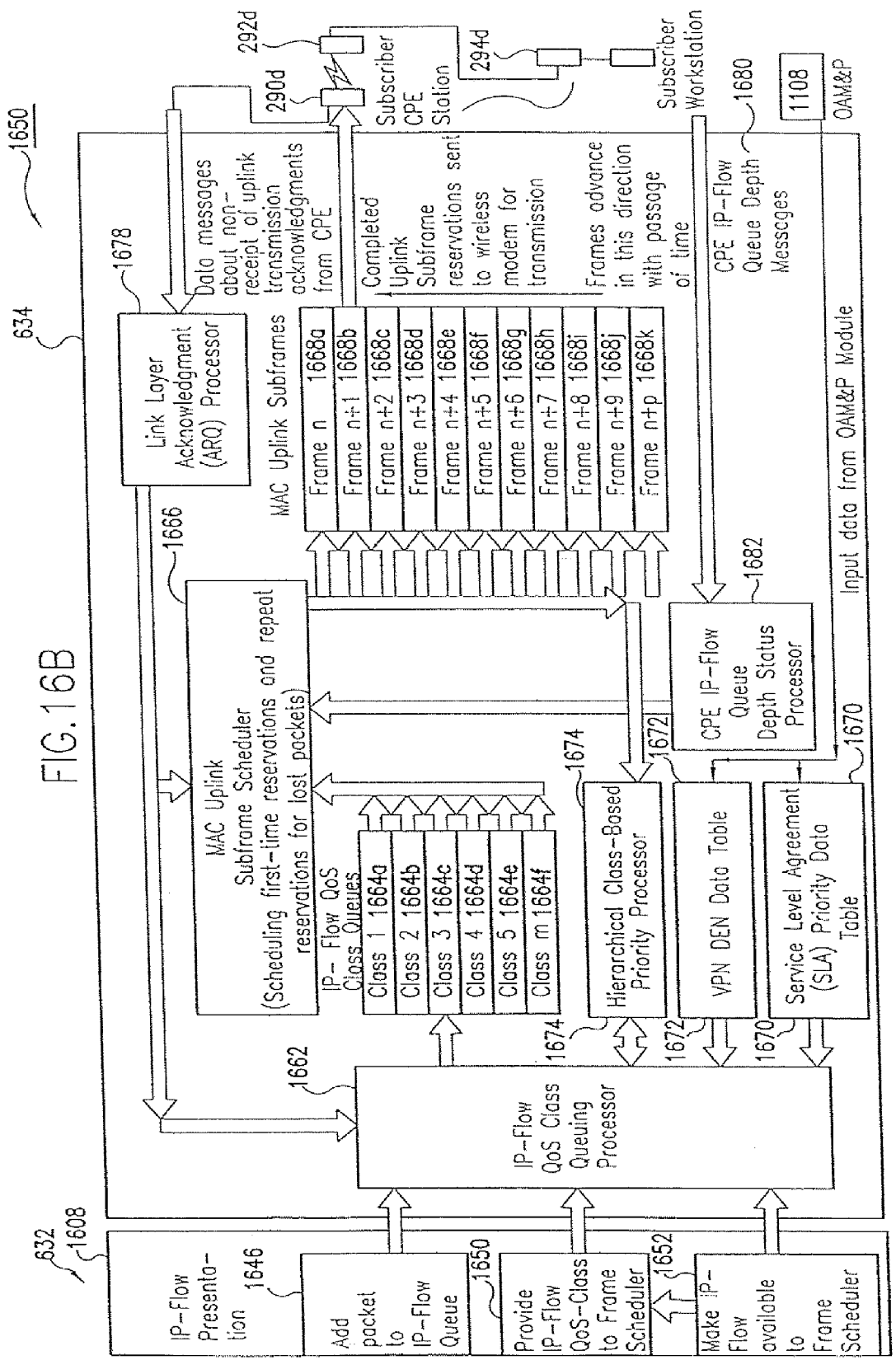
FIG. 16B is an exemplary logical flow diagram for an uplink flow scheduler.

FIGS. 16A and 16B are exemplary logical flow diagrams for the uplink. The logical flow pertains to analysis and scheduling of shared wireless bandwidth to IP packet flows from a subscriber workstation 120d coupled to a subscriber CPE station 294d, being transmitted over the wireless medium up to the wireless base station 302, and on to data network 142 for transmission to a destination host workstation 136a. FIG. 16A is an exemplary logical flow diagram 1600 for uplink IP flow analyzer 632. FIG. 16B is an exemplary logical flow diagram 1660 for the uplink flow scheduler 634.

The functional components for FIGS. 16A and 16B are explained by way of method modules, which can be viewed as physical units (e.g., comprising software, hardware, or a combination thereof) or logical vehicles (e.g., used for explanatory purposes only). Those skilled in the art will recognize that the modules are used only to explain an exemplary embodiment, and are not to be considered limiting.

The exemplary logical flow diagram 1600 for uplink IP flow analyzer 632 of FIG. 16A includes packet header identification component 1602, packet characterization component 1604, packet classification component 1606, and IP flow presentation component 1608. The functions of these components are explained in detail below.

In one embodiment, uplink IP flow analyzer 632 is physically located in wireless base station 302, although those skilled in the art will recognize that the same functionality can be located remotely from wireless base station 302. In a preferred embodiment of the present invention, the function of IP flow analyzer 632 is performed at a subscriber CPE station 294d desiring an uplink reservation slot for uplinking a packet/IP flow up to base station 302. A reservation request block (RRB) request detailing the IP flow identifier, number of packets and classification of the IP flow can be created then by IP flow analyzer 632 and can be uplinked via preferably a contention RRB slot for scheduling by uplink frame scheduler 634 in future uplink subframe slots up at wireless base station 302.

FIGS. 2D, 3A and 3B are helpful to the reader for an understanding of the uplink IP flow analyzer.

2. Introduction

IP flow analyzer 632 performs the function of identifying, characterizing, classifying, and presenting data packets to an uplink frame scheduler 634. The functions of identifying, characterizing, classifying and presenting the data packets can be respectively performed by packet header identification component 1602, packet characterization component 1604, packet classification component 1606 and IP flow presentation component 1608 of uplink IP flow analyzer 632.

Packet header identification component 1602 determines whether a packet of an incoming IP flow is known to the system (i.e. is an existing IP flow), or if it is the first data packet of a new IP data flow, and determines the source application based on fields in the header section of the packet. Identification 1602 can include buffering packets and extracting and parsing the header contents. Packet characterization component 1604 characterizes a new data packet (of a new IP flow) to determine the QoS requirements for the IP flow based on the source application, and to identify the subscriber CPE station that will receive the IP flow. Packet classification component 1606 classifies the new IP data flow into one of several priority classes. Classification 1606 can include, e.g., grouping packets having similar QoS requirements. IP data flow presentation 1608 initializes the new IP data flow and presents it to uplink flow scheduler 634.

Each time a subscriber CPE station 294*d* attempts to communicate in the uplink direction with wireless base station 302, it requests a reservation by inserting an RRB in the uplink subframe. Uplink frame scheduler 634 then schedules the reservation request in a future uplink subframe and notifies the CPE station 294*d* of the reservation. In a downlink signal, uplink flow scheduler 634 located preferably at wireless base station 302, transmits a reservation slot in a particular future frame for the requesting subscriber CPE station 294*d* to transmit its uplink data. Uplink flow scheduler 634 assigns the reservation based on the same parameters as the downlink flow scheduler 604 uses in the downlink. In other words, uplink flow scheduler 634 determines the reservation slots based on the queue class priority and based on a set of rules, schedules the reservations for uplink transmissions from subscriber CPE station 294*d* using, e.g., an advanced reservation algorithm. The rules are determined by inputs to the uplink flow scheduler 634 from a hierarchical class-based priority processor module 1674, a virtual private network (VPN) directory enabled (DEN) data table 1672, and a service level agreement (SLA) priority data table 1670. The advanced reservation algorithm is described with respect to FIG. 14.

3. Identification

Packet header identification component 1602 identifies the IP flow received from a subscriber CPE station 294*d* based on the packet's header contents.

A stream of packets, also known as packets from several IP flows (i.e. each IP flow is associated with a single "call") is received at packet header identification component 1602. The IP flow in one embodiment is transmitted to subscriber CPE station 294*d* from one or more subscriber workstations 120*d* for uplink to host computers 136*a* coupled to wireless base station 302 by data network 142. Subscriber CPE station 294*d* can transmit the data packets of the IP flow to packet buffer module 1610 of packet header identification component 1602. In one embodiment, packet header identification component is within CPE subscriber station 294*d*.

At module 1610, the received packets are buffered in a storage area for transfer to header extraction module 1620. At module 1620, the packet header files are extracted and parsed to obtain the contents of the packet header fields.

Relevant fields can include, e.g., source, destination, type of service (TOS) and differentiated service (DiffServ) markings, if any exist.

For IP flows known to the system, there are entries in existing IP flow identification table 1626. An IP flow is in the system if a previous packet of the IP flow of the existing IP data call has already been identified. In module 1622, it is determined if there is a match between the incoming IP flow and an entry in table 1626. If so, then the IP flow is known to the system, and control passes to module 1630 of the packet characterization component 1604.

If the IP flow is not an existing flow known to the system, meaning that the IP flow is a new IP flow, then control passes to module 1624, where the packet header fields are analyzed to identify the source application of the IP flow.

Packet header analysis module 1624 determines from source application packet header table 1628 the type of source application making the IP flow. The application can be any of the types of applications described with respect to FIG. 2D or known to those skilled in the art. Examples include a file transfer protocol (FTP) download from another client workstation 138*f*, a voice telephony call from a caller 124*d* (connected over a modem), a fax machine call, and a conference call from multiple callers 124*d* and 126*d* (connected over a modem), to name a few. If the IP flow is a new IP flow, then the identification information about the new IP flow is added to table 1626, and control passes from analysis module 1624 to module 1632 of the packet characterization component 1604.

4. Characterization

Packet characterization component 1604 characterizes the IP flow and passes it to packet classification component 1606 for classification.

If the IP flow is an existing IP flow, control passes to module 1630 from module 1622 of the packet header identification component 1602. If in module 1622 it is determined that the IP data flow is known to the system, in module 1630 it is determined whether the packet is old (i.e., stale). This can include determining from a time-to-live field (a field in the IP packet header) the age of the packet, and comparing the field to a threshold age value. If the packet is determined to be stale, it is discarded. Module 1630 can anticipate application packet discards. From module 1630, control passes to module 1640 of the packet classification component 1606.

If the IP flow is new, control passes to module 1632 from module 1624 of the packet header identification component 1602. If in module 1624 it is determined that the application associated with the IP flow application is not known to the system, in IP flow QoS requirements lookup module 1632 the QoS requirements for the application associated with the IP flow are determined. Module 1632 performs this operation by looking up the application in IP flow QoS requirement table 1634. Different applications have different requirements. For example, bandwidth allocation (i.e., allocating an appropriate amount of bandwidth) is important to an application performing FTP downloads, and not jitter (i.e., time synchronizing the received data) and latency (i.e., the amount of time passage between responses). On the other hand, jitter and latency are important to voice telephony and conference calls, and bandwidth allocation is not.

After processing by module 1632, control passes to module 163*b*. In CPE subscriber station identifier (ID) lookup module 1636 a subscriber CPE ID lookup is performed for the new IP data flow. Each subscriber CPE station 294*d* can have one or more applications, running on one or more subscriber workstations 120*d*, homed to it. Accordingly, one or many subscribers can generate or receive an IP flow directed from or at a subscriber CPE station 294*d*. A subscriber workstation 120*d* can be any device coupled to a subscriber CPE station 294*d*. Module 1636 looks up the CPE station identifier for the IP flow in table 1638, to provide the CPE ID in the reservation request block (RRB). Control then passes from module 1636 to module 1648 of the packet classification component 1606.

5. Classification

Packet classification component 1606 classifies the IP flow and passes it to IP flow presentation component 1608 for presentment.

For existing IP flows, control passes to module 1640 from module 1630 of the packet characterization component 1604. If in module 1630 it is determined that the packet is not stale, then in module 1640 the packet is associated with its IP flow. As illustrated in FIG. 16A, the packet processed herein was determined to be a portion of an IP flow known to the system. Therefore, the QoS processing of modules 1632, 1636 and 1642 are unnecessary, because the QoS requirements of the present packet are the same as for its IP flow.

For new IP flows, control passes to module 1642 from module 1636 of the packet characterization component 1604. In module 1642 the packet is classified or grouped into a QoS class by performing an IP flow QoS requirement table 1644 lookup where the QoS classes are stored depending on the QoS requirements for packets. From module 1642, control passes to module 1648 of IP flow presentation component 1608.

6. IP Flow Presentation

IP flow presentation component 1608 prepares and presents the IP data flow packets to flow scheduler 634. In one embodiment of the uplink direction, a reservation request block (RRB) is created and uplinked via a contention slot to the wireless base station 302 for scheduling by IP flow scheduler 634. In another embodiment, the scheduler is located at the CPE station 294*d* so no reservation request is needed.

For existing IP flows, control passes to module 1646 from module 1640 of the packet classification component 1640. In module 1646, the packet is added to the IP flow queue, which is the queue for the current existing IP flow. In one embodiment, this can include preparation of a RRB. From module 1646, control passes to module 1662 of uplink flow scheduler 634. In one embodiment, this can include uplink of the RRB from CPE 294*d* to wireless base station 302.

For a new IP flow, control passes to module 1648 from module 1642 of the packet classification component 1606. In initialize IP flow module 1648, this new IP flow is initialized for presentation to module 1652. Module 1652 presents the IP data flow (in particular, the reservation request block data packet) to module 1662 of uplink flow scheduler 634. In module 1650, the QoS class for the IP flow is presented to scheduler 634, preferably by inclusion in a RRB.

7. Uplink Flow Scheduler

The exemplary logical flow diagram for the uplink flow scheduler 634 of FIG. 16B comprises IP flow QoS class queuing processor module 1662, MAC uplink subframe scheduler module 1666, hierarchical class-based priority processor module 1674, VPN DEN data table module 1672, SLA priority data table 1670, CPE IP flow queue depth status processor 1682 and link layer acknowledgment processor module 1678.

Uplink flow scheduler 634 of FIG. 16B also includes QoS class queues for class 1, 1664*a*; class 2, 1664*b*; class 3, 1664*c*; class 4, 1664*d*; class 5, 1664*e*; and class 6, 1664*f*; and MAC uplink subframes: frame n 1668*a*; frame n+1, 1668*b*; frame n+2, 1668*c*; frame n+3, 1668*d*, . . . frame n+p, 1668*k*.

In one embodiment, uplink flow scheduler 634 is physically located in wireless base station 302, although those skilled in the art will recognize that the same functionality can be located remotely from wireless base station 302. For example, in another embodiment, uplink flow scheduler 634 can be located at CPE station 294*d* and is in communication with other CPE stations 294 and the wireless base station 302.

Uplink flow scheduler 634 is used to schedule the uplink subframe. The entire frame is divided into an uplink portion (called an uplink subframe) for transmitting uplink frames, and a downlink portion (called a downlink subframe) for transmitting downlink frames.

Illustrated in FIG. 16B are WAP antenna 290*d*, the wireless medium, RF transceiver subscriber antenna 292*d*, subscriber CPE station 294*d* and subscriber workstation 120*d*. WAP 290*d* and RF transceiver subscriber antenna 292*d* respectively provide a wireless connection between wireless base station 302 (where uplink flow scheduler 634 resides in one embodiment) and subscriber CPE station 294*d*, which can transmit upstream an IP flow from an application running on client computer 120*d*. WAP 290*d* serves as a wireless gateway for data network 142, and RF transceiver subscriber antenna 292*d* serves as a wireless gateway for subscriber CPE station 294*d* to uplink the IP flow packet data.

Also illustrated in FIG. 16B is data interface 320, which provides a connection from uplink flow scheduler 634 for sending uplinked IP flow packets on to data router 140*d* of data network 142 and on to a destination host computer 136*a*. These connections are also illustrated in FIGS. 2D and 3B.

The previous frame includes an uplink reservation request which is received by the wireless base station from a subscriber CPE station 294*d*. At this point, the reservation request block has been identified, characterized, classified, and presented, preferably at the CPE station 294*d*, and has been transmitted to uplink flow scheduler 634 from uplink flow analyzer 632 at the CPE 294*d*. In particular, the reservation request block is presented to IP flow QoS class queuing processor module 1662 from module 1650. Module 1662 informs MAC uplink subframe scheduler 1666 of the reservation.

In turn, MAC uplink subframe scheduler 1666 uses a slot in the subframe to acknowledge receipt of the request called the acknowledgment request block (ARB). An exemplary slot used to convey the frame, slot, and IP flow identifier for this reservation is described with respect to FIG. 12. Scheduler 1666 transmits in this reservation slot the CPE identification data, along with which future slot(s) and frame(s) the requesting subscriber CPE station 294*d* is permitted to use for uplink of the requested data packet IP flow transmissions.

The future slot(s) in the future frame(s) are assigned, e.g., based on inputs from hierarchical class-based priority processor module 1674, VPN DEN data table 1672 and service level agreement (SLA) priority data table 1670. These components function in a similar manner to hierarchical class-based priority processor module 1574, VPN DEN data table 1572 and service level agreement (SLA) priority data table 1570, described with respect to the downlink flow scheduler 604.

When IP flow QoS class queuing processor module 1662 receives packets of an existing or new IP flow from IP flow presentation module 1608, it then creates class queues 1664a-1664f, which is a variable number of queues, and places the packets in these class queues. In a preferred embodiment there are between 3 and 10 classes. These queues hold reservation request packets for scheduling. Packets are placed in class queues 1664a-1664f according to the contents of the reservation request block for input to module 1662.

Module 1662 receives inputs from hierarchical class-based priority processor module 1674, VPN DEN data table 1672 and service level agreement (SLA) priority data table 1670. The queuing function of module 1662 is based on these inputs. These components function analogously to their counterparts in the downlink flow scheduling method. SLA priority data table 1670 and VPN DEN data table 1672 receive input from operations, administration, maintenance and provisioning (OAM&P) module 1108. OAM&P module 1108 provides updates to priorities when, e.g., a subscriber modifies its service level agreement or a VPN subscription is changed.

MAC uplink subframe scheduler 1666 takes the requests queued in class queues 1664a-1664f, and schedules reservations of slots in frames 1668a-1668k, which is a variable number of frames. In one embodiment, each frame is scheduled with up to a predetermined number limit or percentage limit of packets from each of the classes 1664a-1664f. The requests can be scheduled as shown in FIG. 13, taking into account certain priorities. In another embodiment, the frames are scheduled according to the inventive advanced reservation algorithm method for scheduling isochronous type traffic described with respect to FIG. 14. In yet another embodiment, the frames are scheduled according to a combination of known methods and the advanced reservation algorithm method of the present invention.

The reservation slot schedule can then be sent down to the CPE stations 294 using, e.g., FDB slots such as 1236g and 1236h of FIG. 12F. The uplink slots can then be inserted by CPE station 294d into the uplink subframe as scheduled. The frame slots are then transmitted up from CPE station 294d to wireless base station 302 and are then sent on as packets to their destination addresses. For example, from wireless base station 302 the packets can be transmitted over data network 142 to a host computer 136a.

After the uplink packets are received by the wireless base station 302, the wireless base station 302 sends an upstream acknowledgment data block (UAB) message back down to the transmitting subscriber CPE station 294d, to acknowledge receipt of the transmitted data packets.

Every once in a while, a packet is lost through noise or other interference in the wireless medium. When this situation arises, the subscriber CPE station 294d determines that it has not received a UAB data acknowledgment, so it sends a retransmit request requesting another uplink reservation slot to wireless base station 302 via WAP 290d, which transmits the request to link layer acknowledgment (ARQ) processor 1678. ARQ processor 1678 informs MAC uplink subframe scheduler 1666 of the need of retransmission (i.e. the need of a frame slot reservation for resending the uplink packet). CPE subscriber station 294d can also send to ARQ processor 1678, other data messages about nonreceipt of uplink transmission acknowledgments. The ARQ 1678 can forward such messages on to the uplink subframe scheduler 1666. The uplink subframe scheduler 1666 in turn reschedules the requested uplink reservation from the appropriate class queues 1664a-1664f. Alternatively, in another embodiment, link layer acknowledgment processor 1678 can also send a positive UAB acknowledgment to the subscriber CPE station 294d, to indicate that the data packets have been properly received. Thus uplink scheduler 1666 in addition to scheduling first time reservations, also can schedule repeat reservations for lost packets.

Each subscriber CPE station 294d has a limited amount of memory space available for queuing packets received from subscriber workstations 120d awaiting reservation slots of uplink from the CPE 294d to wireless base station 302. When, for example, the the queue of subscriber CPE station 294d becomes full from a backup of packets awaiting upstream reservations, IP data flows can potentially be lost, or packets may become stale. In this scenario, subscriber CPE station 294d transmits a CPE IP flow queue depth message 1680 to the wireless base station 302 indicating that the queue is filled up, which can be received by CPE IP flow queue depth status processor 1682. Processor 1682 can inform MAC uplink subframe scheduler 1666 of this condition, which can, e.g., increase temporarily the priority of IP flows at subscriber CPE station 294d to overcome the backlog or can, e.g., stop transmitting additional downlink packets to the CPE station 294d until the queue depth backlog is decreased to an acceptable level again. Processor 1682 can also send messages to MAC uplink subframe scheduler 1666 to flush reservation requests from the subscriber CPE station 294d in class queues 1664a-1664f.

4. TCP Adjunct Agent

TCP is a reliable transport protocol tuned to perform well in traditional networks where congestion is the primary cause of packet loss. However, networks with wireless links incur significant losses due to bit-errors. The wireless environment violates many assumptions made by TCP, causing degraded end-to-end performance. See for example, Balakrishnan, H., Seshan, S. and Katz, R. H., "Improving Reliable Transport and Handoff Performance in Cellular Wireless Networks," University of California at Berkeley, Berkeley, Calif., accessible over the Internet at URL, http://www.cs.berkeley.edu/~ss/papers/winet/html/winet.html, dealing more directly with handoffs and bit errors in a narrowband wireless environment, the contents of which are incorporated by reference. Attempts to address this problem have modified TCP in order to overcome it. However, this is not a commercially feasible means of overcoming this challenge. It is impracticable to implement any solution that requires a change to the standard operation of TCP.

The present invention uses an enhanced MAC layer which interfaces with a TCP adjunct agent to intercept TCP layer requests to manipulate the TCP layers at either a source or destination end of a transmission, to modify TCP behavior at the source and destination of the TCP/IP transmission which includes an intermediary wireless link. Packets can be queued at the wireless base station awaiting receipt acknowledgment and the base station can perform local retransmissions across the wireless link to overcome packet loss caused by high bit-error rates. Communication over wireless links is characterized by limited bandwidth, high latencies, sporadic high bit-error rates and temporary disconnections which must be dealt with by network protocols and applications.

Reliable transport protocols such as TCP have been tuned for traditional wired line networks. TCP performs very well on such networks by adapting to end-to-end delays and packet losses caused by congestion. TCP provides reliability by maintaining a running average of estimated round-trip delay and mean deviation, and by retransmitting any packet whose acknowledgment is not received within four times the deviation from the average. Due to the relatively low bit-error rates over wired networks, all packet losses are correctly assumed to be caused by congestion.

In the presence of the high bit-error rates characteristic of wireless environments, TCP reacts to packet losses as it would in the wired environment, i.e. it drops its transmission window size before retransmitting packets, initiates congestion control or avoidance mechanisms (e.g., slow start) and resets its retransmission timer. These measures result in an unnecessary reduction in the link's bandwidth utilization, thereby causing a significant degradation in performance in the form of poor throughput and very high interactive delays.

The present invention maintains packets in class queues awaiting acknowledgment of receipt from the subscriber CPE stations. Unacknowledged data slots can then be resent by having the wireless base station perform local retransmissions to the subscriber CPE station. By using duplicate acknowledgments to identify a packet loss and performing local retransmissions as soon as the loss is detected, the wireless base station can shield the sender from the inherently high bit error rate of the wireless link. In particular, transient situations of very low communication quality and temporary disconnectivity can be hidden from the sender.

For transfer of data from a CPE subscriber host to a wireless base station host, missing packets are detected at the wireless base station and negative acknowledgments can be generated for them. The negative acknowledgments can request that the packet be resent from the CPE subscriber host (the sender). The CPE subscriber host can then process the negative acknowledgment and retransmit corresponding missing packets. Advantageously, no modifications to the sender TCP or receiver TCP is necessary, since the present invention places TCP aware functionality in the MAC layer.

Figure 5A:
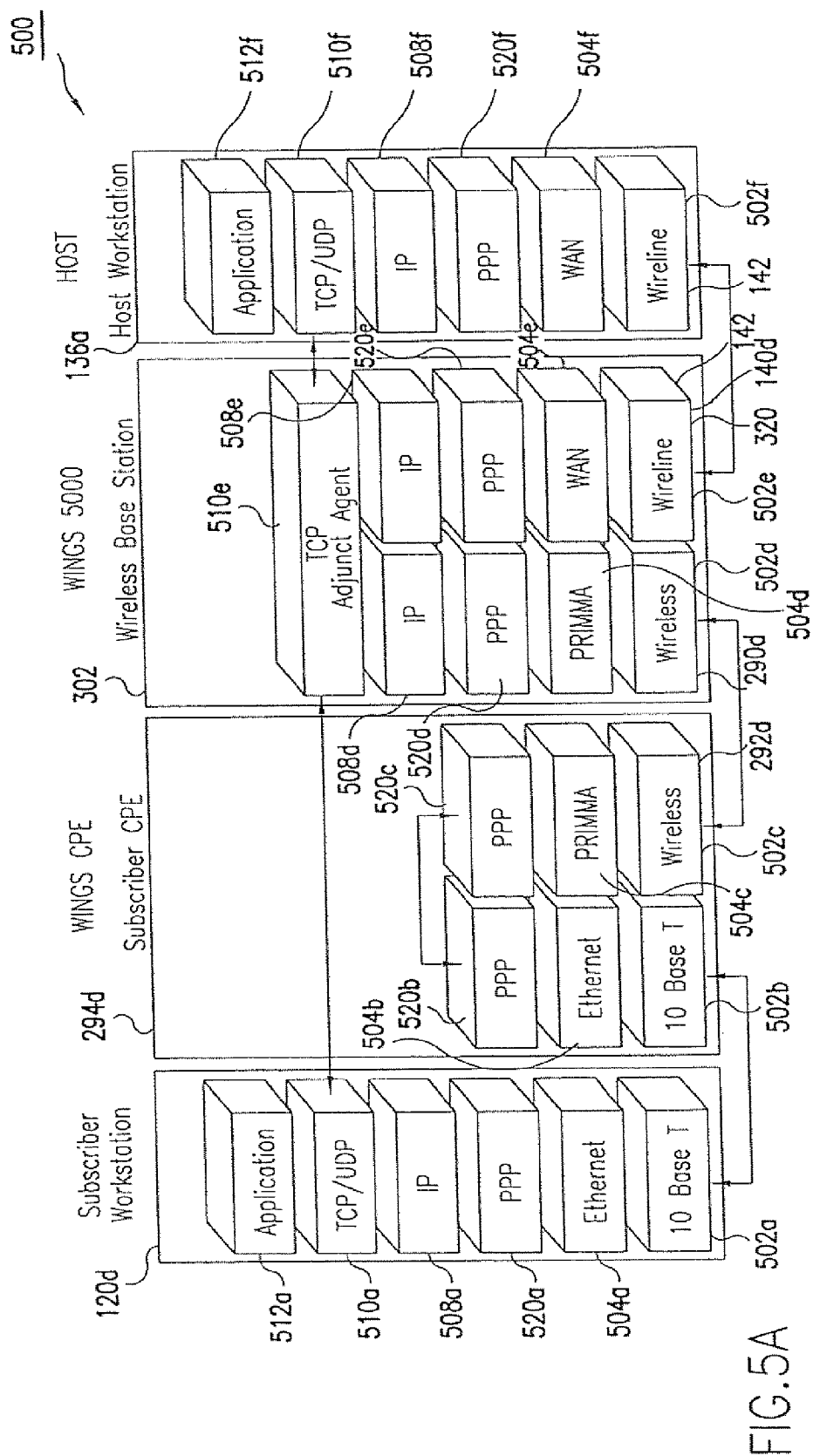
FIG. 5A depicts Internet protocol flows from a subscriber host to a wireless base station, and through a wireline connection to a destination host.

FIG. 5A illustrates flow 500 depicting IP flows from a source TCP at a subscriber host, down a protocol stack for transmission through a CPE subscriber station, through a wireless medium to a wireless base station, up and through a protocol stack at the wireless base station having an example TCP adjunct agent, then through a wireline connection and through a protocol stack to a destination host. The adjunct TCP agent modifies operation of a TCP sliding window algorithm at the transmitting TCP and in cooperation with proactive reservation-based intelligent multi-media access technology (PRIMMA) media access control (MAC) enables local retransmission over the wireless medium in accord with the present invention.

Specifically, flow 500 illustrates IP packet flow from subscriber workstation 120*d*, through CPE subscriber station 294*d* at CPE subscriber location 306*d*, then over a wireless transmission medium to wireless base station 302, and eventually over a wireline link over data network 142 to host workstation 136*a*.

TCP adjunct agent 510*e* makes sure transport is reliable by modifying operation of the TCP sliding window algorithm at the transmitting TCP in a manner that optimizes the window for the wireless medium. TCP adjunct agent 510*e* advantageously is transparent to industry standard protocols as agent 510*e* does not require modification of the standard TCP/UDP layer of client subscriber workstation 120*d* or host workstation 136*a*.

Flow 500 includes IP flows from application layer 512*a*, down the protocol stack through TCP/UDP layer 510*a*, through IP layer 508*a*, then through point-to-point (PPP) layer 520*a*, then through data link Ethernet layer 504*a*, then through 10 BaseT Ethernet network interface card (NIC) physical layer 502*a*, over a wire line connection to 10 BaseT Ethernet NIC physical layer 502*b* of subscriber CPE 294*d*.

Subscriber CPE 294*d* flows packets coming in from NIC 502*b*, back up its protocol stack through Ethernet layer 502*b*, through PPP layers 520*b* and 520*c*, back down through PRIMMA MAC 504*c* to wireless physical layer 502*c* including antenna 292*d*, then over the wireless medium to antenna 290*d* of wireless base station 302.

Wireless base station 302 flows packet IP flows up from antenna 290*d* at physical layer 502*d* through PRIMMA MAC layer 504*d*, through PPP layer 520*a*, through IP layer 508*d* to TCP adjunct agent 510*e*, which can flow IP flows down through IP layer 508*e*, through PPP layer 520*e*, through wide area network (WAN) layer 504*e*, through wireline physical layer 502*e*, through interface 320, over routers 140*d*, through data network 142, via wireline connections to wireline layer 502*f* of WAN host workstation 136*a*.

Host workstation 136*a* flows IP flows from wireline layer 502*f*, up through its protocol stack through WAN layer 504*f*, through PPP layer 520*f*, through IP layer 508*f*, to TCP/UDP layer 510*f* and on to application layer 512*f*.

TCP/UDP layers 510*a* and 510*f* act to provide such transport functions as, e.g.,segmentation, managing a transmission window, resequencing, and requesting retransmission of lost packet flows. Normally TCP layers 510*a* and 510*f* would send a window of packets and then await acknowledgment or requests for retransmission. A TCP sliding window algorithm is normally used to vary the transmission flow to provide optimized transport and to back off when congestion is detected by receipt of requests for retransmission. Unfortunately in the wireless environment, due to high bit error rates, not all packets may reach the destination address, not because of congestion, but rather because of high bit error rates, so as to prompt a retransmission request from the destination IP host to the source. Rather than slow transport, TCP adjunct agent 510*e* modifies operation of the TCP sliding window algorithm to optimize operation over wireless. PRIMMA MAC layer 504*d* interacts with TCP adjunct agent 510*e* permitting the agent to intercept, e.g., retransmission requests, from TCP layer 510*a* of subscriber workstation 120*d* intended for host 136*a*, and allowing the wireless base station to retransmit the desired packets or flows to subscriber workstation 120*d* rather than forwarding on the retransmission request to host 136*a*, since the packets could still be stored in the queue of PRIMMA 504*d* and would not be discarded until an acknowledgment of receipt is received from the subscriber CPE. Since retransmission can be performed according to the present invention at the PRIMMA MAC data link layer, i.e. layer 2, retransmission can occur from the base station to the CPE subscriber, rather than requiring a retransmission from all the way over at the transmitting source TCP which would cause TCP to backoff its sliding window algorithm. Thus, by having wireless base station 302 retransmit until receipt is acknowledged over the wireless link, the inherently high bit error rate can be overcome, while maintaining an optimal TCP window.

Recall, a TCP transmitter transmits a TCP sliding window block of packets and alters the size of the window upon detection of congestion. The TCP transmitter transports a block of packets in a window, and then awaits acknowledgment from the receiver. If transmission is going smoothly, i.e. no congestion or lost packets occur, then the transmitter TCP ramps up the transmission rate. This increased transmission rate continues until the transmitting TCP detects congestion or packet loss. When notified of congestion, the transmitting TCP stops transmitting, backs off and sends a smaller block (i.e. a smaller window) of packets.

TCP adjunct agent modifies normal TCP operation by tricking the transmitting TCP and its transmitting window algorithm. The TCP adjunct agent prevents the transmitter from being notified of loss, i.e. receiving congestion notification, from the receiving TCP by, e.g., preventing duplicate retransmission requests. Since the transmitting TCP does not receive such notification, it does not modify the TCP sliding window and transmission continues at the higher rate.

In the event that real congestion occurs, i.e. if the TCP adjunct agent recognizes packets really were lost, then the TCP adjunct agent can let the retransmission request go through to the transmitting TCP. This is advantageously accomplished because the MAC link layer of the present invention is in communication with the higher protocol layers, it is application aware, transport aware and network aware. In this case, because the MAC layer is transport layer aware, PRIMMA MAC layer 504d communicates with the TCP adjunct agent 510e at layer 4. Since the MAC requires acknowledgment of receipt of wireless transmissions sent to the CPE subscriber station 294d for every packet sent from the wireless base station 302, the MAC layer 504d knows whether an inter-TCP layer communication, e.g., a request for retransmission, is sent from a client computer TCP at the CPE station is created because the lost packet was lost in wireless transmission, or because of real congestion.

If PRIMMA MAC 504d does not receive an acknowledgment from 504c, then the PRIMMA MAC 504d of wireless base station 302 can retransmit the contents of the lost packet to the subscriber CPE station 294d. If the PRIMMA MAC 504c of the subscriber CPE station 294d acknowledges receipt and still requests a retransmission, then real congestion could have occurred and the PRIMMA MAC 504d of the wireless base station 302 can let the TCP adjunct agent 510e know that it should allow the retransmission request to be sent to the transmitting TCP 510f of host workstation 136a.

Thus, TCP adjunct agent 510e of the present invention can modify operation of the TCP sliding window algorithm in a manner that is optimal for the wireless medium, without requiring any change to commercially available TCP layers 510a and 510f at the receiver and sender hosts. In an embodiment, TCP adjunct agent 510e obviates the need for any modification of the TCP layers at either the sending (i.e. transmitting) host or client. In another embodiment the host and client TCP layers are unaware of the modification of operation by the TCP adjunct agent, i.e. it is transparent to source and destination TCP layers. In another embodiment, TCP adjunct agent 510e intercepts retransmission requests between a TCP layer of the client computer coupled to the subscriber CPE station and the TCP layer of the host workstation coupled to the data network.

Figure 5B:
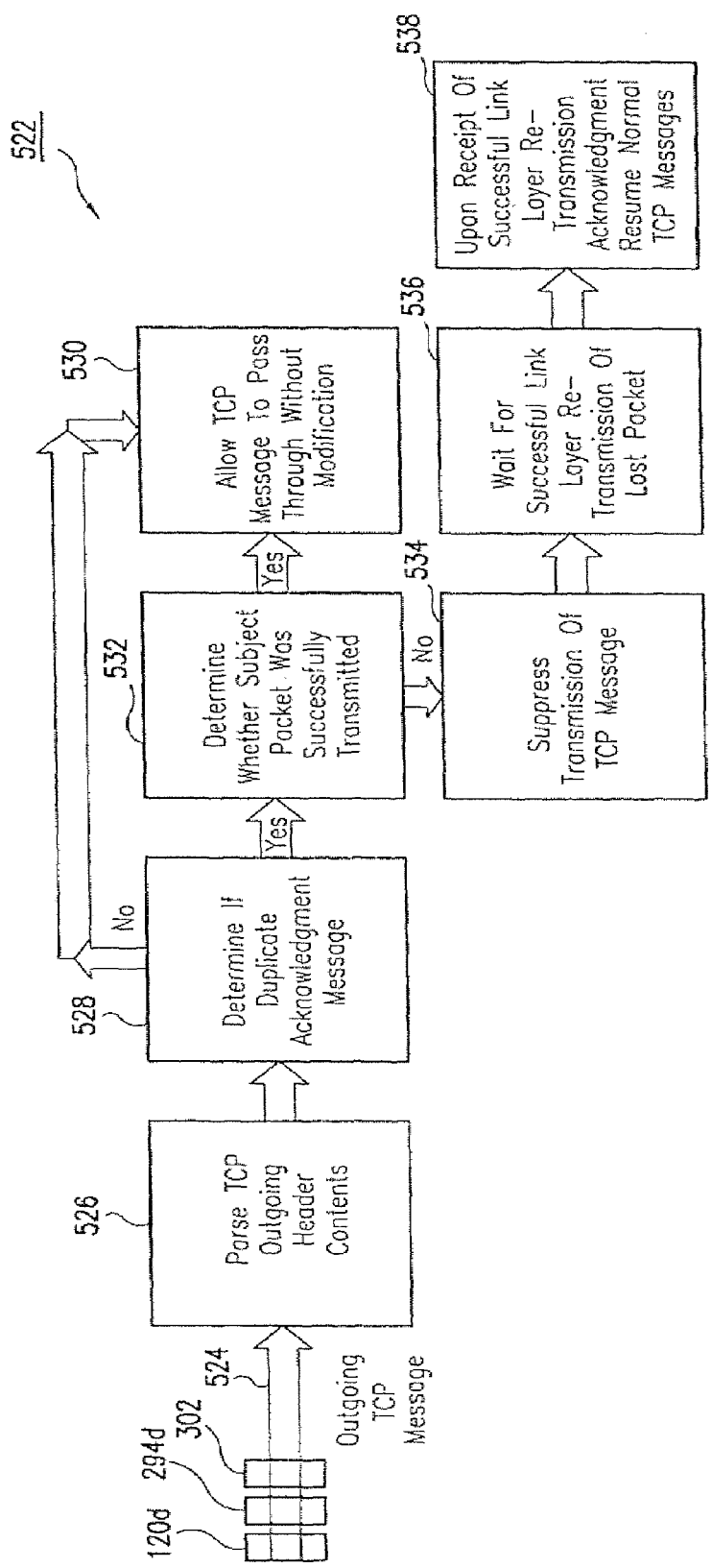
FIG. 5B illustrates a functional flow diagram including an example functional description of a transmission control protocol adjunct agent performing an outgoing transmission control protocol spoof function.

FIG. 5B illustrates functional flow diagram 522 including an example functional description of TCP adjunct agent 510e performing an outgoing TCP spoof function. Referring to FIG. 5B and 5A, diagram 522 assumes that a TCP layer 510f at a transmitting host 136a has transmitted a windowful of packet data to subscriber workstation 120d, and awaits acknowledgment. Diagram 522 illustrates receipt of an outgoing TCP message 524 in TCP adjunct agent 510e at wireless base station 302 which has been sent from subscriber workstation 120d via subscriber CPE station 294d.

In step 526, the TCP header contents of outgoing TCP message 524 is parsed in order to reveal the contents of the message being sent from subscriber workstation 120d through the wireless network toward the transmitting host 136a.

In step 528, it is determined whether the TCP header contents includes a duplicate acknowledgment message from the CPE station. Receiving a duplicate acknowledgment request from the CPE subscriber location could be indicative of a lost message in the wireless medium, or a real congestion problem. If in step 528 the TCP packet is determined to be a duplicate acknowledgment message, then processing can continue with step 532, if not, then processing can continue with step 530.

In step 530, it is determined that there was real congestion, i.e., this was not a duplicate acknowledgment message caused by retransmission attempts at the wireless link layer. Thus, in step 530, the TCP message is permitted to pass through TCP adjunct 510e without modification, and can continue through flow 500 to TCP layer 510f of FIG. 5A.

In step 532, since there was a duplicate acknowledgment detected in step 528, it is determined whether the packet was successfully transmitted, or not. Step 532 is performed via intercommunication between TCP adjunct agent 510e and PRIMMA MAC layer 504d. This is an example of the interactivity between PRIMMA MAC and higher layer protocols illustrated as line 428 in FIG. 4. PRIMMA MAC layer 504d can identify whether a packet was successfully sent from wireless base station 302 to CPE station 294d since, as illustrated in FIG. 15B, requests for retransmission 1576 are received from CPE station 294d at link layer acknowledgment (ARQ) processor 1578 to MAC downlink subframe scheduler 1566 alerting the scheduler 1566 to retransmit the lost packet in a future frame 1568. If in step 532, it is determined that the packet was successfully transmitted, then processing can continue with step 530, as described above. If however it is determined that the packet was not successfully transmitted, then processing continues with step 534.

In step 534, since the packet was not successfully transmitted, TCP adjunct agent 510e can suppress transmission of TCP message 524 since it can be assumed that the packet was lost in the wireless medium. Processing can continue with step 536.

In step 536, TCP adjunct agent 510e can wait for notification from PRIMMA MAC 504d that a successful link layer retransmission of the lost packet was received at link layer acknowledgment processor 1578. From step 536, processing can continue with step 538.

In step 538, upon receipt of acknowledgment of a successful PRIMMA MAC 504d link layer retransmission, then normal TCP messages can be resumed.

In another step (not shown), TCP adjunct agent and PRIMMA MAC layers can set a limit of a threshold number of retransmission attempts, and if that threshold is reached, then processing can continue with step 530 to permit the TCP message to pass without modification.

Figure 5C:
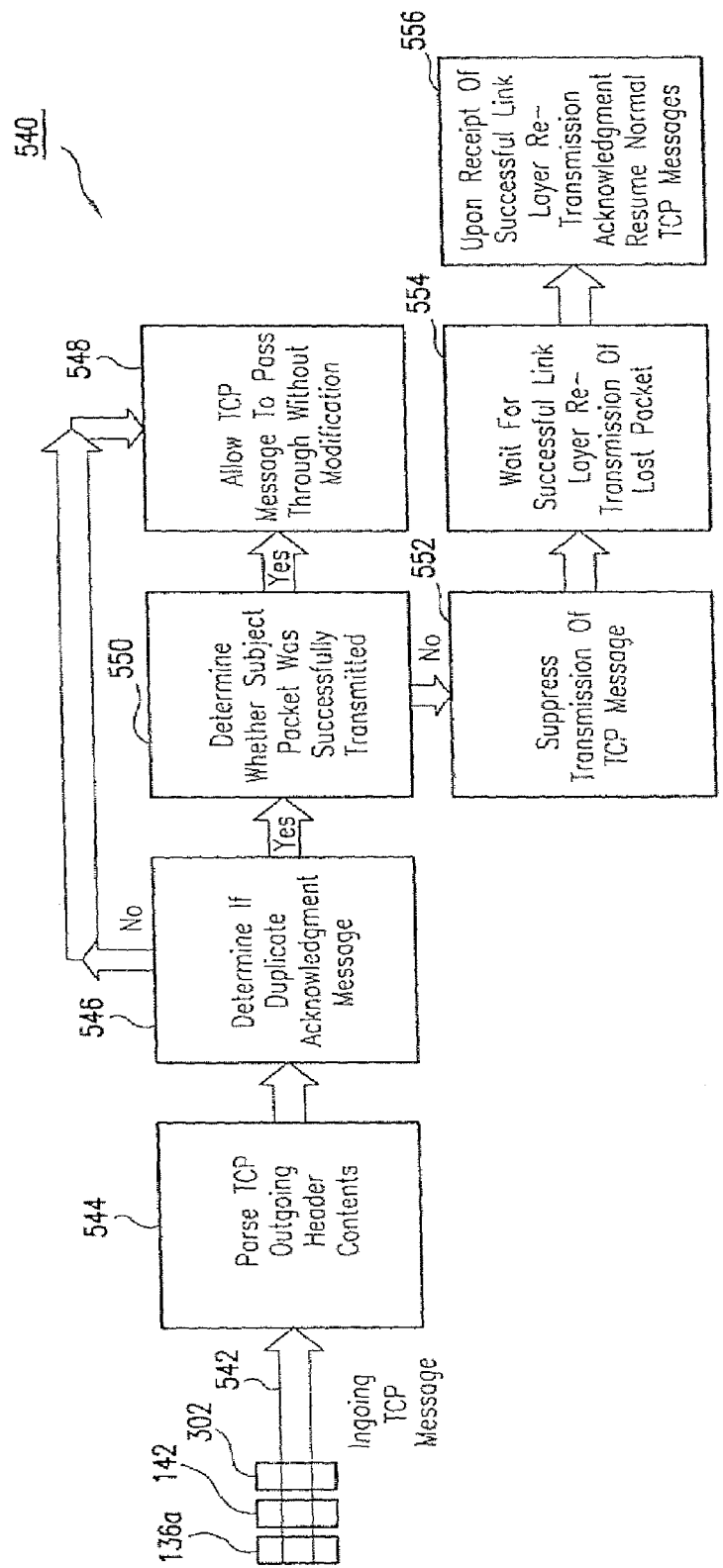
FIG. 5C illustrates a functional flow diagram including an exemplary functional description of a transmission control protocol adjunct agent performing an incoming transmission control protocol spoof function.

FIG. 5C illustrates functional flow diagram 540 including an example functional description of TCP adjunct agent 510e performing an incoming TCP spoof function. Referring to FIG. 15C and 5A, diagram 540 assumes that a TCP layer 510a at a transmitting subscriber workstation 120d has transmitted a windowful of packet data to host 136a, and awaits acknowledgment. Diagram 544 illustrates receipt of an incoming TCP message 542 in TCP adjunct agent 510e at wireless base station 302 which has been sent from host workstation 136a via data network 142 for transmission over the wireless medium to subscriber CPE 294d to subscriber workstation 120d.

In step 544, the TCP header contents of ingoing TCP message 542 is parsed in order to reveal the contents of the message being sent from host 136a through the wireless network toward the transmitting subscriber workstation 120d.

In step 546, it is determined whether the TCP header contents includes a duplicate acknowledgment message from host 136a. Receiving a duplicate acknowledgment request from the host could be indicative of a lost message in the wireless medium, or a real congestion problem. If in step 546 the TCP packet is determined to be a duplicate acknowledgment message, then processing can continue with step 550, if not, then processing can continue with step 548.

In step 548, it is determined that there was real congestion, i.e., this was not a duplicate acknowledgment message caused by retransmission attempts at the wireless link layer. Thus, in step 548, the TCP message is permitted to pass through TCP adjunct 510e without modification, and can continue through flow 500 to TCP layer 510a of FIG. 5A.

In step 550, since there was a duplicate acknowledgment detected in step 546, it can be determined whether the packet was successfully transmitted, or not. Step 550 can be performed via intercommunication between TCP adjunct agent 510e and PRIMMA MAC layer 504d. This is an example of the interactivity between PRIMMA MAC and higher layer protocols illustrated as line 428 in FIG. 4. PRIMMA MAC layer 504d can identify whether a packet was successfully sent from CPE station 294d to wireless base station 302, as illustrated in FIG. 16B, requests for retransmission 1676 are received from CPE station 294d at link layer acknowledgment (ARQ) processor 1678 to MAC downlink subframe scheduler 1666 alerting the scheduler 1666 to retransmit the lost packet in a future frame 1668. If in step 550, it is determined that the packet was successfully transmitted, then processing can continue with step 548, as described above. If however it is determined that the packet was not successfully transmitted, then processing continues with step 552.

In step 552, since the packet was not successfully transmitted, TCP adjunct agent 510e can suppress transmission of TCP message 542 since it can be assumed that the packet was lost in the wireless medium. Processing can continue with step 554.

In step 554, TCP adjunct agent 510e can wait for notification from PRIMMA MAC 504d that a successful link layer retransmission of the lost packet was received at link layer acknowledgment processor 1678. From step 554, processing can continue with step 556.

In step 556, upon receipt of acknowledgment of a successful PRIMMA MAC 504d link layer retransmission, then normal TCP messages can be resumed.

In another step (not shown), TCP adjunct agent and PRIMMA MAC layers can set a limit of a threshold number of retransmission attempts, and if that threshold is reached, then processing can continue with step 548 to permit the TCP message to pass without modification.

5. Wireless QoS Aware PRIMMA Media Access Control (MAC) Hardware Architecture

Figure 10:
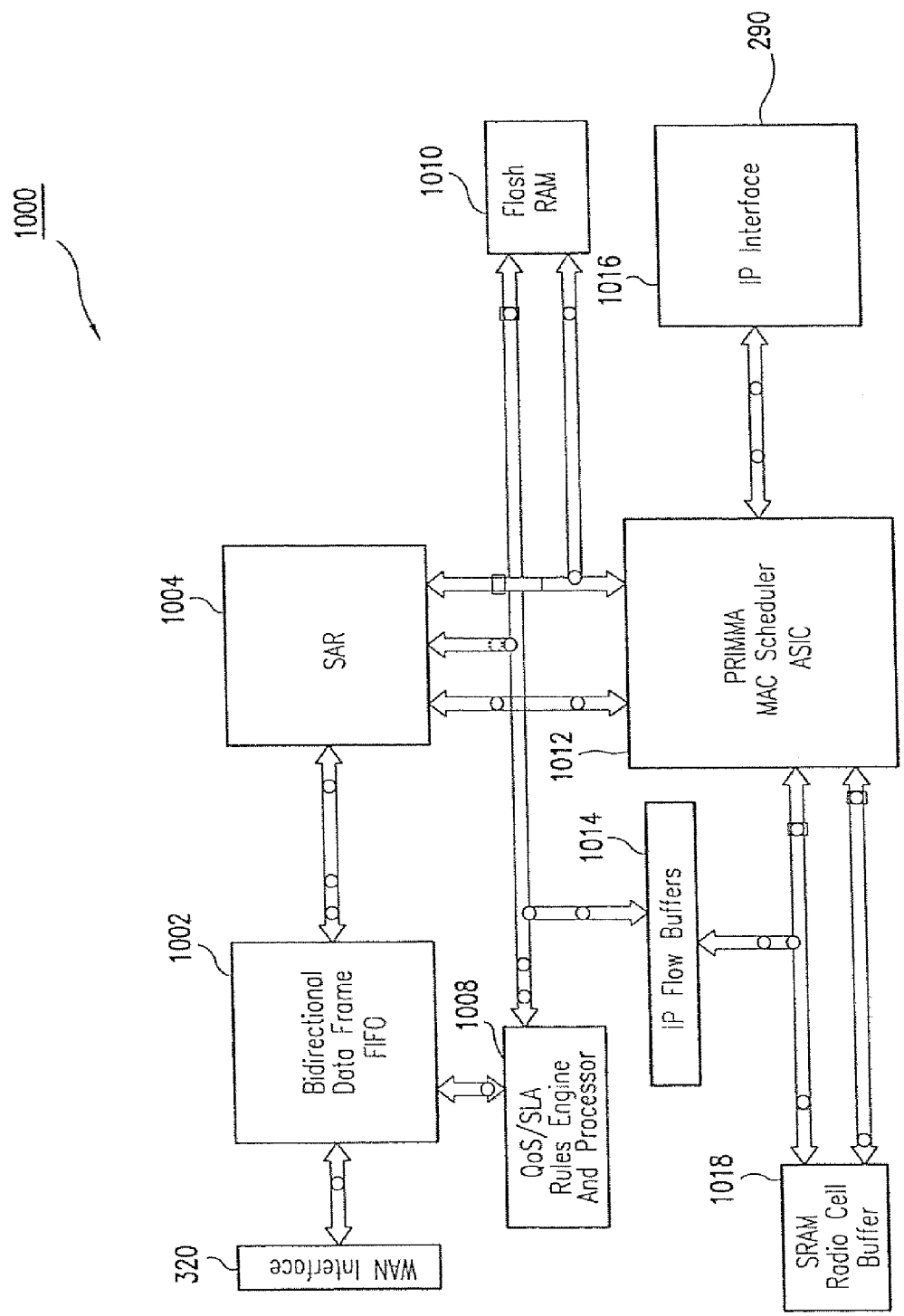
FIG. 10 depicts an embodiment of an inventive media access control hardware architecture.

FIG. 10 illustratively depicts an embodiment of PRIMMA MAC hardware architecture 1000. Architecture 1000 shows data network 142 coupled by a wireline bidirectional connection to WAN interface 320.

WAN interface 320 is bidirectionally linked to a bidirectional data frame FIFO 1002 which is bidirectionally coupled to both segmentation and resequencing (SAR) 1004 and QoS/SLA rules engine and processor 1008.

QoS/SLA rules engine and processor 1008 is also bidirectionally coupled to IP flow buffers 1014 and flash random access memory (RAM) 1010.

SAR 1004 is bidirectionally coupled to IP flow buffers 1014, flash RAM 1010, QoS/SLA rules engine and processor 1008 and PRIMA MAC scheduler ASIC 1012.

PRIMA MAC scheduler ASIC 1012 is also bidirectionally coupled to an RF interface 290, a static RAM (SRAM) radio cell buffer 1018 and IP blow buffer 1014.

6. Wireless Base Station Software Organization

Figure 11:
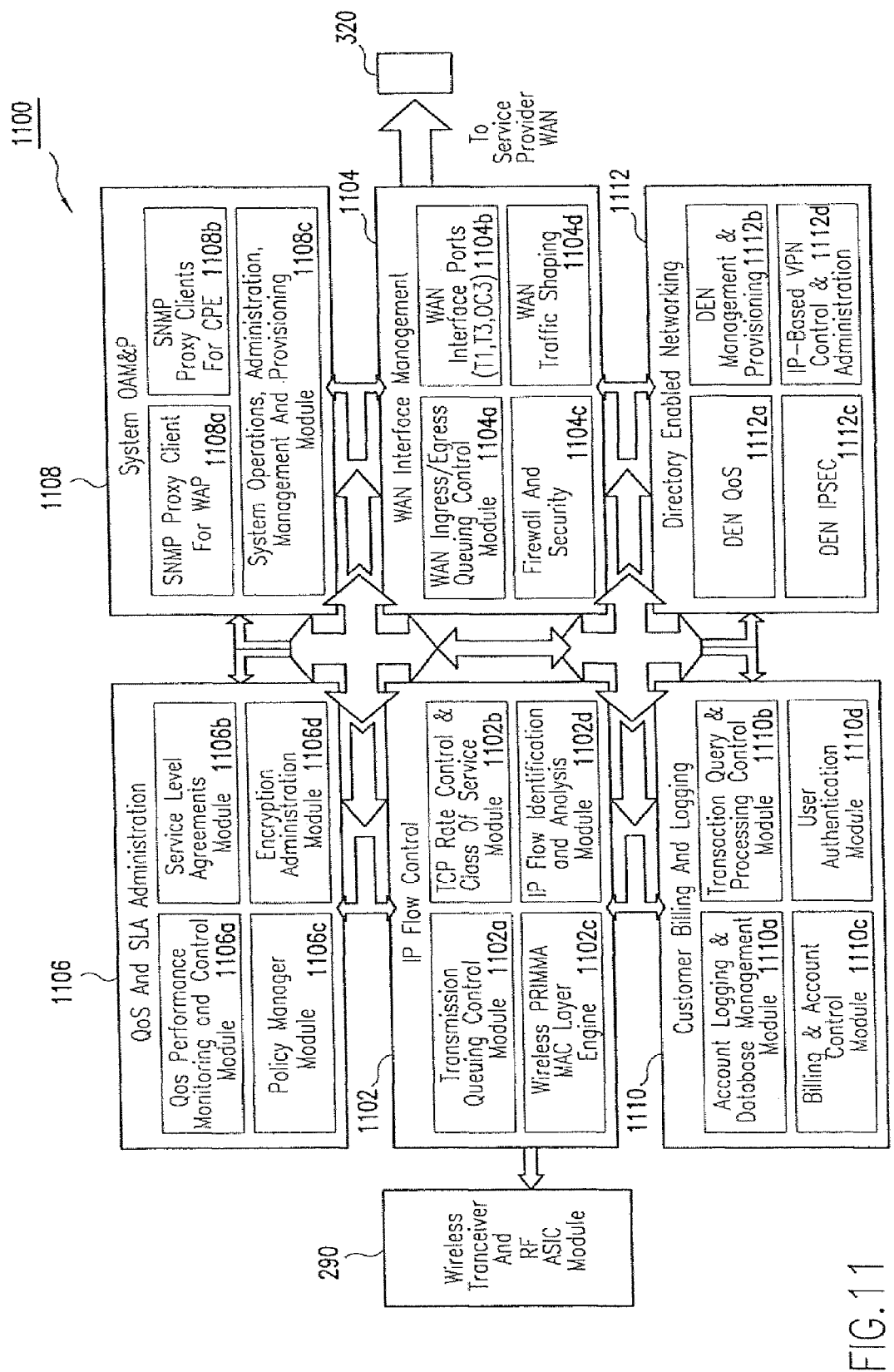
FIG. 11 is an exemplary software organization for a packet-centric wireless point to multi-point telecommunications system.

FIG. 11 is an exemplary software organization for a packet-centric wireless point to multi-point telecommunications system. The software organization of FIG. 11 includes wireless transceiver and RF application specific integrated circuit (ASIC) module 290, IP flow control component 1102, WAN interface management component 1104, QoS and SLA administration component 1106, system and OAM&P component 1108, customer billing and logging component 1110, directory enabled networking (DEN) component 1112, and wireless base station 320.

IP flow control module 1102 includes transmission queuing control module 1102a, TCP rate control and class of service module 1102b, wireless PRIMMA MAC layer engine 1102c and IP flow identification and analysis module 1102d.

WAN interface management component 1104 includes WAN ingress/egress queuing control module 1104a, WAN interface ports (e.g., for T1, T3, OC3 ports) 1104b, firewall and security module 1104c, and WAN traffic shaping module 1104d.

The IP Flow control component 1102 and WAN interface management component 1104 represent the "core" of the system, where the packet processing, MAC layer scheduling, TCP proxy agent, and WAN I/F control functions are located. Much of the activities of the "non-core" components described above support and control these core components.

QoS and SLA administration component 1106 includes includes QoS performance monitoring and control module 1106a, service level agreements module 1106b, policy manager module 1106c and encryption administration module 1106d.

The QoS and SLA administration component 1106 provides the static data needed by the system in order to properly group particular IP-flows into QoS classes. Typically, during the provisioning phase of installing the system, the service provider will (remotely) download pertinent information about the subscriber CPE station 294, including the subscriber CPE stations's SLA, any policy-based information (such as hours of operation or peak data transmission rate allowance.). Encryption keys or "strengths" can also be downloaded, which may be subscriber CPE station or service provider specific.

System OAM&P component 1108 includes SNMP proxy client for WAP module 1108a, SNMP proxy clients for CPE module 1108b, and system operations, administration, management and provisioning module 1108c.

The OAM&P component 1108 allows remote service personnel and equipment to monitor, control, service, modify and repair the system. System performance levels can be automatically monitored, and system traps and traces can be set. Subscriber complaints can be addressed with the use of remote test and debug services controlled by OAM&P component 1108. System capacity limits can be monitored, and proactive provisioning of additional WAN connectivity can occur, as the result of automatic trend analysis functions in OAM&P component 1108.

Customer billing and logging module 1110 includes account logging and database management module 1110*a*, transaction query and processing control module 1110*b*, billing and account control module 111*c*, and user authentication module 1110*d*.

The customer billing and logging component 1110 allows the service provider to receive account, billing and transaction information pertaining to subscribers in the system. For service providers who bill on the basis of usage, cumulative system resource utilization data can be gathered. For specific types of activities (eg. video conferencing, multi-casting, etc.) there may be special billing data that is collected and transmitted to the service provider. This component also controls the availability of the system to subscribers through the operation of the subscriber authentication function. Once a subscriber is authorized to use the system, a new subscriber authentication entry is made (remotely) by the service provider. Likewise, a subscriber can be denied further access to the system for delinquent payment for services, or for other reasons. The service provider can also remotely query the system for specific account-related transactions.

Directory Enabled Networking (DEN) component 1112 includes DEN QoS 1112*a* module, DEN management and provisioning 1112*b* module, DEN IPSEC module 1112*c* and IP-based VPN control and administration module 1112*d*.

The DEN component 1112 allows the service provider the means to input into the system relevant information regarding the operation of DEN-based VPN's of subscribers. Subscriber VPNs need to be "initialized" and "provisioned" so that the system properly allocates system resources to subscribers with these VPNs, and provides for the recognition and operation of these VPNs. Data from DEN component 1112 are utilized by the system to apply the appropriate priorities to IP-flows of the subject subscribers.

The invention's packet-centric wireless base station supports directory enabled networking (DEN), a MICROSOFT, INTEL and CISCO standard for providing a standard structure for how distributed sites manage IP flows. The present invention prioritizes VPN traffic in a lightweight directory access protocol (LDAP)-compliant (LDAP is available from MICROSOFT of Redmond, Wash.) manner which allows remote administration, provisioning and management. The present invention is also LDAP version 2 compliant. The present invention also complies with the X.500 standard promulgated by the international telecommunications union/ telecommunications section (ITU/T), and with the RFC 1777.

In one embodiment, DEN provides policy-based network management, IPsec compatible network security, and IPsec based VPNs. The DEN of the wireless base station 302 is planned to be common information model (CIM) 3.0 compatible (once the specification is finalized). The wireless base station 302 can provide native DEN support and supports directory based DEN QoS mechanisms including reservation model (i.e. RSVP, per-flow queuing), and precedence/priority/differentiated model (i.e. packet marking). Wireless base station 302 can plan support of DEN network policy QoS, and until DEN is complete, can support internal QoS and network extensions.

6. IPsec Support

IPsec is introduced above with reference to FIG. 4. IPsec provides a standard method of encrypting packets. In VPN tunnel mode, an entire header can be encoded, i.e. encrypted. In order for the present invention to be able to implement its packet-centric, QoS aware prioritization, during identification of a packet/IP flow, the wireless base station needs to be able to analyze the contents of header fields of the packets. Therefore, analysis of unencrypted packets is desirable.

The present invention already encrypts the data stream prior to transmitting frames over the wireless medium, so IPsec does not really need to be used over the wireless link to provide for encrypted transmission. Where a service provider finds it desirable to use IPsec, IPsec can be used for authentication and secure encapsulation of the header and payload, or just the payload data. IPsec is normally integrated at a firewall. If a service provider desires to implement the present invention and IPsec, then the present invention should be implemented behind the firewall, i.e. the firewall can be moved to the wireless base station. This permits ending the IPsec stream at the base station which can provide the base station access to packet header fields.

Figure 17:
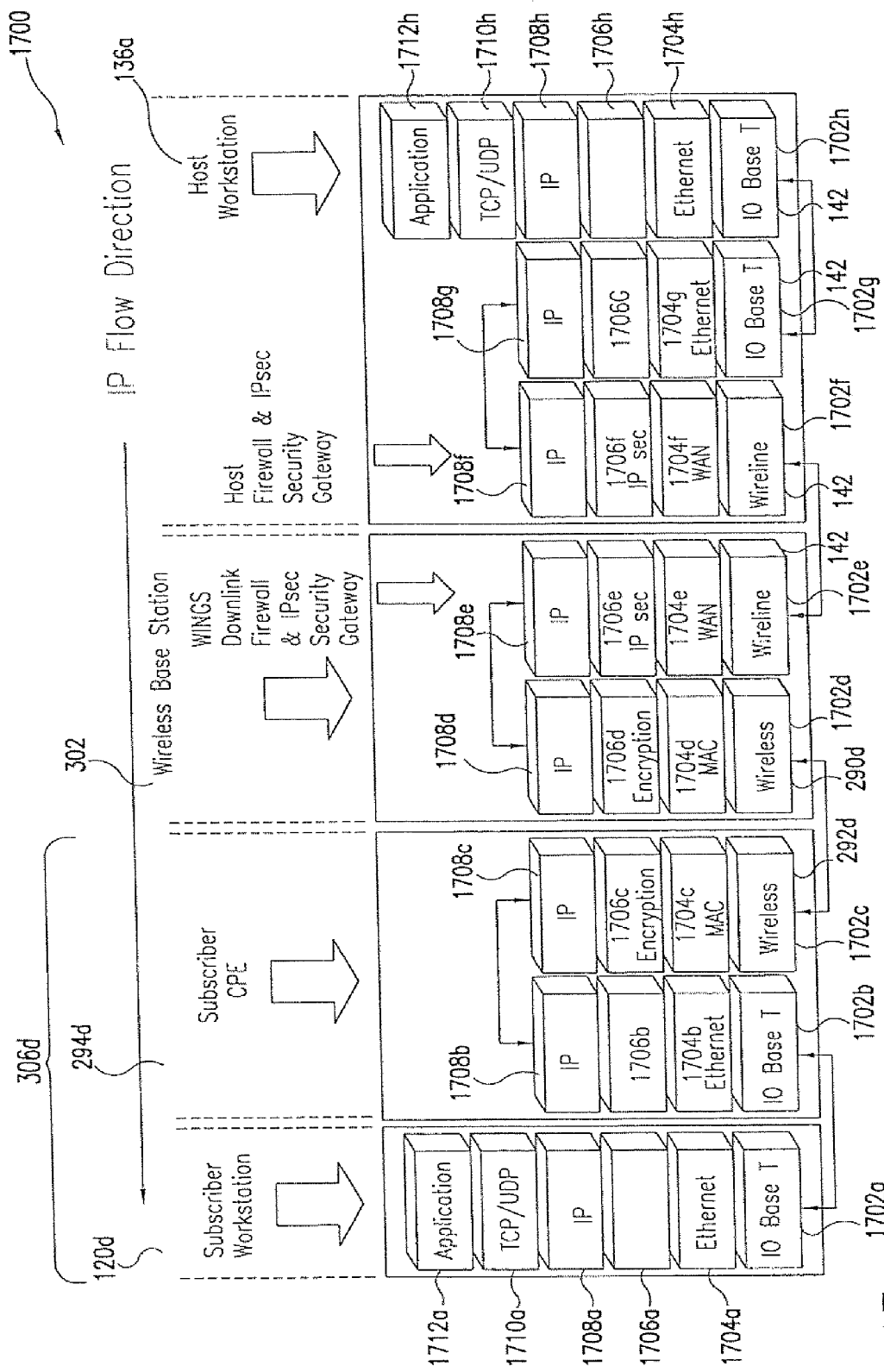
FIG. 17 illustrates Internet protocol flow in a downlink direction, including Internet protocol security encryption.
Figure 18:
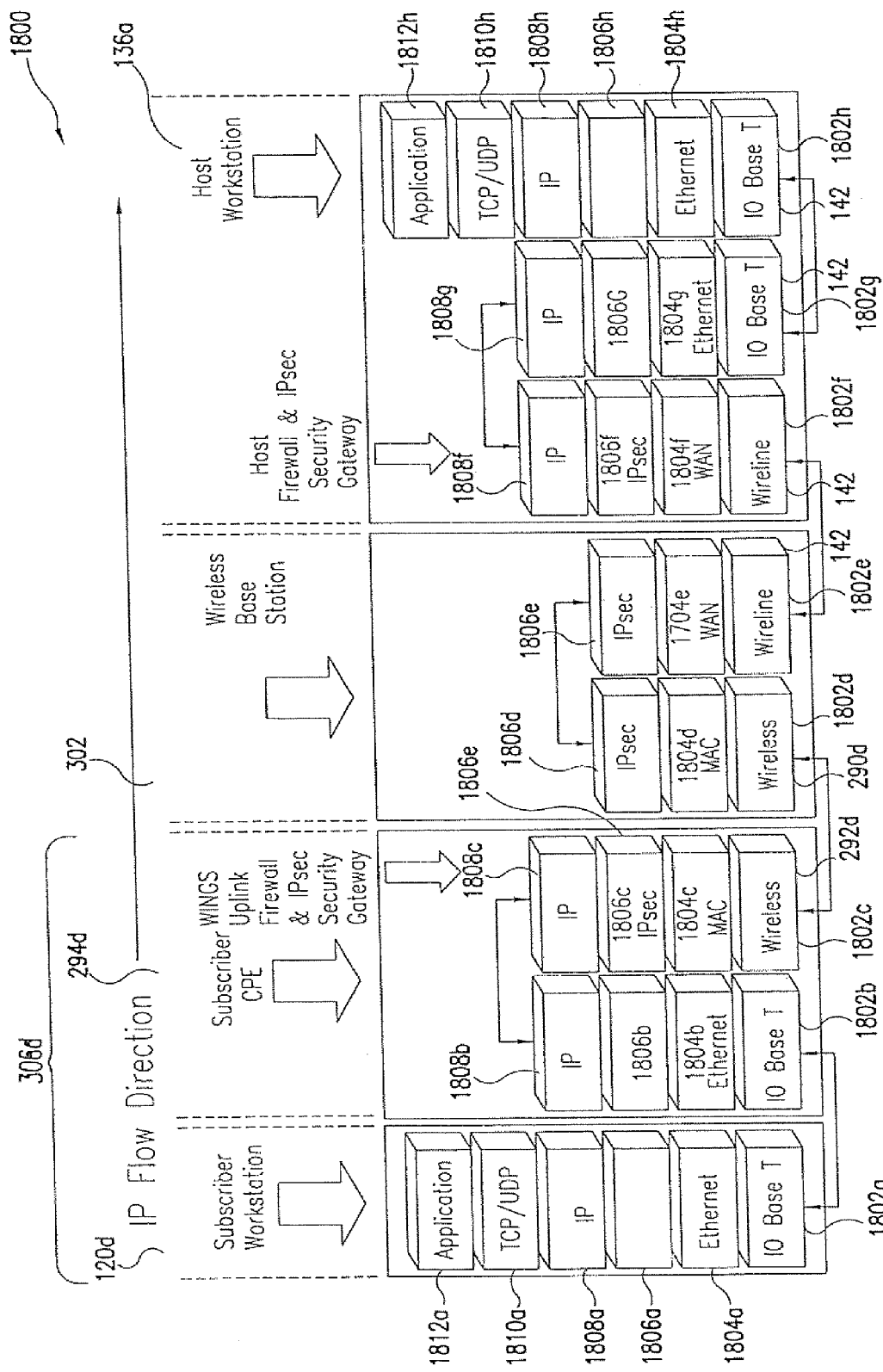
FIG. 18 illustrates an uplink direction of Internet protocol security support.

FIG. 17 illustrates IP flow in the downlink direction including IPsec encryption. Similarly, FIG. 18 illustratively depicts an uplink direction of IPsec support of the present invention.

FIG. 17 illustrates downlink flow 1700 depicting downlink direction IP flows from a source host workstation 136*a*, down a protocol stack which supports IPsec, for transmission up and through wireless base station 302 which is coupled to data network 142, through encryption layers, then through the wireless link to subscriber CPE 294*d*, up and through a protocol stack at the subscriber CPE 294*d*, then through a wireline connection to data network 142 and up through the protocol stack to the destination subscriber workstation 120*d* at subscriber location 306*d*.

Specifically, flow 1700 illustrates IP packet flow from host workstation 136*a*, through wireless base station 302, then over a wireless transmission link to subscriber CPE 294*d*, and over a wireline link to subscriber workstation 120*d*.

Host workstation 136*a* flows IP flows down from application layer 1712*h*, down through TCP/UDP layer 1705*h*, through IP layer 1708*h*, through optional PPP layer 1706*h*, through Ethernet layer 1705*h*, down through 10BaseT layer 1702*h*, over data network 142 to 10BaseT layer 1702*g*, then up through Ethernet 1704*g*, up its protocol stack through optional PPP layer 1706*g* to IP layer 1708*g* and 1708*h*, back down through Internet firewall and IPsec security gateway 1706*f*, down through WAN layer 1704*f*, to wireline layer 1702*f* to data network 142 to wireline physical layer 1702*e*.

Wireline physical layer 1702*e* of wireless base station 302, flows IP flows up the protocol stack through WAN layer 1704*e* through IPsec security gateway 1706*e* and firewall to IP network layer 1708*e* and 1708*d* and then down through encryption layer 1706*d*, PRIMMA MAC layer 1704*d* and down to wireless link to subscriber CPE 294*d*.

Subscriber CPE 294*d* flows packet IP flows up from antenna 292*d* at physical wireless layer 1702*c* up through MAC layer 1704*c*, through encryption layer 1706*c*, through IP layers 1708*b* and 1708*c*, then down through optional layer 1706*b* to Ethernet layer 1704*b* to 10BaseT connection 1702*b* to 10BaseT connection.

Subscriber workstation 120*d* flows IP flows up from 10BaseT layer 1702*a* up through its protocol stack through Ethernet layer 1704*a*, through optional PPP layer 1706*a*, through IP layer 1708*a*, to TCP/UDP layer 1710*a* and on up to application layer 1712*a*.

FIG. 18 illustrates uplink flow 1800 depicting uplink direction IP flows from a source TCP at subscriber workstation 120*d* at CPE location 306*d*, down a protocol stack for transmission through Ethernet coupled CPE subscriber station 294d through wireless medium to wireless base station 302, up and through a protocol stack at the wireless base station 302 which supports IPsec, then through a wireline connection to data network 142 and through a protocol stack to a destination host.

Specifically, flow 1800 illustrates IP packet flow from subscriber workstation 120d, through subscriber CPE 294d, then over a wireless transmission medium to wireless base station 302, and eventually over a wireline link to host workstation 136a.

Flow 1800 includes IP flows from application layer 1812a, down the protocol stack through TCP/UDP layer 1810a, through IP layer 1808a, then through optional point-to-point (PPP) layer 1806a, then through data link Ethernet layer 1804a, then through 10BaseT Ethernet network interface card (NIC) physical layer 1802a, over a wire line connection to 10BaseT Ethernet NIC physical layer 1802b of subscriber CPE 294d.

Subscriber CPE 294d flows packets coming in from NIC 1802b, back up its protocol stack through Ethernet layer 1804b, through optional PPP layer 1806b to IP layer 1808b and 1808c, back down through an Internet firewall and IPsec security gateway 1806c, down through PRIMMA MAC 1804c to wireless physical layer 1802c including antenna 292d, then over the wireless medium, such as, e.g., RF communication, cable RE, and satellite link, to antenna 290d of wireless base station 302 at wireless physical layer 1802d.

Wireless base station 302 flows packet IP flows up from antenna 290d at physical wireless layer 1802d up through MAC layer 1804d, through IPsec layers 1806d and 1806d, which can encapsulate packets and encrypt them. From IPsec layer 1806e, IP flows can flow down through WAN layer 1804e and through wireline physical layer 1802e over data network 142.

Wireline physical layer 1802f flows IP flows up the protocol stack through WAN layer 1804f through IPsec security gateway 1806f and firewall to IP network layer 1808f and 1808g and then down through optional PPP layer 1806h, Ethernet layer 1804h and down through 10BaseT layer 1802g, through interface 320, over routers 140d, through data network 142, via wireline connections to 10BaseT physical layer 1802h of host workstation 136a.

Host workstation 136a flows IP flows up from 10BaseT layer 1802h up through its protocol stack through Ethernet layer 1805h, through optional PPP layer 1806h, through IP layer 1808h, to TCP/UDP layer 1810h and on to application layer 1812h.

IV. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for IP flow classification grouping IP flows in a packet-centric wireless point to multi-point telecommunications system, said method comprising:
   analyzing an Internet Protocol (IP) flow in a packet-centric manner;
   classifying said IP flow; and
   scheduling said IP flow for transmission over a shared wireless bandwidth between a wireless base station and at least one subscriber customer premises equipment (CPE) station, including
   allocating said shared wireless bandwidth to communication of said IP flow between said wireless base station and a subscriber CPE station, so as to optimize end-user quality of service (QoS) associated with said IP flow.

2. The method according to claim 1, further comprising:
   dynamically allocating said shared wireless bandwidth to communication between said wireless base station and said subscriber CPE station.

3. The method according to claim 2, further comprising:
   allocating said shared wireless bandwidth on a frame basis.

4. The method according to claim 3, further comprising:
   allocating a frame of said shared wireless bandwidth in an uplink direction from said subscriber CPE station to said wireless base station.

5. The method according to claim 3, further comprising:
   allocating a frame of said shared wireless bandwidth in a downlink direction from said wireless base station to said subscriber CPE station.

6. The method according to claim 2, further comprising:
   allocating said shared wireless bandwidth on a subframe within a frame basis.

7. The method according to claim 6, further comprising:
   allocating a subframe of said shared wireless bandwidth in an uplink direction from said subscriber CPE station to said wireless base station.

8. The method according to claim 6, further comprising:
   allocating a subframe of said shared wireless bandwidth in a downlink direction from said wireless base station to said subscriber CPE station.

9. The method according to claim 2, further comprising:
   allocating said shared wireless bandwidth on a slot within a frame basis.

10. The method according to claim 9, further comprising:
    allocating a slot of said shared wireless bandwidth in an uplink direction from said CPE station to said wireless base station.

11. The method according to claim 9, further comprising:
    allocating a slot of said shared wireless bandwidth in a downlink direction from said wireless base station to said subscriber CPE station.

12. The method according to claim 2, further comprising:
    allocating said shared wireless bandwidth on a subslot within a frame basis.

13. The method according to claim 12, further comprising:
    allocating a subslot of said shared wireless bandwidth in an uplink direction from said subscriber CPE station to said wireless base station.

14. The method according to claim 12, further comprising:
    allocating a subslot of said shared wireless bandwidth in a downlink direction from said wireless base station to said subscriber CPE station.

15. The method according to claim 6, further comprising:
    allocating said shared wireless bandwidth to one or more control packets.

16. The method according to claim 15, further comprising at least one of:
    allocating a downstream acknowledgment slot;
    allocating a reservation request slot;
    allocating an operations data slot;

allocating an upstream acknowledgment slot;
allocating an acknowledgment request slot;
allocating a frame descriptor slot; and
allocating a command and control slot.

17. The method according to claim 2, further comprising:
allocating said shared wireless bandwidth to one or more data packets.

18. The method according to claim 17, further comprising at least one of:
allocating said shared wireless bandwidth in an uplink direction; and
allocating said shared wireless bandwidth in a downlink direction.

19. The method according to claim 1, further comprising:
allocating shared wireless bandwidth to said subscriber CPE station so as to optimize end-user internet protocol (IP) quality of service (QoS).

20. The method according to claim 18, further comprising at least one of:
identifying said IP flow;
characterizing said IP flow;
storing said IP flow; and
prioritizing said IP flow.

21. The method according to claim 20, wherein said identifying step comprises:
analyzing a packet of said IP flow so as to determine whether said packet of said IP flow is associated with a new IP flow or an existing IP flow;
prioritizing said packet of said IP flow after characterizing said IP flow and classifying said IP flow, if said packet is determined to be associated with said new IP flow; and
prioritizing said packet of said IP flow without characterizing said IP flow, and without classifying said IP flow, if said packet is determined to be associated with said existing IP flow.

22. The method according to claim 21, wherein said analyzing step comprises:
buffering said packet of said IP flow;
extracting information from at least one of a packet header field and a packet payload field of said packet of said IP flow; and
analyzing said information from said packet.

23. The method according to claim 21, further comprising:
determining whether a version of said packet is Internet Protocol version IPv.4 or IPv.6; and
parsing said packet accordingly.

24. The method according to claim 22, further comprising:
determining a source application type of said packet.

25. The method according to claim 24, further comprising at least one of:
storing a source application for a source address from a source application packet header table;
retrieving said source application for said source address from said source application packet header table;
determining a source application from a type of service (TOS) packet header field; and
determining a source application from a differentiated services (DiffServ) packet header field.

26. The method according to claim 21, further comprising at least one of:
storing an identifier of said IP flow to an IP flow identification data table; and
retrieving said identifier of said IP flow from said IP flow identification data table.

27. The method according to claim 20, further comprising at least one of:
determining whether an age of a packet is older than a threshold age;
anticipating client application IP flow discards based on said age of said packet exceeding said threshold age;
determining a QoS requirement for said IP flow; and
determining a subscriber identification for said subscriber CPE station associated with said IP flow.

28. The method according to claim 27, further comprising:
analyzing a time to live (TTL) packet header field for determining said age of said packet.

29. The method according to claim 27, further comprising:
determining a QoS requirement for said IP flow.

30. The method according to claim 27, further comprising:
determining a QoS requirement for said IP flow based on at least one of:
a source address;
a destination address; and
a UDP port number.

31. The method according to claim 20, further comprising:
buffering a packet of said IP flow in accordance with an existing IP flow for subsequent prioritizing, if said packet of said IP flow is identified as associated with said existing IP flow.

32. The method according to claim 20, further comprising:
classifying a packet of said LIP flow into a QoS class grouping.

33. The method according to claim 32, further comprising:
determining and taking into account said QoS class groupings when scheduling communication of said IP flow.

34. The method according to claim 33, further comprising:
determining and taking into account any optional differentiated services (DiffServ) field priority marking for said IP flow when scheduling communication of said IP flow.

35. The method according to claim 33, further comprising:
determining and taking into account any optional type of service (TOS) field priority marking for said IP flow when scheduling said IP flow.

36. The method according to claim 20, further comprising:
determining and taking into account hierarchical class based priorities (HCBPs) for said IP flow when scheduling said IP flow.

37. The method according to claim 20, further comprising:
determining and taking into account virtual private network (VPN) priorities for said IP flow when scheduling said IP flow.

38. The method according to claim 20, further comprising:
determining and taking into account service level agreement (SLA) based priorities for said IP flow when scheduling said IP flow.

39. The method according to claim 20, further comprising:
determining and taking into account any type of service (TOS) priorities for said IP flow when scheduling said IP flow.

40. The method according to claim 20, further comprising:
determining and taking into account any differentiated services (DiffServ) priorities for said IP flow when scheduling said IP flow.

41. The method according to claim 38, further comprising the step of:
prioritizing said IP flow based on priorities of a service level agreement (SLA) for SLA subscribers.

42. The method according to claim 41, further comprising the step of:
analyzing said SLA for said IP flow.

43. The method according to claim 42, further comprising the step of:
prioritizing said IP flow based on one or more subscriber-defined parameters.

44. The method according to claim 41, further comprising:
prioritizing based on a premium service level;
prioritizing based on a normal service level; and
prioritizing based on a value service level.

45. The method according to claim 1, wherein the method comprises:
assigning future slots of a transmission frame to a data packet in the transmission frame for transmission over said shared wireless medium, further comprising:
applying an advanced reservation algorithm to schedule transmission of said IP flow;
reserving a first slot in a future transmission frame based on said advanced reservation algorithm, for a first data packet of said IP flow; and
reserving a second slot in a subsequent transmission frame subsequent in time to said future transmission frame based on said advanced reservation algorithm, for a second data packet of said IP flow, wherein said second data packet of said IP flow is placed in said second slot of said subsequent transmission frame in an isochronous manner to the placing of said first data packet in said first slot of said future transmission frame.

46. The method according to claim 45, wherein there is a periodic variation between the placing of said first data packet in said first slot and the placing of second data packet in said second slot.

47. The method according to claim 45, wherein there is an aperiodic variation between the placing of said first data packet in said first slot and the placing of said second data packet in said second slot.

48. The method according to claim 45, wherein said advanced reservation algorithm determines whether said IP flow is jitter-sensitive.

49. The method according to claim 6, wherein the method comprises providing isochronous data packets in a telecommunications system, said telecommunications system comprising: said wireless base station coupled to a first data network; one or more host workstations coupled to said first data network; one or more of said subscriber CPE stations in wireless communication with said wireless base station over said shared wireless bandwidth using a packet-centric protocol; and one or more subscriber workstations coupled to each of said one or more subscriber CPE stations over a second network; resource allocation means optimizing end-user IP quality of service (QoS) and allocating said shared wireless bandwidth among said one or more subscriber CPE stations, the method comprising:
applying an advanced reservation algorithm to scheduling of an IP flow;
reserving succeeding slots in one or more succeeding future transmission frames of said IP flow in an isochronous manner based on said advanced reservation algorithm.

50. The method according to claim 49, wherein there is a periodic variation between said successive reserving of said succeeding slots.

51. The method according to claim 49, wherein there is no periodic variation between the successive reserving of said succeeding slots.

52. The method according to claim 49, wherein said advanced reservation algorithm determines whether said IP flow is jitter-sensitive.

53. The method according to claim 40, wherein the method comprises: integrating differentiated services (DiffServ) marked IP-Flows into quality of service (QoS) priorities in a wireless point to multi-point (PtMP) transmission system, said wireless point to multi-point (PtMP) transmission system comprising:
said wireless base station coupled to a first data network,
one or more host workstations coupled to said first data network,
one or more subscriber CPE stations in wireless communication with said wireless base station over said shared wireless bandwidth using a packet-centric protocol,
one or more subscriber workstations coupled to each of said one or more subscriber CPE stations over a second network, and
a resource allocator that allocates said shared wireless bandwidth among said one or more subscriber CPE stations in communication with said wireless base station, the method comprising the steps of:
analyzing said IP flow for a differentiated services (DiffServ) marking; and
scheduling said IP flow taking into account any said DiffServ marking.

54. The method according to claim 53, wherein said IP flow comprises at least one of:
a TCP/IP flow; and
a UDP/IP flow.

55. The method according to claim 53, wherein said analyzing step comprises:
identifying said IP flow having said Diff Serv marking;
characterizing said IP flow having said Diff Serv marking; and
classifying said IP flow having said Diff Serv marking.

56. The method according to claim 53, wherein said scheduling step comprises:
prioritizing said IP flow taking into account any said DiffServ marking and other IP priority header identification information.

57. The method according to claim 56, wherein said prioritizing step comprises a weighted fair priorities (WFP).

58. The method according to claim 57, wherein said prioritizing step comprises at least one of:
prioritizing based on an IP flow hierarchical class based priority;
prioritizing based on a service level agreement (SLA) class priority;
prioritizing based on a virtual private network (VPN) subscription; and prioritizing based on a virtual private network (VPN) subscription class priority.

59. The method according to claim 55, wherein said identifying step comprises at least one of the steps of:
analyzing one or more packet header fields in said IP flow; and
distinguishing between a new and an existing IP flow.

60. The method according to claim 59, wherein said analyzing one or more packet header fields step comprises at least one of:
buffering packets of a plurality of IP flows;
extracting identification information from said packet header fields of each of said packets; and
analyzing said identification information from said packet header fields.

61. The method according to claim 60, wherein said extracting step comprises at least one step of:
determining whether said packets are a packet version IPv.4 or IPv.6; and
parsing said packet header fields of said plurality of IP flows.

62. The method according to claim 61, wherein said analyzing step comprises the step of:
determining a source application type.

63. The method according to claim 61, wherein said analyzing step comprises the step of:
taking into account any said differentiated service (Diff Serv) field priority marking.

64. The method according to claim 63, wherein said DiffServ field priority marking is compatible with Internet Engineering Task Force (IETF) RFC 2474.

65. The method according to claim 63, wherein said Diff Serv field priority marking is compatible with IETF RFC 2475.

66. The method according to claim 55, wherein said classifying step comprises the step of:
associating a packet of said IP flow with an existing IP flow.

67. The method according to claim 55, wherein said classifying step comprises the step of:
grouping a packet of a new IP flow into a QoS priority class.

68. The method according to claim 67, wherein said grouping step comprises the step of:
taking into account any said DiffServ marking for said IP flow.

69. The method according to claim 56, wherein said prioritizing step comprises the step of:
taking into account any said DiffServ marking for said IP flow.

70. The method according to claim 37, further comprising a scheduling method for use in a packet-centric wireless point to multi-point telecommunications system, said telecommunications system comprising:
said wireless base station coupled to a first data network;
one or more host workstations coupled to said first data network;
one or more of said subscriber customer premise equipment (CPE) stations in wireless communication with said wireless base station over said shared wireless bandwidth using a packet-centric protocol; and
one or more subscriber workstations coupled to each of said one or more subscriber CPE stations over a second network;
resource allocation means optimizing end-user internet protocol (IP) quality of service (QoS) and allocating shared wireless bandwidth among said subscriber CPE stations;
means for analyzing and scheduling said IP flow over said shared wireless bandwidth, wherein the scheduling method comprises the steps of:
prioritizing said IP flow based on priorities of a virtual private network (VPN).

71. The method according to claim 70, further comprising the step of:
analyzing said priorities of said VPN for said IP flow.

72. The method according to claim 71, further comprising the step of:
prioritizing any VPN IP flows.

73. The method according to claim 71, further comprising the step of:
prioritizing said W flow based on one or more subscriber-defined parameters.

74. The method according to claim 70, wherein said VPN comprises a directory enabled networking (DEN) table management scheme.

75. The method according to claim 74, wherein said VPN DEN is common information model (CIM) 3.0 compatible.

76. The method according to claim 70, wherein said VPN is implemented using a point-to-point tunneling protocol (PPTP).

77. The method according to claim 70, wherein said VPN is implemented using internet protocol security (IPSec) protocol.

78. The method according to claim 10, wherein said allocating step comprises:
allocating said slot of said shared wireless bandwidth in an uplink direction based on reservation requests from said subscriber CPE station to said wireless base station.

79. The method according to claim 19, wherein said allocating said shared wireless bandwidth in an uplink direction step comprises:
allocating said shared wireless bandwidth in an uplink direction based on reservation requests.

80. The method according to claim 2, wherein the step of dynamically allocating said shared wireless bandwidth includes a time domain multiple access/time division duplex (TDMA/TDD) media access control (MAC) telecommunications access method, further comprising the steps of:
(a) accessing IP flow control information from one or more dynamically allocatable control slots that provide said IP flow control information over said shared wireless bandwidth between said wireless base station and one or more of said subscriber CPE stations; and
(b) accessing IP flow data information being transmitted in one or more dynamically allocatable data slots that provide said IP flow data information over said shared wireless bandwidth between said wireless base station and said one or more subscriber CPE stations.

81. The method according to claim 80, wherein step (a) comprises the steps of at least one of:
communicating a downstream acknowledgment;
communicating a reservation request;
communicating an operations data slot;
communicating an upstream acknowledgment slot;
communicating an acknowledgment request slot;
communicating a frame descriptor slot; and
communicating a command and control slot.

82. The method according to claim 80, further comprising the steps of:
communicating said IP flow data information in said dynamically allocatable data slots for transmission in an uplink direction from said subscriber CPE station to said wireless base station; and
communicating said IP flow data information in said dynamically allocatable data slots for transmission in a downlink direction from said wireless base station to said subscriber CPE station.

83. The method according to claim 82, further comprising the step of:
dynamically allocating said shared wireless bandwidth between a downlink subframe and an uplink subframe.

84. The method according to claim 83, further comprising the steps of:
scheduling multiple slots in said downlink subframe for said subscriber CPE station for a single internet protocol (IP) flow.

85. The method according to claim 83, further comprising the steps of:
scheduling multiple slots in said downlink subframe for said subscriber CPE station for a plurality of internet protocol (IP) flows.

86. The method according to claim 83, comprising the steps of:
scheduling multiple slots in said uplink subframe for said subscriber CPE station for a single internet protocol (IP) flow.

87. The method according to claim 83, further comprising the steps of:
scheduling multiple slots in said uplink subframe for said subscriber CPE station for a plurality of internet protocol (IP) flows.

88. The method according to claim 83, further comprising the steps of:
dynamically allocating one or more reservation request contention slots for addressing contentions between reservation requests for available uplink subframe slots between said wireless base station and said subscriber CPE station.

89. The method according to claim 88, further comprising the steps of:
dynamically allocating said contention slots according to the frequency of detected collisions between said reservation requests.

90. The method according to claim 83, further comprising:
transmitting one or more reservation slots in said downlink subframe defining where said subscriber CPE station requesting a reservation will place uplink data.

91. The method according to claim 82, wherein said steps of communicating said IP flow information use a time domain multiple access/time division duplex (TDMA/TDD) transmission media access control (MAC) access method.

92. The method according to claim 82, wherein said steps of communicating said IP flow information use a frequency division multiple access (FDMA) access method.

93. The method according to claim 82, wherein said steps of communicating said IP flow information use a code-division multiple access (CDMA) access method.

94. The method according to claim 80, wherein step (a) comprises the steps of at least one of:
communicating a downstream acknowledgment;
communicating an operations data slot;
communicating an upstream acknowledgment slot;
communicating an acknowledgment request slot; and
communicating a frame descriptor slot.

95. The method of claim 83, wherein said step of dynamically allocating a bandwidth further comprises:
analyzing and scheduling said IP flow over said shared wireless bandwidth comprising:
identifying said IP flow;
characterizing said IP flow;
classifying said IP flow; and
prioritizing said IP flow.

96. The method according to claim 1 comprising a step of:
preventing operation of a transmission control protocol (TCP) sliding window algorithm that controls a TCP transmission rate in a wireless point to multi-point (PtMP) transmission system by:
ensuring that transport of a packet over a wireless telecommunications link occurs reliably so as to guarantee enduser quality of service (QoS); and
preventing operation of a TCP sliding window algorithm taking into account application awareness if transport is not occurring reliably over said wireless telecommunications link in order to maintain a TCP transmission rate.

97. The method of claim 96, wherein said ensuring step comprises the steps of:
awaiting acknowledgment of wireless transmission of said packet at a link layer over said wireless telecommunications link; and
retransmitting at said link layer an unacknowledged lost packet.

98. The method according to claim 97, wherein said link layer is a packet-centric QoS aware media access control (MAC) layer.

99. The method of claim 96, wherein said preventing step comprises the step of:
suppressing transmission of a TCP layer communication that would cause said TCP sliding window algorithm to modify said TCP transmission rate.

100. The method of claim 99, wherein said suppressing step comprises the step of:
preventing a source TCP from retransmitting said packet.

101. The method of claim 99, wherein said suppressing step comprises the step of:
avoiding modification of a source TCP layer and a destination TCP layer.

102. The method of claim 101, wherein said source and destination TCP layers are unaware of operation modification.

103. The method of claim 99, wherein said suppressing step comprises the step of:
intercepting retransmission requests between a destination TCP layer of a subscriber workstation coupled to said subscriber CPE station which is in wireless communication with said wireless base station, and a source TCP layer of a host workstation coupled to said wireless base station.

104. The method of claim 99, further comprising a step of:
detecting real congestion and permitting transmission of a TCP layer communication that would cause said TCP sliding window algorithm to modify said TCP transmission rate if real congestion is detected.

105. The method of claim 104, wherein said detecting step comprises determining from said link layer whether said wireless transmission of said packet was acknowledged.

106. The method of claim 96, wherein said ensuring step comprises the steps of:
- awaiting at a TCP adjunct an acknowledgment of wireless transmission of said packet over said wireless telecommunications link; and
- retransmitting a lost packet if said acknowledgment is not received at said TCP adjunct before a threshold time period.

107. The method according to claim 106, wherein said TCP adjunct is operative
- to deliver end user QoS and is application aware.

108. A computer program product embodied on a computer readable medium for IP flow classification grouping IP flows in a packet-centric wireless point to multi-point telecommunications system, the computer program product comprising:
- means for enabling a processor to analyze an Internet Protocol (IP) flow in a packet-centric manner;
- means for enabling the processor to classify said IP flow; and
- means for enabling the processor to schedule said IP flow for transmission over a shared wireless bandwidth between a wireless base station and at least one subscriber customer premises equipment (CPE) station, including
- means for enabling the processor to allocate said shared wireless bandwidth to communication of said IP flow between said wireless base station and a subscriber CPE station, so as to optimize end-user quality of service (QoS) associated with said IP flow.

109. A method for scheduling packets comprising:
- classifying a plurality of packets according to end-user quality of service (QoS) requirements of said plurality of packets; and
- scheduling said plurality of packets for communication in at least one of an upstream direction and a downstream direction over a shared wireless bandwidth according to a scheduling algorithm.

110. The method according to claim 109, wherein at least one of said classifying step and said scheduling step is performed at a customer premises equipment device (CPE) station.

111. The method according to claim 109, wherein at least one of said classifying step and said scheduling step is performed at a wireless base station.

112. The method according to claim 109, wherein at least one of said classifying step and said scheduling step is performed by a packet scheduler, wherein said packet scheduler is executed on at least one of a base station and a customer premises equipment (CPE) station.

113. The method according to claim 109, wherein at least one of said classifying step and said scheduling step is performed at an access point (AP) base station.

114. The method according to claim 109, further comprising:
- communicating said end-user QoS requirements between a customer premises equipment station (STA) and an access point (AP).

115. The method according to claim 109, further comprising:
- controlling packet scheduler behavior according to said end-user QoS requirements as managed by a network management system.

116. The method according to claim 109, further comprising:
- constructing a wireless transmission frame from said plurality of packets taking into account said end-user quality of service (QoS) requirements so as to maximize wireless bandwidth utilization.

117. The method according to claim 116, wherein said constructing step comprises:
- placement of at least one of a packet, a portion of a packet, an IP flow, and a portion of an IP flow into said wireless transmission frame.

118. The method according to claim 109, further comprising:
- communicating said end-user QoS requirements between a station (STA) and an access point (AP).

119. The method according to claim 109, further comprising:
- communicating said end-user quality of service (QoS) requirements between a wireless local area network (LAN) station (STA) and an access point (AP).

120. The method according to claim 109, further comprising:
- communicating said end-user quality of service (QoS) requirements between a wireless wide area network (WAN) station (STA) and an access point (AP).

121. The method according to claim 109, the step of scheduling further comprising:
- allocating resources of said shared wireless bandwidth among a plurality of wireless network stations to optimize end-user quality of service (QoS) for an Internet Protocol (IP) flow.

122. The method according to claim 121, the step of scheduling further comprising:
- assigning future slots of a transmission frame to a portion of said IP flow in said transmission frame for transmission over said shared wireless network.

123. The method according to claim 122, the step of assigning, further comprising:
- applying a reservation algorithm;
- reserving a slot for a first portion of a first IP flow in a future transmission frame based on said algorithm;
- reserving a second slot for a second portion of said first IP flow in a transmission frame subsequent in time to said future transmission frame based on said algorithm;
- placing said first portion of said first IP flow in said first slot; and
- placing said second portion of said first IP flow in said second slot in an isochronous manner to the placing of said first portion in said first slot.

124. The method according to claim 123, further comprising:
- interposing a periodic variation between the placing of said first portion in said first slot and the placing of said second portion in said second slot.

125. The method according to claim 123, further comprising:
- interposing an aperiodic variation between the placing of said first portion in said first slot and the placing of said second portion in said second slot.

126. The method according to claim 121, further comprising:
- determining whether said IP flow is at least one of a jitter-sensitive IP flow and a latency sensitive IP flow.

127. The method according to claim 121, the step of allocating further comprising:
- accounting for hierarchical class based priorities (HCBPs) for said IP flow.

128. The method according to claim 121, the step of allocating further comprising:
- accounting for virtual private network (VPN) priorities for said IP flow.

129. The method according to claim 121, the step of allocating further comprising:
   accounting for service level agreement (SLA) based priorities for said IP flow.

130. The method according to claim 121, the step of allocating further comprising:
   accounting for any type of service (TOS) priorities for said IP flow.

131. The method according to claim 121, the step of allocating further comprising:
   accounting for any differentiated services (DiffServ) priorities for said IP flow.

132. The method according to claim 121, further comprising:
   associating said IP flow with at least one of a voice-over-Internet Protocol (VoIP) data and a video data application.

133. The method according to claim 109, wherein said shared wireless bandwidth is at least one of a local area network (LAN) and a wide area network (WAN).

134. The method according to claim 121, wherein said wireless network stations comprise at least one of a local area network (LAN) wireless network station and a wide area network (WAN) wireless network station.

135. The method according to claim 109, the step of classifying further comprising:
   controlling the behavior of a packet scheduler according to said end-user quality of service (QoS) requirements as managed by a service management system.

136. The method according to claim 109, further comprising:
   constructing a wireless transmission frame from said plurality of packets including accounting for said end user QoS requirements and maximizing wireless bandwidth utilization.

137. The method according to claim 136, further comprising:
   placing at least one of a complete and a partial packet into said wireless transmission frame.

138. The method according to claim 109, further comprising:
   controlling a local area network media (LAN) access control (MAC) layer including accounting for said end-user QoS requirements.

139. The method according to claim 109, wherein said scheduling step is performed by a packet scheduler comprising:
   an off-the-shelf MAC/PHY network interface card (NIC) adapter including at least one of a PCI form factor, a PCMCIA form factor, a PC Card form factor, a PCI bus, a PCMCIA bus, and a PC Card bus.

140. The method according to claim 109, further comprising:
   coordinating, by an access point (AP), access to a radio frequency (RF) wireless resource by one or more wireless network stations comprising
   controlling, by said AP, access to said RF wireless resource by said one or more wireless network stations comprising
   receiving reservation requests from said one or more wireless network stations at said AP and sending grants from said AP to said one or more wireless network stations.

141. The method according to claim 140, further comprising:
   periodically polling said one or more wireless network stations for said reservation requests so as to minimize latency for new IP flows.

142. The method according to claim 140, wherein said coordinating step further comprises:
   obviating performance degradation caused by contention-based media access methods.

143. The method according to claim 140, wherein said coordinating step further comprises:
   allocating resources to said one or more wireless network stations comprising:
      minimizing latency for new IP flows.

144. The method according to claim 140, wherein said coordinating step further comprises:
   ensuring high priority packets are provided appropriate bandwidth needed by said high priority packets.

145. The method according to claim 109, wherein said scheduling step comprises:
   allocating said shared wireless bandwidth for IP flows requiring special QoS treatment; and
   providing application-aware packet discards, while avoiding at least one of uncontrolled packet discards and media access contention resolution.

146. The method according to claim 109, wherein said scheduling step comprises:
   allocating said shared wireless bandwidth in oversubscribed environments without consequent degradation of high priority Voice over IP (VoIP) and video applications.

* * * * *